US012761972B1

(12) United States Patent
Fontaine et al.

(10) Patent No.: US 12,761,972 B1
(45) Date of Patent: Oct. 13, 2026

(54) APPLICATION PROGRAMMING INTERFACE TO MODIFY GRAPH DEPENDENCIES

(71) Applicant: NVIDIA Corporation, Santa Clara, CA (US)

(72) Inventors: David Anthony Fontaine, Mountain View, CA (US); Steven Arthur Gurfinkel, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 526 days.

(21) Appl. No.: 18/114,837

(22) Filed: Feb. 27, 2023

(51) Int. Cl.
*G06F 9/50* (2006.01)

(52) U.S. Cl.
CPC .................................. *G06F 9/5072* (2013.01)

(58) Field of Classification Search
CPC .................................................... G06F 9/5072
See application file for complete search history.

(56) References Cited

U.S. PATENT DOCUMENTS

| | | | |
|---|---|---|---|
| 5,689,711 | A | 11/1997 | Bardasz et al. |
| 6,937,969 | B1 | 8/2005 | Vandersteen et al. |
| 7,478,375 | B1 | 1/2009 | Kersters |
| 8,115,773 | B2 | 2/2012 | Swift et al. |
| 8,181,168 | B1 | 5/2012 | Lee et al. |
| 8,239,404 | B2 | 8/2012 | Zhou et al. |
| 8,539,516 | B1 | 9/2013 | Wilt et al. |
| 9,251,225 | B2 | 2/2016 | Stanfill |
| 9,372,670 | B1 | 6/2016 | Cartey et al. |
| 9,411,706 | B1 | 8/2016 | van Schaik |
| 9,542,192 | B1 | 1/2017 | Wilt et al. |
| 9,684,944 | B2 | 6/2017 | Taylor et al. |
| 10,417,058 | B1 | 9/2019 | Kesler |
| 10,540,270 | B1 | 1/2020 | Surkatty et al. |
| 10,673,712 | B1 * | 6/2020 | Gosar ................ H04L 41/5096 |
| 11,003,423 | B2 | 5/2021 | Mazurskiy |
| 11,055,812 | B1 * | 7/2021 | Asthana ................ G06F 9/5027 |
| 11,113,030 | B1 | 9/2021 | Monga et al. |
| 11,150,961 | B2 | 10/2021 | Agarwal et al. |
| 11,340,873 | B2 | 5/2022 | Cangea et al. |
| 11,422,797 | B1 | 8/2022 | Zhang et al. |
| 11,455,152 | B2 | 9/2022 | Zhang |
| 11,842,221 | B2 | 12/2023 | Glass et al. |
| 11,868,237 | B2 | 1/2024 | Balasubramanian et al. |
| 12,073,263 | B1 | 8/2024 | Thompson |
| 12,159,217 | B1 | 12/2024 | Borkovic |
| 12,443,462 | B1 | 10/2025 | Fontaine et al. |
| 2004/0088666 | A1 | 5/2004 | Poznanovic et al. |
| 2005/0034106 | A1 | 2/2005 | Kornerup et al. |

(Continued)

OTHER PUBLICATIONS

Nvidia, "CUDA Runtime API, Reference Manual", Jan. 2022, <https://docs.nvidia.com/cuda/archive/11.6.0/pdf/CUDA_Runtime_API.pdf>,> Chapter 6.30, 638 pages.

(Continued)

*Primary Examiner* — Sisley N Kim
(74) *Attorney, Agent, or Firm* — Davis Wright Tremaine LLP

(57) ABSTRACT

Apparatuses, systems, and techniques to perform an application programming interface (API) to cause dependency type information of one or more graph nodes of a software graph to be modified. In at least one embodiment, one or more dependency types from a graph are modified.

20 Claims, 65 Drawing Sheets

(56) References Cited

U.S. PATENT DOCUMENTS

| | | | |
|---|---|---|---|
| 2005/0155034 | A1 | 7/2005 | Jiang et al. |
| 2005/0174984 | A1 | 8/2005 | O'Neill |
| 2007/0174494 | A1 | 7/2007 | Bonwick et al. |
| 2007/0220031 | A1 | 9/2007 | MacMahon et al. |
| 2008/0278482 | A1 | 11/2008 | Farmanbar et al. |
| 2009/0055630 | A1 | 2/2009 | Isshiki et al. |
| 2009/0102846 | A1 | 4/2009 | Flockermann et al. |
| 2009/0113396 | A1 | 4/2009 | Rosen et al. |
| 2010/0079462 | A1 | 4/2010 | Breeds et al. |
| 2010/0333110 | A1 | 12/2010 | Luo et al. |
| 2012/0008530 | A1 | 1/2012 | Kulkarni et al. |
| 2012/0072887 | A1 | 3/2012 | Basak |
| 2012/0278365 | A1 | 11/2012 | Labat et al. |
| 2013/0097183 | A1 | 4/2013 | McCracken |
| 2013/0127891 | A1 | 5/2013 | Kim et al. |
| 2013/0212131 | A1 | 8/2013 | Reddy |
| 2015/0006644 | A1 | 1/2015 | Anantharam et al. |
| 2015/0016257 | A1 | 1/2015 | Kumar et al. |
| 2015/0288595 | A1 | 10/2015 | Suzuki |
| 2016/0077896 | A1* | 3/2016 | Bolz ......................... G06F 9/54 719/328 |
| 2016/0139894 | A1 | 5/2016 | Slesarenko et al. |
| 2016/0210720 | A1 | 7/2016 | Taylor et al. |
| 2016/0210724 | A1 | 7/2016 | Taylor et al. |
| 2016/0253625 | A1 | 9/2016 | Casey |
| 2016/0307353 | A1 | 10/2016 | Ligenza et al. |
| 2017/0286526 | A1 | 10/2017 | Bar-Or et al. |
| 2017/0373946 | A1 | 12/2017 | Lewandowski et al. |
| 2018/0113713 | A1 | 4/2018 | Cheng et al. |
| 2018/0136933 | A1 | 5/2018 | Kogan et al. |
| 2018/0181676 | A1 | 6/2018 | Khandelwal et al. |
| 2018/0218259 | A1 | 8/2018 | Braz et al. |
| 2019/0130777 | A1 | 5/2019 | Dey et al. |
| 2019/0146763 | A1 | 5/2019 | Gould |
| 2019/0182107 | A1 | 6/2019 | Saxena et al. |
| 2019/0188055 | A1 | 6/2019 | Hunt et al. |
| 2019/0327154 | A1 | 10/2019 | Sahoo et al. |
| 2019/0339966 | A1 | 11/2019 | Moondhra et al. |
| 2019/0370061 | A1 | 12/2019 | Shah et al. |
| 2019/0370407 | A1 | 12/2019 | Dickie |
| 2019/0370927 | A1 | 12/2019 | Frenkel et al. |
| 2020/0004514 | A1* | 1/2020 | Yu ........................... G06N 3/08 |
| 2020/0050633 | A1 | 2/2020 | Evans et al. |
| 2020/0057748 | A1 | 2/2020 | Danilak |
| 2020/0136891 | A1 | 4/2020 | Mdini et al. |
| 2020/0202246 | A1 | 6/2020 | Lin et al. |
| 2020/0310937 | A1 | 10/2020 | Takeda |
| 2020/0364088 | A1 | 11/2020 | Ashwathnarayan et al. |
| 2020/0371761 | A1 | 11/2020 | Gupta et al. |
| 2020/0396075 | A1 | 12/2020 | Visegrady et al. |
| 2020/0409671 | A1 | 12/2020 | Mazurskiy |
| 2020/0409709 | A1 | 12/2020 | ChoFleming et al. |
| 2021/0004263 | A1 | 1/2021 | Moita et al. |
| 2021/0011849 | A1 | 1/2021 | Simpson et al. |
| 2021/0037397 | A1 | 2/2021 | Guo et al. |
| 2021/0073169 | A1 | 3/2021 | Wang et al. |
| 2021/0089368 | A1 | 3/2021 | Goosen et al. |
| 2021/0096921 | A1 | 4/2021 | Banerjee et al. |
| 2021/0133089 | A1 | 5/2021 | Khillar et al. |
| 2021/0149719 | A1 | 5/2021 | Jones et al. |
| 2021/0149734 | A1 | 5/2021 | Gurfinkel et al. |
| 2021/0232579 | A1 | 7/2021 | Schechter et al. |
| 2021/0248115 | A1 | 8/2021 | Jones et al. |
| 2021/0311727 | A1 | 10/2021 | Khullar |
| 2021/0318908 | A1 | 10/2021 | Cavus et al. |
| 2021/0373974 | A1 | 12/2021 | Agarwal et al. |
| 2022/0019188 | A1* | 1/2022 | Kansky .................. B25J 9/1664 |
| 2022/0103417 | A1 | 3/2022 | Grammel et al. |
| 2022/0214861 | A1 | 7/2022 | Sohrabizadeh et al. |
| 2022/0245009 | A1 | 8/2022 | Vasiljevic et al. |
| 2022/0334851 | A1 | 10/2022 | Zhurba et al. |
| 2022/0334891 | A1 | 10/2022 | Fontaine |
| 2022/0335448 | A1 | 10/2022 | Garg et al. |
| 2022/0361127 | A1 | 11/2022 | Chen |
| 2023/0005096 | A1* | 1/2023 | Gurfinkel .................. G06T 1/60 |
| 2023/0005097 | A1 | 1/2023 | Gurfinkel et al. |
| 2023/0084951 | A1 | 3/2023 | Fontaine et al. |
| 2023/0108560 | A1 | 4/2023 | Wang |
| 2023/0118695 | A1 | 4/2023 | Zhang et al. |
| 2023/0140822 | A1 | 5/2023 | Purnomo et al. |
| 2023/0185634 | A1 | 6/2023 | Fontaine et al. |
| 2023/0185635 | A1 | 6/2023 | Vaz |
| 2023/0244523 | A1 | 8/2023 | Gorantla et al. |
| 2023/0244549 | A1 | 8/2023 | Fontaine et al. |
| 2023/0297444 | A1 | 9/2023 | Fernandes et al. |
| 2024/0053991 | A1 | 2/2024 | Wei et al. |
| 2024/0118965 | A1 | 4/2024 | Ashrafi et al. |
| 2024/0168795 | A1 | 5/2024 | Edwards et al. |
| 2024/0220314 | A1 | 7/2024 | Gasparakis |
| 2024/0289187 | A1 | 8/2024 | Fontaine et al. |
| 2025/0021407 | A1 | 1/2025 | Fontaine et al. |
| 2025/0138795 | A1 | 5/2025 | Dubrovsky et al. |

OTHER PUBLICATIONS

IEEE "IEEE Standard for Floating-Point Arithmetic", Microprocessor Standards Committee of the IEEE Computer Society, IEEE Std 754-2008, dated Jun. 12, 2008, 70 pages.
Gray, "Getting Started with CUDA Graph," retrieved from forums.developer.nvidia.com, Sep. 5, 2019, 9 pages.
Jones, "CUDA Graphs Updates," NVIDIA, Oct. 2022, 35 pages.
Abdolrashidi et al., "WIREFRAME: Supporting Data-dependent Parallelism through Dependency Graph Execution in GPUs," ACM, 2017, 12 pages.
Zhou et al., "Deadlock Prediction via Generalized Dependency," ACM, 2022, 12 pages.
Gutman et al., "CUDA Graph Usage: CUDA FeatureTesting," retrieved from <https://web.archive.org/web/20201028074137/https://codingbyexample.com/2020/09/25/cuda-graph-usage/,> 2020, 14 pages.
Yu et al., "OpenMP to CUDA Graphs: a Compiler-based Transformation to Enhance the Programmability of NVIDIA Devices," ACM, 2020, 6 pages.
Clucas et al., "Ripple: Simplified Large-Scale Computation on Heterogeneous Architectures with Polymorphic Data Layout", Journal of Parallel and Distributed Computing, Apr. 20, 2021, 18 pages.
U.S. Appl. No. 18/114,672, filed Feb. 27, 2023.
U.S. Appl. No. 18/114,689, filed Feb. 27, 2023.
U.S. Appl. No. 18/114,696, filed Feb. 27, 2023.
U.S. Appl. No. 18/114,701, filed Feb. 27, 2023.
U.S. Appl. No. 18/114,706, filed Feb. 27, 2023.
U.S. Appl. No. 18/114,711, filed Feb. 27, 2023.
U.S. Appl. No. 18/114,719, filed Feb. 27, 2023.
U.S. Appl. No. 18/114,724, filed Feb. 27, 2023.
U.S. Appl. No. 18/114,726, filed Feb. 27, 2023.
U.S. Appl. No. 18/114,734, filed Feb. 27, 2023.
U.S. Appl. No. 18/114,680, filed Feb. 27, 2023.
U.S. Appl. No. 18/114,771, filed Feb. 27, 2023.
U.S. Appl. No. 18/114,776, filed Feb. 27, 2023.
U.S. Appl. No. 18/114,783, filed Feb. 27, 2023.
U.S. Appl. No. 18/114,813, filed Feb. 27, 2023.
U.S. Appl. No. 18/114,789, filed Feb. 27, 2023.
U.S. Appl. No. 18/114,736, filed Feb. 27, 2023.
U.S. Appl. No. 18/114,825, filed Feb. 27, 2023.
U.S. Appl. No. 18/114,831, filed Feb. 27, 2023.
U.S. Appl. No. 18/114,802, filed Feb. 27, 2023.
U.S. Appl. No. 18/114,870, filed Feb. 27, 2023.

* cited by examiner

FIG. 38B
GENERAL-PURPOSE GRAPHICS PROCESSING UNIT 3830
MEMORY CONTROLLER 3842A
MEMORY CONTROLLER 3842B
HOST INTERFACE 3832
GLOBAL SCHEDULER 3834
COMPUTE CLUSTER 3836A
COMPUTE CLUSTER 3836B
COMPUTE CLUSTER 3836C
COMPUTE CLUSTER 3836D
CACHE MEMORY 3838
COMPUTE CLUSTER 3836E
COMPUTE CLUSTER 3836F
COMPUTE CLUSTER 3836G
COMPUTE CLUSTER 3836H
I/O HUB 3839
GPU LINK 3840
MEMORY 3844A
MEMOR Y 3844B

APPLICATION PROGRAMMING INTERFACE TO MODIFY GRAPH DEPENDENCIES

FIELD

At least one embodiment pertains to techniques for parallel computing. For example, at least one embodiment pertains to processors or computing systems used to perform an application programming interface (API) to cause dependency type information of one or more graph nodes of a software graph to be modified.

BACKGROUND

Parallel computing programs, when scheduling tasks, may cause one or more tasks of a software graph to depend from one or more other tasks. Tasks are performed according to a category of dependency between tasks.

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Figure 1:
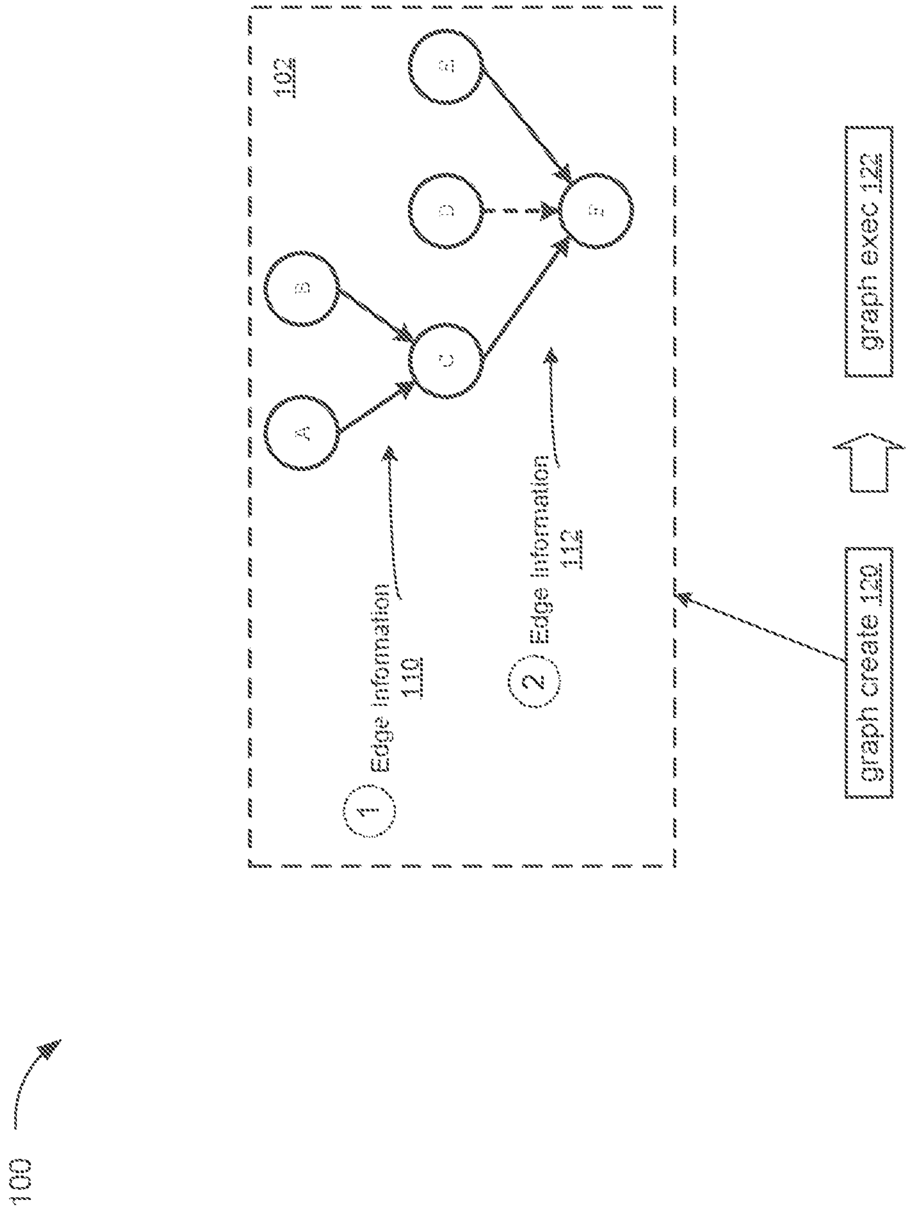
FIG. 1 illustrates graph creation and execution, in accordance with at least one embodiment.

FIG. 1 illustrates graph creation and execution, in accordance with at least one embodiment. In at least one embodiment, a processor comprises circuitry to set a dependency between two or more nodes of a graph. In at least one embodiment, a dependency in a graph is obtained via an application programming interface ("API") that is used to either explicitly define, or to capture information that defines, this graph. In at least one embodiment, an API is to indicate one or more node dependencies of a graph.

In at least one embodiment, an example process 100 for creating and using graphs comprises graph create 120 and graph execution 122, where said process 100 comprises generating and executing graph 102. In at least one embodiment, a graph represents operations to be performed by one or more graphics processing units ("GPUs"), or other parallel processing units ("PPUs"). In at least one embodiment, a graph represent one or more operations to be performed that include one or more of a kernel operation, a CPU function call, a memory copy operation, a memory set operation, an event operation, a semaphore operation, and/or an embedded child graph operation. In at least one embodiment, a graph comprises nodes that represent operations to be performed by one or more GPUs, and edges that represent dependencies between these operations. In at least one embodiment, a graph comprises nodes that represent instructions to be performed by one or more GPUs, and edges that represent dependencies between these instructions. In at least one embodiment, a graph comprises nodes that represent one or more of primitives, functions, user instructions, micro-operations, kernels, graph code, and/or any suitable actions. In at least one embodiment, these dependencies correspond to data flow between operations, such as output from one operation that is provided to another operation. In at least one embodiment, dependencies between nodes of a graph represent a manner in which operations corresponding to these nodes are to be performed. In at least one embodiment, a graph is stored in a computer memory as a data structure that comprises representations of its nodes and edges.

In at least one embodiment, creating a graph is created by at least one of explicit definition or stream capture. In at least one embodiment, explicit definition of a graph comprises use of one or more application programming interfaces ("APIs") (e.g., as described below in relation to FIGS. 6-26) that defines said graph's nodes and edges, where said nodes represent operations to be performed by one or more GPUs or PPUs and said edges represent data flow and/or performance ordering between nodes. In at least one embodiment, stream capture comprises intercepting and recording operations directed to a GPU or PPU. For example, in at least one embodiment, a graph is constructed from stream capture by identifying kernel operations streamed to a GPU and constructing a graph that represents these operations and their dependencies. In at least one embodiment, a kernel represents a function, routine, or other unit of code to be performed by one or more GPUs or PPUs.

In at least one embodiment, nodes are added to a graph using one or more APIs (e.g., as described below in relation to FIGS. 6-26) that defines nodes and/or edges between nodes to be added to a graph. In at least one embodiment, an API is specific to one type of node. In at least one embodiment, for example, an API may be used to add a node to a graph that performs one or more of a kernel operation, a CPU function call, a memory copy operation, a memory set operation, an event operation, a semaphore operation, and/or an embedded child graph operation. In at least one embodiment, an API may generate a node to be added to a graph for any of a plurality of node types. In at least one embodiment, for example, a single API could be used to generate a kernel node, or alternatively generate a memory copy node. In at least one embodiment, an API adds a node to a graph having a particular type based, at least in part, on one or more parameters provided to as input. In at least one embodiment, for example, based on an API receiving parameters corresponding to a kernel node type, a kernel node will be added to a graph. In at least one embodiment, in another example, an API receiving parameters corresponding to an empty node type, an empty node will be added to a graph. In at least one embodiment, parameters provided to an API may be in any number of formats and/or arrangements. In at least one embodiment, an API will receive parameters arranged in one or more data structures. In at least one embodiment, a data structure may comprise a union data structure, such as a tagged union. In at least one embodiment, a data structure may occupy a fixed amount of memory independent of parameters that are to be stored. In at least one embodiment, for example, parameters required to add a kernel node to a graph may occupy more memory than parameters required to add an empty kernel node to a graph, but a data structure is associated with a fixed size allocation of memory. In at least one embodiment, memory allocated to parameters provided to an API comprises one or more memory addresses to be used as padding. In at least one embodiment, memory used as padding is initialized to a default value. In at least one embodiment, a portion of memory used as padding may be used to store additional API parameters, such as parameters added for additional functionality and/or expandability.

In at least one embodiment, memory allocated to node parameters provided to, and/or generated by, an API, comprises one or more memory addresses to be used as padding. In at least one embodiment, and API is to access a data structure having a variable number of null (or zero set) parameters to be used as padding. In at least one embodiment, for example, any memory addresses of a data structure used to store parameters that are unused are to be null or padding values. In at least one embodiment, memory used as padding is initialized to a default value. In at least one embodiment, a portion of memory used as padding may be used to store additional API node parameters, such as parameters added for additional functionality and/or expandability. In at least one embodiment, a data structure allows new parameters (e.g., data fields) to be added based on a node type. In at least one embodiment, new fields are given a default value such that enable background compatibility with instructions that do not use said new fields. In at least one embodiment, a size of padding used in a data structure is a size of a largest available node-type parameter structure. In at least one embodiment, for example, if a largest parameter in a data structure is 184 bytes, a portion of padding in said data structure is also 184 bytes. In at least one embodiment, a size of padding used in a data structure is larger than a size of a largest available node-type structure. In at least one embodiment, for example, if a largest parameter in a data structure is 184 bytes, a portion of padding in said data structure is greater than 184 bytes.

In at least one embodiment, a data structure including node parameters includes one or more flags. In at least one embodiment, for example, a data structure includes one or more flags that are specific to a node type. In at least one embodiment, for example, a child graph node is to have a flag facilitating a transfer of ownership, rather than a cloning, of a child graph. In at least one embodiment, an API (such as described below in relation to FIGS. 6-26) is to populate flags of a data structure so that it can be accessed by one or more other processes. In at least one embodiment, for example, an API is to query a node parameters of a child graph and set a flag associated with a transfer operation instead of a cloning operation.

In at least one embodiment, an example parameter data structure to be access by an API, is as follows:

```
typedef struct cudaGraphNodeParams_st {
  cudaGraphNodeType type;
  int32_t reserved0[3];
  union {
    int64_t; reserved1[30]
    cudaKernelNodeParamsV2 kernel;
    cudaMemcpyNodeParams memcpy;
    cudaMemsetNodeParamsV2 memset;
    cudaHostNodeParamsV2 host;
    cudaMemAllocNodeParamsV2 alloc;
    cudaMemFreeNodeParams free;
    cudaChildGraphNodeParams childGraph;
    cudaEventRecordNodeParams eventRecord;
    cudaEventWaitNodeParams eventWait;
    cudaExternalSemaphoreWaitNodeParamsV2 extSemWait;
    cudaExternalSemaphoreSignalNodeParamsV2 extSemSignal;
  };
}cudaGraphNodeParams;
```

Where cudaGraphNodeParams_st is a data structure, cudaGraphNodeType indicates a type of node to add to a graph, and cudaGraphNodeParams is a union of parameters corresponding to kernel nodes, memory copy nodes, memory set nodes, host nodes, memory allocation nodes, memory free nodes, child graph nodes, event record nodes, event wait nodes, external semaphore wait nodes, external semaphore signal nodes, and/or padding. In at least one embodiment, based on a type of node indicated by cudaGraphNodeType, appropriate parameters will be accessed from union cudaGraphNodeParams. In at least one embodiment, for example, if a node type is indicated as a kernel node, kernel node parameters are accessed in a union of a data structure. In at least one embodiment, similarly, if a node type is indicated as a memory allocation node, memory allocation parameters are accessed from a union of a data structure.

In at least one embodiment, one or more GPUs or PPUs execute operations in a graph. For example, in at least one embodiment, a GPU or PPU executes kernel operations represented by a graph. In at least one embodiment, graph operations are performed using parallelism, where possible. Some nodes of a graph may, in at least one embodiment, be dependent on other operations, and accordingly operations in a graph may be executed in accordance with those dependencies.

In at least one embodiment, a graph is processed, after its definition, to prepare for execution by one or more GPUs or PPUs. In at least one embodiment, this may include compilation of said graph, applications of various optimizations, or other processing. In at least one embodiment, processing may include communication between a CPU and one or more GPUs or PPUs that are to execute a graph.

In at least one embodiment, a graph dependency refers to a relationship between nodes of a graph. In at least one embodiment, a graph dependency refers to a relationship in which at least one node relies on completion of at least one other node. In at least one embodiment, a graph dependency refers to a relationship in which at least one node relies on a launching order of at least one other node. In at least one embodiment, a graph dependency refers to a relationship in which at least one other dependency is prevented between a node and at least one other node. In at least one embodiment, a graph dependency causes one node of a graph to wait until at least one other node is launched before being launched. In at least one embodiment, an order of graph dependencies refers to a sequence in which these relationships were defined. In at least one embodiment, this sequence information is obtained from API calls made to define a graph, whether through an explicit API, stream capture, or other mechanism.

In at least one embodiment, a graph dependency is a full execution dependency. In at least one embodiment, an full execution dependency is a dependency between two nodes in which a first node of these two nodes is blocked by a second node until this second node finished executing (e.g., as described below in relation to full execution dependency 302 of FIG. 3). In at least one embodiment, an full execution dependency prevents a first node from being performed until a second node has completed being performed. In at least one embodiment, one or more nodes associated with a full execution dependency may correspond to a dependency definition and/or edge information indicating a full execution dependency.

In at least one embodiment, a graph dependency is an anti-deadlock dependency. In at least one embodiment, an anti-deadlock dependency is a dependency between two nodes in which a first node of these two nodes is not caused to be blocked (e.g., throttled) by a second node (e.g., as described below in relation to anti-deadlock dependency 332 of FIG. 3). In at least one embodiment, an anti-deadlock dependency prevents a first node from blocking a second node while permitting said second node to prevent said first node from being performed. In at least one embodiment, one or more nodes associated with an anti-deadlock dependency may correspond to an indication of an anti-deadlock dependency. In at least one embodiment, an API is performed to cause an anti-deadlock attribute to be stored to prevent one or more nodes of a graph from delaying a launch and/or performance of one or more other nodes. In at least one embodiment, an API is performed to cause to prevent one or more dependencies from being added to two or more threads. In at least one embodiment, for example, a first thread associated with a node of a graph is prevented from having another dependency imposed on it by one or more other threads associated with one or more other nodes of a graph. In at least one embodiment, one or more node with an asserted anti-deadlock attribute is to prevent one or more dependencies (e.g., launch order dependency, full execution dependency, etc.) from being generated an association to one or more other nodes. In at least one embodiment, an anti-deadlock attribute associated with a thread is set using a launch attribute. In at least one embodiment, an anti-deadlock attribute is automatically asserted based on detecting a potential deadlock of one or more operations. In at least one embodiment, an anti-deadlock attribute is automatically asserted based on a type of operation associated with a node. In at least one embodiment, for example, nodes associated with a memory operation may have an anti-deadlock attribute automatically asserted as a default value. In at least one embodiment, nodes with an anti-deadlock attribute asserted are not to be blocked by other nodes that also have an anti-deadlock attribute asserted. In at least one embodiment, nodes with anti-deadlock attribute asserted are not to be blocked by upstream tasks which also have an anti-deadlock attribute asserted. In at least one embodiment, for example for Nodes A, B, C, when B has an anti-deadlock dependency from A, and C has an anti-deadlock dependency from B, a dependency from B to A, C to B, and/or C to A are prohibited.

In at least one embodiment, a graph dependency is a launch order dependency. In at least one embodiment, a launch order dependency is a dependency between two nodes in which a first node of these two nodes is constrained from being launched, or otherwise performed, before a second node of these two nodes is launched (e.g., as described below in relation to launch order dependency 312 of FIG. 3 and in FIG. 4). In at least one embodiment, an API is to control ordering of performance of one or more independent instructions associated with one or more nodes. In at least one embodiment, for example, a node constrained by a second node by a launch order dependency will wait until this second node is launched, but not necessarily having completed execution, before itself is launched. In at least one embodiment, a user specifies an order in which one or more instructions are to be performed. In at least one embodiment, a user specifies an order in which two or more independent instructions are to be performed, where said independent instructions do not have a data dependency with other independent nodes. In at least one embodiment, a node with a launch order dependency has one or more parameters defining one or more events to occur before said node is launched (e.g., rasterized). In at least one embodiment, an instruction is launched when one or more commands and/or instructions cause it to be committed to one or more resources, such as one or more processors. In at least one embodiment, for example, a node waits on an event, a launching of another node, before itself is able to be launched. In at least one embodiment, a node is associated with a waiting identifier that indicates one or more other nodes that must launch, but not necessarily complete execution, before it may be launched. In at least one embodiment, a launch order dependency may be defined in a launch attribute of a node, and used at a time of launch to perform said node. In at least one embodiment, a launch order dependency may preempt an existing ordering of nodes to be performed. In at least one embodiment, for example, node F in graph 102 may be defined prior to node D, but a launch order dependency from D to F (e.g., indicating that D must launch before F) may preempt, or otherwise have priority over, an existing ordering. In at least one embodiment, a launch order dependency may be defined between two or more instructions. In at least one embodiment, a launch order dependency may be defined between two or more kernels. In at least one embodiment, for example, a launch order dependency may be generated between a kernel node and another kernel node, memory copy node, and/or memory set node. In at least one embodiment, a launch order dependency may be defined between a kernel and a non-kernel operation, such as a CPU synchronization.

In at least one embodiment, a graph dependency is a fast launch dependency. In at least one embodiment, a fast launch dependency is a dependency which constrains a node of graph 102 to allow it to launch before another node has completed execution, or otherwise finished being performed (e.g., as described below in relation to fast launch dependency 322 of FIG. 3). In at least one embodiment, a fast dependency between two or more nodes facilitates performance of one or more tasks that are not dependent on results, data, or operations of said nodes. In at least one embodiment, for example, tasks that are not dependent on results, data, or operations of other nodes, comprises tasks such as zeroing buffers or loading constant data values, which can be performed concurrently.

In at least one embodiment, a graph include edge information, such as edge information 110 and/or edge information 112, that corresponding to one or more dependencies between two or more nodes, as described below in relation to FIG. 4 and/or FIG. 5. In at least one embodiment, edge information includes information indicating an edge type. In at least one embodiment, an edge type may specify a type of edge and/or a type of dependency associated with a corresponding edge. In at least one embodiment, for example, edge information associated with an edge indicates a launch order dependency for two nodes at a source and destination of this edge. In at least one embodiment, for example, edge information associated with an edge indicates an anti-deadlock dependency for two nodes at a source and destination of this edge. In at least one embodiment, edge information may include one or more port definitions. In at least one embodiment, using an edge type and/or port definitions in an edge information, constraints between two nodes are identified when a graph is created and/or executed.

In at least one embodiment, information collected during graph creation is used to generate and execute graphs. In at least one embodiment, this information comprises edge information, such as edge information 110 and/or edge information 112.

Figure 2:
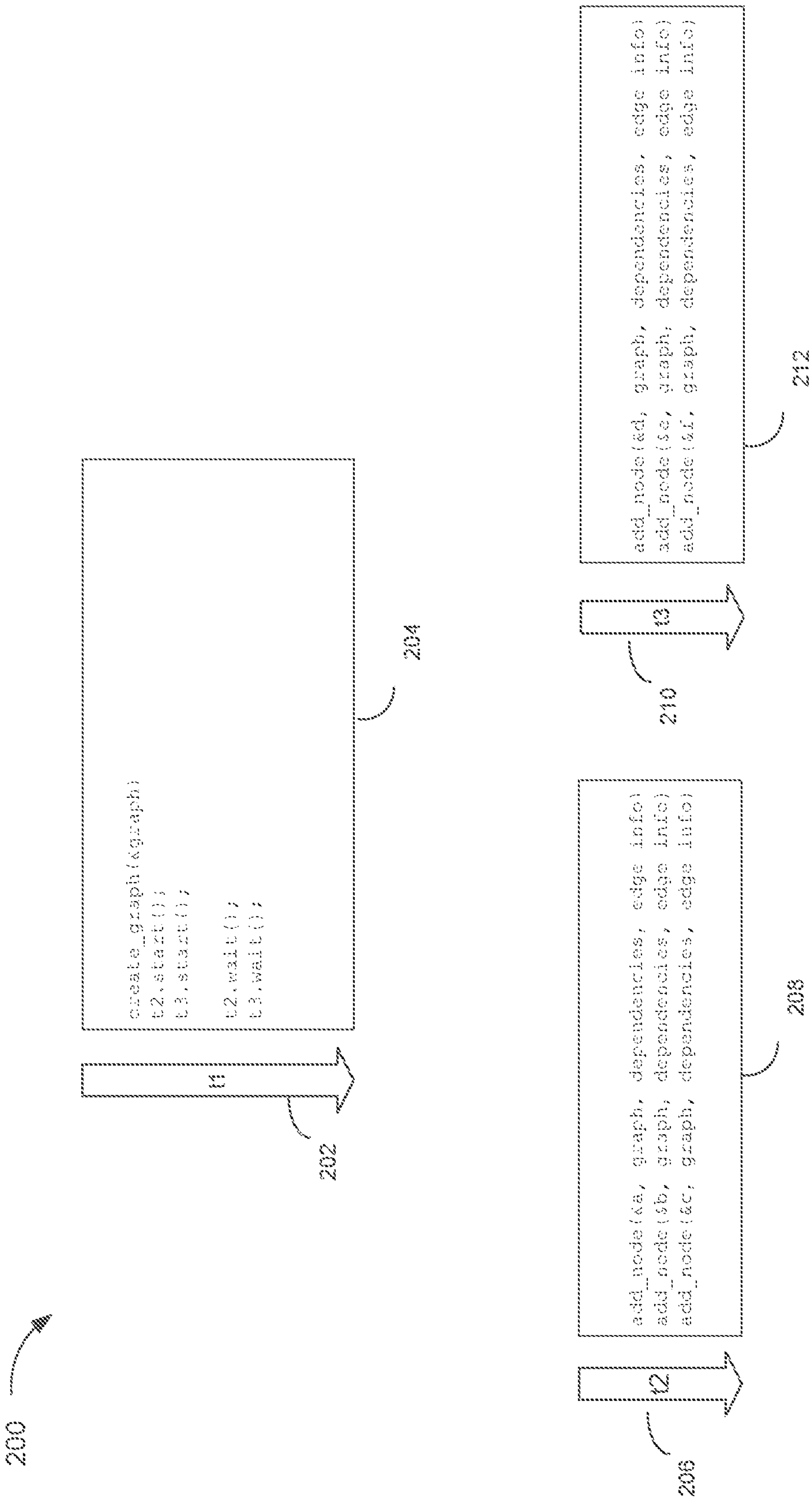
FIG. 2 illustrates an illustrates an example of graph creation, in accordance with at least one embodiment.

FIG. 2 illustrates an example 200 of graph creation, in accordance with at least one embodiment. In at least one embodiment, a program uses stream capture or graph creation APIs to define a graph in a multi-threaded environment. Because threads may execute in non-determinate order, a graph whose nodes are created on multiple threads may have nodes whose order of definition is non-deterministic. For example, in at least one embodiment, a thread 202 executes code 204 that starts child threads 206, 210, and these threads 206, 210 execute code 208, 212 to create nodes a-c and d-f, respectively. Because threads 206, 210 execute in non-deterministic order, in at least one embodiment, nodes a-f may be defined in non-deterministic order. For example, possible orders of definition might be (a, b, c, d, e, f) if t2 206 completes execution prior to t3 210, or (a, d, b, e, c, f) in one of many possible examples of interleaved execution.

In at least one embodiment, however, dependencies for this graph are defined by executing code 208, 212. In at least one embodiment, nodes may be added to a graph using one or more APIs (e.g., as described below in relation to FIGS. 6-26). In at least one embodiment, this may be done as illustrated in FIG. 2, where code 208, 212 includes instructions to add nodes a-f to a graph and set dependencies for nodes a-c and d-f. In at least one embodiment, edge information for this graph are defined by executing code 208, 212. It will be appreciated that this example is intended to be illustrative rather than limiting, and should not be construed in a manner which would limit potential embodiments to only those that incorporate this specific example.

In at least one embodiment, a graph defined in accordance with example 200 may be generated and/or executed, using dependency definitions and/or edge information. In at least one embodiment, a processor comprises circuitry to execute a graph, at least in part, on dependencies among nodes within each of these graphs, as described above in conjunction with FIG. 1. In at least one embodiment, a processor comprises circuitry to execute a graph, at least in part, on edge information among nodes within each of these graphs, as described above in conjunction with FIG. 1.

Figure 3:
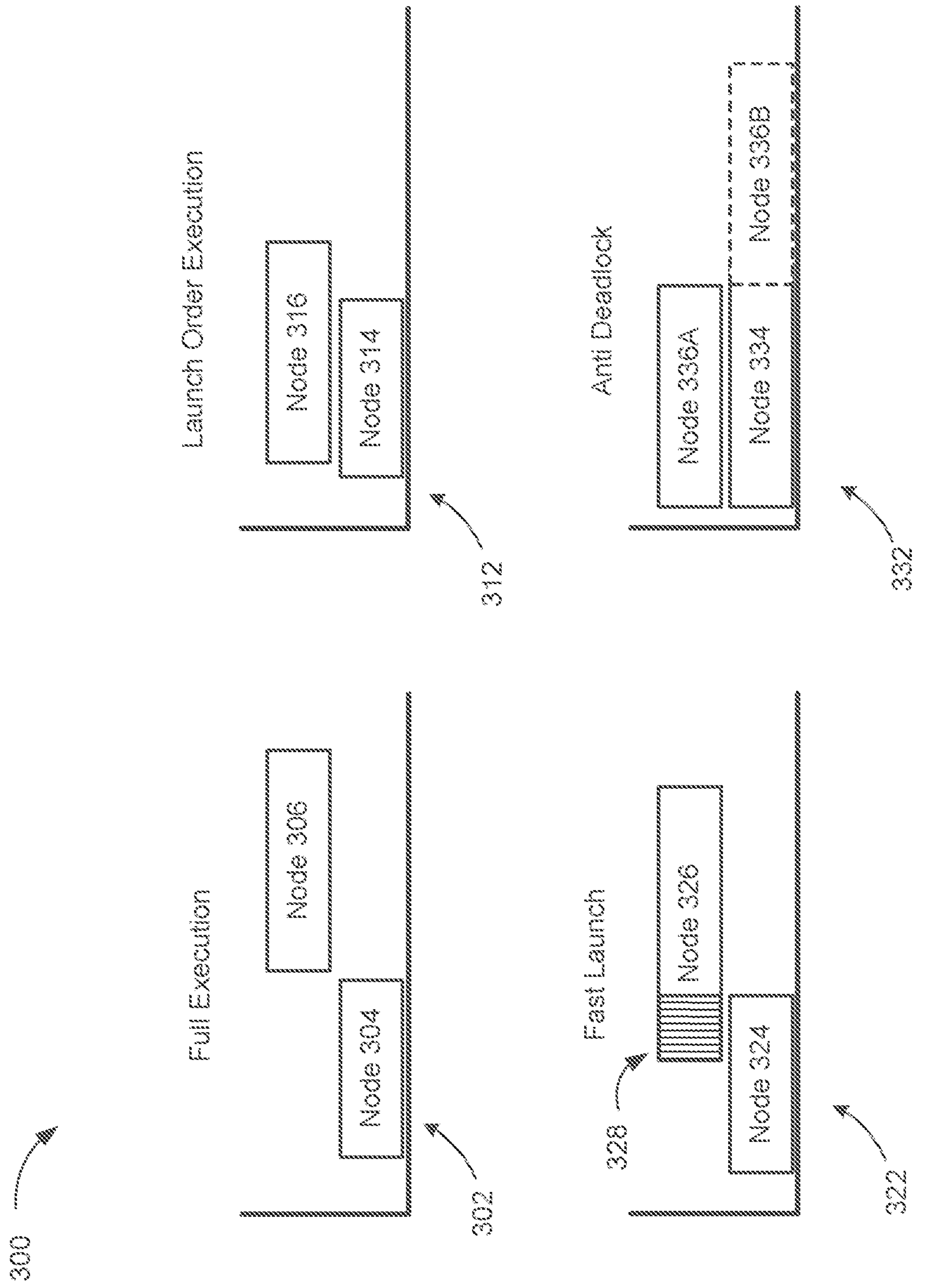
FIG. 3 is an example diagram illustrating node dependencies, in accordance with at least one embodiment.

FIG. 3 is an example diagram illustrating node dependencies 300, in accordance with at least one embodiment. In at least one embodiment, node dependencies 300 includes one or more dependencies that have a dependency type. In at least one embodiment, node dependencies 300 include one or more of a full execution dependency 302, launch order dependency 312, fast launch dependency 322, anti-deadlock dependency 332. In at least one embodiment, node dependencies 300 depict one or more temporal relationships between one or more nodes of a graph, as described above in conjunction with FIG. 1.

In at least one embodiment, full execution dependency 302 relates to a dependency between node 304 and node 306 of a graph. In at least one embodiment, a full execution dependency 302 is in accordance with dependencies described in connection with FIG. 1. In at least one embodiment, full execution dependency 302 is a constraint on node 304 and/or node 306 which prevents node 306 from being performed until a time that node 304 has finished execution, or otherwise being performed. In at least one embodiment, for example, node 306 is not launched for performance until node 304 has completed all associated operations.

In at least one embodiment, launch order dependency 312 relates to a dependency between node 314 and node 316 of a graph. In at least one embodiment, a launch order dependency 312 is in accordance with dependencies described in connection with FIG. 1. In at least one embodiment, launch order dependency 312 is a constraint on node 314 and/or node 316 which prevents one or more instructions associated with node 316 from being performed until a time that one or more instructions associated with node 314 has finished being launched, or otherwise begun to be performed. In at least one embodiment, for example, node 316 is not launched for performance until node 314 has been launched. In at least one embodiment, node 316 is launched to be performed at a time that precedes completed performance of node 314.

In at least one embodiment, fast launch dependency 322 relates to a dependency between node 324 and node 326 of a graph. In at least one embodiment, a fast launch dependency 322 is in accordance with dependencies described in connection with FIG. 1. In at least one embodiment, launch order dependency 322 is a constraint on node 324 and/or node 326 which allows node 326 to launch before node 324 has completed execution, or otherwise finished being performed. In at least one embodiment, node 326 performs one or more tasks that are not dependent on results, data, or operations of node 324 and portions of tasks associated with node 326 are performed concurrently with node 324. In at least one embodiment, for example, node 326 includes a preamble 328 comprising tasks such as zeroing buffers or loading constant data values, which does not depend on node 324 and can be performed concurrently. In at least one embodiment, performance of a portion of node 324 causes a trigger to cause node 326 to launch. In at least one embodiment, a trigger associated with node 324 indicates that node 326 is to be launched.

In at least one embodiment, anti-deadlock dependency 332 relates to a dependency between node 334 and node 336A of a graph. In at least one embodiment, an anti-deadlock dependency 332 is in accordance with dependencies described in connection with FIG. 1. In at least one embodiment, anti-deadlock dependency 332 is a constraint on node 334 and/or node 336A which prevents node 334 from being blocked (e.g., throttled) by node 336A. For example, node 334 constrains node 336B from being performed using a full execution dependency between node 334 and node 336B. In at least one embodiment, in that example, node 336B does not have an anti-deadlock dependency with node 334, such that another dependency (e.g., full execution dependency) can be formed between node 336B and node 334. In at least one embodiment, node 334 is launched to be performed at a time that is not constrained by a complete and/or partial launch and/or performance of node 336A.

Figure 4:
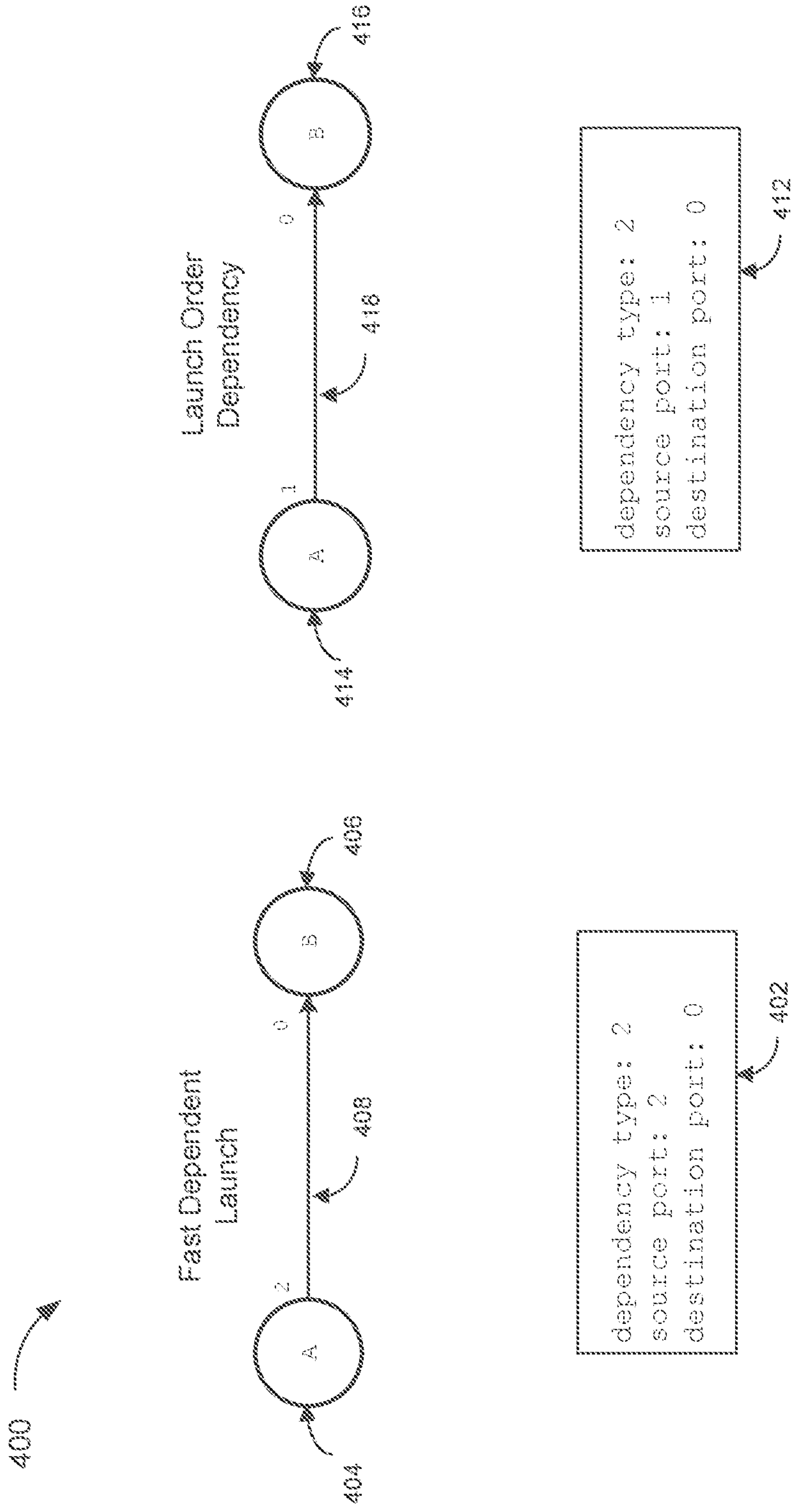
FIG. 4 is an example diagram illustrating dependency edge information, in accordance with at least one embodiment.

FIG. 4 is an example diagram illustrating dependency edge information 400, in accordance with at least one embodiment. In at least one embodiment, dependency edge information 400 comprises edge information 402 and/or edge information 412. In at least one embodiment, edge information 402 may correspond to a fast dependent launch dependency type for an edge 408 between node 404 and node 406. In at least one embodiment, edge information 402 includes an edge dependency type. In at least one embodiment, edge dependency type is represented by a corresponding value (e.g., "2") that indicates a particular dependency type for edge 408. In at least one embodiment, edge information 402 includes port definitions that include a source port definition and/or a destination port definition corresponding to edge 408. In at least one embodiment, source port definition is associated with a source node (e.g., node 404) of edge 408. In at least one embodiment, a destination port definition is associated with a destination node (e.g., node 406) of edge 408. In at least one embodiment, a source port definition and/or destination port definition is represented by a value indicating one or more constraints on operations of node 404 and/or node 406. In at least one embodiment, for example, a source port definition having a numerical value "2" and a destination port definition having a numerical value "0," may indicate that, based on a dependency type of "2," that there exists a fast launch dependency between node 404 and node 406.

In at least one embodiment, edge information 412 may correspond to a launch order dependency type for an edge 418 between node 414 and node 416. In at least one embodiment, edge information 412 includes an edge dependency type. In at least one embodiment, edge dependency type is represented by a corresponding value (e.g., "2") that indicates a particular dependency type for edge 418. In at least one embodiment, edge information 412 includes port definitions that include a source port definition and/or a destination port definition corresponding to edge 418. In at least one embodiment, source port definition is associated with a source node (e.g., node 414) of edge 418. In at least one embodiment, a destination port definition is associated with a destination node (e.g., node 416) of edge 418. In at least one embodiment, a source port definition and/or destination port definition is represented by a value indicating one or more constraints on operations of node 414 and/or node 416. In at least one embodiment, for example, a source port definition having a numerical value "1" and a destination port definition having a numerical value "0," may indicate that, based on a dependency type of "2," that there exists a launch order dependency between node 414 and node 416. In at least one embodiment, based on a dependency type indicated by edge information 412, one or more instructions associated with node 416 will not begin performance until one or more instructions associated with node 414 have begun performance.

Figure 5:
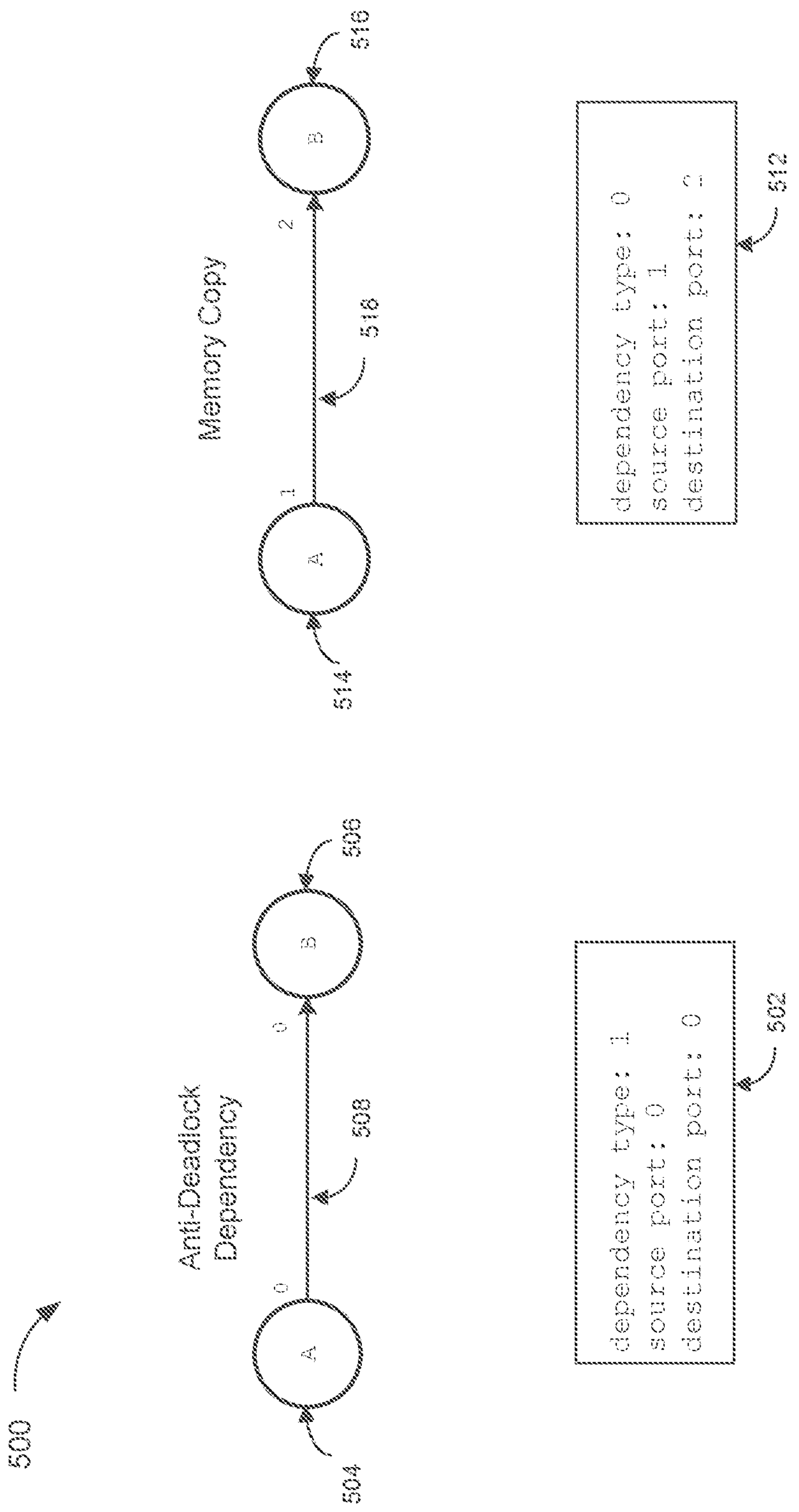
FIG. 5 is an example diagram illustrating edge information, in accordance with at least one embodiment.

FIG. 5 is an example diagram illustrating edge information 500, in accordance with at least one embodiment. In at least one embodiment, dependency edge information 500 comprises edge information 502 and/or edge information 512. In at least one embodiment, edge information 502 may correspond to an anti-dependency type for an edge 508 between node 504 and node 506. In at least one embodiment, edge information 502 includes an edge dependency type. In at least one embodiment, edge dependency type is represented by a corresponding value (e.g., "1") that indicates a particular dependency type for edge 508. In at least one embodiment, edge information 502 includes port definitions that include a source port definition and/or a destination port definition corresponding to edge 508. In at least one embodiment, source port definition is associated with a source node (e.g., node 504) of edge 508. In at least one embodiment, a destination port definition is associated with a destination node (e.g., node 506) of edge 508. In at least one embodiment, a source port definition and/or destination port definition is represented by a value indicating one or more constraints on operations of node 504 and/or node 506. In at least one embodiment, for example, a source port definition having a numerical value "0" and a destination port definition having a numerical value "0," may indicate that, based on a dependency type of "1," that there exists an anti-deadlock dependency between node 504 and node 506.

In at least one embodiment, edge information 512 may correspond to a fast dependent launch dependency type for an edge 518 between node 514 and node 516. In at least one embodiment, node 514 and/or node 516 corresponds to a memory copy operation. In at least one embodiment, edge information 512 includes an edge dependency type. In at least one embodiment, edge dependency type is represented by a corresponding value (e.g., "0") that indicates a particular dependency type for edge 518. In at least one embodiment, edge information 512 includes port definitions that include a source port definition and/or a destination port definition corresponding to edge 518. In at least one embodiment, source port definition is associated with a source node (e.g., node 514) of edge 518. In at least one embodiment, a destination port definition is associated with a destination node (e.g., node 516) of edge 518. In at least one embodiment, a source port definition and/or destination port definition is represented by a value indicating one or more constraints on operations of node 514 and/or node 516. In at least one embodiment, for example, a source port definition having a numerical value "1" and a destination port definition having a numerical value "2," may indicate that, based on a dependency type of "0," that there exists a memory copy dependency between node 514 and node 516.

Figure 6:
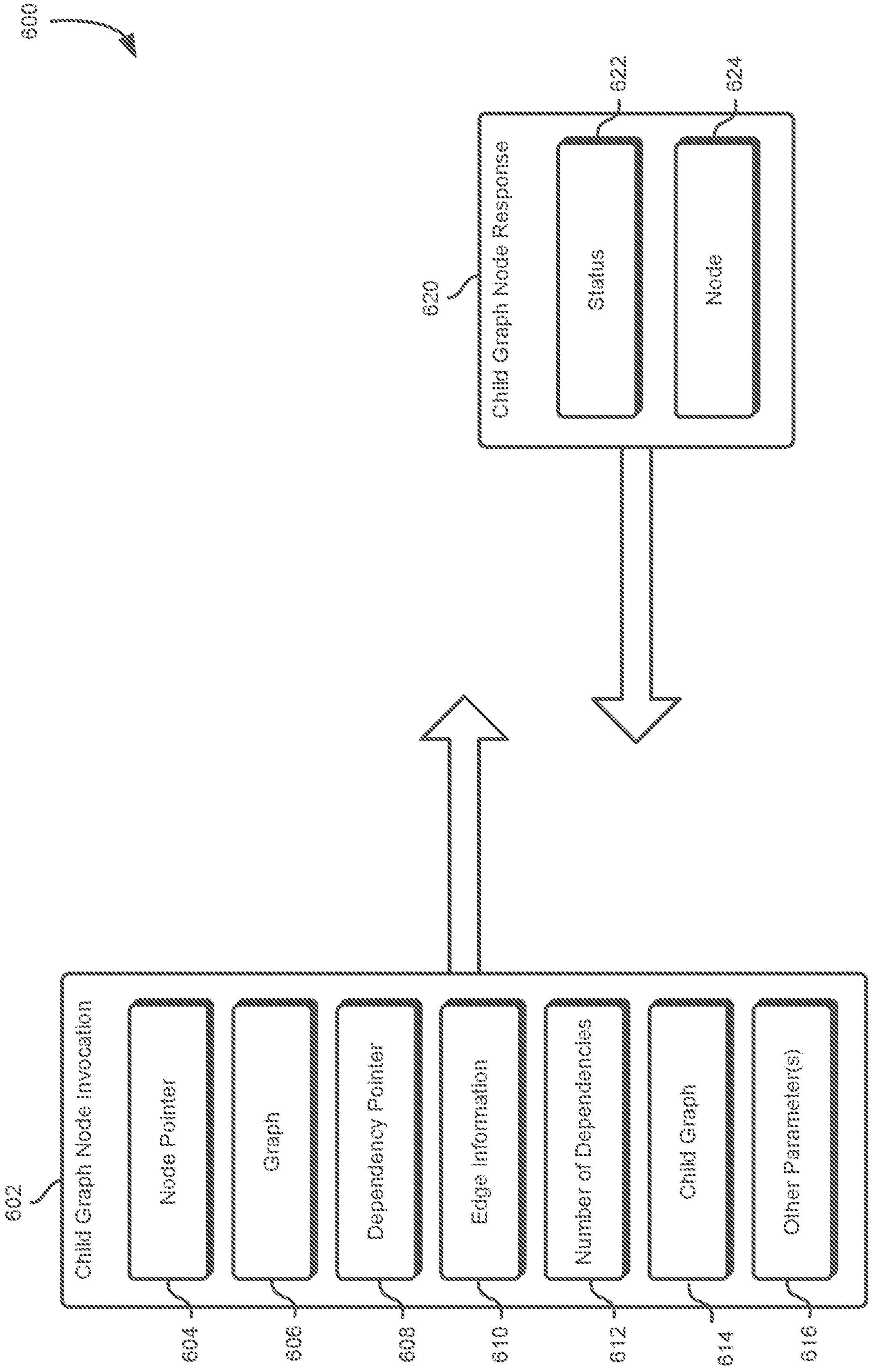
FIG. 6 is a block diagram illustrating a child graph node operation, in accordance with at least one embodiment.

FIG. 6 is a block diagram illustrating a child graph node operation 600 ("operation 600"), in accordance with at least one embodiment. In at least one embodiment, an operation 600 is one or more computational operations that, if performed, cause a node to be generated and/or added to a graph, as described above in conjunction with FIG. 1. In at least one embodiment, operation 600 is to cause a child graph node to be added to a software graph based, at least in part, on a dependency type. In at least one embodiment, operation 600 is to cause a node, which includes an embedded graph (e.g., child graph), to be generated and/or added to a graph. In at least one embodiment, operation 600 is a set of instructions that, if performed, cause one or more processors to cause one or more APIs to be performed.

In at least one embodiment, a child graph node invocation 602 ("invocation 602") is a function call to be performed by one or more software programs, such as kernels to be performed by one or more parallel processing units (PPUs), such as graphics processing units (GPUs). In at least one embodiment, invocation 602 is an invocation of an instruction to cause one or more processors to perform one or more computational operations 622, 624 of a child graph node response 620 ("response 620"). In at least one embodiment, invocation 602 is an invocation of an API to cause one or more processors to perform one or more computational operations 622, 624 of response 620.

In at least one embodiment, invocation 602 receives, when invoked, one or more parameters 604, 606, 608, 610, 612, 614, 616, to indicate information about computational operations to be performed. In at least one embodiment, invocation 602 receives, when invoked, one or more parameters 604, 606, 608, 610, 612, 614, 616 to indicate information about instructions to be performed.

In at least one embodiment, invocation 602 receives, as input, parameters 604, 606, 608, 610, 612, 614, 616 comprising a node pointer 604. In at least one embodiment, node pointer 604 is data comprising information indicating one or more nodes to be created by operation 600. In at least one embodiment, node pointer 604 is a pointer to an address corresponding to one or more nodes to be created by operation 600. In at least one embodiment, node pointer 604 is data to be input to a function call, if said function call is to perform invocation 602. In at least one embodiment, node pointer 604 is data to be input to an API, if said API is to cause invocation 602 to be performed.

In at least one embodiment, invocation 602 receives, as input, parameters 604, 606, 608, 610, 612, 614, 616 comprising a graph 606. In at least one embodiment, graph 606 is data comprising information indicating one or more attributes of a graph, such as nodes, edges, dependencies, and/or any other suitable attribute. In at least one embodiment, graph 606 is associated with an instantiated graph that is evaluated to be generated and/or executed, as described above in conjunction with FIG. 1, and/or FIG. 2. In at least one embodiment, graph 606 is data to be input to a function call, if said function call is to perform invocation 602. In at least one embodiment, graph 606 is data to be input to an API, if said API is to cause invocation 602 to be performed.

In at least one embodiment, invocation 602 receives, as input, parameters 604, 606, 608, 610, 612, 614, 616 comprising a dependency pointer 608. In at least one embodiment, dependency pointer 608 is data comprising information indicating one or more dependencies between two or more nodes of a graph. In at least one embodiment, dependency pointer 608 includes information corresponding to one or more dependencies between a node indicated by node pointer 604 and one or more other nodes of graph 606. In at least one embodiment, dependency pointer 608 is data to be input to a function call, if said function call is to perform invocation 602. In at least one embodiment, dependency pointer 608 is data to be input to an API, if said API is to cause invocation 602 to be performed.

In at least one embodiment, invocation 602 receives, as input, parameters 604, 606, 608, 610, 612, 614, 616 comprising edge information 610. In at least one embodiment, edge information 610 is data comprising information corresponding to one or more dependencies of graph 606. In at least one embodiment, edge information 610 includes information indicating one or more dependencies between a node associated with node pointer 604 and one or more nodes of graph 606. In at least one embodiment, edge information 610 includes an indication of one or more of a source port, a destination port, and/or a dependency type, as described above in conjunction with FIG. 1, FIG. 3, FIG. 4, and/or FIG. 5. In at least one embodiment, edge information 610 may be represented as an array, in which each element corresponds to an element of a parallel array associated with dependency pointer 608. In at least one embodiment, edge information 610 is data to be input to a function call, if said function call is to perform invocation 602. In at least one embodiment, edge information 610 is data to be input to an API, if said API is to cause invocation 602 to be performed.

In at least one embodiment, invocation 602 receives, as input, parameters 604, 606, 608, 610, 612, 614, 616 comprising a number of dependencies 612. In at least one embodiment, number of dependencies 612 is data indicating a number, or quantity, of dependencies associated with a node of graph 606 associated with node pointer 604. In at least one embodiment, number of dependencies 612 is data to be input to a function call, if said function call is to perform invocation 602. In at least one embodiment, number of dependencies 612 is data to be input to an API, if said API is to cause invocation 602 to be performed.

In at least one embodiment, invocation 602 receives, as input, parameters 604, 606, 608, 610, 612, 614, 616 comprising a child graph 614. In at least one embodiment, child graph 614 is data comprising information indicating one or more attributes of a graph to be replicated into a node of graph 606 associated with node pointer 604, such as nodes, edges, dependencies, and/or any other suitable attribute. In at least one embodiment, invocation 602 is to add a node (indicated by node pointer 604) to graph 606, which include a replication of child graph 614. In at least one embodiment, child graph 614 is associated with an instantiated graph that is evaluated to be generated and/or executed, as described above in conjunction with FIG. 1. In at least one embodiment, child graph 614 is data to be input to a function call, if said function call is to perform invocation 602. In at least one embodiment, child graph 614 is data to be input to an API, if said API is to cause invocation 602 to be performed.

In at least one embodiment, invocation 602 receives, as input, parameters 604, 606, 608, 610, 612, 614, 616 comprising other parameter(s) 616. In at least one embodiment, other parameter(s) 616 are data comprising any other information usable by operation 600. In at least one embodiment, other parameter(s) 616 are data to be input to a function call, if said function call is to perform invocation 602. In at least one embodiment, other parameter(s) 616 are data to be input to an API, if said API is to cause invocation 602 to be performed.

In at least one embodiment, an example instruction indicating operation 600 in a parallel computing environment, such as compute uniform device architecture (CUDA), is as follows:

cudaGraphAddChildGraphNode (pGraphNode, graph, pDependencies, pDependencyData, numDependencies, childGraph) where pGraphNode corresponds to node pointer 604, graph corresponds to graph 606, pDependencies corresponds to dependency pointer 608, pDependencyData corresponds to edge information 610, numDependencies corresponds to number of dependencies 612, and childGraph corresponds to child graph 614.

In at least one embodiment, response 620 generates, as output, parameters 622, 624 comprising a status 622. In at least one embodiment, status 622 is data comprising any other information presented by operation 600. In at least one embodiment, status 622 is data to be output in response to a function call, if said function call is to perform invocation 602. In at least one embodiment, status 622 is data to be output by an API, if said API is to cause invocation 602 to be performed. In at least one embodiment, status 622 indicates that operation 600 was performed successfully. In at least one embodiment, status 622 indicates that operation 600 was not performed successfully, or otherwise failed.

In at least one embodiment, response 620 generates, as output, parameters 622, 624 comprising node 624. In at least one embodiment, node 624 is data to one or more nodes generated by operation 600, using information associated with invocation 602, such as parameters 604, 606, 608, 610, 612, 614, 616. In at least one embodiment, node 624 will be output by response 620 to an address corresponding to node pointer 604, such that node 624 will be generated by storing data to an address indicated by node pointer 604. In at least one embodiment, node 624 is data to be output in response to a function call, if said function call is to perform invocation 602. In at least one embodiment, node 624 is data to be output by an API, if said API is to cause invocation 602 to be performed. In at least one embodiment, node 624 is provided to data structure, memory, and/or variable indicated by node pointer 604. In at least one embodiment, node 624 is presented in response to performance of one or more API and/or function calls.

Figure 7:
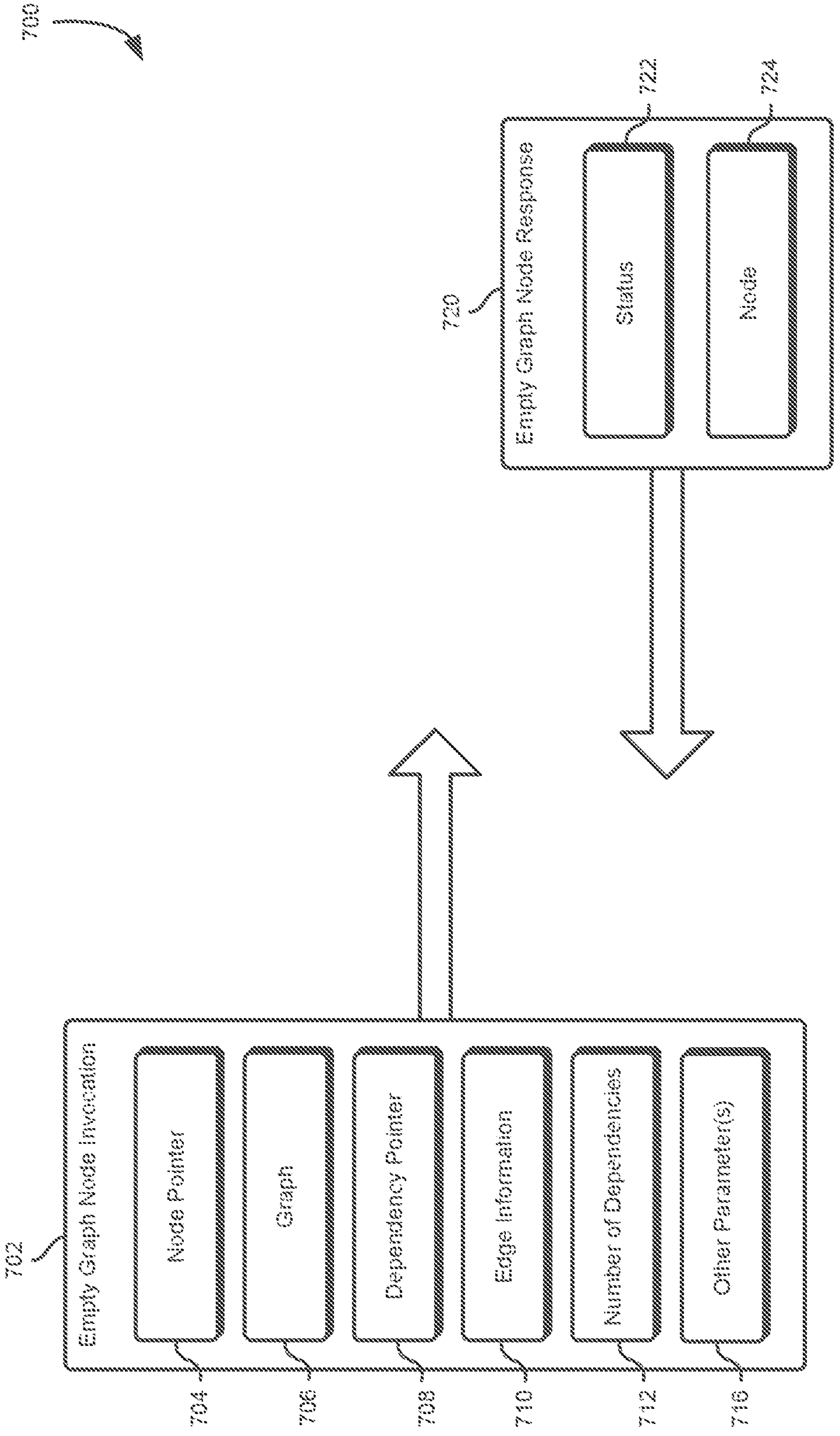
FIG. 7 is a block diagram illustrating an empty graph node operation, in accordance with at least one embodiment.

FIG. 7 is a block diagram illustrating an empty graph node operation 700 ("operation 700"), in accordance with at least one embodiment. In at least one embodiment, operation 700 is one or more computational operations that, if performed, cause an empty node to be generated and/or added to a graph, as described above in conjunction with FIG. 1. In at least one embodiment, operation 700 is to cause a null-operation graph node to be added to a software graph based, at least in part, on a dependency type. In at least one embodiment, an empty node performs no operation during execution. In at least one embodiment, an empty node is used for transitive ordering. In at least one embodiment, for example, a phased execution graph with 2 groups of n nodes with a barrier between them can be represented using an empty node and 2*n dependency edges, rather than no empty node and n^2 dependency edges. In at least one embodiment, operation 700 is to cause an empty node to be generated and/or added to a graph. In at least one embodiment, operation 700 is a set of instructions that, if performed, cause one or more processors to cause one or more APIs to be performed.

In at least one embodiment, an empty graph node invocation 702 ("invocation 702") is a function call to be performed by one or more software programs, such as kernels to be performed by one or more parallel processing units (PPUs), such as graphics processing units (GPUs). In at least one embodiment, invocation 702 is an invocation of an instruction to cause one or more processors to perform one or more computational operations 722, 724 of an empty graph node response 720 ("response 720"). In at least one embodiment, invocation 702 is an invocation of an API to cause one or more processors to perform one or more computational operations 722, 724 of response 720.

In at least one embodiment, invocation 702 receives, when invoked, one or more parameters 704, 706, 708, 710, 712, 716, to indicate information about computational operations to be performed. In at least one embodiment, invocation 702 receives, when invoked, one or more parameters 704, 706, 708, 710, 712, 716 to indicate information about instructions to be performed.

In at least one embodiment, invocation 702 receives, as input, parameters 704, 706, 708, 710, 712, 716 comprising a node pointer 704. In at least one embodiment, node pointer 704 is data comprising information indicating one or more nodes to be created by operation 700. In at least one embodiment, node pointer 704 is a pointer to an address corresponding to one or more nodes to be created by operation 700. In at least one embodiment, node pointer 704 is data to be input to a function call, if said function call is to perform invocation 702. In at least one embodiment, node pointer 704 is data to be input to an API, if said API is to cause invocation 702 to be performed.

In at least one embodiment, invocation 702 receives, as input, parameters 704, 706, 708, 710, 712, 716 comprising a graph 706. In at least one embodiment, graph 706 is data comprising information indicating one or more attributes of a graph, such as nodes, edges, dependencies, and/or any other suitable attribute. In at least one embodiment, graph 706 is associated with an instantiated graph that is evaluated to be generated and/or executed, as described above in conjunction with FIG. 1, and/or FIG. 2. In at least one embodiment, graph 706 is data to be input to a function call, if said function call is to perform invocation 702. In at least one embodiment, graph 706 is data to be input to an API, if said API is to cause invocation 702 to be performed.

In at least one embodiment, invocation 702 receives, as input, parameters 704, 706, 708, 710, 712, 716 comprising a dependency pointer 708. In at least one embodiment, dependency pointer 708 is data comprising information indicating one or more dependencies between two or more nodes of a graph. In at least one embodiment, dependency pointer 708 includes information corresponding to one or more dependencies between a node indicated by node pointer 704 and one or more other nodes of graph 706. In at least one embodiment, dependency pointer 708 is data to be input to a function call, if said function call is to perform invocation 702. In at least one embodiment, dependency pointer 708 is data to be input to an API, if said API is to cause invocation 702 to be performed.

In at least one embodiment, invocation 702 receives, as input, parameters 704, 706, 708, 710, 712, 716 comprising edge information 710. In at least one embodiment, edge information 710 is data comprising information corresponding to one or more dependencies of graph 706. In at least one embodiment, edge information 710 includes information indicating one or more dependencies between a node associated with node pointer 704 and one or more nodes of graph 706. In at least one embodiment, edge information 710 includes an indication of one or more of a source port, a destination port, and/or a dependency type, as described above in conjunction with FIG. 1, FIG. 3, FIG. 4, and/or FIG. 5. In at least one embodiment, edge information 710 may be represented as an array, in which each element corresponds to an element of a parallel array associated with dependency pointer 708. In at least one embodiment, edge information 710 is data to be input to a function call, if said function call is to perform invocation 702. In at least one embodiment, edge information 710 is data to be input to an API, if said API is to cause invocation 702 to be performed.

In at least one embodiment, invocation 702 receives, as input, parameters 704, 706, 708, 710, 712, 716 comprising a number of dependencies 712. In at least one embodiment, number of dependencies 712 is data indicating a number, or quantity, of dependencies associated with a node of graph 706 associated with node pointer 704. In at least one embodiment, number of dependencies 712 is data to be input to a function call, if said function call is to perform invocation 702. In at least one embodiment, number of dependencies 712 is data to be input to an API, if said API is to cause invocation 702 to be performed.

In at least one embodiment, invocation 702 receives, as input, parameters 704, 706, 708, 710, 712, 716 comprising other parameter(s) 716. In at least one embodiment, other parameter(s) 716 are data comprising any other information usable by operation 700. In at least one embodiment, other parameter(s) 716 are data to be input to a function call, if said function call is to perform invocation 702. In at least one embodiment, other parameter(s) 716 are data to be input to an API, if said API is to cause invocation 702 to be performed.

In at least one embodiment, an example instruction indicating operation 700 in a parallel computing environment, such as compute uniform device architecture (CUDA), is as follows:

cudaGraphAddEmptyNode (pGraphNode, graph, pDependencies, pDependencyData, numDependencies) where pGraphNode corresponds to node pointer 704, graph corresponds to graph 706, pDependencies corresponds to dependency pointer 708, pDependencyData corresponds to edge information 710, and numDependencies corresponds to number of dependencies 712.

In at least one embodiment, response 720 generates, as output, parameters 722, 724 comprising a status 722. In at least one embodiment, status 722 is data comprising any other information presented by operation 700. In at least one embodiment, status 722 is data to be output in response to a function call, if said function call is to perform invocation 702. In at least one embodiment, status 722 is data to be output by an API, if said API is to cause invocation 702 to be performed. In at least one embodiment, status 722 indicates that operation 700 was performed successfully. In at least one embodiment, status 722 indicates that operation 700 was not performed successfully, or otherwise failed.

In at least one embodiment, response 720 generates, as output, parameters 722, 724 comprising node 724. In at least one embodiment, node 724 is data to one or more nodes generated by operation 700, using information associated with invocation 702, such as parameters 704, 706, 708, 710, 712, 716. In at least one embodiment, node 724 will be output by response 720 to an address corresponding to node pointer 704, such that node 724 will be generated by storing data to an address indicated by node pointer 704. In at least one embodiment, node 724 is data to be output in response to a function call, if said function call is to perform invocation 702. In at least one embodiment, node 724 is data to be output by an API, if said API is to cause invocation 702 to be performed. In at least one embodiment, node 724 is provided to data structure, memory, and/or variable indicated by node pointer 704. In at least one embodiment, node 724 is presented in response to performance of one or more API and/or function calls.

Figure 8:
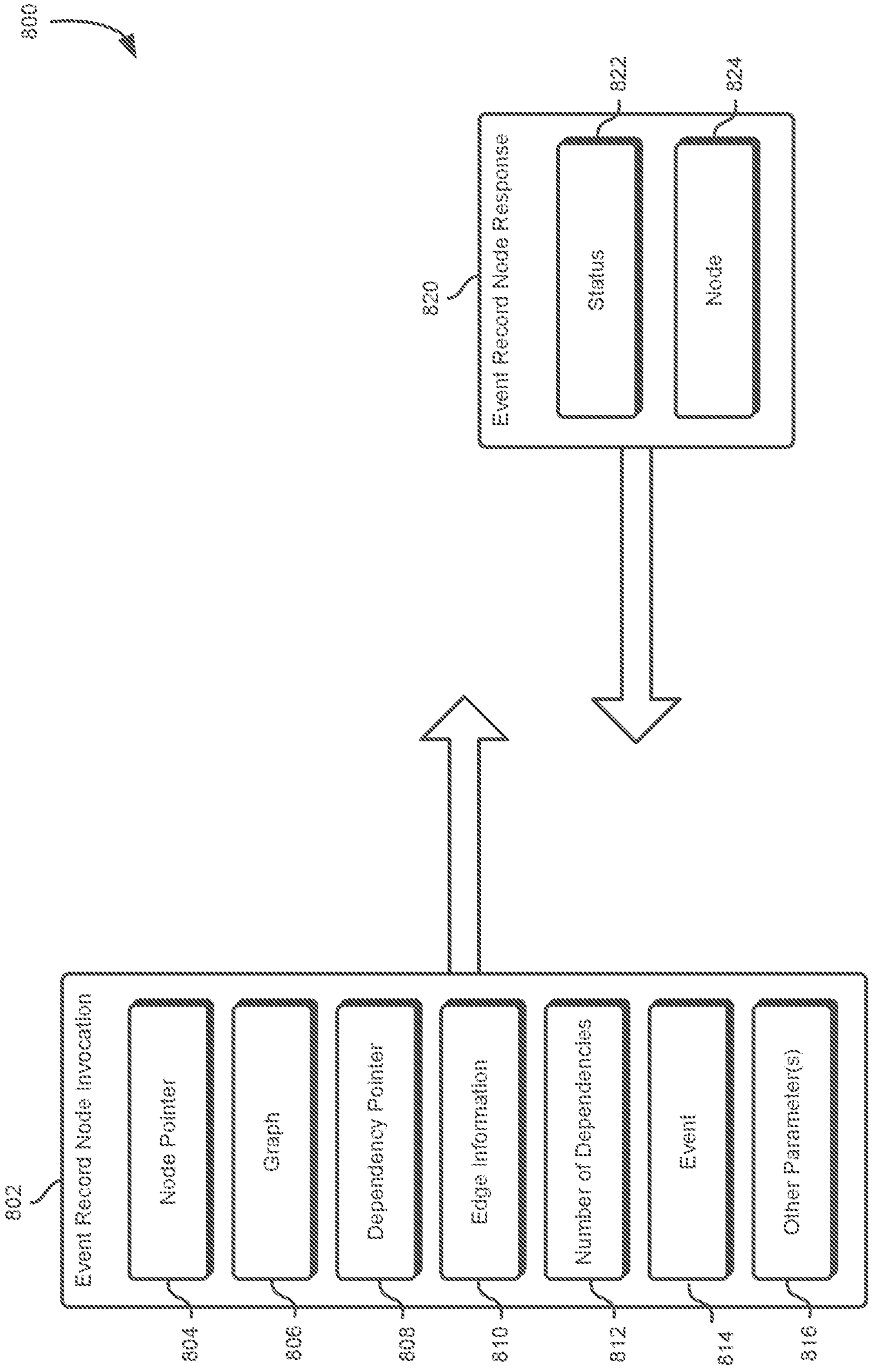
FIG. 8 is a block diagram illustrating an event record node operation, in accordance with at least one embodiment.

FIG. 8 is a block diagram illustrating an event record node operation 800 ("operation 800"), in accordance with at least one embodiment. In at least one embodiment, operation 800 is one or more computational operations that, if performed, cause a node to be generated and/or added to a graph, as described above in conjunction with FIG. 1. In at least one embodiment, operation 800 is to store an indication of whether a node within a software graph was performed based, at least in part, on a dependency type. In at least one embodiment, operation 800 is to cause an event record node to be generated and/or added to a graph. In at least one embodiment, an event record node, when executed, causes an event to be recorded, and/or continue to be recorded. In at least one embodiment, an event is to monitor progress of one or more operations, such as monitoring a launch or a software kernel. In at least one embodiment, an event record node is to monitor execution of one or more dependent nodes. In at least one embodiment, an event may be queried to determine whether a particular event (e.g., a launching of a kernel and/or other operation) has completed. In at least one embodiment, operation 800 is a set of instructions that, if performed, cause one or more processors to cause one or more APIs to be performed.

In at least one embodiment, an event record node invocation 802 ("invocation 802") is a function call to be performed by one or more software programs, such as kernels to be performed by one or more parallel processing units (PPUs), such as graphics processing units (GPUs). In at least one embodiment, invocation 802 is an invocation of an instruction to cause one or more processors to perform one or more computational operations 822, 824 of an empty graph node response 820 ("response 820"). In at least one embodiment, invocation 802 is an invocation of an API to cause one or more processors to perform one or more computational operations 822, 824 of response 820.

In at least one embodiment, invocation 802 receives, when invoked, one or more parameters 804, 806, 808, 810, 812, 814, 816, to indicate information about computational operations to be performed. In at least one embodiment, invocation 802 receives, when invoked, one or more parameters 804, 806, 808, 810, 812, 814, 816 to indicate information about instructions to be performed.

In at least one embodiment, invocation 802 receives, as input, parameters 804, 806, 808, 810, 812, 814, 816 comprising a node pointer 804. In at least one embodiment, node pointer 804 is data comprising information indicating one or more nodes to be created by operation 800. In at least one embodiment, node pointer 804 is a pointer to an address corresponding to one or more nodes to be created by operation 800. In at least one embodiment, node pointer 804 is data to be input to a function call, if said function call is to perform invocation 802. In at least one embodiment, node pointer 804 is data to be input to an API, if said API is to cause invocation 802 to be performed.

In at least one embodiment, invocation 802 receives, as input, parameters 804, 806, 808, 810, 812, 814, 816 comprising a graph 806. In at least one embodiment, graph 806 is data comprising information indicating one or more attributes of a graph, such as nodes, edges, dependencies, and/or any other suitable attribute. In at least one embodiment, graph 806 is associated with an instantiated graph that is evaluated to be generated and/or executed, as described above in conjunction with FIG. 1 and/or FIG. 2. In at least one embodiment, graph 806 is data to be input to a function call, if said function call is to perform invocation 802. In at least one embodiment, graph 806 is data to be input to an API, if said API is to cause invocation 802 to be performed.

In at least one embodiment, invocation 802 receives, as input, parameters 804, 806, 808, 810, 812, 814, 816 comprising a dependency pointer 808. In at least one embodiment, dependency pointer 808 is data comprising information indicating one or more dependencies between two or more nodes of a graph. In at least one embodiment, dependency pointer 808 includes information corresponding to one or more dependencies between a node indicated by node pointer 804 and one or more other nodes of graph 806. In at least one embodiment, dependency pointer 808 is data to be input to a function call, if said function call is to perform invocation 802. In at least one embodiment, dependency pointer 808 is data to be input to an API, if said API is to cause invocation 802 to be performed.

In at least one embodiment, invocation 802 receives, as input, parameters 804, 806, 808, 810, 812, 814, 816 comprising edge information 810. In at least one embodiment, edge information 810 is data comprising information corresponding to one or more dependencies of graph 806. In at least one embodiment, edge information 810 includes information indicating one or more dependencies between a node associated with node pointer 804 and one or more nodes of graph 806. In at least one embodiment, edge information 810 includes an indication of one or more of a source port, a destination port, and/or a dependency type, as described above in conjunction with FIG. 1, FIG. 3, FIG. 4, and/or FIG. 5. In at least one embodiment, edge information 810 may be represented as an array, in which each element corresponds to an element of a parallel array associated with dependency pointer 808. In at least one embodiment, edge information 810 is data to be input to a function call, if said function call is to perform invocation 802. In at least one embodiment, edge information 810 is data to be input to an API, if said API is to cause invocation 802 to be performed.

In at least one embodiment, invocation 802 receives, as input, parameters 804, 806, 808, 810, 812, 814, 816 comprising a number of dependencies 812. In at least one embodiment, number of dependencies 812 is data indicating a number, or quantity, of dependencies associated with a node of graph 806 associated with node pointer 804. In at least one embodiment, number of dependencies 812 is data to be input to a function call, if said function call is to perform invocation 802. In at least one embodiment, number of dependencies 812 is data to be input to an API, if said API is to cause invocation 802 to be performed.

In at least one embodiment, invocation 802 receives, as input, parameters 804, 806, 808, 810, 812, 814, 816 comprising an event 814. In at least one embodiment, event 814 is data indicating a type of event to be recorded when executing a node of graph 806 associated with node pointer 804. In at least one embodiment, event 814 is data to be input to a function call, if said function call is to perform invocation 802. In at least one embodiment, event 814 is data to be input to an API, if said API is to cause invocation 802 to be performed.

In at least one embodiment, invocation 802 receives, as input, parameters 804, 806, 808, 810, 812, 814, 816 comprising other parameter(s) 816. In at least one embodiment, other parameter(s) 816 are data comprising any other information usable by operation 800. In at least one embodiment, other parameter(s) 816 are data to be input to a function call, if said function call is to perform invocation 802. In at least one embodiment, other parameter(s) 816 are data to be input to an API, if said API is to cause invocation 802 to be performed.

In at least one embodiment, an example instruction indicating operation 800 in a parallel computing environment, such as compute uniform device architecture (CUDA), is as follows:

cudaGraphAddEventRecordNode (pGraphNode, graph, pDependencies, pDependencyData, numDependencies, event) where pGraphNode corresponds to node pointer 804, graph corresponds to graph 806, pDependencies corresponds to dependency pointer 808, pDependencyData corresponds to edge information 810, and numDependencies corresponds to number of dependencies 812, and event corresponds to event 814.

In at least one embodiment, response 820 generates, as output, parameters 822, 824 comprising a status 822. In at least one embodiment, status 822 is data comprising any other information presented by operation 800. In at least one embodiment, status 822 is data to be output in response to a function call, if said function call is to perform invocation 802. In at least one embodiment, status 822 is data to be output by an API, if said API is to cause invocation 802 to be performed. In at least one embodiment, status 822 indicates that operation 800 was performed successfully. In at least one embodiment, status 822 indicates that operation 800 was not performed successfully, or otherwise failed.

In at least one embodiment, response 820 generates, as output, parameters 822, 824 comprising node 824. In at least one embodiment, node 824 is data to one or more nodes generated by operation 800, using information associated with invocation 802, such as parameters 804, 806, 808, 810, 812, 814, 816. In at least one embodiment, node 824 will be output by response 820 to an address corresponding to node pointer 804, such that node 824 will be generated by storing data to an address indicated by node pointer 804. In at least one embodiment, node 824 is data to be output in response to a function call, if said function call is to perform invocation 802. In at least one embodiment, node 824 is data to be output by an API, if said API is to cause invocation 802 to be performed. In at least one embodiment, node 824 is provided to data structure, memory, and/or variable indicated by node pointer 804. In at least one embodiment, node 824 is presented in response to performance of one or more API and/or function calls.

Figure 9:
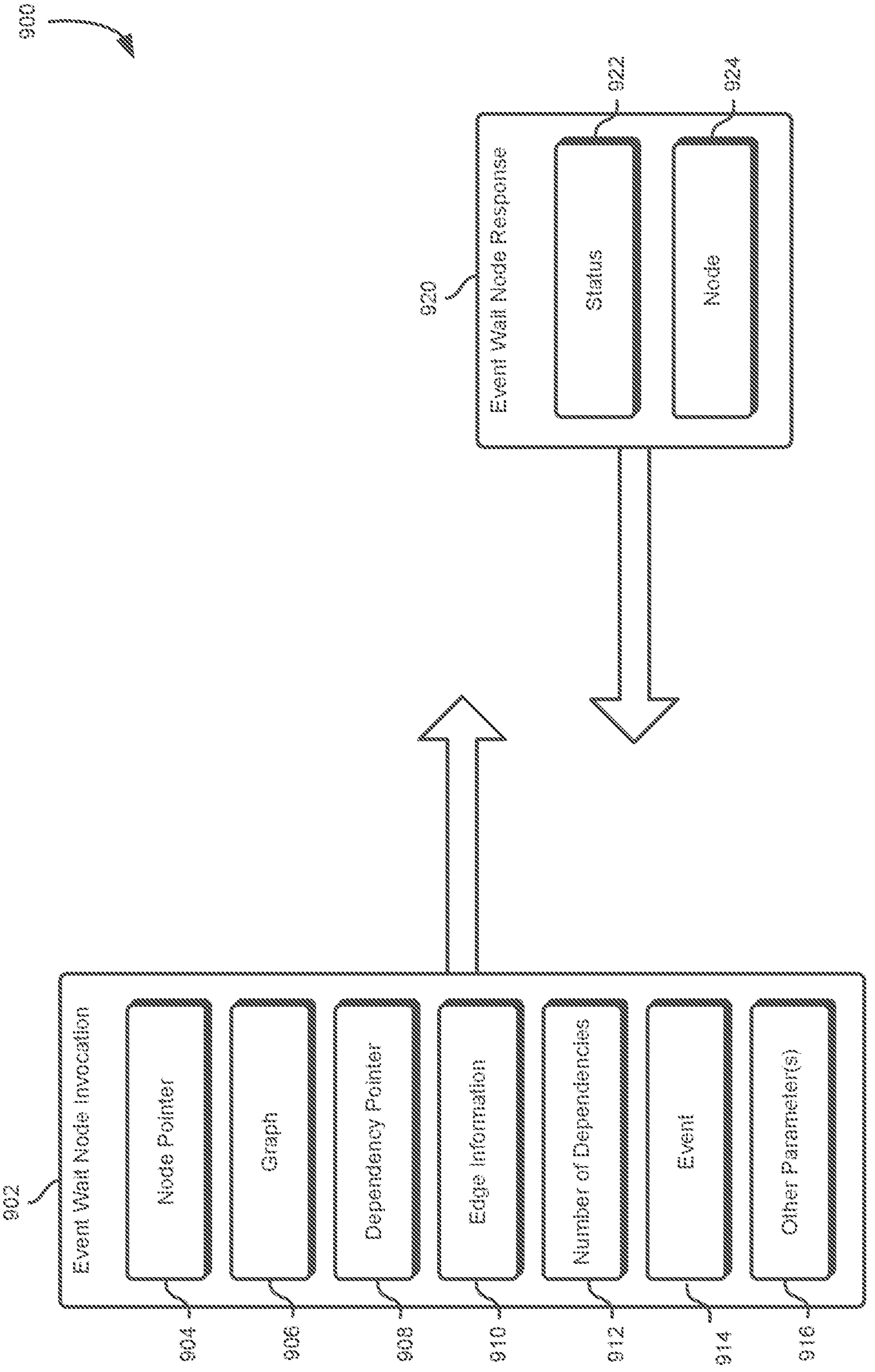
FIG. 9 is a block diagram illustrating an event wait node operation, in accordance with at least one embodiment.

FIG. 9 is a block diagram illustrating an event wait node operation 900 ("operation 900"), in accordance with at least one embodiment. In at least one embodiment, operation 900 is one or more computational operations that, if performed, cause a node to be generated and/or added to a graph, as described above in conjunction with FIG. 1. In at least one embodiment, operation 900 is to cause an event wait node to be added to a software graph based, at least in part, on a dependency type. In at least one embodiment, operation 900 is to cause an event wait node to be generated and/or added to a graph. In at least one embodiment, an event wait node, when executed, causes a node to wait for work associated with an event to be performed. In at least one embodiment, an event wait node will wait on one or more events associated with a context and/or device distinct from a launch stream of said event wait node. In at least one embodiment, an event is to monitor progress of one or more operations, such as monitoring a launch or a software kernel. In at least one embodiment, an event wait node is to monitor execution of one or more dependent nodes. In at least one embodiment, an event may be queried to determine whether a particular event (e.g., a launching of a kernel and/or other operation) has completed. In at least one embodiment, operation 900 is a set of instructions that, if performed, cause one or more processors to cause one or more APIs to be performed.

In at least one embodiment, an event wait node invocation 902 ("invocation 902") is a function call to be performed by one or more software programs, such as kernels to be performed by one or more parallel processing units (PPUs), such as graphics processing units (GPUs). In at least one embodiment, invocation 902 is an invocation of an instruction to cause one or more processors to perform one or more computational operations 922, 924 of an empty graph node response 920 ("response 920"). In at least one embodiment, invocation 902 is an invocation of an API to cause one or more processors to perform one or more computational operations 922, 924 of response 920.

In at least one embodiment, invocation 902 receives, when invoked, one or more parameters 904, 906, 908, 910, 912, 914, 916, to indicate information about computational operations to be performed. In at least one embodiment, invocation 902 receives, when invoked, one or more parameters 904, 906, 908, 910, 912, 914, 916 to indicate information about instructions to be performed.

In at least one embodiment, invocation 902 receives, as input, parameters 904, 906, 908, 910, 912, 914, 916 comprising a node pointer 904. In at least one embodiment, node pointer 904 is data comprising information indicating one or more nodes to be created by operation 900. In at least one embodiment, node pointer 904 is a pointer to an address corresponding to one or more nodes to be created by operation 900. In at least one embodiment, node pointer 904 is data to be input to a function call, if said function call is to perform invocation 902. In at least one embodiment, node pointer 904 is data to be input to an API, if said API is to cause invocation 902 to be performed.

In at least one embodiment, invocation 902 receives, as input, parameters 904, 906, 908, 910, 912, 914, 916 comprising a graph 906. In at least one embodiment, graph 906 is data comprising information indicating one or more attributes of a graph, such as nodes, edges, dependencies, and/or any other suitable attribute. In at least one embodiment, graph 906 is associated with an instantiated graph that is evaluated to be generated and/or executed, as described above in conjunction with FIG. 1, and/or FIG. 2. In at least one embodiment, graph 906 is data to be input to a function call, if said function call is to perform invocation 902. In at least one embodiment, graph 906 is data to be input to an API, if said API is to cause invocation 902 to be performed.

In at least one embodiment, invocation 902 receives, as input, parameters 904, 906, 908, 910, 912, 914, 916 comprising a dependency pointer 908. In at least one embodiment, dependency pointer 908 is data comprising information indicating one or more dependencies between two or more nodes of a graph. In at least one embodiment, dependency pointer 908 includes information corresponding to one or more dependencies between a node indicated by node pointer 904 and one or more other nodes of graph 906. In at least one embodiment, dependency pointer 908 is data to be input to a function call, if said function call is to perform invocation 902. In at least one embodiment, dependency pointer 908 is data to be input to an API, if said API is to cause invocation 902 to be performed.

In at least one embodiment, invocation 902 receives, as input, parameters 904, 906, 908, 910, 912, 914, 916 comprising edge information 910. In at least one embodiment, edge information 910 is data comprising information corresponding to one or more dependencies of graph 906. In at least one embodiment, edge information 910 includes information indicating one or more dependencies between a node associated with node pointer 904 and one or more nodes of graph 906. In at least one embodiment, edge information 910 includes an indication of one or more of a source port, a destination port, and/or a dependency type, as described above in conjunction with FIG. 1, FIG. 2, FIG. 5, and/or FIG. 6. In at least one embodiment, edge information 910 may be represented as an array, in which each element corresponds to an element of a parallel array associated with dependency pointer 908. In at least one embodiment, edge information 910 is data to be input to a function call, if said function call is to perform invocation 902. In at least one embodiment, edge information 910 is data to be input to an API, if said API is to cause invocation 902 to be performed.

In at least one embodiment, invocation 902 receives, as input, parameters 904, 906, 908, 910, 912, 914, 916 comprising a number of dependencies 912. In at least one embodiment, number of dependencies 912 is data indicating a number, or quantity, of dependencies associated with a node of graph 906 associated with node pointer 904. In at least one embodiment, number of dependencies 912 is data to be input to a function call, if said function call is to perform invocation 902. In at least one embodiment, number of dependencies 912 is data to be input to an API, if said API is to cause invocation 902 to be performed.

In at least one embodiment, invocation 902 receives, as input, parameters 904, 906, 908, 910, 912, 914, 916 comprising an event 914. In at least one embodiment, event 914 is data indicating a type of event to be recorded when executing a node of graph 906 associated with node pointer 904. In at least one embodiment, event 914 is data to be input to a function call, if said function call is to perform invocation 902. In at least one embodiment, event 914 is data to be input to an API, if said API is to cause invocation 902 to be performed.

In at least one embodiment, invocation 902 receives, as input, parameters 904, 906, 908, 910, 912, 914, 916 comprising other parameter(s) 916. In at least one embodiment, other parameter(s) 916 are data comprising any other information usable by operation 900. In at least one embodiment, other parameter(s) 916 are data to be input to a function call, if said function call is to perform invocation 902. In at least one embodiment, other parameter(s) 916 are data to be input to an API, if said API is to cause invocation 902 to be performed.

In at least one embodiment, an example instruction indicating operation 900 in a parallel computing environment, such as compute uniform device architecture (CUDA), is as follows:

cudaGraphAddEventWaitNode (pGraphNode, graph, pDependencies, pDependencyData, numDependencies, event)

where pGraphNode corresponds to node pointer 904, graph corresponds to graph 906, pDependencies corresponds to dependency pointer 908, pDependencyData corresponds to edge information 910, and numDependencies corresponds to number of dependencies 912, and event corresponds to event 914.

In at least one embodiment, response 920 generates, as output, parameters 922, 924 comprising a status 922. In at least one embodiment, status 922 is data comprising any other information presented by operation 900. In at least one embodiment, status 922 is data to be output in response to a function call, if said function call is to perform invocation 902. In at least one embodiment, status 922 is data to be output by an API, if said API is to cause invocation 902 to be performed. In at least one embodiment, status 922 indicates that operation 900 was performed successfully. In at least one embodiment, status 922 indicates that operation 900 was not performed successfully, or otherwise failed.

In at least one embodiment, response 920 generates, as output, parameters 922, 924 comprising node 924. In at least one embodiment, node 924 is data to one or more nodes generated by operation 900, using information associated with invocation 902, such as parameters 904, 906, 908, 910, 912, 914, 916. In at least one embodiment, node 924 will be output by response 920 to an address corresponding to node pointer 904, such that node 924 will be generated by storing data to an address indicated by node pointer 904. In at least one embodiment, node 924 is data to be output in response to a function call, if said function call is to perform invocation 902. In at least one embodiment, node 924 is data to be output by an API, if said API is to cause invocation 902 to be performed. In at least one embodiment, node 924 is provided to data structure, memory, and/or variable indicated by node pointer 904. In at least one embodiment, node 924 is presented in response to performance of one or more API and/or function calls.

Figure 10:
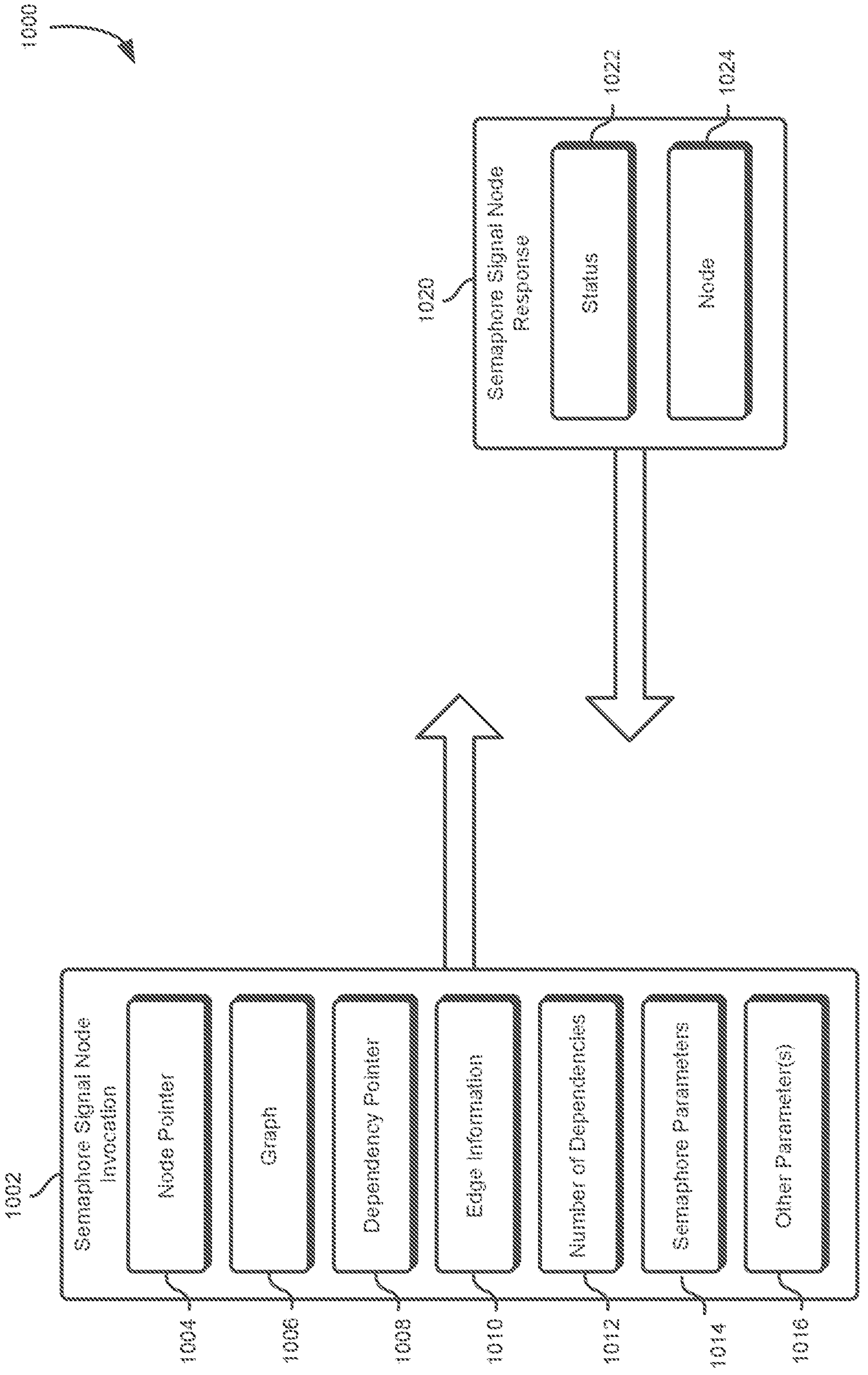
FIG. 10 is a block diagram illustrating an external semaphore signal node operation, in accordance with at least one embodiment.

FIG. 10 is a block diagram illustrating an external semaphore signal node operation 1000 ("operation 1000"), in accordance with at least one embodiment. In at least one embodiment, operation 1000 is one or more computational operations that, if performed, cause a node to be generated and/or added to a graph, as described above in conjunction with FIG. 1. In at least one embodiment, operation 1000 is to cause a semaphore update node to be added to a software graph based, at least in part, on a dependency type. In at least one embodiment, operation 1000 is to cause an external semaphore signal node to be generated and/or added to a graph. In at least one embodiment, an external semaphore signal node, when executed, causes a signal operation on a set of externally allocated semaphore objects to be performed. In at least one embodiment, a signal operation on a set of externally allocated semaphore objects facilitate a synchronization of one or more internal and/or external objects. In at least one embodiment, operation 1000 is a set of instructions that, if performed, cause one or more processors to cause one or more APIs to be performed.

In at least one embodiment, an external semaphore signal node invocation 1002 ("invocation 1002") is a function call to be performed by one or more software programs, such as kernels to be performed by one or more parallel processing units (PPUs), such as graphics processing units (GPUs). In at least one embodiment, invocation 1002 is an invocation of an instruction to cause one or more processors to perform one or more computational operations 1022, 1024 of an external semaphore signal node response 1020 ("response 1020"). In at least one embodiment, invocation 1002 is an invocation of an API to cause one or more processors to perform one or more computational operations 1022, 1024 of response 1020.

In at least one embodiment, invocation 1002 receives, when invoked, one or more parameters 1004, 1006, 1008, 1010, 1012, 1014, 1016, to indicate information about computational operations to be performed. In at least one embodiment, invocation 1002 receives, when invoked, one or more parameters 1004, 1006, 1008, 1010, 1012, 1014, 1016 to indicate information about instructions to be performed.

In at least one embodiment, invocation 1002 receives, as input, parameters 1004, 1006, 1008, 1010, 1012, 1014, 1016 comprising a node pointer 1004. In at least one embodiment, node pointer 1004 is data comprising information indicating one or more nodes to be created by operation 1000. In at least one embodiment, node pointer 1004 is a pointer to an address corresponding to one or more nodes to be created by operation 1000. In at least one embodiment, node pointer 1004 is data to be input to a function call, if said function call is to perform invocation 1002. In at least one embodiment, node pointer 1004 is data to be input to an API, if said API is to cause invocation 1002 to be performed.

In at least one embodiment, invocation 1002 receives, as input, parameters 1004, 1006, 1008, 1010, 1012, 1014, 1016 comprising a graph 1006. In at least one embodiment, graph 1006 is data comprising information indicating one or more attributes of a graph, such as nodes, edges, dependencies, and/or any other suitable attribute. In at least one embodiment, graph 1006 is associated with an instantiated graph that is evaluated to be generated and/or executed, as described above in conjunction FIG. 1, and/or FIG. 2. In at least one embodiment, graph 1006 is data to be input to a function call, if said function call is to perform invocation 1002. In at least one embodiment, graph 1006 is data to be input to an API, if said API is to cause invocation 1002 to be performed.

In at least one embodiment, invocation 1002 receives, as input, parameters 1004, 1006, 1008, 1010, 1012, 1014, 1016 comprising a dependency pointer 1008. In at least one embodiment, dependency pointer 1008 is data comprising information indicating one or more dependencies between two or more nodes of a graph. In at least one embodiment, dependency pointer 1008 includes information corresponding to one or more dependencies between a node indicated by node pointer 1004 and one or more other nodes of graph 1006. In at least one embodiment, dependency pointer 1008 is data to be input to a function call, if said function call is to perform invocation 1002. In at least one embodiment, dependency pointer 1008 is data to be input to an API, if said API is to cause invocation 1002 to be performed.

In at least one embodiment, invocation 1002 receives, as input, parameters 1004, 1006, 1008, 1010, 1012, 1014, 1016 comprising edge information 1010. In at least one embodiment, edge information 1010 is data comprising information corresponding to one or more dependencies of graph 1006. In at least one embodiment, edge information 1010 includes information indicating one or more dependencies between a node associated with node pointer 1004 and one or more nodes of graph 1006. In at least one embodiment, edge information 1010 includes an indication of one or more of a source port, a destination port, and/or a dependency type, as described above in conjunction with FIG. 1, FIG. 3, FIG. 4, and/or FIG. 5. In at least one embodiment, edge information 1010 may be represented as an array, in which each element corresponds to an element of a parallel array associated with dependency pointer 1008. In at least one embodiment, edge information 1010 is data to be input to a function call, if said function call is to perform invocation 1002. In at least one embodiment, edge information 1010 is data to be input to an API, if said API is to cause invocation 1002 to be performed.

In at least one embodiment, invocation 1002 receives, as input, parameters 1004, 1006, 1008, 1010, 1012, 1014, 1016 comprising a number of dependencies 1012. In at least one embodiment, number of dependencies 1012 is data indicating a number, or quantity, of dependencies associated with a node of graph 1006 associated with node pointer 1004. In at least one embodiment, number of dependencies 1012 is data to be input to a function call, if said function call is to perform invocation 1002. In at least one embodiment, number of dependencies 1012 is data to be input to an API, if said API is to cause invocation 1002 to be performed.

In at least one embodiment, invocation 1002 receives, as input, parameters 1004, 1006, 1008, 1010, 1012, 1014, 1016 comprising one or more semaphore parameters 1014. In at least one embodiment, semaphore parameters 1014 is data associated with one or more external semaphore signal corresponding to a node of graph 1006 associated with node pointer 1004. In at least one embodiment, semaphore parameters 1014 include an array of semaphore identifiers and/or handles. In at least one embodiment, semaphore parameters 1014 include an indication of a number of associated handles and/or parameters. In at least one embodiment, semaphore parameters 1014 include an array of semaphore parameters. In at least one embodiment, semaphore parameters 1014 is data to be input to a function call, if said function call is to perform invocation 1002. In at least one embodiment, semaphore parameters 1014 is data to be input to an API, if said API is to cause invocation 1002 to be performed.

In at least one embodiment, invocation 1002 receives, as input, parameters 1004, 1006, 1008, 1010, 1012, 1014, 1016 comprising other parameter(s) 1016. In at least one embodiment, other parameter(s) 1016 are data comprising any other information usable by operation 1000. In at least one embodiment, other parameter(s) 1016 are data to be input to a function call, if said function call is to perform invocation 1002. In at least one embodiment, other parameter(s) 1016 are data to be input to an API, if said API is to cause invocation 1002 to be performed.

In at least one embodiment, an example instruction indicating operation 1000 in a parallel computing environment, such as compute uniform device architecture (CUDA), is as follows:

cudaGraphAddExternalSemaphoresSignalNode (pGraphNode, graph, pDependencies, pDependencyData, numDependencies, nodeParams) where pGraphNode corresponds to node pointer 1004, graph corresponds to graph 1006, pDependencies corresponds to dependency pointer 1008, pDependencyData corresponds to edge information 1010, and numDependencies corresponds to number of dependencies 1012, and nodeParams corresponds to semaphore parameters 1014.

In at least one embodiment, response 1020 generates, as output, parameters 1022, 1024 comprising a status 1022. In at least one embodiment, status 1022 is data comprising any other information presented by operation 1000. In at least one embodiment, status 1022 is data to be output in response to a function call, if said function call is to perform invocation 1002. In at least one embodiment, status 1022 is data to be output by an API, if said API is to cause invocation 1002 to be performed. In at least one embodiment, status 1022 indicates that operation 1000 was performed successfully. In at least one embodiment, status 1022 indicates that operation 1000 was not performed successfully, or otherwise failed.

In at least one embodiment, response 1020 generates, as output, parameters 1022, 1024 comprising node 1024. In at least one embodiment, node 1024 is data to one or more nodes generated by operation 1000, using information associated with invocation 1002, such as parameters 1004, 1006, 1008, 1010, 1012, 1014, 1016. In at least one embodiment, node 1024 will be output by response 1020 to an address corresponding to node pointer 1004, such that node 1024 will be generated by storing data to an address indicated by node pointer 1004. In at least one embodiment, node 1024 is data to be output in response to a function call, if said function call is to perform invocation 1002. In at least one embodiment, node 1024 is data to be output by an API, if said API is to cause invocation 1002 to be performed. In at least one embodiment, node 1024 is provided to data structure, memory, and/or variable indicated by node pointer 1004. In at least one embodiment, node 1024 is presented in response to performance of one or more API and/or function calls.

Figure 11:
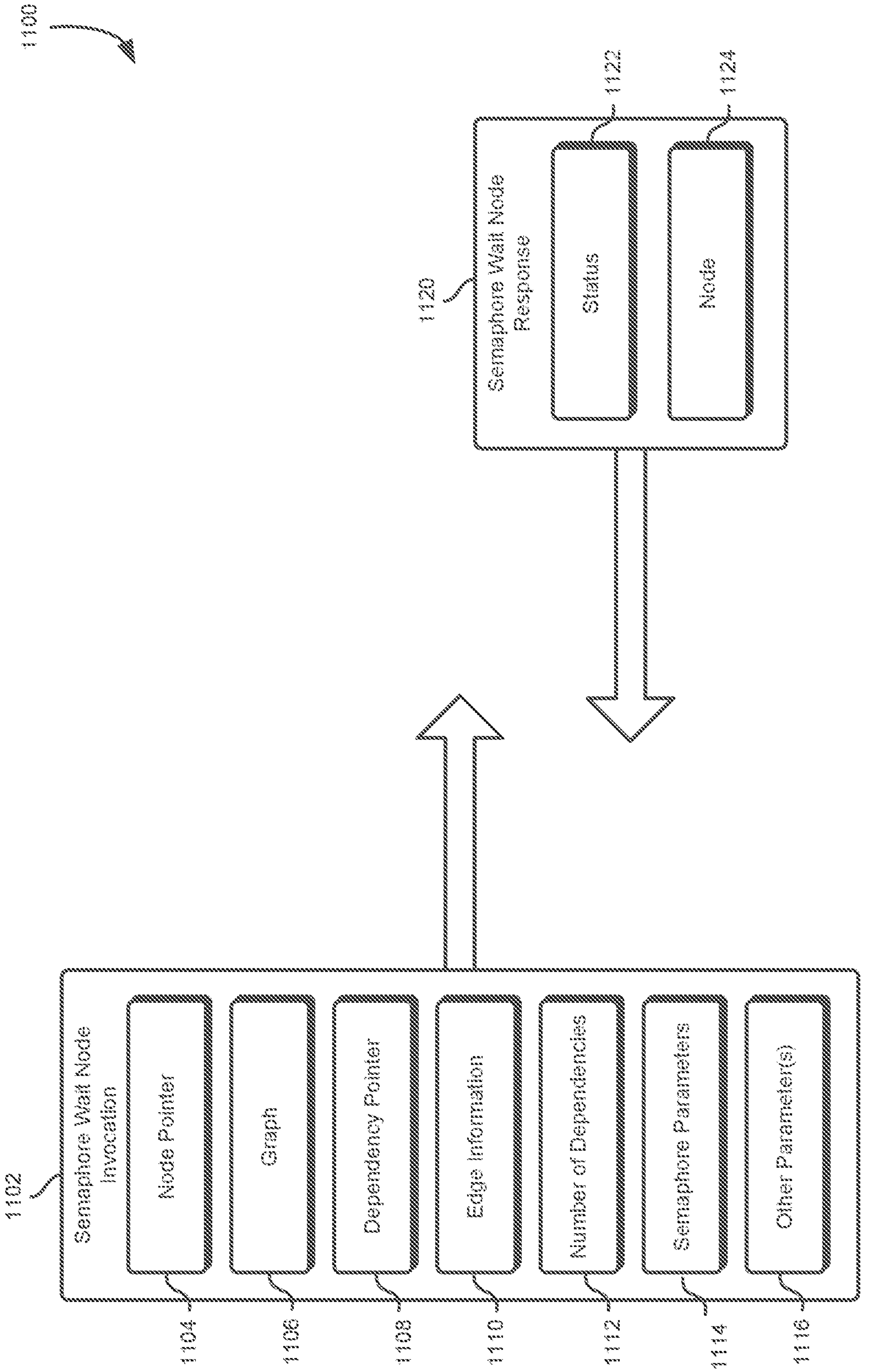
FIG. 11 is a block diagram illustrating an external semaphore wait node operation, in accordance with at least one embodiment.

FIG. 11 is a block diagram illustrating an external semaphore wait node operation 1100 ("operation 1100"), in accordance with at least one embodiment. In at least one embodiment, operation 1100 is one or more computational operations that, if performed, cause a node to be generated and/or added to a graph, as described above in conjunction with FIG. 1. In at least one embodiment, operation 1100 is to cause a semaphore wait node to be added to a software graph based, at least in part, on a dependency type. In at least one embodiment, operation 1100 is to cause an external semaphore wait node to be generated and/or added to a graph. In at least one embodiment, an external semaphore wait node, when executed, performs a wait operation on a set of externally allocated semaphore objects. In at least one embodiment, an external semaphore wait node's dependencies will not be launched (e.g., performed) until one or more wait operations have completed. In at least one embodiment, a wait operation on a set of externally allocated semaphore objects facilitate a synchronization of one or more internal and/or external objects. In at least one embodiment, operation 1100 is a set of instructions that, if performed, cause one or more processors to cause one or more APIs to be performed.

In at least one embodiment, an event wait node invocation 1102 ("invocation 1102") is a function call to be performed by one or more software programs, such as kernels to be performed by one or more parallel processing units (PPUs), such as graphics processing units (GPUs). In at least one embodiment, invocation 1102 is an invocation of an instruction to cause one or more processors to perform one or more computational operations 1122, 1124 of an empty graph node response 1120 ("response 1120"). In at least one embodiment, invocation 1102 is an invocation of an API to cause one or more processors to perform one or more computational operations 1122, 1124 of response 1120.

In at least one embodiment, invocation 1102 receives, when invoked, one or more parameters 1104, 1106, 1108, 1110, 1112, 1114, 1116, to indicate information about computational operations to be performed. In at least one embodiment, invocation 1102 receives, when invoked, one or more parameters 1104, 1106, 1108, 1110, 1112, 1114, 1116 to indicate information about instructions to be performed.

In at least one embodiment, invocation 1102 receives, as input, parameters 1104, 1106, 1108, 1110, 1112, 1114, 1116 comprising a node pointer 1104. In at least one embodiment, node pointer 1104 is data comprising information indicating one or more nodes to be created by operation 1100. In at least one embodiment, node pointer 1104 is a pointer to an address corresponding to one or more nodes to be created by operation 1100. In at least one embodiment, node pointer 1104 is data to be input to a function call, if said function call is to perform invocation 1102. In at least one embodiment, node pointer 1104 is data to be input to an API, if said API is to cause invocation 1102 to be performed.

In at least one embodiment, invocation 1102 receives, as input, parameters 1104, 1106, 1108, 1110, 1112, 1114, 1116 comprising a graph 1106. In at least one embodiment, graph 1106 is data comprising information indicating one or more attributes of a graph, such as nodes, edges, dependencies, and/or any other suitable attribute. In at least one embodiment, graph 1106 is associated with an instantiated graph that is evaluated to be generated and/or executed, as described above in conjunction with FIG. 1, and/or FIG. 2. In at least one embodiment, graph 1106 is data to be input to a function call, if said function call is to perform invocation 1102. In at least one embodiment, graph 1106 is data to be input to an API, if said API is to cause invocation 1102 to be performed.

In at least one embodiment, invocation 1102 receives, as input, parameters 1104, 1106, 1108, 1110, 1112, 1114, 1116 comprising a dependency pointer 1108. In at least one embodiment, dependency pointer 1108 is data comprising information indicating one or more dependencies between two or more nodes of a graph. In at least one embodiment, dependency pointer 1108 includes information corresponding to one or more dependencies between a node indicated by node pointer 1104 and one or more other nodes of graph 1106. In at least one embodiment, dependency pointer 1108 is data to be input to a function call, if said function call is to perform invocation 1102. In at least one embodiment, dependency pointer 1108 is data to be input to an API, if said API is to cause invocation 1102 to be performed.

In at least one embodiment, invocation 1102 receives, as input, parameters 1104, 1106, 1108, 1110, 1112, 1114, 1116 comprising edge information 1110. In at least one embodiment, edge information 1110 is data comprising information corresponding to one or more dependencies of graph 1106. In at least one embodiment, edge information 1110 includes information indicating one or more dependencies between a node associated with node pointer 1104 and one or more nodes of graph 1106. In at least one embodiment, edge information 1110 includes an indication of one or more of a source port, a destination port, and/or a dependency type, as described above in conjunction with FIG. 1, FIG. 3, FIG. 4, and/or FIG. 5. In at least one embodiment, edge information 1110 may be represented as an array, in which each element corresponds to an element of a parallel array associated with dependency pointer 1108. In at least one embodiment, edge information 1110 is data to be input to a function call, if said function call is to perform invocation 1102. In at least one embodiment, edge information 1110 is data to be input to an API, if said API is to cause invocation 1102 to be performed.

In at least one embodiment, invocation 1102 receives, as input, parameters 1104, 1106, 1108, 1110, 1112, 1114, 1116 comprising a number of dependencies 1112. In at least one embodiment, number of dependencies 1112 is data indicating a number, or quantity, of dependencies associated with a node of graph 1106 associated with node pointer 1104. In at least one embodiment, number of dependencies 1112 is data to be input to a function call, if said function call is to perform invocation 1102. In at least one embodiment, number of dependencies 1112 is data to be input to an API, if said API is to cause invocation 1102 to be performed.

In at least one embodiment, invocation 1102 receives, as input, parameters 1104, 1106, 1108, 1110, 1112, 1114, 1116 comprising one or more semaphore parameters 1114. In at least one embodiment, semaphore parameters 1114 is data associated with one or more external semaphore signal corresponding to a node of graph 1106 associated with node pointer 1104. In at least one embodiment, semaphore parameters 1114 include an array of semaphore identifiers and/or handles. In at least one embodiment, semaphore parameters 1114 include an indication of a number of associated handles and/or parameters. In at least one embodiment, semaphore parameters 1114 include an array of semaphore parameters. In at least one embodiment, semaphore parameters 1114 is data to be input to a function call, if said function call is to perform invocation 1102. In at least one embodiment, semaphore parameters 1114 is data to be input to an API, if said API is to cause invocation 1102 to be performed.

In at least one embodiment, invocation 1102 receives, as input, parameters 1104, 1106, 1108, 1110, 1112, 1114, 1116 comprising other parameter(s) 1116. In at least one embodiment, other parameter(s) 1116 are data comprising any other information usable by operation 1100. In at least one embodiment, other parameter(s) 1116 are data to be input to a function call, if said function call is to perform invocation 1102. In at least one embodiment, other parameter(s) 1116 are data to be input to an API, if said API is to cause invocation 1102 to be performed.

In at least one embodiment, an example instruction indicating operation 1100 in a parallel computing environment, such as compute uniform device architecture (CUDA), is as follows:

cudaGraphAddExternalSemaphoresWaitNode (pGraphNode, graph, pDependencies, pDependencyData, numDependencies, nodeParams) where pGraphNode corresponds to node pointer 1104, graph corresponds to graph 1106, pDependencies corresponds to dependency pointer 1108, pDependencyData corresponds to edge information 1110, and numDependencies corresponds to number of dependencies 1112, and nodeParams corresponds to semaphore parameters 1114.

In at least one embodiment, response 1120 generates, as output, parameters 1122, 1124 comprising a status 1122. In at least one embodiment, status 1122 is data comprising any other information presented by operation 1100. In at least one embodiment, status 1122 is data to be output in response to a function call, if said function call is to perform invocation 1102. In at least one embodiment, status 1122 is data to be output by an API, if said API is to cause invocation 1102 to be performed. In at least one embodiment, status 1122 indicates that operation 1100 was performed successfully. In at least one embodiment, status 1122 indicates that operation 1100 was not performed successfully, or otherwise failed.

In at least one embodiment, response 1120 generates, as output, parameters 1122, 1124 comprising node 1124. In at least one embodiment, node 1124 is data to one or more nodes generated by operation 1100, using information associated with invocation 1102, such as parameters 1104, 1106, 1108, 1110, 1112, 1114, 1116. In at least one embodiment, node 1124 will be output by response 1120 to an address corresponding to node pointer 1104, such that node 1124 will be generated by storing data to an address indicated by node pointer 1104. In at least one embodiment, node 1124 is data to be output in response to a function call, if said function call is to perform invocation 1102. In at least one embodiment, node 1124 is data to be output by an API, if said API is to cause invocation 1102 to be performed. In at least one embodiment, node 1124 is provided to data structure, memory, and/or variable indicated by node pointer 1104. In at least one embodiment, node 1124 is presented in response to performance of one or more API and/or function calls.

Figure 12:
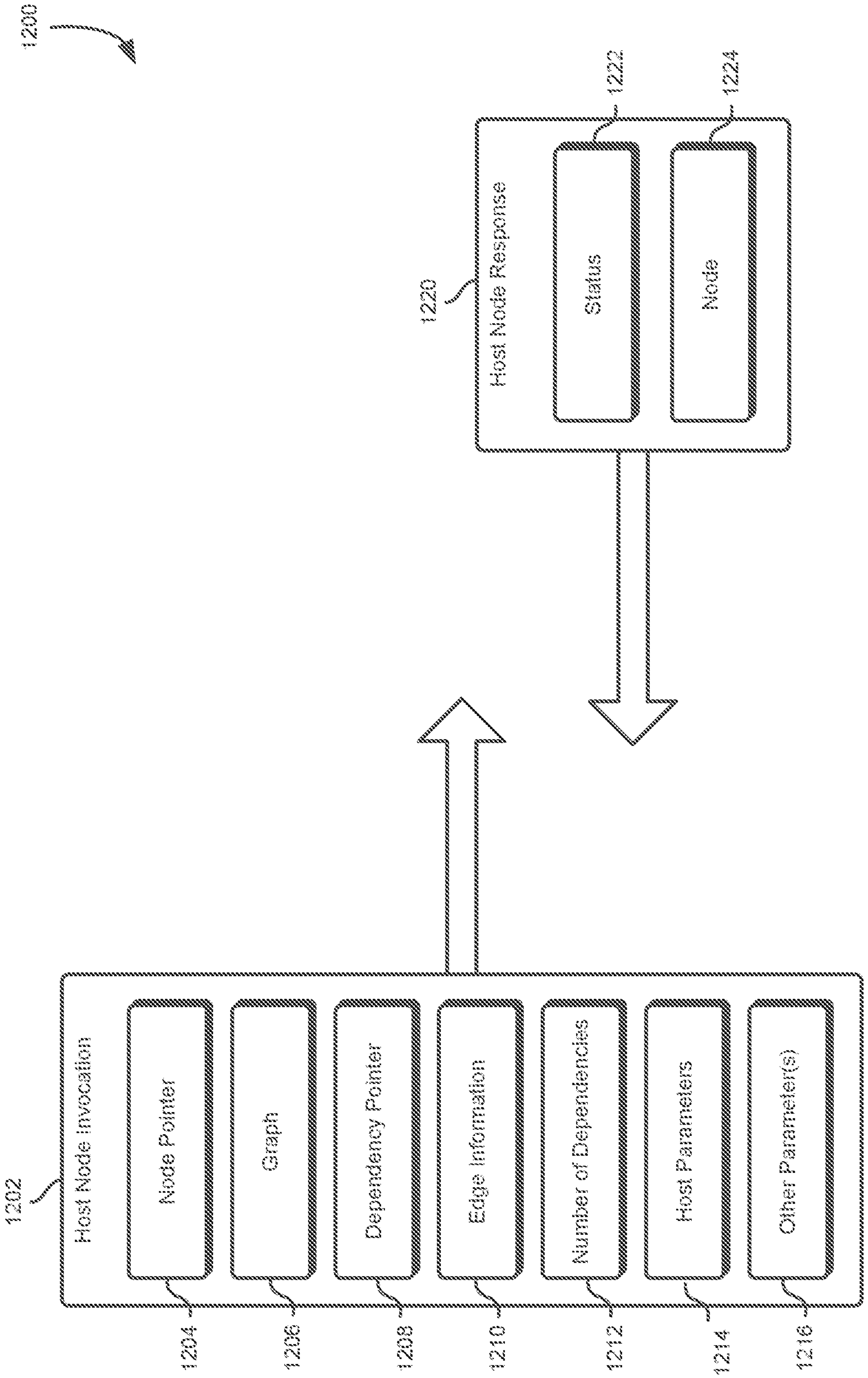
FIG. 12 is a block diagram illustrating a host node operation, in accordance with at least one embodiment.

FIG. 12 is a block diagram illustrating a host node operation 1200 ("operation 1200"), in accordance with at least one embodiment. In at least one embodiment, operation 1200 is one or more computational operations that, if performed, cause a node to be generated and/or added to a graph, as described above in conjunction with FIG. 1. In at least one embodiment, operation 1200 is to cause a host node to be added to a software graph based, at least in part, on a dependency type. In at least one embodiment, operation 1200 is to cause a host node to be generated and/or added to a graph. In at least one embodiment, a host node, when executed, invokes one or more processor functions, for example, using a CPU. In at least one embodiment, operation 1200 is a set of instructions that, if performed, cause one or more processors to cause one or more APIs to be performed.

In at least one embodiment, a host node invocation 1202 ("invocation 1202") is a function call to be performed by one or more software programs, such as kernels to be performed by one or more parallel processing units (PPUs), such as graphics processing units (GPUs). In at least one embodiment, invocation 1202 is an invocation of an instruction to cause one or more processors to perform one or more computational operations 1222, 1224 of a host node response 1220 ("response 1220"). In at least one embodiment, invocation 1202 is an invocation of an API to cause one or more processors to perform one or more computational operations 1222, 1224 of response 1220.

In at least one embodiment, invocation 1202 receives, when invoked, one or more parameters 1204, 1206, 1208, 1210, 1212, 1214, 1216, to indicate information about computational operations to be performed. In at least one embodiment, invocation 1202 receives, when invoked, one or more parameters 1204, 1206, 1208, 1210, 1212, 1214, 1216 to indicate information about instructions to be performed.

In at least one embodiment, invocation 1202 receives, as input, parameters 1204, 1206, 1208, 1210, 1212, 1214, 1216 comprising a node pointer 1204. In at least one embodiment, node pointer 1204 is data comprising information indicating one or more nodes to be created by operation 1200. In at least one embodiment, node pointer 1204 is a pointer to an address corresponding to one or more nodes to be created by operation 1200. In at least one embodiment, node pointer 1204 is data to be input to a function call, if said function call is to perform invocation 1202. In at least one embodiment, node pointer 1204 is data to be input to an API, if said API is to cause invocation 1202 to be performed.

In at least one embodiment, invocation 1202 receives, as input, parameters 1204, 1206, 1208, 1210, 1212, 1214, 1216 comprising a graph 1206. In at least one embodiment, graph 1206 is data comprising information indicating one or more attributes of a graph, such as nodes, edges, dependencies, and/or any other suitable attribute. In at least one embodiment, graph 1206 is associated with an instantiated graph that is evaluated to be generated and/or executed, as described above in conjunction with FIG. 1, and/or FIG. 2. In at least one embodiment, graph 1206 is data to be input to a function call, if said function call is to perform invocation 1202. In at least one embodiment, graph 1206 is data to be input to an API, if said API is to cause invocation 1202 to be performed.

In at least one embodiment, invocation 1202 receives, as input, parameters 1204, 1206, 1208, 1210, 1212, 1214, 1216 comprising a dependency pointer 1208. In at least one embodiment, dependency pointer 1208 is data comprising information indicating one or more dependencies between two or more nodes of a graph. In at least one embodiment, dependency pointer 1208 includes information corresponding to one or more dependencies between a node indicated by node pointer 1204 and one or more other nodes of graph 1206. In at least one embodiment, dependency pointer 1208 is data to be input to a function call, if said function call is to perform invocation 1202. In at least one embodiment, dependency pointer 1208 is data to be input to an API, if said API is to cause invocation 1202 to be performed.

In at least one embodiment, invocation 1202 receives, as input, parameters 1204, 1206, 1208, 1210, 1212, 1214, 1216 comprising edge information 1210. In at least one embodiment, edge information 1210 is data comprising information corresponding to one or more dependencies of graph 1206. In at least one embodiment, edge information 1210 includes information indicating one or more dependencies between a node associated with node pointer 1204 and one or more nodes of graph 1206. In at least one embodiment, edge information 1210 includes an indication of one or more of a source port, a destination port, and/or a dependency type, as described above in conjunction with FIG. 1, FIG. 3, FIG. 4, and/or FIG. 5. In at least one embodiment, edge information 1210 may be represented as an array, in which each element corresponds to an element of a parallel array associated with dependency pointer 1208. In at least one embodiment, edge information 1210 is data to be input to a function call, if said function call is to perform invocation 1202. In at least one embodiment, edge information 1210 is data to be input to an API, if said API is to cause invocation 1202 to be performed.

In at least one embodiment, invocation 1202 receives, as input, parameters 1204, 1206, 1208, 1210, 1212, 1214, 1216 comprising a number of dependencies 1212. In at least one embodiment, number of dependencies 1212 is data indicating a number, or quantity, of dependencies associated with a node of graph 1206 associated with node pointer 1204. In at least one embodiment, number of dependencies 1212 is data to be input to a function call, if said function call is to perform invocation 1202. In at least one embodiment, number of dependencies 1212 is data to be input to an API, if said API is to cause invocation 1202 to be performed.

In at least one embodiment, invocation 1202 receives, as input, parameters 1204, 1206, 1208, 1210, 1212, 1214, 1216 comprising one or more host parameters 1214. In at least one embodiment, host parameters 1214 is data associated with one or more processors corresponding to a node of graph 1206 associated with node pointer 1204. In at least one embodiment, host parameters 1214 include one or more identifiers of one or more functions to be called when a node of graph 1206 associated with node pointer 1204 executes. In at least one embodiment, host parameters 1214 include one or more identifiers of one or more instructions to be performed when a node of graph 1206 associated with node pointer 1204 executes. In at least one embodiment, host parameters 1214 include one or more arguments, variable, and/or parameters to provide to one or more instructions and/or functions to be performed when a node of graph 1206 associated with node pointer 1204 executes. In at least one embodiment, host parameters 1214 is data to be input to a function call, if said function call is to perform invocation 1202. In at least one embodiment, host parameters 1214 is data to be input to an API, if said API is to cause invocation 1202 to be performed.

In at least one embodiment, invocation 1202 receives, as input, parameters 1204, 1206, 1208, 1210, 1212, 1214, 1216 comprising other parameter(s) 1216. In at least one embodiment, other parameter(s) 1216 are data comprising any other information usable by operation 1200. In at least one embodiment, other parameter(s) 1216 are data to be input to a function call, if said function call is to perform invocation 1202. In at least one embodiment, other parameter(s) 1216 are data to be input to an API, if said API is to cause invocation 1202 to be performed.

In at least one embodiment, an example instruction indicating operation 1200 in a parallel computing environment, such as compute uniform device architecture (CUDA), is as follows:

cudaGraphAddHostNode (pGraphNode, graph, pDependencies, pDependencyData, numDependencies, nodeParams) where pGraphNode corresponds to node pointer 1204, graph corresponds to graph 1206, pDependencies corresponds to dependency pointer 1208, pDependencyData corresponds to edge information 1210, and numDependencies corresponds to number of dependencies 1212, and nodeParams corresponds to host parameters 1214.

In at least one embodiment, response 1220 generates, as output, parameters 1222, 1224 comprising a status 1222. In at least one embodiment, status 1222 is data comprising any other information presented by operation 1200. In at least one embodiment, status 1222 is data to be output in response to a function call, if said function call is to perform invocation 1202. In at least one embodiment, status 1222 is data to be output by an API, if said API is to cause invocation 1202 to be performed. In at least one embodiment, status 1222 indicates that operation 1200 was performed successfully. In at least one embodiment, status 1222 indicates that operation 1200 was not performed successfully, or otherwise failed.

In at least one embodiment, response 1220 generates, as output, parameters 1222, 1224 comprising node 1224. In at least one embodiment, node 1224 is data to one or more nodes generated by operation 1200, using information associated with invocation 1202, such as parameters 1204, 1206, 1208, 1210, 1212, 1214, 1216. In at least one embodiment, node 1224 will be output by response 1220 to an address corresponding to node pointer 1204, such that node 1224 will be generated by storing data to an address indicated by node pointer 1204. In at least one embodiment, node 1224 is data to be output in response to a function call, if said function call is to perform invocation 1202. In at least one embodiment, node 1224 is data to be output by an API, if said API is to cause invocation 1202 to be performed. In at least one embodiment, node 1224 is provided to data structure, memory, and/or variable indicated by node pointer 1204. In at least one embodiment, node 1224 is presented in response to performance of one or more API and/or function calls.

Figure 13:
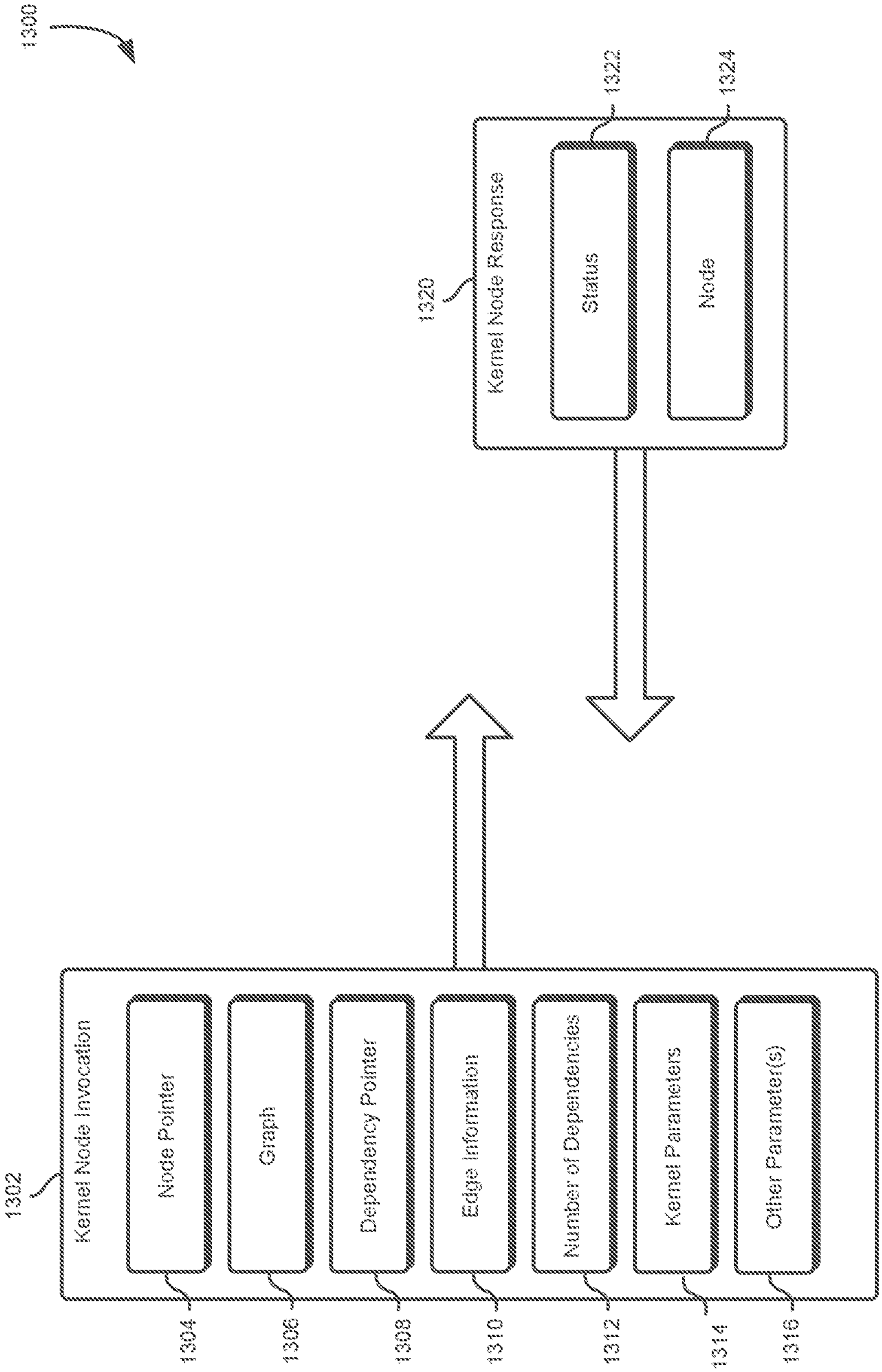
FIG. 13 is a block diagram illustrating a kernel node operation, in accordance with at least one embodiment.

FIG. 13 is a block diagram illustrating a kernel node operation 1300 ("operation 1300"), in accordance with at least one embodiment. In at least one embodiment, operation 1300 is one or more computational operations that, if performed, cause a node to be generated and/or added to a graph, as described above in conjunction with FIG. 1. In at least one embodiment, operation 1300 is to cause a kernel node to be added to a software graph based, at least in part, on a dependency type. In at least one embodiment, operation 1300 is to cause a kernel node to be generated and/or added to a graph. In at least one embodiment, a kernel node, when executed, causes a kernel to be launched to be performed. In at least one embodiment, a kernel is to be performed according to one or more kernel parameters, such as kernel parameters 13114. In at least one embodiment, operation 1300 is a set of instructions that, if performed, cause one or more processors to cause one or more APIs to be performed.

In at least one embodiment, a kernel node invocation 1302 ("invocation 1302") is a function call to be performed by one or more software programs, such as kernels to be performed by one or more parallel processing units (PPUs), such as graphics processing units (GPUs). In at least one embodiment, invocation 1302 is an invocation of an instruction to cause one or more processors to perform one or more computational operations 1322, 1324 of a kernel node response 1320 ("response 1320"). In at least one embodiment, invocation 1302 is an invocation of an API to cause one or more processors to perform one or more computational operations 1322, 1324 of response 1320.

In at least one embodiment, invocation 1302 receives, when invoked, one or more parameters 1304, 1306, 1308, 1310, 1312, 1314, 1316, to indicate information about computational operations to be performed. In at least one embodiment, invocation 1302 receives, when invoked, one or more parameters 1304, 1306, 1308, 1310, 1312, 1314, 1316 to indicate information about instructions to be performed.

In at least one embodiment, invocation 1302 receives, as input, parameters 1304, 1306, 1308, 1310, 1312, 1314, 1316 comprising a node pointer 1304. In at least one embodiment, node pointer 1304 is data comprising information indicating one or more nodes to be created by operation 1300. In at least one embodiment, node pointer 1304 is a pointer to an address corresponding to one or more nodes to be created by operation 1300. In at least one embodiment, node pointer 1304 is data to be input to a function call, if said function call is to perform invocation 1302. In at least one embodiment, node pointer 1304 is data to be input to an API, if said API is to cause invocation 1302 to be performed.

In at least one embodiment, invocation 1302 receives, as input, parameters 1304, 1306, 1308, 1310, 1312, 1314, 1316 comprising a graph 1306. In at least one embodiment, graph 1306 is data comprising information indicating one or more attributes of a graph, such as nodes, edges, dependencies, and/or any other suitable attribute. In at least one embodiment, graph 1306 is associated with an instantiated graph that is evaluated to be generated and/or executed, as described above in conjunction with FIG. 1, and/or FIG. 2. In at least one embodiment, graph 1306 is data to be input to a function call, if said function call is to perform invocation 1302. In at least one embodiment, graph 1306 is data to be input to an API, if said API is to cause invocation 1302 to be performed.

In at least one embodiment, invocation 1302 receives, as input, parameters 1304, 1306, 1308, 1310, 1312, 1314, 1316 comprising a dependency pointer 1308. In at least one embodiment, dependency pointer 1308 is data comprising information indicating one or more dependencies between two or more nodes of a graph. In at least one embodiment, dependency pointer 1308 includes information corresponding to one or more dependencies between a node indicated by node pointer 1304 and one or more other nodes of graph 1306. In at least one embodiment, dependency pointer 1308 is data to be input to a function call, if said function call is to perform invocation 1302. In at least one embodiment, dependency pointer 1308 is data to be input to an API, if said API is to cause invocation 1302 to be performed.

In at least one embodiment, invocation 1302 receives, as input, parameters 1304, 1306, 1308, 1310, 1312, 1314, 1316 comprising edge information 1310. In at least one embodiment, edge information 1310 is data comprising information corresponding to one or more dependencies of graph 1306. In at least one embodiment, edge information 1310 includes information indicating one or more dependencies between a node associated with node pointer 1304 and one or more nodes of graph 1306. In at least one embodiment, edge information 1310 includes an indication of one or more of a source port, a destination port, and/or a dependency type, as described above in conjunction with FIG. 1, FIG. 3, FIG. 4, and/or FIG. 5. In at least one embodiment, edge information 1310 may be represented as an array, in which each element corresponds to an element of a parallel array associated with dependency pointer 1308. In at least one embodiment, edge information 1310 is data to be input to a function call, if said function call is to perform invocation 1302. In at least one embodiment, edge information 1310 is data to be input to an API, if said API is to cause invocation 1302 to be performed.

In at least one embodiment, invocation 1302 receives, as input, parameters 1304, 1306, 1308, 1310, 1312, 1314, 1316 comprising a number of dependencies 1312. In at least one embodiment, number of dependencies 1312 is data indicating a number, or quantity, of dependencies associated with a node of graph 1306 associated with node pointer 1304. In at least one embodiment, number of dependencies 1312 is data to be input to a function call, if said function call is to perform invocation 1302. In at least one embodiment, number of dependencies 1312 is data to be input to an API, if said API is to cause invocation 1302 to be performed.

In at least one embodiment, invocation 1302 receives, as input, parameters 1304, 1306, 1308, 1310, 1312, 1314, 1316 comprising one or more kernel parameters 1314. In at least one embodiment, kernel parameters 1314 is data associated with one or more kernels corresponding to a node of graph 1306 associated with node pointer 1304. In at least one embodiment, kernel parameters 1314 include an indication of one or more dimensions of one or more resources that a kernel is to be launched to. In at least one embodiment, kernel parameters 1314 include an indication of one or more arguments used to perform one or more kernels. In at least one embodiment, kernel parameters 1314 include an indication of one or more kernels to be launched. In at least one embodiment, kernel parameters 1314 include an indication one or more dimensions of a resource grid used in association with performing one or more kernels. In at least one embodiment, kernel parameters 1314 include a size of memory to be used by one or more kernels. In at least one embodiment, kernel parameters 1314 is data to be input to an API, if said API is to cause invocation 1302 to be performed.

In at least one embodiment, invocation 1302 receives, as input, parameters 1304, 1306, 1308, 1310, 1312, 1314, 1316 comprising other parameter(s) 1316. In at least one embodiment, other parameter(s) 1316 are data comprising any other information usable by operation 1300. In at least one embodiment, other parameter(s) 1316 are data to be input to a function call, if said function call is to perform invocation 1302. In at least one embodiment, other parameter(s) 1316 are data to be input to an API, if said API is to cause invocation 1302 to be performed.

In at least one embodiment, an example instruction indicating operation 1300 in a parallel computing environment, such as compute uniform device architecture (CUDA), is as follows:

cudaGraphAddKernelNode (pGraphNode, graph, pDependencies, pDependencyData, numDependencies, nodeParams) where pGraphNode corresponds to node pointer 1304, graph corresponds to graph 1306, pDependencies corresponds to dependency pointer 1308, pDependencyData corresponds to edge information 1310, and numDependencies corresponds to number of dependencies 1312, and nodeParams corresponds to kernel parameters 1314.

In at least one embodiment, response 1320 generates, as output, parameters 1322, 1324 comprising a status 1322. In at least one embodiment, status 1322 is data comprising any other information presented by operation 1300. In at least one embodiment, status 1322 is data to be output in response to a function call, if said function call is to perform invocation 1302. In at least one embodiment, status 1322 is data to be output by an API, if said API is to cause invocation 1302 to be performed. In at least one embodiment, status 1322 indicates that operation 1300 was performed successfully. In at least one embodiment, status 1322 indicates that operation 1300 was not performed successfully, or otherwise failed.

In at least one embodiment, response 1320 generates, as output, parameters 1322, 1324 comprising node 1324. In at least one embodiment, node 1324 is data to one or more nodes generated by operation 1300, using information associated with invocation 1302, such as parameters 1304, 1306, 1308, 1310, 1312, 1314, 1316. In at least one embodiment, node 1324 will be output by response 1320 to an address corresponding to node pointer 1304, such that node 1324 will be generated by storing data to an address indicated by node pointer 1304. In at least one embodiment, node 1324 is data to be output in response to a function call, if said function call is to perform invocation 1302. In at least one embodiment, node 1324 is data to be output by an API, if said API is to cause invocation 1302 to be performed. In at least one embodiment, node 1324 is provided to data structure, memory, and/or variable indicated by node pointer 1304. In at least one embodiment, node 1324 is presented in response to performance of one or more API and/or function calls.

Figure 14:
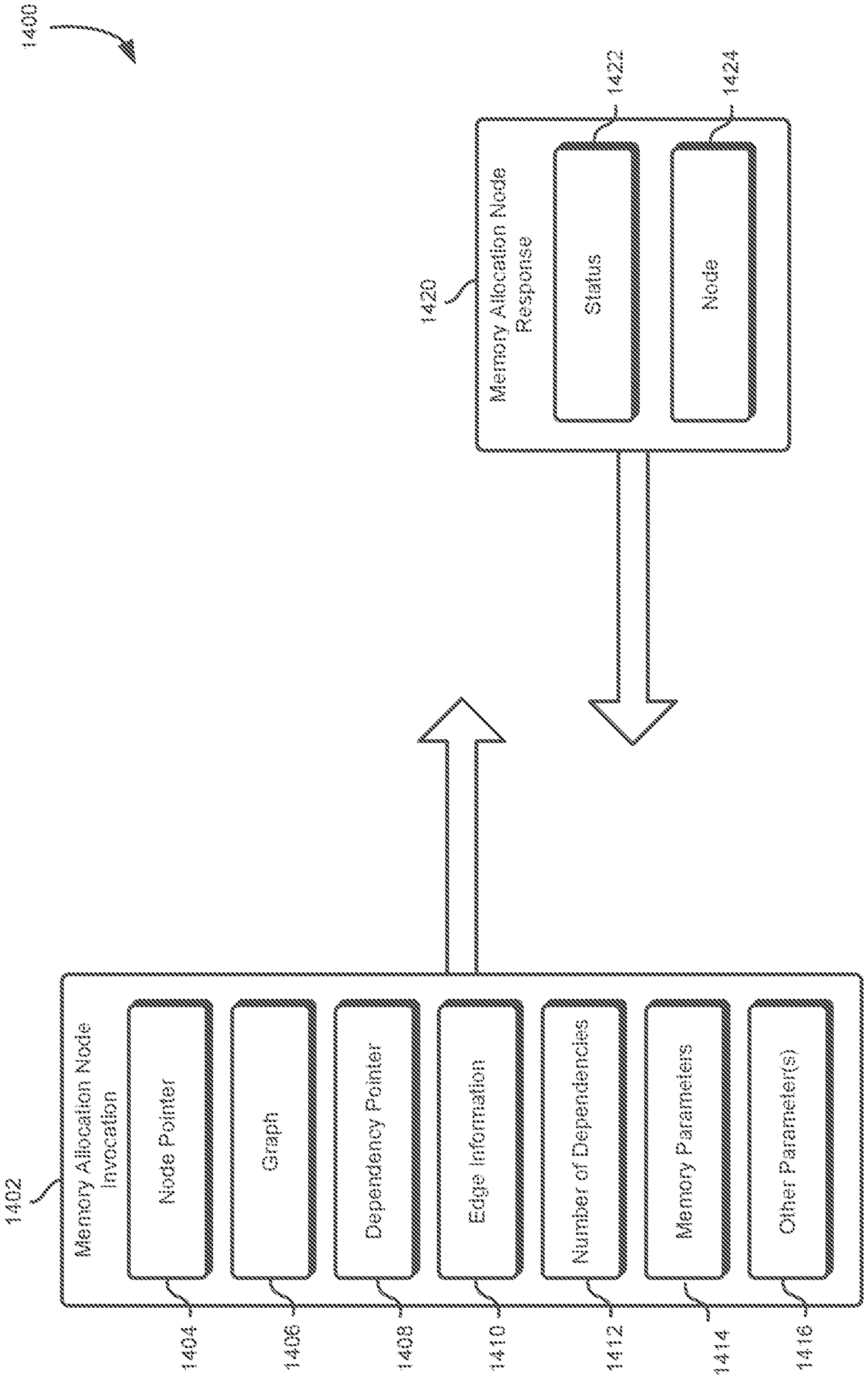
FIG. 14 is a block diagram illustrating a memory allocation operation, in accordance with at least one embodiment.

FIG. 14 is a block diagram illustrating a memory allocation operation 1400 ("operation 1400"), in accordance with at least one embodiment. In at least one embodiment, operation 1400 is one or more computational operations that, if performed, cause a node to be generated and/or added to a graph, as described above in conjunction with FIG. 1. In at least one embodiment, operation 1400 is to cause a memory allocation node to be added to a software graph based, at least in part, on a dependency type. In at least one embodiment, operation 1400 is to cause a memory allocation node to be generated and/or added to a graph. In at least one embodiment, a memory allocation node, when executed, causes one or more portions of memory to be allocated. In at least one embodiment, allocated memory may be freed or otherwise release by one or more operations of a graph. In at least one embodiment, operation 1400 is a set of instructions that, if performed, cause one or more processors to cause one or more APIs to be performed.

In at least one embodiment, memory allocation node invocation 1402 ("invocation 1402") is a function call to be performed by one or more software programs, such as kernels to be performed by one or more parallel processing units (PPUs), such as graphics processing units (GPUs). In at least one embodiment, invocation 1402 is an invocation of an instruction to cause one or more processors to perform one or more computational operations 1422, 1424 of memory allocation node response 1420 ("response 1420"). In at least one embodiment, invocation 1402 is an invocation of an API to cause one or more processors to perform one or more computational operations 1422, 1424 of response 1420.

In at least one embodiment, invocation 1402 receives, when invoked, one or more parameters 1404, 1406, 1408, 1410, 1412, 1414, 1416, to indicate information about computational operations to be performed. In at least one embodiment, invocation 1402 receives, when invoked, one or more parameters 1404, 1406, 1408, 1410, 1412, 1414, 1416 to indicate information about instructions to be performed.

In at least one embodiment, invocation 1402 receives, as input, parameters 1404, 1406, 1408, 1410, 1412, 1414, 1416 comprising a node pointer 1404. In at least one embodiment, node pointer 1404 is data comprising information indicating one or more nodes to be created by operation 1400. In at least one embodiment, node pointer 1404 is a pointer to an address corresponding to one or more nodes to be created by operation 1400. In at least one embodiment, node pointer 1404 is data to be input to a function call, if said function call is to perform invocation 1402. In at least one embodiment, node pointer 1404 is data to be input to an API, if said API is to cause invocation 1402 to be performed.

In at least one embodiment, invocation 1402 receives, as input, parameters 1404, 1406, 1408, 1410, 1412, 1414, 1416 comprising a graph 1406. In at least one embodiment, graph 1406 is data comprising information indicating one or more attributes of a graph, such as nodes, edges, dependencies, and/or any other suitable attribute. In at least one embodiment, graph 1406 is associated with an instantiated graph that is evaluated to be generated and/or executed, as described above in conjunction with FIG. 1, and/or FIG. 2. In at least one embodiment, graph 1406 is data to be input to a function call, if said function call is to perform invocation 1402. In at least one embodiment, graph 1406 is data to be input to an API, if said API is to cause invocation 1402 to be performed.

In at least one embodiment, invocation 1402 receives, as input, parameters 1404, 1406, 1408, 1410, 1412, 1414, 1416 comprising a dependency pointer 1408. In at least one embodiment, dependency pointer 1408 is data comprising information indicating one or more dependencies between two or more nodes of a graph. In at least one embodiment, dependency pointer 1408 includes information corresponding to one or more dependencies between a node indicated by node pointer 1404 and one or more other nodes of graph 1406. In at least one embodiment, dependency pointer 1408 is data to be input to a function call, if said function call is to perform invocation 1402. In at least one embodiment, dependency pointer 1408 is data to be input to an API, if said API is to cause invocation 1402 to be performed.

In at least one embodiment, invocation 1402 receives, as input, parameters 1404, 1406, 1408, 1410, 1412, 1414, 1416 comprising edge information 1410. In at least one embodiment, edge information 1410 is data comprising information corresponding to one or more dependencies of graph 1406. In at least one embodiment, edge information 1410 includes information indicating one or more dependencies between a node associated with node pointer 1404 and one or more nodes of graph 1406. In at least one embodiment, edge information 1410 includes an indication of one or more of a source port, a destination port, and/or a dependency type, as described above in conjunction with FIG. 1, FIG. 3, FIG. 4, and/or FIG. 5. In at least one embodiment, edge information 1410 may be represented as an array, in which each element corresponds to an element of a parallel array associated with dependency pointer 1408. In at least one embodiment, edge information 1410 is data to be input to a function call, if said function call is to perform invocation 1402. In at least one embodiment, edge information 1410 is data to be input to an API, if said API is to cause invocation 1402 to be performed.

In at least one embodiment, invocation 1402 receives, as input, parameters 1404, 1406, 1408, 1410, 1412, 1414, 1416 comprising a number of dependencies 1412. In at least one embodiment, number of dependencies 1412 is data indicating a number, or quantity, of dependencies associated with a node of graph 1406 associated with node pointer 1404. In at least one embodiment, number of dependencies 1412 is data to be input to a function call, if said function call is to perform invocation 1402. In at least one embodiment, number of dependencies 1412 is data to be input to an API, if said API is to cause invocation 1402 to be performed.

In at least one embodiment, invocation 1402 receives, as input, parameters 1404, 1406, 1408, 1410, 1412, 1414, 1416 comprising one or more memory parameters 1414. In at least one embodiment, memory parameters 1414 is data associated with one or more memory allocation operations corresponding to a node of graph 1406 associated with node pointer 1404. In at least one embodiment, memory parameters 1414 include an indication of a number of memory access descriptors. In at least one embodiment, memory parameters 1414 include an indication of a size of a portion of requested memory to allocate. In at least one embodiment, memory parameters 1414 include an indication of a one or more memory addresses corresponding to one or more portions of memory being allocated. In at least one embodiment, memory parameters 1414 is data to be input to a function call, if said function call is to perform invocation 1402. In at least one embodiment, memory parameters 1414 is data to be input to an API, if said API is to cause invocation 1402 to be performed.

In at least one embodiment, invocation 1402 receives, as input, parameters 1404, 1406, 1408, 1410, 1412, 1414, 1416 comprising other parameter(s) 1416. In at least one embodiment, other parameter(s) 1416 are data comprising any other information usable by operation 1400. In at least one embodiment, other parameter(s) 1416 are data to be input to a function call, if said function call is to perform invocation 1402. In at least one embodiment, other parameter(s) 1416 are data to be input to an API, if said API is to cause invocation 1402 to be performed.

In at least one embodiment, an example instruction indicating operation 1400 in a parallel computing environment, such as compute uniform device architecture (CUDA), is as follows:

cudaGraphAddMemAllocNode (pGraphNode, graph, pDependencies, pDependencyData, numDependencies, nodeParams) where pGraphNode corresponds to node pointer 1404, graph corresponds to graph 1406, pDependencies corresponds to dependency pointer 1408, pDependencyData corresponds to edge information 1410, and numDependencies corresponds to number of dependencies 1412, and nodeParams corresponds to memory parameters 1414.

In at least one embodiment, response 1420 generates, as output, parameters 1422, 1424 comprising a status 1422. In at least one embodiment, status 1422 is data comprising any other information presented by operation 1400. In at least one embodiment, status 1422 is data to be output in response to a function call, if said function call is to perform invocation 1402. In at least one embodiment, status 1422 is data to be output by an API, if said API is to cause invocation 1402 to be performed. In at least one embodiment, status 1422 indicates that operation 1400 was performed successfully. In at least one embodiment, status 1422 indicates that operation 1400 was not performed successfully, or otherwise failed.

In at least one embodiment, response 1420 generates, as output, parameters 1422, 1424 comprising node 1424. In at least one embodiment, node 1424 is data to one or more nodes generated by operation 1400, using information associated with invocation 1402, such as parameters 1404, 1406, 1408, 1410, 1412, 1414, 1416. In at least one embodiment, node 1424 will be output by response 1420 to an address corresponding to node pointer 1404, such that node 1424 will be generated by storing data to an address indicated by node pointer 1404. In at least one embodiment, node 1424 is data to be output in response to a function call, if said function call is to perform invocation 1402. In at least one embodiment, node 1424 is data to be output by an API, if said API is to cause invocation 1402 to be performed. In at least one embodiment, node 1424 is provided to data structure, memory, and/or variable indicated by node pointer 1404. In at least one embodiment, node 1424 is presented in response to performance of one or more API and/or function calls.

Figure 15:
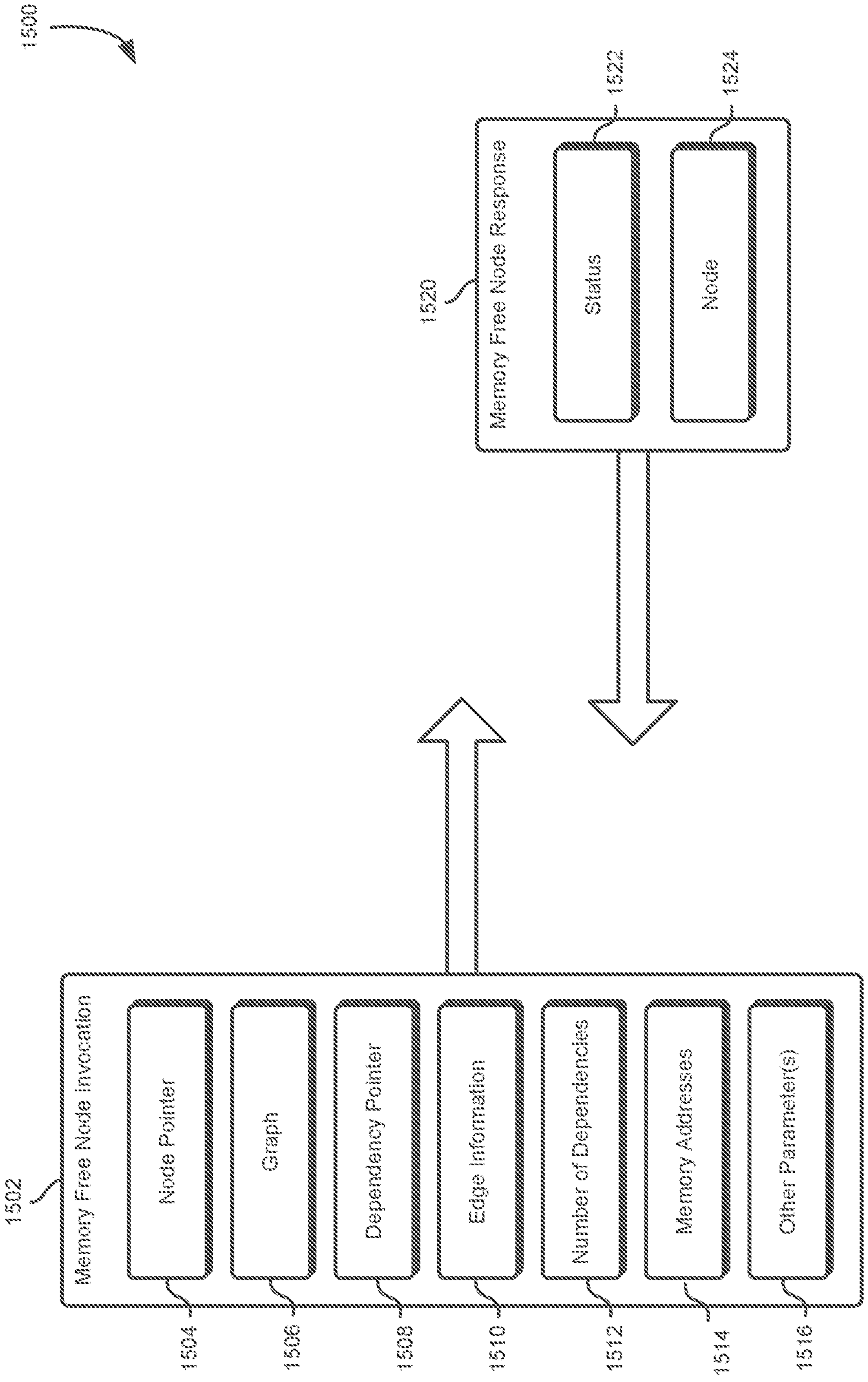
FIG. 15 is a block diagram illustrating a memory allocation operation, in accordance with at least one embodiment.

FIG. 15 is a block diagram illustrating a memory free operation 1500 ("operation 1500"), in accordance with at least one embodiment. In at least one embodiment, operation 1500 is one or more computational operations that, if performed, cause a node to be generated and/or added to a graph, as described above in conjunction with FIG. 1. In at least one embodiment, operation 1500 is to cause a memory deallocation node to be added to a software graph based, at least in part, on a dependency type. In at least one embodiment, operation 1500 is to cause a memory free node to be generated and/or added to a graph. In at least one embodiment, a memory free node, when executed, causes one or more portions of memory to be freed, or otherwise released. In at least one embodiment, allocated memory may be freed or otherwise release by one or more operations of a graph. In at least one embodiment, operation 1500 is a set of instructions that, if performed, cause one or more processors to cause one or more APIs to be performed.

In at least one embodiment, memory free node invocation 1502 ("invocation 1502") is a function call to be performed by one or more software programs, such as kernels to be performed by one or more parallel processing units (PPUs), such as graphics processing units (GPUs). In at least one embodiment, invocation 1502 is an invocation of an instruction to cause one or more processors to perform one or more computational operations 1522, 1524 of memory free node response 1520 ("response 1520"). In at least one embodiment, invocation 1502 is an invocation of an API to cause one or more processors to perform one or more computational operations 1522, 1524 of response 1520.

In at least one embodiment, invocation 1502 receives, when invoked, one or more parameters 1504, 1506, 1508, 1510, 1512, 1514, 1516, to indicate information about computational operations to be performed. In at least one embodiment, invocation 1502 receives, when invoked, one or more parameters 1504, 1506, 1508, 1510, 1512, 1514, 1516 to indicate information about instructions to be performed.

In at least one embodiment, invocation 1502 receives, as input, parameters 1504, 1506, 1508, 1510, 1512, 1514, 1516 comprising a node pointer 1504. In at least one embodiment, node pointer 1504 is data comprising information indicating one or more nodes to be created by operation 1500. In at least one embodiment, node pointer 1504 is a pointer to an address corresponding to one or more nodes to be created by operation 1500. In at least one embodiment, node pointer 1504 is data to be input to a function call, if said function call is to perform invocation 1502. In at least one embodiment, node pointer 1504 is data to be input to an API, if said API is to cause invocation 1502 to be performed.

In at least one embodiment, invocation 1502 receives, as input, parameters 1504, 1506, 1508, 1510, 1512, 1514, 1516 comprising a graph 1506. In at least one embodiment, graph 1506 is data comprising information indicating one or more attributes of a graph, such as nodes, edges, dependencies, and/or any other suitable attribute. In at least one embodiment, graph 1506 is associated with an instantiated graph that is evaluated to be generated and/or executed, as described above in conjunction with FIG. 1, and/or FIG. 2. In at least one embodiment, graph 1506 is data to be input to a function call, if said function call is to perform invocation 1502. In at least one embodiment, graph 1506 is data to be input to an API, if said API is to cause invocation 1502 to be performed.

In at least one embodiment, invocation 1502 receives, as input, parameters 1504, 1506, 1508, 1510, 1512, 1514, 1516 comprising a dependency pointer 1508. In at least one embodiment, dependency pointer 1508 is data comprising information indicating one or more dependencies between two or more nodes of a graph. In at least one embodiment, dependency pointer 1508 includes information corresponding to one or more dependencies between a node indicated by node pointer 1504 and one or more other nodes of graph 1506. In at least one embodiment, dependency pointer 1508 is data to be input to a function call, if said function call is to perform invocation 1502. In at least one embodiment, dependency pointer 1508 is data to be input to an API, if said API is to cause invocation 1502 to be performed.

In at least one embodiment, invocation 1502 receives, as input, parameters 1504, 1506, 1508, 1510, 1512, 1514, 1516 comprising edge information 1510. In at least one embodiment, edge information 1510 is data comprising information corresponding to one or more dependencies of graph 1506. In at least one embodiment, edge information 1510 includes information indicating one or more dependencies between a node associated with node pointer 1504 and one or more nodes of graph 1506. In at least one embodiment, edge information 1510 includes an indication of one or more of a source port, a destination port, and/or a dependency type, as described above in conjunction with FIG. 1, FIG. 3, FIG. 4, and/or FIG. 5. In at least one embodiment, edge information 1510 may be represented as an array, in which each element corresponds to an element of a parallel array associated with dependency pointer 1508. In at least one embodiment, edge information 1510 is data to be input to a function call, if said function call is to perform invocation 1502. In at least one embodiment, edge information 1510 is data to be input to an API, if said API is to cause invocation 1502 to be performed.

In at least one embodiment, invocation 1502 receives, as input, parameters 1504, 1506, 1508, 1510, 1512, 1514, 1516 comprising a number of dependencies 1512. In at least one embodiment, number of dependencies 1512 is data indicating a number, or quantity, of dependencies associated with a node of graph 1506 associated with node pointer 1504. In at least one embodiment, number of dependencies 1512 is data to be input to a function call, if said function call is to perform invocation 1502. In at least one embodiment, number of dependencies 1512 is data to be input to an API, if said API is to cause invocation 1502 to be performed.

In at least one embodiment, invocation 1502 receives, as input, parameters 1504, 1506, 1508, 1510, 1512, 1514, 1516 comprising one or more memory addresses 1514. In at least one embodiment, memory addresses 1514 is data associated with one or more memory free operations corresponding to a node of graph 1506 associated with node pointer 1504. In at least one embodiment, memory parameters 1514 include an indication of one or more memory addresses corresponding to one or more portions of memory to be freed. In at least one embodiment, memory parameters 1514 is data to be input to a function call, if said function call is to perform invocation 1502. In at least one embodiment, memory parameters 1514 is data to be input to an API, if said API is to cause invocation 1502 to be performed.

In at least one embodiment, invocation 1502 receives, as input, parameters 1504, 1506, 1508, 1510, 1512, 1514, 1516 comprising other parameter(s) 1516. In at least one embodiment, other parameter(s) 1516 are data comprising any other information usable by operation 1500. In at least one embodiment, other parameter(s) 1516 are data to be input to a function call, if said function call is to perform invocation 1502. In at least one embodiment, other parameter(s) 1516 are data to be input to an API, if said API is to cause invocation 1502 to be performed.

In at least one embodiment, an example instruction indicating operation 1500 in a parallel computing environment, such as compute uniform device architecture (CUDA), is as follows:

cudaGraphAddMemFreeNode (pGraphNode, graph, pDependencies, pDependencyData, numDependencies, address)

where pGraphNode corresponds to node pointer 1504, graph corresponds to graph 1506, pDependencies corresponds to dependency pointer 1508, pDependencyData corresponds to edge information 1510, and numDependencies corresponds to number of dependencies 1512, and address corresponds to memory addresses 1514.

In at least one embodiment, response 1520 generates, as output, parameters 1522, 1524 comprising a status 1522. In at least one embodiment, status 1522 is data comprising any other information presented by operation 1500. In at least one embodiment, status 1522 is data to be output in response to a function call, if said function call is to perform invocation 1502. In at least one embodiment, status 1522 is data to be output by an API, if said API is to cause invocation 1502 to be performed. In at least one embodiment, status 1522 indicates that operation 1500 was performed successfully. In at least one embodiment, status 1522 indicates that operation 1500 was not performed successfully, or otherwise failed.

In at least one embodiment, response 1520 generates, as output, parameters 1522, 1524 comprising node 1524. In at least one embodiment, node 1524 is data to one or more nodes generated by operation 1500, using information associated with invocation 1502, such as parameters 1504, 1506, 1508, 1510, 1512, 1514, 1516. In at least one embodiment, node 1524 will be output by response 1520 to an address corresponding to node pointer 1504, such that node 1524 will be generated by storing data to an address indicated by node pointer 1504. In at least one embodiment, node 1524 is data to be output in response to a function call, if said function call is to perform invocation 1502. In at least one embodiment, node 1524 is data to be output by an API, if said API is to cause invocation 1502 to be performed. In at least one embodiment, node 1524 is provided to data structure, memory, and/or variable indicated by node pointer 1504. In at least one embodiment, node 1524 is presented in response to performance of one or more API and/or function calls.

Figure 16:
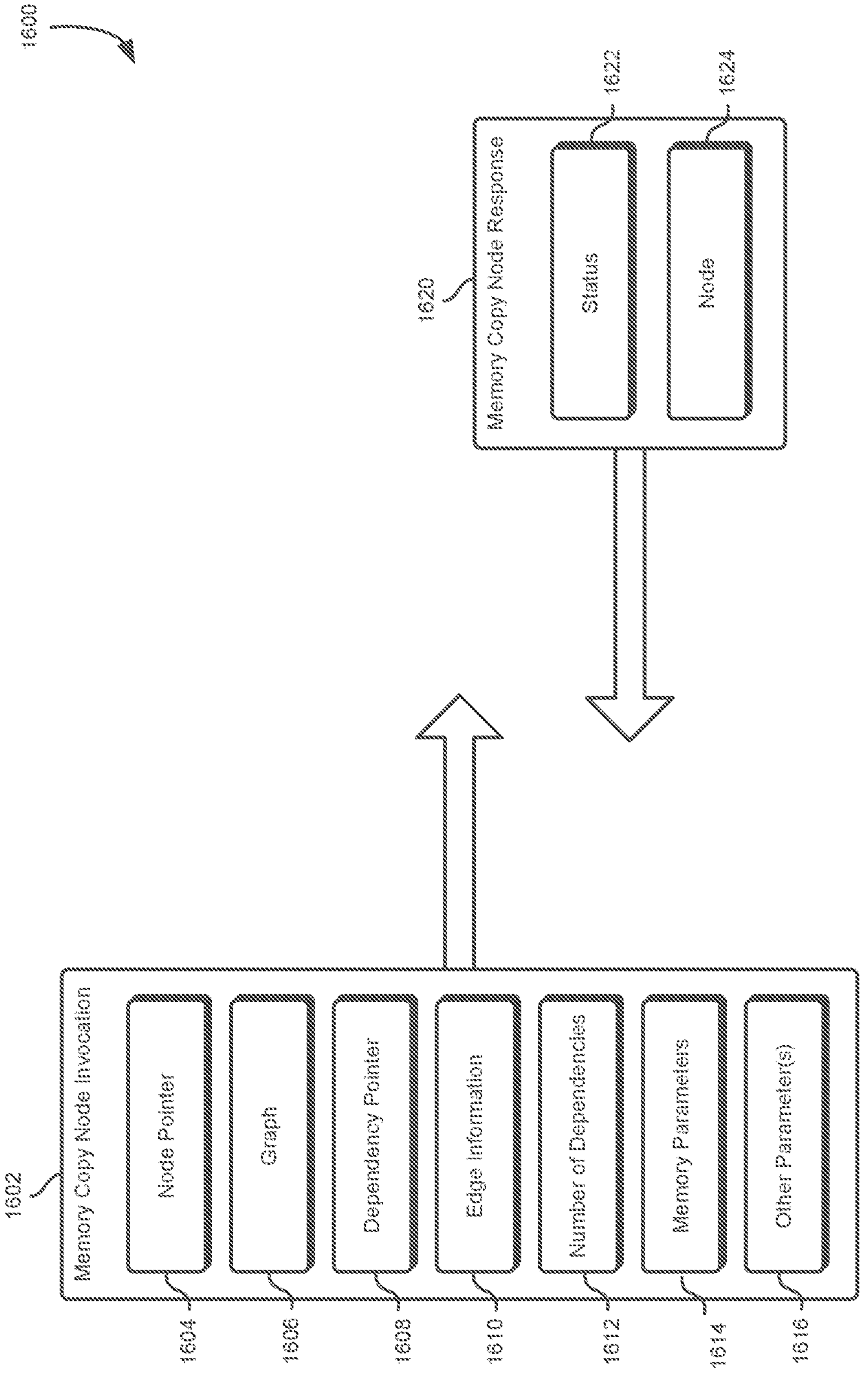
FIG. 16 is a block diagram illustrating a memory copy operation, in accordance with at least one embodiment.

FIG. 16 is a block diagram illustrating a memory copy operation 1600 ("operation 1600"), in accordance with at least one embodiment. In at least one embodiment, operation 1600 is one or more computational operations that, if performed, cause a node to be generated and/or added to a graph, as described above in conjunction with FIG. 1. In at least one embodiment, operation 1600 is to cause a memory copy node to be added to a software graph based, at least in part, on a dependency type. In at least one embodiment, operation 1600 is to cause a memory copy node to be generated and/or added to a graph. In at least one embodiment, a memory copy node, when executed, causes one or more portions of memory to be duplicated, at least in part, to one or more other portions of memory. In at least one embodiment, operation 1600 is a set of instructions that, if performed, cause one or more processors to cause one or more APIs to be performed.

In at least one embodiment, memory copy node invocation 1602 ("invocation 1602") is a function call to be performed by one or more software programs, such as kernels to be performed by one or more parallel processing units (PPUs), such as graphics processing units (GPUs). In at least one embodiment, invocation 1602 is an invocation of an instruction to cause one or more processors to perform one or more computational operations 1622, 1624 of memory copy node response 1620 ("response 1620"). In at least one embodiment, invocation 1602 is an invocation of an API to cause one or more processors to perform one or more computational operations 1622, 1624 of response 1620.

In at least one embodiment, invocation 1602 receives, when invoked, one or more parameters 1604, 1606, 1608, 1610, 1612, 1614, 1616, to indicate information about computational operations to be performed. In at least one embodiment, invocation 1602 receives, when invoked, one or more parameters 1604, 1606, 1608, 1610, 1612, 1614, 1616 to indicate information about instructions to be performed.

In at least one embodiment, invocation 1602 receives, as input, parameters 1604, 1606, 1608, 1610, 1612, 1614, 1616 comprising a node pointer 1604. In at least one embodiment, node pointer 1604 is data comprising information indicating one or more nodes to be created by operation 1600. In at least one embodiment, node pointer 1604 is a pointer to an address corresponding to one or more nodes to be created by operation 1600. In at least one embodiment, node pointer 1604 is data to be input to a function call, if said function call is to perform invocation 1602. In at least one embodiment, node pointer 1604 is data to be input to an API, if said API is to cause invocation 1602 to be performed.

In at least one embodiment, invocation 1602 receives, as input, parameters 1604, 1606, 1608, 1610, 1612, 1614, 1616 comprising a graph 1606. In at least one embodiment, graph 1606 is data comprising information indicating one or more attributes of a graph, such as nodes, edges, dependencies, and/or any other suitable attribute. In at least one embodiment, graph 1606 is associated with an instantiated graph that is evaluated to be generated and/or executed, as described above in conjunction with FIG. 1, and/or FIG. 2. In at least one embodiment, graph 1606 is data to be input to a function call, if said function call is to perform invocation 1602. In at least one embodiment, graph 1606 is data to be input to an API, if said API is to cause invocation 1602 to be performed.

In at least one embodiment, invocation 1602 receives, as input, parameters 1604, 1606, 1608, 1610, 1612, 1614, 1616 comprising a dependency pointer 1608. In at least one embodiment, dependency pointer 1608 is data comprising information indicating one or more dependencies between two or more nodes of a graph. In at least one embodiment, dependency pointer 1608 includes information corresponding to one or more dependencies between a node indicated by node pointer 1604 and one or more other nodes of graph 1606. In at least one embodiment, dependency pointer 1608 is data to be input to a function call, if said function call is to perform invocation 1602. In at least one embodiment, dependency pointer 1608 is data to be input to an API, if said API is to cause invocation 1602 to be performed.

In at least one embodiment, invocation 1602 receives, as input, parameters 1604, 1606, 1608, 1610, 1612, 1614, 1616 comprising edge information 1610. In at least one embodiment, edge information 1610 is data comprising information corresponding to one or more dependencies of graph 1606. In at least one embodiment, edge information 1610 includes information indicating one or more dependencies between a node associated with node pointer 1604 and one or more nodes of graph 1606. In at least one embodiment, edge information 1610 includes an indication of one or more of a source port, a destination port, and/or a dependency type, as described above in conjunction with FIG. 1, FIG. 3, FIG. 4, and/or FIG. 5. In at least one embodiment, edge information 1610 may be represented as an array, in which each element corresponds to an element of a parallel array associated with dependency pointer 1608. In at least one embodiment, edge information 1610 is data to be input to a function call, if said function call is to perform invocation 1602. In at least one embodiment, edge information 1610 is data to be input to an API, if said API is to cause invocation 1602 to be performed.

In at least one embodiment, invocation 1602 receives, as input, parameters 1604, 1606, 1608, 1610, 1612, 1614, 1616 comprising a number of dependencies 1612. In at least one embodiment, number of dependencies 1612 is data indicating a number, or quantity, of dependencies associated with a node of graph 1606 associated with node pointer 1604. In at least one embodiment, number of dependencies 1612 is data to be input to a function call, if said function call is to perform invocation 1602. In at least one embodiment, number of dependencies 1612 is data to be input to an API, if said API is to cause invocation 1602 to be performed.

In at least one embodiment, invocation 1602 receives, as input, parameters 1604, 1606, 1608, 1610, 1612, 1614, 1616 comprising one or more memory parameters 1614. In at least one embodiment, memory parameters 1614 is data associated with one or more memory allocation operations corresponding to a node of graph 1606 associated with node pointer 1604. In at least one embodiment, memory parameters 1614 include an indication of a destination memory address that a portion of memory is to be copied to. In at least one embodiment, memory parameters 1614 include an indication of a destination memory address offset that is used to offset an address that a portion of memory is to be copied to. In at least one embodiment, memory parameters 1614 include an indication of a pitched destination memory address that a portion of memory is to be copied to. In at least one embodiment, memory parameters 1614 include an indication of a memory copy size indicating a size of memory to be copied. In at least one embodiment, memory parameters 1614 include an indication of a type of transfer used to copy data from one portion of memory to another. In at least one embodiment, memory parameters 1614 include an indication of a source memory address that content of a portion of memory is to be copied from. In at least one embodiment, memory parameters 1614 include an indication of a source memory address offset that is used to offset an address that a portion of memory is to be copied from. In at least one embodiment, memory parameters 1614 include an indication of a pitched source memory address that a portion of memory is to be copied from. In at least one embodiment, memory parameters 1614 is data to be input to a function call, if said function call is to perform invocation 1602. In at least one embodiment, memory parameters 1614 is data to be input to an API, if said API is to cause invocation 1602 to be performed.

In at least one embodiment, invocation 1602 receives, as input, parameters 1604, 1606, 1608, 1610, 1612, 1614, 1616 comprising other parameter(s) 1616. In at least one embodiment, other parameter(s) 1616 are data comprising any other information usable by operation 1600. In at least one embodiment, other parameter(s) 1616 are data to be input to a function call, if said function call is to perform invocation 1602. In at least one embodiment, other parameter(s) 1616 are data to be input to an API, if said API is to cause invocation 1602 to be performed.

In at least one embodiment, an example instruction indicating operation 1600 in a parallel computing environment, such as compute uniform device architecture (CUDA), is as follows:

cudaGraphAddMemcpyNode (pGraphNode, graph, pDependencies, pDependencyData, numDependencies, pCopyParams) where pGraphNode corresponds to node pointer 1604, graph corresponds to graph 1606, pDependencies corresponds to dependency pointer 1608, pDependencyData corresponds to edge information 1610, and numDependencies corresponds to number of dependencies 1612, and pCopyParams corresponds to memory parameters 1614.

In at least one embodiment, response 1620 generates, as output, parameters 1622, 1624 comprising a status 1622. In at least one embodiment, status 1622 is data comprising any other information presented by operation 1600. In at least one embodiment, status 1622 is data to be output in response to a function call, if said function call is to perform invocation 1602. In at least one embodiment, status 1622 is data to be output by an API, if said API is to cause invocation 1602 to be performed. In at least one embodiment, status 1622 indicates that operation 1600 was performed successfully. In at least one embodiment, status 1622 indicates that operation 1600 was not performed successfully, or otherwise failed.

In at least one embodiment, response 1620 generates, as output, parameters 1622, 1624 comprising node 1624. In at least one embodiment, node 1624 is data to one or more nodes generated by operation 1600, using information associated with invocation 1602, such as parameters 1604, 1606, 1608, 1610, 1612, 1614, 1616. In at least one embodiment, node 1624 will be output by response 1620 to an address corresponding to node pointer 1604, such that node 1624 will be generated by storing data to an address indicated by node pointer 1604. In at least one embodiment, node 1624 is data to be output in response to a function call, if said function call is to perform invocation 1602. In at least one embodiment, node 1624 is data to be output by an API, if said API is to cause invocation 1602 to be performed. In at least one embodiment, node 1624 is provided to data structure, memory, and/or variable indicated by node pointer 1604. In at least one embodiment, node 1624 is presented in response to performance of one or more API and/or function calls.

Figure 17:
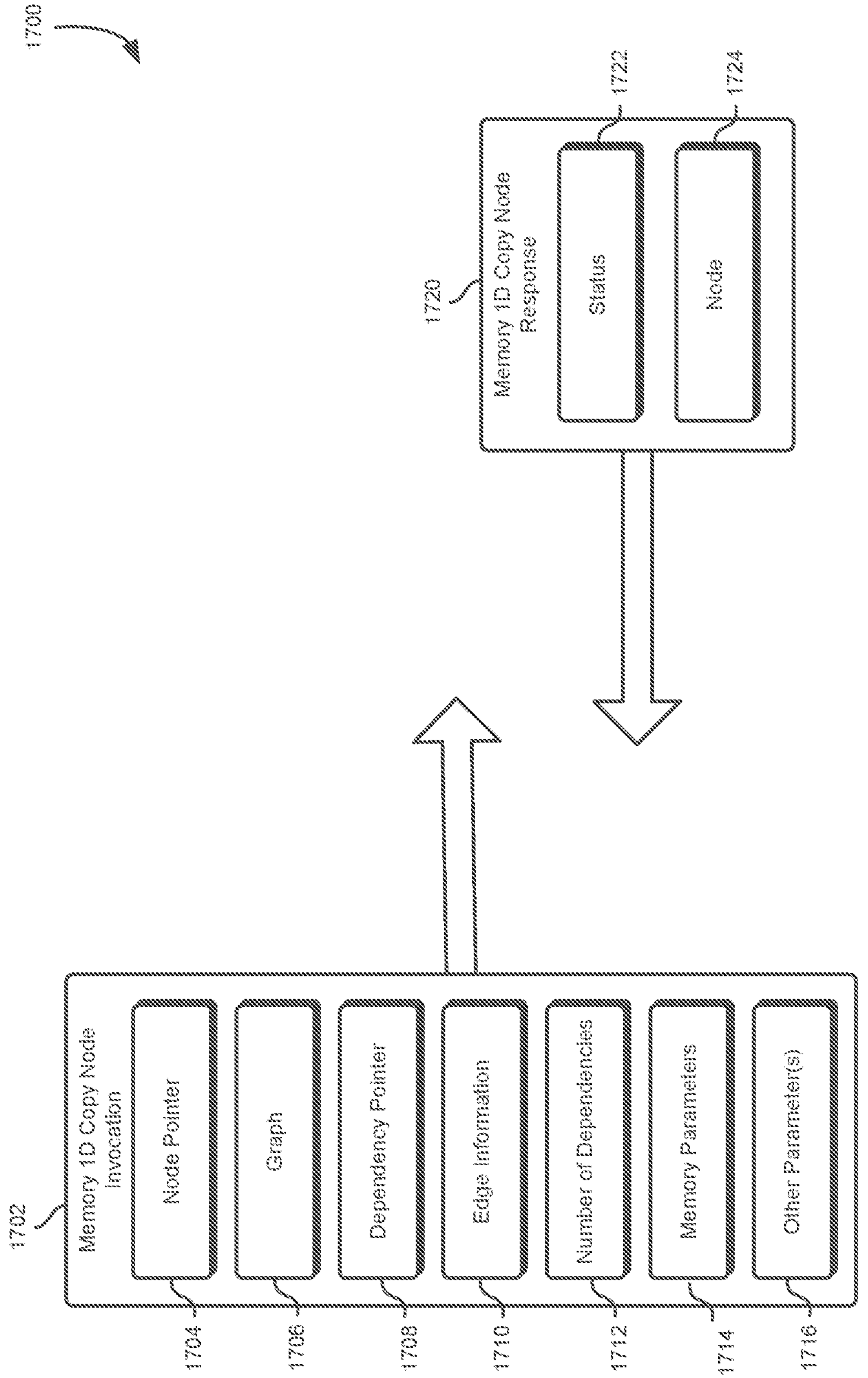
FIG. 17 is a block diagram illustrating a one dimensional ("1D") memory copy operation, in accordance with at least one embodiment.

FIG. 17 is a block diagram illustrating a one dimensional ("1D") memory copy operation 1700 ("operation 1700"), in accordance with at least one embodiment. In at least one embodiment, operation 1700 is one or more computational operations that, if performed, cause a node to be generated and/or added to a graph, as described above in conjunction with FIG. 1. In at least one embodiment, operation 1700 is to cause an array storage node to be added to a software graph based, at least in part, on a dependency type. In at least one embodiment, operation 1700 is to cause a one dimensional memory copy node to be generated and/or added to a graph. In at least one embodiment, a one dimensional memory copy node, when executed, causes one or more portions of memory to be copied. In at least one embodiment, allocated memory may be freed or otherwise release by one or more operations of a graph. In at least one embodiment, operation 1700 is a set of instructions that, if performed, cause one or more processors to cause one or more APIs to be performed.

In at least one embodiment, memory 1D copy node invocation 1702 ("invocation 1702") is a function call to be performed by one or more software programs, such as kernels to be performed by one or more parallel processing units (PPUs), such as graphics processing units (GPUs). In at least one embodiment, invocation 1702 is an invocation of an instruction to cause one or more processors to perform one or more computational operations 1722, 1724 of memory 1D copy node response 1720 ("response 1720"). In at least one embodiment, invocation 1702 is an invocation of an API to cause one or more processors to perform one or more computational operations 1722, 1724 of response 1720.

In at least one embodiment, invocation 1702 receives, when invoked, one or more parameters 1704, 1706, 1708, 1710, 1712, 1714, 1716, to indicate information about computational operations to be performed. In at least one embodiment, invocation 1702 receives, when invoked, one or more parameters 1704, 1706, 1708, 1710, 1712, 1714, 1716 to indicate information about instructions to be performed.

In at least one embodiment, invocation 1702 receives, as input, parameters 1704, 1706, 1708, 1710, 1712, 1714, 1716 comprising a node pointer 1704. In at least one embodiment, node pointer 1704 is data comprising information indicating one or more nodes to be created by operation 1700. In at least one embodiment, node pointer 1704 is a pointer to an address corresponding to one or more nodes to be created by operation 1700. In at least one embodiment, node pointer 1704 is data to be input to a function call, if said function call is to perform invocation 1702. In at least one embodiment, node pointer 1704 is data to be input to an API, if said API is to cause invocation 1702 to be performed.

In at least one embodiment, invocation 1702 receives, as input, parameters 1704, 1706, 1708, 1710, 1712, 1714, 1716 comprising a graph 1706. In at least one embodiment, graph 1706 is data comprising information indicating one or more attributes of a graph, such as nodes, edges, dependencies, and/or any other suitable attribute. In at least one embodiment, graph 1706 is associated with an instantiated graph that is evaluated to be generated and/or executed, as described above in conjunction with FIG. 1, and/or FIG. 2. In at least one embodiment, graph 1706 is data to be input to a function call, if said function call is to perform invocation 1702. In at least one embodiment, graph 1706 is data to be input to an API, if said API is to cause invocation 1702 to be performed.

In at least one embodiment, invocation 1702 receives, as input, parameters 1704, 1706, 1708, 1710, 1712, 1714, 1716 comprising a dependency pointer 1708. In at least one embodiment, dependency pointer 1708 is data comprising information indicating one or more dependencies between two or more nodes of a graph. In at least one embodiment, dependency pointer 1708 includes information corresponding to one or more dependencies between a node indicated by node pointer 1704 and one or more other nodes of graph 1706. In at least one embodiment, dependency pointer 1708 is data to be input to a function call, if said function call is to perform invocation 1702. In at least one embodiment, dependency pointer 1708 is data to be input to an API, if said API is to cause invocation 1702 to be performed.

In at least one embodiment, invocation 1702 receives, as input, parameters 1704, 1706, 1708, 1710, 1712, 1714, 1716 comprising edge information 1710. In at least one embodiment, edge information 1710 is data comprising information corresponding to one or more dependencies of graph 1706. In at least one embodiment, edge information 1710 includes information indicating one or more dependencies between a node associated with node pointer 1704 and one or more nodes of graph 1706. In at least one embodiment, edge information 1710 includes an indication of one or more of a source port, a destination port, and/or a dependency type, as described above in conjunction with FIG. 1, FIG. 3, FIG. 4, and/or FIG. 5. In at least one embodiment, edge information 1710 may be represented as an array, in which each element corresponds to an element of a parallel array associated with dependency pointer 1708. In at least one embodiment, edge information 1710 is data to be input to a function call, if said function call is to perform invocation 1702. In at least one embodiment, edge information 1710 is data to be input to an API, if said API is to cause invocation 1702 to be performed.

In at least one embodiment, invocation 1702 receives, as input, parameters 1704, 1706, 1708, 1710, 1712, 1714, 1716 comprising a number of dependencies 1712. In at least one embodiment, number of dependencies 1712 is data indicating a number, or quantity, of dependencies associated with a node of graph 1706 associated with node pointer 1704. In at least one embodiment, number of dependencies 1712 is data to be input to a function call, if said function call is to perform invocation 1702. In at least one embodiment, number of dependencies 1712 is data to be input to an API, if said API is to cause invocation 1702 to be performed.

In at least one embodiment, invocation 1702 receives, as input, parameters 1704, 1706, 1708, 1710, 1712, 1714, 1716 comprising one or more memory parameters 1714. In at least one embodiment, memory parameters 1714 is data associated with one or more memory 1D copy operations corresponding to a node of graph 1706 associated with node pointer 1704. In at least one embodiment, memory parameters 1714 include an indication of a destination memory address that a portion of memory is to be copied to. In at least one embodiment, memory parameters 1714 include an indication of a memory copy size indicating a size of memory to be copied. In at least one embodiment, memory parameters 1714 include an indication of a type of transfer used to copy data from one portion of memory to another. In at least one embodiment, memory parameters 1714 include an indication of a source memory address that content of a portion of memory is to be copied from. In at least one embodiment, memory parameters 1714 is data to be input to a function call, if said function call is to perform invocation 1702. In at least one embodiment, memory parameters 1714 is data to be input to an API, if said API is to cause invocation 1702 to be performed.

In at least one embodiment, invocation 1702 receives, as input, parameters 1704, 1706, 1708, 1710, 1712, 1714, 1716 comprising other parameter(s) 1716. In at least one embodiment, other parameter(s) 1716 are data comprising any other information usable by operation 1700. In at least one embodiment, other parameter(s) 1716 are data to be input to a function call, if said function call is to perform invocation 1702. In at least one embodiment, other parameter(s) 1716 are data to be input to an API, if said API is to cause invocation 1702 to be performed.

In at least one embodiment, an example instruction indicating operation 1700 in a parallel computing environment, such as compute uniform device architecture (CUDA), is as follows:

cudaGraphAddMemcpyNode1D (pGraphNode, graph, pDependencies, pDependencyData, numDependencies, nodeParams) where pGraphNode corresponds to node pointer 1704, graph corresponds to graph 1706, pDependencies corresponds to dependency pointer 1708, pDependencyData corresponds to edge information 1710, and numDependencies corresponds to number of dependencies 1712, and nodeParams corresponds to memory parameters 1714.

In at least one embodiment, response 1720 generates, as output, parameters 1722, 1724 comprising a status 1722. In at least one embodiment, status 1722 is data comprising any other information presented by operation 1700. In at least one embodiment, status 1722 is data to be output in response to a function call, if said function call is to perform invocation 1702. In at least one embodiment, status 1722 is data to be output by an API, if said API is to cause invocation 1702 to be performed. In at least one embodiment, status 1722 indicates that operation 1700 was performed successfully. In at least one embodiment, status 1722 indicates that operation 1700 was not performed successfully, or otherwise failed.

In at least one embodiment, response 1720 generates, as output, parameters 1722, 1724 comprising node 1724. In at least one embodiment, node 1724 is data to one or more nodes generated by operation 1700, using information associated with invocation 1702, such as parameters 1704, 1706, 1708, 1710, 1712, 1714, 1716. In at least one embodiment, node 1724 will be output by response 1720 to an address corresponding to node pointer 1704, such that node 1724 will be generated by storing data to an address indicated by node pointer 1704. In at least one embodiment, node 1724 is data to be output in response to a function call, if said function call is to perform invocation 1702. In at least one embodiment, node 1724 is data to be output by an API, if said API is to cause invocation 1702 to be performed. In at least one embodiment, node 1724 is provided to data structure, memory, and/or variable indicated by node pointer 1704. In at least one embodiment, node 1724 is presented in response to performance of one or more API and/or function calls.

Figure 18:
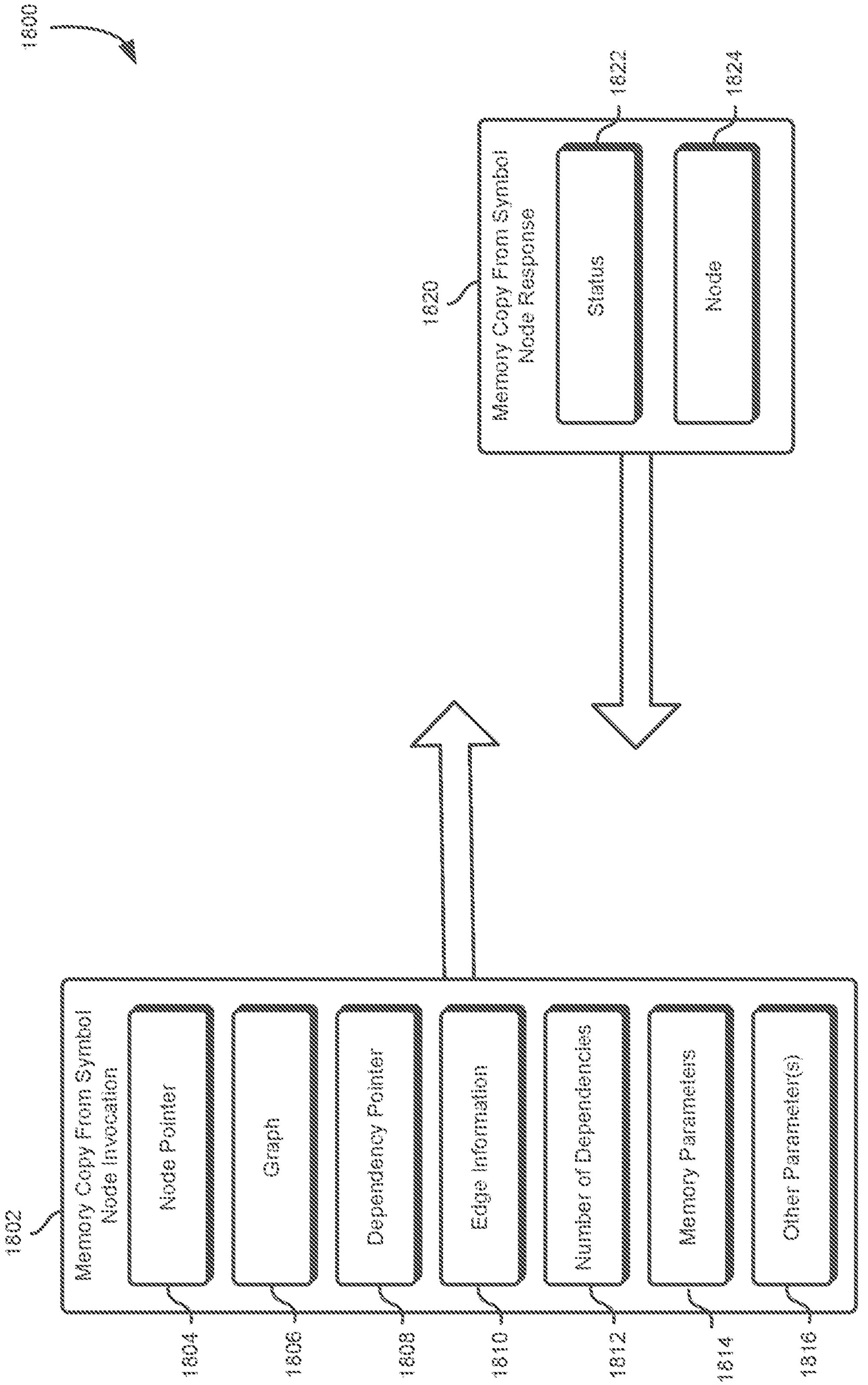
FIG. 18 is a block diagram illustrating a memory copy from symbol operation, in accordance with at least one embodiment.

FIG. 18 is a block diagram illustrating a memory copy from symbol operation 1800 ("operation 1800"), in accordance with at least one embodiment. In at least one embodiment, operation 1800 is one or more computational operations that, if performed, cause a node to be generated and/or added to a graph, as described above in conjunction with FIG. 1. In at least one embodiment, operation 1800 is to cause a symbol storage node to be added to a software graph based, at least in part, on a dependency type. In at least one embodiment, operation 1800 is to cause a memory copy from symbol node to be generated and/or added to a graph. In at least one embodiment, a memory copy from symbol node, when executed, causes one or more portions of memory to be copied in association to one or more symbols and/or variables. In at least one embodiment, operation 1800 is a set of instructions that, if performed, cause one or more processors to cause one or more APIs to be performed.

In at least one embodiment, memory copy from symbol node invocation 1802 ("invocation 1802") is a function call to be performed by one or more software programs, such as kernels to be performed by one or more parallel processing units (PPUs), such as graphics processing units (GPUs). In at least one embodiment, invocation 1802 is an invocation of an instruction to cause one or more processors to perform one or more computational operations 1822, 1824 of memory copy from symbol node response 1820 ("response 1820"). In at least one embodiment, invocation 1802 is an invocation of an API to cause one or more processors to perform one or more computational operations 1822, 1824 of response 1820.

In at least one embodiment, invocation 1802 receives, when invoked, one or more parameters 1804, 1806, 1808, 1810, 1812, 1814, 1816, to indicate information about computational operations to be performed. In at least one embodiment, invocation 1802 receives, when invoked, one or more parameters 1804, 1806, 1808, 1810, 1812, 1814, 1816 to indicate information about instructions to be performed.

In at least one embodiment, invocation 1802 receives, as input, parameters 1804, 1806, 1808, 1810, 1812, 1814, 1816 comprising a node pointer 1804. In at least one embodiment, node pointer 1804 is data comprising information indicating one or more nodes to be created by operation 1800. In at least one embodiment, node pointer 1804 is a pointer to an address corresponding to one or more nodes to be created by operation 1800. In at least one embodiment, node pointer 1804 is data to be input to a function call, if said function call is to perform invocation 1802. In at least one embodiment, node pointer 1804 is data to be input to an API, if said API is to cause invocation 1802 to be performed.

In at least one embodiment, invocation 1802 receives, as input, parameters 1804, 1806, 1808, 1810, 1812, 1814, 1816 comprising a graph 1806. In at least one embodiment, graph 1806 is data comprising information indicating one or more attributes of a graph, such as nodes, edges, dependencies, and/or any other suitable attribute. In at least one embodiment, graph 1806 is associated with an instantiated graph that is evaluated to be generated and/or executed, as described above in conjunction with FIG. 1, and/or FIG. 2. In at least one embodiment, graph 1806 is data to be input to a function call, if said function call is to perform invocation 1802. In at least one embodiment, graph 1806 is data to be input to an API, if said API is to cause invocation 1802 to be performed.

In at least one embodiment, invocation 1802 receives, as input, parameters 1804, 1806, 1808, 1810, 1812, 1814, 1816 comprising a dependency pointer 1808. In at least one embodiment, dependency pointer 1808 is data comprising information indicating one or more dependencies between two or more nodes of a graph. In at least one embodiment, dependency pointer 1808 includes information corresponding to one or more dependencies between a node indicated by node pointer 1804 and one or more other nodes of graph 1806. In at least one embodiment, dependency pointer 1808 is data to be input to a function call, if said function call is to perform invocation 1802. In at least one embodiment, dependency pointer 1808 is data to be input to an API, if said API is to cause invocation 1802 to be performed.

In at least one embodiment, invocation 1802 receives, as input, parameters 1804, 1806, 1808, 1810, 1812, 1814, 1816 comprising edge information 1810. In at least one embodiment, edge information 1810 is data comprising information corresponding to one or more dependencies of graph 1806. In at least one embodiment, edge information 1810 includes information indicating one or more dependencies between a node associated with node pointer 1804 and one or more nodes of graph 1806. In at least one embodiment, edge information 1810 includes an indication of one or more of a source port, a destination port, and/or a dependency type, as described above in conjunction with FIG. 1, FIG. 3, FIG. 4, and/or FIG. 5. In at least one embodiment, edge information 1810 may be represented as an array, in which each element corresponds to an element of a parallel array associated with dependency pointer 1808. In at least one embodiment, edge information 1810 is data to be input to a function call, if said function call is to perform invocation 1802. In at least one embodiment, edge information 1810 is data to be input to an API, if said API is to cause invocation 1802 to be performed.

In at least one embodiment, invocation 1802 receives, as input, parameters 1804, 1806, 1808, 1810, 1812, 1814, 1816 comprising a number of dependencies 1812. In at least one embodiment, number of dependencies 1812 is data indicating a number, or quantity, of dependencies associated with a node of graph 1806 associated with node pointer 1804. In at least one embodiment, number of dependencies 1812 is data to be input to a function call, if said function call is to perform invocation 1802. In at least one embodiment, number of dependencies 1812 is data to be input to an API, if said API is to cause invocation 1802 to be performed.

In at least one embodiment, invocation 1802 receives, as input, parameters 1804, 1806, 1808, 1810, 1812, 1814, 1816 comprising one or more memory parameters 1814. In at least one embodiment, memory parameters 1814 is data associated with one or more memory allocation operations corresponding to a node of graph 1806 associated with node pointer 1804. In at least one embodiment, memory parameters 1814 include an indication of a number of memory access descriptors. In at least one embodiment, memory parameters 1814 include an indication of a size of a portion of requested memory to allocate. In at least one embodiment, memory parameters 1814 include an indication of a symbol from which data is to be copied from corresponding one or more portions of memory. In at least one embodiment, memory parameters 1814 include an indication of a one or more memory addresses corresponding to one or more portions of memory being allocated. In at least one embodiment, memory parameters 1814 is data to be input to a function call, if said function call is to perform invocation 1802. In at least one embodiment, memory parameters 1814 is data to be input to an API, if said API is to cause invocation 1802 to be performed.

In at least one embodiment, invocation 1802 receives, as input, parameters 1804, 1806, 1808, 1810, 1812, 1814, 1816 comprising other parameter(s) 1816. In at least one embodiment, other parameter(s) 1816 are data comprising any other information usable by operation 1800. In at least one embodiment, other parameter(s) 1816 are data to be input to a function call, if said function call is to perform invocation 1802. In at least one embodiment, other parameter(s) 1816 are data to be input to an API, if said API is to cause invocation 1802 to be performed.

In at least one embodiment, an example instruction indicating operation 1800 in a parallel computing environment, such as compute uniform device architecture (CUDA), is as follows:

cudaGraphAddMemcpyNodeFromSymbol (pGraphNode, graph, pDependencies, pDependencyData, numDependencies, nodeParams) where pGraphNode corresponds to node pointer 1804, graph corresponds to graph 1806, pDependencies corresponds to dependency pointer 1808, pDependencyData corresponds to edge information 1810, and numDependencies corresponds to number of dependencies 1812, and nodeParams corresponds to memory parameters 1814.

In at least one embodiment, response 1820 generates, as output, parameters 1822, 1824 comprising a status 1822. In at least one embodiment, status 1822 is data comprising any other information presented by operation 1800. In at least one embodiment, status 1822 is data to be output in response to a function call, if said function call is to perform invocation 1802. In at least one embodiment, status 1822 is data to be output by an API, if said API is to cause invocation 1802 to be performed. In at least one embodiment, status 1822 indicates that operation 1800 was performed successfully. In at least one embodiment, status 1822 indicates that operation 1800 was not performed successfully, or otherwise failed.

In at least one embodiment, response 1820 generates, as output, parameters 1822, 1824 comprising node 1824. In at least one embodiment, node 1824 is data to one or more nodes generated by operation 1800, using information associated with invocation 1802, such as parameters 1804, 1806, 1808, 1810, 1812, 1814, 1816. In at least one embodiment, node 1824 will be output by response 1820 to an address corresponding to node pointer 1804, such that node 1824 will be generated by storing data to an address indicated by node pointer 1804. In at least one embodiment, node 1824 is data to be output in response to a function call, if said function call is to perform invocation 1802. In at least one embodiment, node 1824 is data to be output by an API, if said API is to cause invocation 1802 to be performed. In at least one embodiment, node 1824 is provided to data structure, memory, and/or variable indicated by node pointer 1804. In at least one embodiment, node 1824 is presented in response to performance of one or more API and/or function calls.

Figure 19:
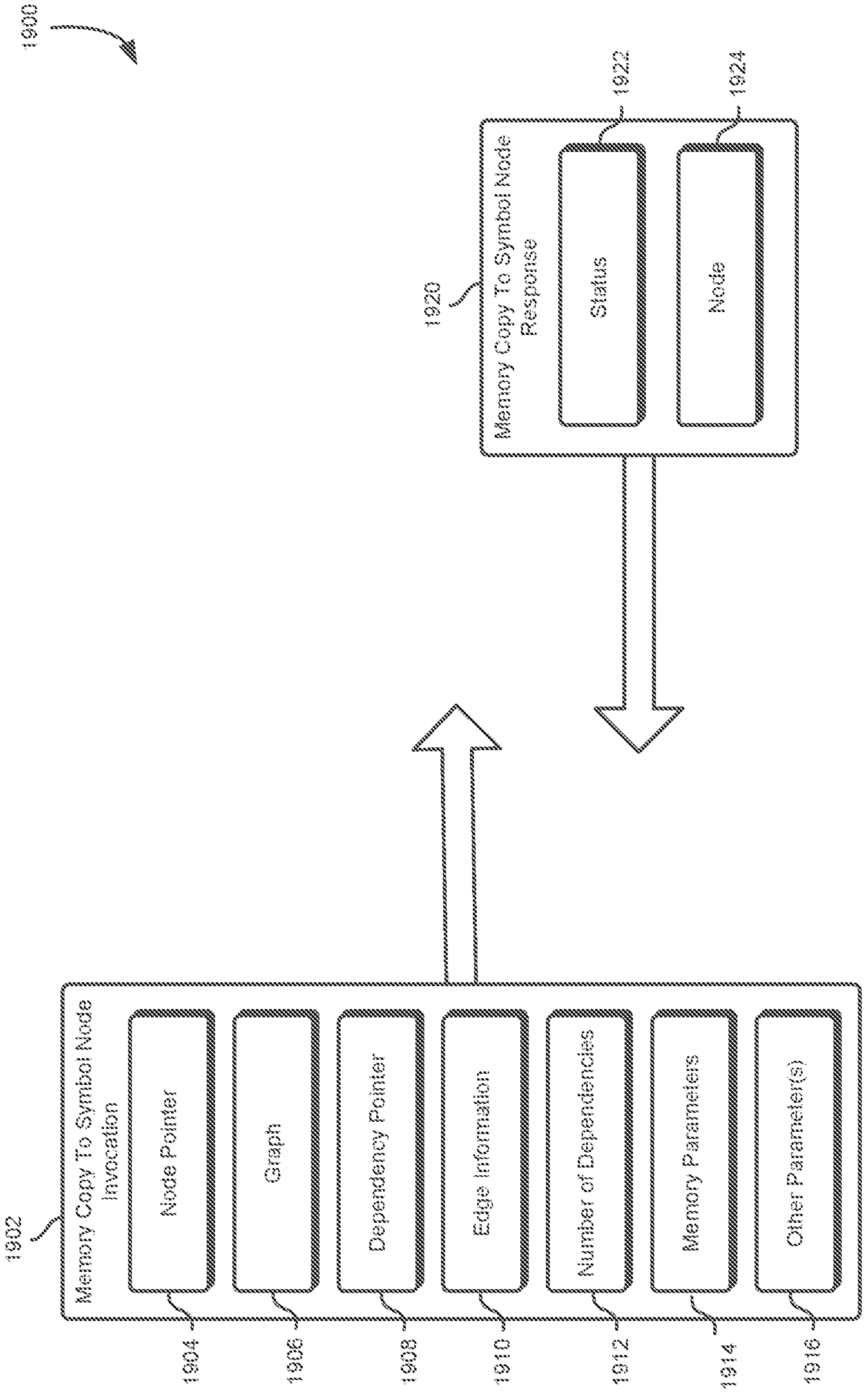
FIG. 19 is a block diagram illustrating a memory copy to symbol operation, in accordance with at least one embodiment.

FIG. 19 is a block diagram illustrating a memory copy to symbol operation 1900 ("operation 1900"), in accordance with at least one embodiment. In at least one embodiment, operation 1900 is one or more computational operations that, if performed, cause a node to be generated and/or added to a graph, as described above in conjunction with FIG. 1. In at least one embodiment, operation 1900 is to cause a symbol load node to be added to a software graph based, at least in part, on a dependency type. In at least one embodiment, operation 1900 is to cause a memory copy to symbol node to be generated and/or added to a graph. In at least one embodiment, a memory copy to symbol node, when executed, causes one or more portions of memory to be copied to one or more portions of memory associated with one or more symbols and/or variables. In at least one embodiment, operation 1900 is a set of instructions that, if performed, cause one or more processors to cause one or more APIs to be performed.

In at least one embodiment, memory copy to symbol node invocation 1902 ("invocation 1902") is a function call to be performed by one or more software programs, such as kernels to be performed by one or more parallel processing units (PPUs), such as graphics processing units (GPUs). In at least one embodiment, invocation 1902 is an invocation of an instruction to cause one or more processors to perform one or more computational operations 1922, 1924 of memory copy to symbol node response 1920 ("response 1920"). In at least one embodiment, invocation 1902 is an invocation of an API to cause one or more processors to perform one or more computational operations 1922, 1924 of response 1920.

In at least one embodiment, invocation 1902 receives, when invoked, one or more parameters 1904, 1906, 1908, 1910, 1912, 1914, 1916, to indicate information about computational operations to be performed. In at least one embodiment, invocation 1902 receives, when invoked, one or more parameters 1904, 1906, 1908, 1910, 1912, 1914, 1916 to indicate information about instructions to be performed.

In at least one embodiment, invocation 1902 receives, as input, parameters 1904, 1906, 1908, 1910, 1912, 1914, 1916 comprising a node pointer 1904. In at least one embodiment, node pointer 1904 is data comprising information indicating one or more nodes to be created by operation 1900. In at least one embodiment, node pointer 1904 is a pointer to an address corresponding to one or more nodes to be created by operation 1900. In at least one embodiment, node pointer 1904 is data to be input to a function call, if said function call is to perform invocation 1902. In at least one embodiment, node pointer 1904 is data to be input to an API, if said API is to cause invocation 1902 to be performed.

In at least one embodiment, invocation 1902 receives, as input, parameters 1904, 1906, 1908, 1910, 1912, 1914, 1916 comprising a graph 1906. In at least one embodiment, graph 1906 is data comprising information indicating one or more attributes of a graph, such as nodes, edges, dependencies, and/or any other suitable attribute. In at least one embodiment, graph 1906 is associated with an instantiated graph that is evaluated to be generated and/or executed, as described above in conjunction with FIG. 1, and/or FIG. 2. In at least one embodiment, graph 1906 is data to be input to a function call, if said function call is to perform invocation 1902. In at least one embodiment, graph 1906 is data to be input to an API, if said API is to cause invocation 1902 to be performed.

In at least one embodiment, invocation 1902 receives, as input, parameters 1904, 1906, 1908, 1910, 1912, 1914, 1916 comprising a dependency pointer 1908. In at least one embodiment, dependency pointer 1908 is data comprising information indicating one or more dependencies between two or more nodes of a graph. In at least one embodiment, dependency pointer 1908 includes information corresponding to one or more dependencies between a node indicated by node pointer 1904 and one or more other nodes of graph 1906. In at least one embodiment, dependency pointer 1908 is data to be input to a function call, if said function call is to perform invocation 1902. In at least one embodiment, dependency pointer 1908 is data to be input to an API, if said API is to cause invocation 1902 to be performed.

In at least one embodiment, invocation 1902 receives, as input, parameters 1904, 1906, 1908, 1910, 1912, 1914, 1916 comprising edge information 1910. In at least one embodiment, edge information 1910 is data comprising information corresponding to one or more dependencies of graph 1906. In at least one embodiment, edge information 1910 includes information indicating one or more dependencies between a node associated with node pointer 1904 and one or more nodes of graph 1906. In at least one embodiment, edge information 1910 includes an indication of one or more of a source port, a destination port, and/or a dependency type, as described above in conjunction with FIG. 1, FIG. 3, FIG. 4, and/or FIG. 5. In at least one embodiment, edge information 1910 may be represented as an array, in which each element corresponds to an element of a parallel array associated with dependency pointer 1908. In at least one embodiment, edge information 1910 is data to be input to a function call, if said function call is to perform invocation 1902. In at least one embodiment, edge information 1910 is data to be input to an API, if said API is to cause invocation 1902 to be performed.

In at least one embodiment, invocation 1902 receives, as input, parameters 1904, 1906, 1908, 1910, 1912, 1914, 1916 comprising a number of dependencies 1912. In at least one embodiment, number of dependencies 1912 is data indicating a number, or quantity, of dependencies associated with a node of graph 1906 associated with node pointer 1904. In at least one embodiment, number of dependencies 1912 is data to be input to a function call, if said function call is to perform invocation 1902. In at least one embodiment, number of dependencies 1912 is data to be input to an API, if said API is to cause invocation 1902 to be performed.

In at least one embodiment, invocation 1902 receives, as input, parameters 1904, 1906, 1908, 1910, 1912, 1914, 1916 comprising one or more memory parameters 1914. In at least one embodiment, memory parameters 1914 is data associated with one or more memory allocation operations corresponding to a node of graph 1906 associated with node pointer 1904. In at least one embodiment, memory parameters 1914 include an indication of a destination memory address. In at least one embodiment, memory parameters 1914 include an indication of a symbol corresponding to one or more portions of memory that data is to be copied to. In at least one embodiment, memory parameters 1914 include an indication of a size (e.g., in bytes) of memory to copy. In at least one embodiment, memory parameters 1914 include an indication of a memory address offset used to identify one or more portions of memory to copy data to.

In at least one embodiment, memory parameters 1914 include an indication of a size of a portion of requested memory to allocate. In at least one embodiment, memory parameters 1914 include an indication of a symbol from which data is to be copied from corresponding one or more portions of memory. In at least one embodiment, memory parameters 1914 include an indication of a one or more memory addresses corresponding to one or more portions of memory being allocated. In at least one embodiment, memory parameters 1914 include an indication of a type of transfer used to copy data from one portion of memory to another. In at least one embodiment, memory parameters 1914 is data to be input to a function call, if said function call is to perform invocation 1902. In at least one embodiment, memory parameters 1914 is data to be input to an API, if said API is to cause invocation 1902 to be performed.

In at least one embodiment, invocation 1902 receives, as input, parameters 1904, 1906, 1908, 1910, 1912, 1914, 1916 comprising other parameter(s) 1916. In at least one embodiment, other parameter(s) 1916 are data comprising any other information usable by operation 1900. In at least one embodiment, other parameter(s) 1916 are data to be input to a function call, if said function call is to perform invocation 1902. In at least one embodiment, other parameter(s) 1916 are data to be input to an API, if said API is to cause invocation 1902 to be performed.

In at least one embodiment, an example instruction indicating operation 1900 in a parallel computing environment, such as compute uniform device architecture (CUDA), is as follows:

cudaGraphAddMemcpyNodeToSymbol (pGraphNode, graph, pDependencies, pDependencyData, numDependencies, nodeParams) where pGraphNode corresponds to node pointer 1904, graph corresponds to graph 1906, pDependencies corresponds to dependency pointer 1908, pDependencyData corresponds to edge information 1910, and numDependencies corresponds to number of dependencies 1912, and nodeParams corresponds to memory parameters 1914.

In at least one embodiment, response 1920 generates, as output, parameters 1922, 1924 comprising a status 1922. In at least one embodiment, status 1922 is data comprising any other information presented by operation 1900. In at least one embodiment, status 1922 is data to be output in response to a function call, if said function call is to perform invocation 1902. In at least one embodiment, status 1922 is data to be output by an API, if said API is to cause invocation 1902 to be performed. In at least one embodiment, status 1922 indicates that operation 1900 was performed successfully. In at least one embodiment, status 1922 indicates that operation 1900 was not performed successfully, or otherwise failed.

In at least one embodiment, response 1920 generates, as output, parameters 1922, 1924 comprising node 1924. In at least one embodiment, node 1924 is data to one or more nodes generated by operation 1900, using information associated with invocation 1902, such as parameters 1904, 1906, 1908, 1910, 1912, 1914, 1916. In at least one embodiment, node 1924 will be output by response 1920 to an address corresponding to node pointer 1904, such that node 1924 will be generated by storing data to an address indicated by node pointer 1904. In at least one embodiment, node 1924 is data to be output in response to a function call, if said function call is to perform invocation 1902. In at least one embodiment, node 1924 is data to be output by an API, if said API is to cause invocation 1902 to be performed. In at least one embodiment, node 1924 is provided to data structure, memory, and/or variable indicated by node pointer 1904. In at least one embodiment, node 1924 is presented in response to performance of one or more API and/or function calls.

Figure 20:
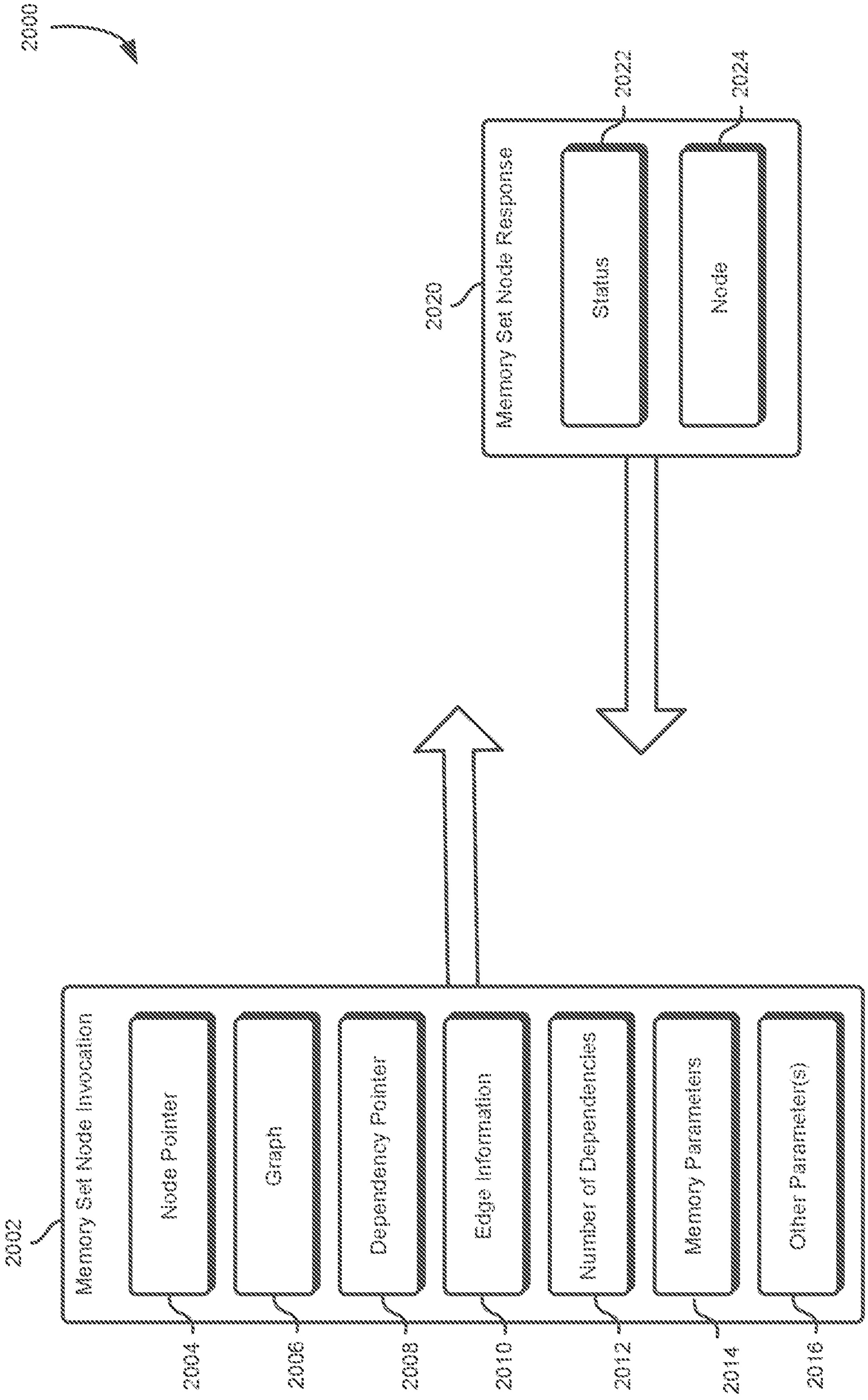
FIG. 20 is a block diagram illustrating a memory set operation, in accordance with at least one embodiment.

FIG. 20 is a block diagram illustrating a memory set operation 2000 ("operation 2000"), in accordance with at least one embodiment. In at least one embodiment, operation 2000 is one or more computational operations that, if performed, cause a node to be generated and/or added to a graph, as described above in conjunction with FIG. 1. In at least one embodiment, operation 2000 is to cause a user-indicated value storage node to be added to a software graph based, at least in part, on a dependency type. In at least one embodiment, operation 2000 is to cause a memory set node to be generated and/or added to a graph. In at least one embodiment, a memory set node, when executed, causes one or more portions of memory to store one or more values. In at least one embodiment, a memory set node, when executed, stores a value to one or more portions of memory. In at least one embodiment, operation 2000 is a set of instructions that, if performed, cause one or more processors to cause one or more APIs to be performed.

In at least one embodiment, memory set node invocation 2002 ("invocation 2002") is a function call to be performed by one or more software programs, such as kernels to be performed by one or more parallel processing units (PPUs), such as graphics processing units (GPUs). In at least one embodiment, invocation 2002 is an invocation of an instruction to cause one or more processors to perform one or more computational operations 2022, 2024 of memory set response 2020 ("response 2020"). In at least one embodiment, invocation 2002 is an invocation of an API to cause one or more processors to perform one or more computational operations 2022, 2024 of response 2020.

In at least one embodiment, invocation 2002 receives, when invoked, one or more parameters 2004, 2006, 2008, 2010, 2012, 2014, 2016, to indicate information about computational operations to be performed. In at least one embodiment, invocation 2002 receives, when invoked, one or more parameters 2004, 2006, 2008, 2010, 2012, 2014, 2016 to indicate information about instructions to be performed.

In at least one embodiment, invocation 2002 receives, as input, parameters 2004, 2006, 2008, 2010, 2012, 2014, 2016 comprising a node pointer 2004. In at least one embodiment, node pointer 2004 is data comprising information indicating one or more nodes to be created by operation 2000. In at least one embodiment, node pointer 2004 is a pointer to an address corresponding to one or more nodes to be created by operation 2000. In at least one embodiment, node pointer 2004 is data to be input to a function call, if said function call is to perform invocation 2002. In at least one embodiment, node pointer 2004 is data to be input to an API, if said API is to cause invocation 2002 to be performed.

In at least one embodiment, invocation 2002 receives, as input, parameters 2004, 2006, 2008, 2010, 2012, 2014, 2016 comprising a graph 2006. In at least one embodiment, graph 2006 is data comprising information indicating one or more attributes of a graph, such as nodes, edges, dependencies, and/or any other suitable attribute. In at least one embodiment, graph 2006 is associated with an instantiated graph that is evaluated to be generated and/or executed, as described above in conjunction with FIG. 1, and/or FIG. 2. In at least one embodiment, graph 2006 is data to be input to a function call, if said function call is to perform invocation 2002. In at least one embodiment, graph 2006 is data to be input to an API, if said API is to cause invocation 2002 to be performed.

In at least one embodiment, invocation 2002 receives, as input, parameters 2004, 2006, 2008, 2010, 2012, 2014, 2016 comprising a dependency pointer 2008. In at least one embodiment, dependency pointer 2008 is data comprising information indicating one or more dependencies between two or more nodes of a graph. In at least one embodiment, dependency pointer 2008 includes information corresponding to one or more dependencies between a node indicated by node pointer 2004 and one or more other nodes of graph 2006. In at least one embodiment, dependency pointer 2008 is data to be input to a function call, if said function call is to perform invocation 2002. In at least one embodiment, dependency pointer 2008 is data to be input to an API, if said API is to cause invocation 2002 to be performed.

In at least one embodiment, invocation 2002 receives, as input, parameters 2004, 2006, 2008, 2010, 2012, 2014, 2016 comprising edge information 2010. In at least one embodiment, edge information 2010 is data comprising information corresponding to one or more dependencies of graph 2006. In at least one embodiment, edge information 2010 includes information indicating one or more dependencies between a node associated with node pointer 2004 and one or more nodes of graph 2006. In at least one embodiment, edge information 2010 includes an indication of one or more of a source port, a destination port, and/or a dependency type, as described above in conjunction with FIG. 1, FIG. 3, FIG. 4, and/or FIG. 5. In at least one embodiment, edge information 2010 may be represented as an array, in which each element corresponds to an element of a parallel array associated with dependency pointer 2008. In at least one embodiment, edge information 2010 is data to be input to a function call, if said function call is to perform invocation 2002. In at least one embodiment, edge information 2010 is data to be input to an API, if said API is to cause invocation 2002 to be performed.

In at least one embodiment, invocation 2002 receives, as input, parameters 2004, 2006, 2008, 2010, 2012, 2014, 2016 comprising a number of dependencies 2012. In at least one embodiment, number of dependencies 2012 is data indicating a number, or quantity, of dependencies associated with a node of graph 2006 associated with node pointer 2004. In at least one embodiment, number of dependencies 2012 is data to be input to a function call, if said function call is to perform invocation 2002. In at least one embodiment, number of dependencies 2012 is data to be input to an API, if said API is to cause invocation 2002 to be performed.

In at least one embodiment, invocation 2002 receives, as input, parameters 2004, 2006, 2008, 2010, 2012, 2014, 2016 comprising other parameter(s) 2016. In at least one embodiment, other parameter(s) 2016 are data comprising any other information usable by operation 2000. In at least one embodiment, other parameter(s) 2016 are data to be input to a function call, if said function call is to perform invocation 2002. In at least one embodiment, other parameter(s) 2016 are data to be input to an API, if said API is to cause invocation 2002 to be performed.

In at least one embodiment, an example instruction indicating operation 2000 in a parallel computing environment, such as compute uniform device architecture (CUDA), is as follows:

cudaGraphAddMemsetNode (pGraphNode, graph, pDependencies, pDependencyData, numDependencies, pMemsetParams) where pGraphNode corresponds to node pointer 2004, graph corresponds to graph 2006, pDependencies corresponds to dependency pointer 2008, pDependencyData corresponds to edge information 2010, and numDependencies corresponds to number of dependencies 2012, and pMemsetParams corresponds to memory parameters 2014.

In at least one embodiment, response 2020 generates, as output, parameters 2022, 2024 comprising a status 2022. In at least one embodiment, status 2022 is data comprising any other information presented by operation 2000. In at least one embodiment, status 2022 is data to be output in response to a function call, if said function call is to perform invocation 2002. In at least one embodiment, status 2022 is data to be output by an API, if said API is to cause invocation 2002 to be performed. In at least one embodiment, status 2022 indicates that operation 2000 was performed successfully. In at least one embodiment, status 2022 indicates that operation 2000 was not performed successfully, or otherwise failed.

In at least one embodiment, response 2020 generates, as output, parameters comprising node 2024. In at least one embodiment, node 2024 is data to one or more nodes generated by operation 2000, using information associated with invocation 2002, such as parameters 2004, 2006, 2008, 2010, 2012, 2014, 2016. In at least one embodiment, node 2024 will be output by response 2020 to an address corresponding to node pointer 2004, such that node 2024 will be generated by storing data to an address indicated by node pointer 2004. In at least one embodiment, node 2024 is data to be output in response to a function call, if said function call is to perform invocation 2002. In at least one embodiment, node 2024 is data to be output by an API, if said API is to cause invocation 2002 to be performed. In at least one embodiment, node 2024 is provided to data structure, memory, and/or variable indicated by node pointer 2004. In at least one embodiment, node 2024 is presented in response to performance of one or more API and/or function calls.

Figure 21:
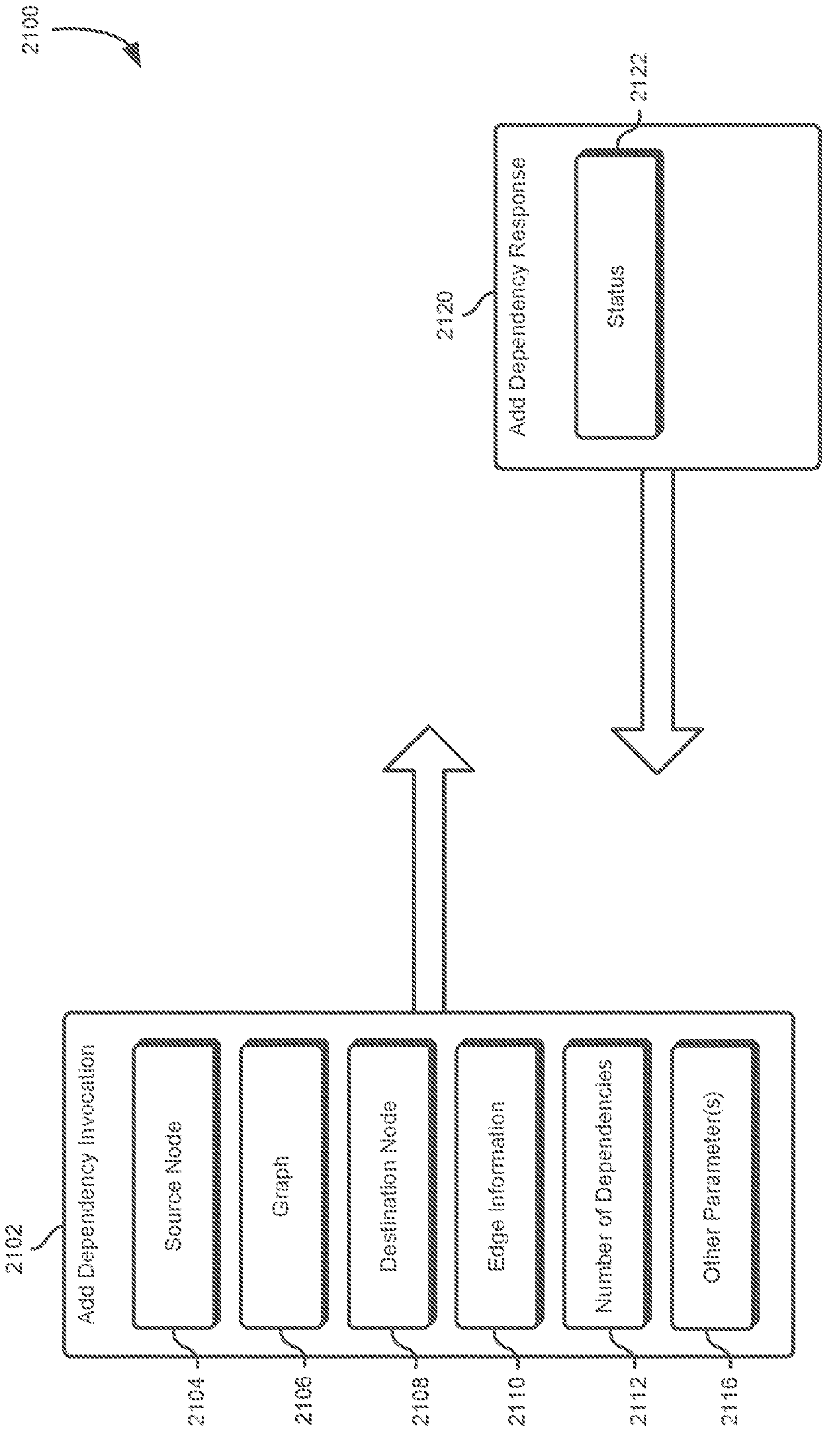
FIG. 21 is a block diagram illustrating an add dependency operation, in accordance with at least one embodiment.

FIG. 21 is a block diagram illustrating an add dependency operation 2100 ("operation 2100"), in accordance with at least one embodiment. In at least one embodiment, operation 2100 is one or more computational operations that, if performed, cause a dependency to be generated and/or added to a graph, as described above in conjunction with FIG. 1. In at least one embodiment, operation 2100 is to cause one or more dependencies between two or more graph nodes to be added to a software graph based, at least in part, on a dependency type. In at least one embodiment, operation 2100 is to cause a dependency between two or more nodes. In at least one embodiment, operation 2100 is a set of instructions that, if performed, cause one or more processors to cause one or more APIs to be performed.

In at least one embodiment, an add dependency invocation 2102 ("invocation 2102") is a function call to be performed by one or more software programs, such as kernels to be performed by one or more parallel processing units (PPUs), such as graphics processing units (GPUs). In at least one embodiment, invocation 2102 is an invocation of an instruction to cause one or more processors to perform one or more computational operations 2122, 2124 of an add dependency response 2120 ("response 2120"). In at least one embodiment, invocation 2102 is an invocation of an API to cause one or more processors to perform one or more computational operations 2122, 2124 of response 2120.

In at least one embodiment, invocation 2102 receives, when invoked, one or more parameters 2104, 2106, 2108, 2110, 2112, 2116, to indicate information about computational operations to be performed. In at least one embodiment, invocation 2102 receives, when invoked, one or more parameters 2104, 2106, 2108, 2110, 2112, 2116 to indicate information about instructions to be performed.

In at least one embodiment, invocation 2102 receives, as input, parameters 2104, 2106, 2108, 2110, 2112, 2114, 2116 comprising a source node 2104. In at least one embodiment, source node 2104 is data comprising information indicating one or more nodes to from which a dependency is to be generated by operation 2100. In at least one embodiment, source node 2104 is an array indicating one or more nodes from which a dependency originates. In at least one embodiment, source node 2104 is a pointer to an address corresponding to one or more nodes. In at least one embodiment, source node 2104 is data to be input to a function call, if said function call is to perform invocation 2102. In at least one embodiment, source node 2104 is data to be input to an API, if said API is to cause invocation 2102 to be performed.

In at least one embodiment, invocation 2102 receives, as input, parameters 2104, 2106, 2108, 2110, 2112, 2114, 2116 comprising a graph 2106. In at least one embodiment, graph 2106 is data comprising information indicating one or more attributes of a graph, such as nodes, edges, dependencies, and/or any other suitable attribute. In at least one embodiment, graph 2106 is associated with an instantiated graph that is evaluated to be generated and/or executed, as described above in conjunction with FIG. 1, and/or FIG. 2. In at least one embodiment, graph 2106 is data to be input to a function call, if said function call is to perform invocation 2102. In at least one embodiment, graph 2106 is data to be input to an API, if said API is to cause invocation 2102 to be performed.

In at least one embodiment, invocation 2102 receives, as input, parameters 2104, 2106, 2108, 2110, 2112, 2114, 2116 comprising a destination node 2108. In at least one embodiment, destination node 2108 is data comprising information indicating one or more nodes to which a dependency is to be generated by operation 2100. In at least one embodiment, destination node 2108 includes an array indicating one or more nodes which depend on one or more other nodes, such as nodes indicated by source node 2104. In at least one embodiment, destination node 2108 is a pointer to an address corresponding to one or more nodes. In at least one embodiment, destination node 2108 is data to be input to a function call, if said function call is to perform invocation 2102. In at least one embodiment, destination node 2108 is data to be input to an API, if said API is to cause invocation 2102 to be performed.

In at least one embodiment, invocation 2102 receives, as input, parameters 2104, 2106, 2108, 2110, 2112, 2114, 2116 comprising edge information 2110. In at least one embodiment, edge information 2110 is data comprising information corresponding to one or more dependencies of graph 2106. In at least one embodiment, edge information 2110 includes information indicating one or more dependencies between a node associated with node source node 2104, destination node 2108, and/or one or more nodes of graph 2106. In at least one embodiment, edge information 2110 includes an indication of one or more of a source port, a destination port, and/or a dependency type, as described above in conjunction with FIG. 1, FIG. 3, FIG. 4, and/or FIG. 5. In at least one embodiment, edge information 2110 is data to be input to a function call, if said function call is to perform invocation 2102. In at least one embodiment, edge information 2110 is data to be input to an API, if said API is to cause invocation 2102 to be performed.

In at least one embodiment, invocation 2102 receives, as input, parameters 2104, 2106, 2108, 2110, 2112, 2114, 2116 comprising a number of dependencies 2112. In at least one embodiment, number of dependencies 2112 is data indicating a number, or quantity, of dependencies associated with a node of graph 2106 associated with source node 2104 and/or destination node 2108. In at least one embodiment, number of dependencies 2112 is data to be input to a function call, if said function call is to perform invocation 2102. In at least one embodiment, number of dependencies 2112 is data to be input to an API, if said API is to cause invocation 2102 to be performed.

In at least one embodiment, invocation 2102 receives, as input, parameters 2104, 2106, 2108, 2110, 2112, 2114, 2116 comprising one or more memory parameters 2114. In at least one embodiment, memory parameters 2114 is data associated with one or more memory allocation operations corresponding to a node of graph 2106 associated with node pointer 2104. In at least one embodiment, memory parameters 2114 include an indication of a number of memory access descriptors. In at least one embodiment, memory parameters 2114 include an indication of a size of a portion of requested memory to allocate. In at least one embodiment, memory parameters 2114 include an indication of a symbol from which data is to be copied from corresponding one or more portions of memory. In at least one embodiment, memory parameters 2114 include an indication of a one or more memory addresses corresponding to one or more portions of memory being allocated. In at least one embodiment, memory parameters 2114 is data to be input to a function call, if said function call is to perform invocation 2102. In at least one embodiment, memory parameters 2114 is data to be input to an API, if said API is to cause invocation 2102 to be performed.

In at least one embodiment, invocation 2102 receives, as input, parameters 2104, 2106, 2108, 2110, 2112, 2114, 2116 comprising other parameter(s) 2116. In at least one embodiment, other parameter(s) 2116 are data comprising any other information usable by operation 2100. In at least one embodiment, other parameter(s) 2116 are data to be input to a function call, if said function call is to perform invocation 2102. In at least one embodiment, other parameter(s) 2116 are data to be input to an API, if said API is to cause invocation 2102 to be performed.

In at least one embodiment, an example instruction indicating operation 2100 in a parallel computing environment, such as compute uniform device architecture (CUDA), is as follows:

cudaGraphAddDependencies (graph, from, to, pDependencyData, numDependencies) where from corresponds to source node 2104, graph corresponds to graph 2106, to corresponds to destination node 2108, pDependencyData corresponds to edge information 2110, and numDependencies corresponds to number of dependencies 2112.

In at least one embodiment, response 2120 generates, as output, parameters comprising a status 2122. In at least one embodiment, status 2122 is data comprising any other information presented by operation 2100. In at least one embodiment, status 2122 is data to be output in response to a function call, if said function call is to perform invocation 2102. In at least one embodiment, status 2122 is data to be output by an API, if said API is to cause invocation 2102 to be performed. In at least one embodiment, status 2122 indicates that operation 2100 was performed successfully. In at least one embodiment, status 2122 indicates that operation 2100 was not performed successfully, or otherwise failed.

Figure 22:
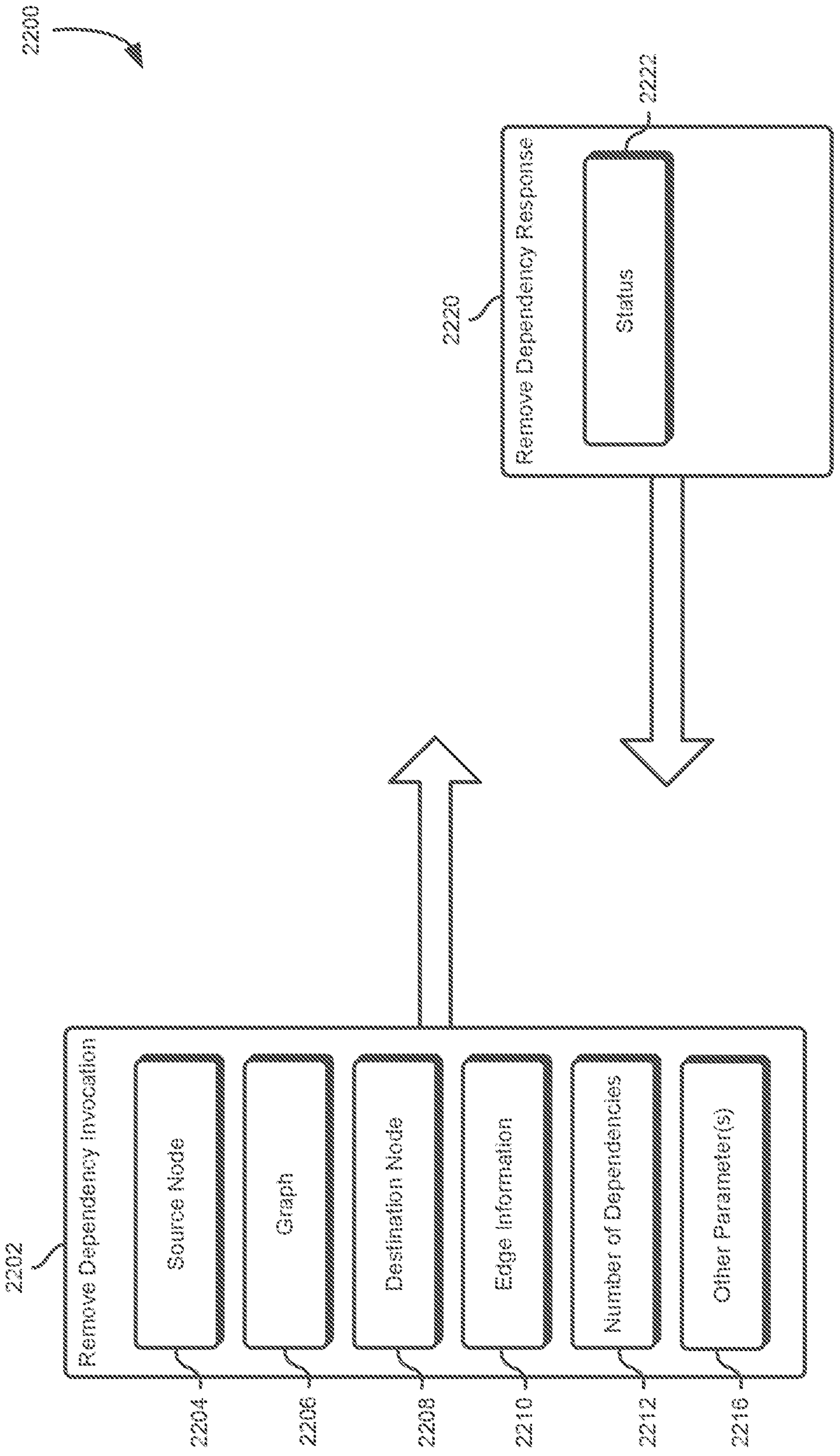
FIG. 22 is a block diagram illustrating a remove dependency operation, in accordance with at least one embodiment.

FIG. 22 is a block diagram illustrating a remove dependency operation 2200 ("operation 2200"), in accordance with at least one embodiment. In at least one embodiment, operation 2200 is one or more computational operations that, if performed, cause a dependency to be removed from a graph, as described above in conjunction with FIG. 1. In at least one embodiment, operation 2200 is to cause one or more dependencies between two or more graph nodes to be removed from a software graph based, at least in part, on a dependency type. In at least one embodiment, operation 2200 is to cause a dependency to be removed from between two or more nodes. In at least one embodiment, operation 2200 is a set of instructions that, if performed, cause one or more processors to cause one or more APIs to be performed.

In at least one embodiment, a remove dependency invocation 2202 ("invocation 2202") is a function call to be performed by one or more software programs, such as kernels to be performed by one or more parallel processing units (PPUs), such as graphics processing units (GPUs). In at least one embodiment, invocation 2202 is an invocation of an instruction to cause one or more processors to perform one or more computational operations 2222, 2224 of a remove dependency response 2220 ("response 2220"). In at least one embodiment, invocation 2202 is an invocation of an API to cause one or more processors to perform one or more computational operations 2222, 2224 of response 2220.

In at least one embodiment, invocation 2202 receives, when invoked, one or more parameters 2204, 2206, 2208, 2210, 2212, 2216, to indicate information about computational operations to be performed. In at least one embodiment, invocation 2202 receives, when invoked, one or more parameters 2204, 2206, 2208, 2210, 2212, 2216 to indicate information about instructions to be performed.

In at least one embodiment, invocation 2202 receives, as input, parameters 2204, 2206, 2208, 2210, 2212, 2216 comprising a source node 2204. In at least one embodiment, source node 2204 is data comprising information indicating one or more nodes to from which a dependency is to be removed by operation 2200. In at least one embodiment, source node 2204 is an array indicating one or more nodes from which a dependency originates. In at least one embodiment, source node 2204 is a pointer to an address corresponding to one or more nodes. In at least one embodiment, source node 2204 is data to be input to a function call, if said function call is to perform invocation 2202. In at least one embodiment, source node 2204 is data to be input to an API, if said API is to cause invocation 2202 to be performed.

In at least one embodiment, invocation 2202 receives, as input, parameters 2204, 2206, 2208, 2210, 2212, 2216 comprising a graph 2206. In at least one embodiment, graph 2206 is data comprising information indicating one or more attributes of a graph, such as nodes, edges, dependencies, and/or any other suitable attribute. In at least one embodiment, graph 2206 is associated with an instantiated graph that is evaluated to be generated and/or executed, as described above in conjunction with FIG. 1, and/or FIG. 2. In at least one embodiment, graph 2206 is data to be input to a function call, if said function call is to perform invocation 2202. In at least one embodiment, graph 2206 is data to be input to an API, if said API is to cause invocation 2202 to be performed.

In at least one embodiment, invocation 2202 receives, as input, parameters 2204, 2206, 2208, 2210, 2212, 2216 comprising a destination node 2208. In at least one embodiment, destination node 2208 is data comprising information indicating one or more nodes to which a dependency is to be removed by operation 2200. In at least one embodiment, destination node 2208 includes an array indicating one or more nodes which depend on one or more other nodes, such as nodes indicated by source node 2204. In at least one embodiment, destination node 2208 is a pointer to an address corresponding to one or more nodes. In at least one embodiment, destination node 2208 is data to be input to a function call, if said function call is to perform invocation 2202. In at least one embodiment, destination node 2208 is data to be input to an API, if said API is to cause invocation 2202 to be performed.

In at least one embodiment, invocation 2202 receives, as input, parameters 2204, 2206, 2208, 2210, 2212, 2216 comprising edge information 2210. In at least one embodiment, edge information 2210 is data comprising information corresponding to one or more dependencies of graph 2206. In at least one embodiment, edge information 2210 includes information indicating one or more dependencies between a node associated with node source node 2204, destination node 2208, and/or one or more nodes of graph 2206. In at least one embodiment, edge information 2210 includes an indication of one or more of a source port, a destination port, and/or a dependency type, as described above in conjunction with FIG. 1, FIG. 3, FIG. 4, and/or FIG. 5. In at least one embodiment, edge information 2210 is data to be input to a function call, if said function call is to perform invocation 2202. In at least one embodiment, edge information 2210 is data to be input to an API, if said API is to cause invocation 2202 to be performed.

In at least one embodiment, invocation 2202 receives, as input, parameters 2204, 2206, 2208, 2210, 2212, 2216 comprising a number of dependencies 2212. In at least one embodiment, number of dependencies 2212 is data indicating a number, or quantity, of dependencies associated with a node of graph 2206 associated with source node 2204 and/or destination node 2208. In at least one embodiment, number of dependencies 2212 is data to be input to a function call, if said function call is to perform invocation 2202. In at least one embodiment, number of dependencies 2212 is data to be input to an API, if said API is to cause invocation 2202 to be performed.

In at least one embodiment, invocation 2202 receives, as input, parameters 2204, 2206, 2208, 2210, 2212, 2216 comprising other parameter(s) 2216. In at least one embodiment, other parameter(s) 2216 are data comprising any other information usable by operation 2200. In at least one embodiment, other parameter(s) 2216 are data to be input to a function call, if said function call is to perform invocation 2202. In at least one embodiment, other parameter(s) 2216 are data to be input to an API, if said API is to cause invocation 2202 to be performed.

In at least one embodiment, an example instruction indicating operation 2200 in a parallel computing environment, such as compute uniform device architecture (CUDA), is as follows:

cudaGraphRemoveDependencies (graph, from, to, pDependencyData, numDependencies) where from corresponds to source node 2204, graph corresponds to graph 2206, to corresponds to destination node 2208, pDependencyData corresponds to edge information 2210, and numDependencies corresponds to number of dependencies 2212.

In at least one embodiment, response 2220 generates, as output, parameters 2222 comprising a status 2222. In at least one embodiment, status 2222 is data comprising any other information presented by operation 2200. In at least one embodiment, status 2222 is data to be output in response to a function call, if said function call is to perform invocation 2202. In at least one embodiment, status 2222 is data to be output by an API, if said API is to cause invocation 2202 to be performed. In at least one embodiment, status 2222 indicates that operation 2200 was performed successfully. In at least one embodiment, status 2222 indicates that operation 2200 was not performed successfully, or otherwise failed.

Figure 23:
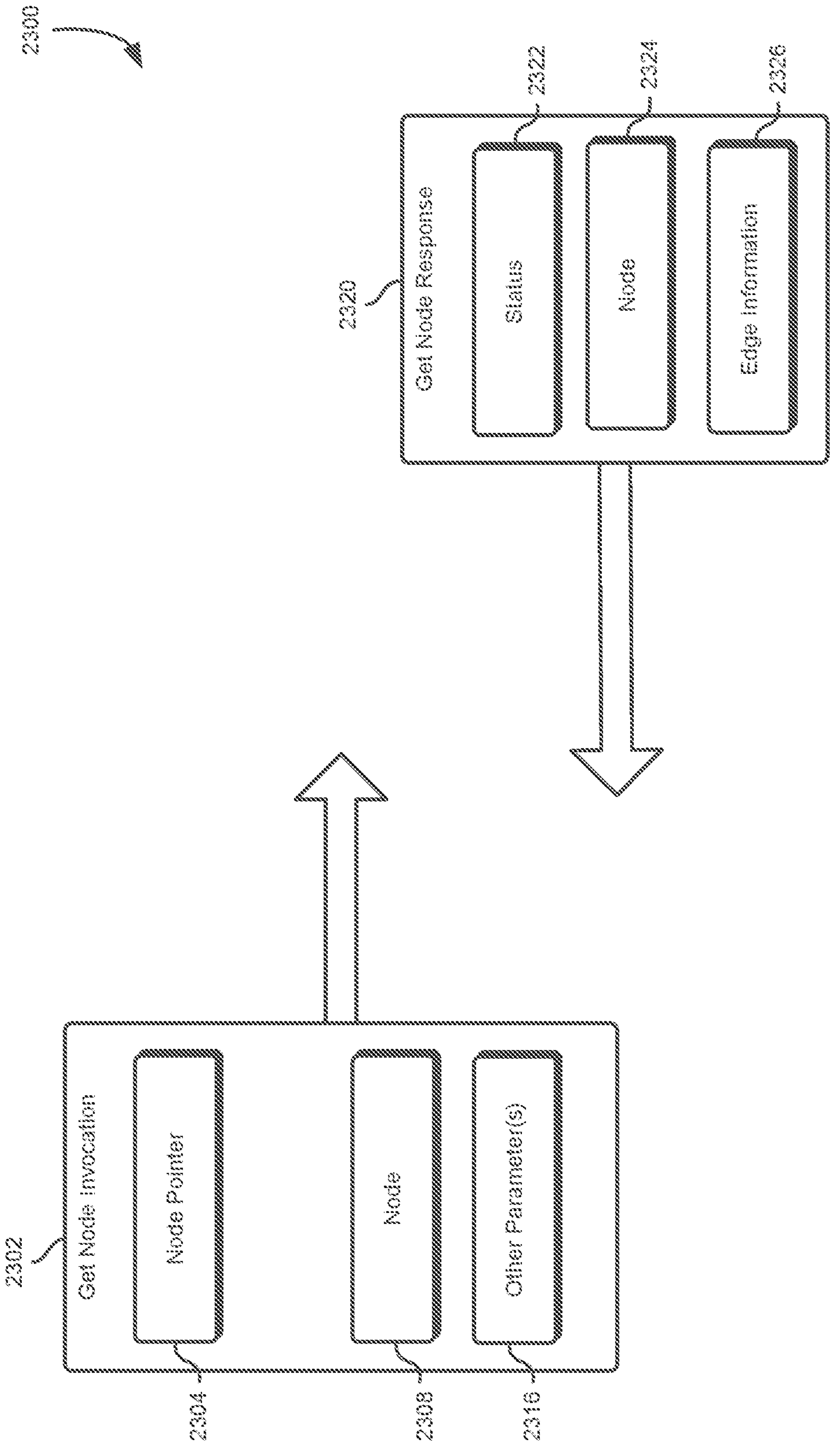
FIG. 23 is a block diagram illustrating a get node operation, in accordance with at least one embodiment.

FIG. 23 is a block diagram illustrating a get node operation 2300 ("operation 2300"), in accordance with at least one embodiment. In at least one embodiment, operation 2300 is one or more computational operations that, if performed, cause a one or more nodes having dependencies with one or more other nodes to be identified, as described above in conjunction with FIG. 1. In at least one embodiment, operation 2300 is to cause dependency type information between two or more graph nodes of a software graph to be indicated. In at least one embodiment, operation 2300 is to cause return one or more dependent nodes and corresponding dependency information. In at least one embodiment, operation 2300 is a set of instructions that, if performed, cause one or more processors to cause one or more APIs to be performed.

In at least one embodiment, a get node invocation 2302 ("invocation 2302") is a function call to be performed by one or more software programs, such as kernels to be performed by one or more parallel processing units (PPUs), such as graphics processing units (GPUs). In at least one embodiment, invocation 2302 is an invocation of an instruction to cause one or more processors to perform one or more computational operations 2322, 2324 of get node response 2320 ("response 2320"). In at least one embodiment, invocation 2302 is an invocation of an API to cause one or more processors to perform one or more computational operations 2322, 2324 of response 2320.

In at least one embodiment, invocation 2302 receives, when invoked, one or more parameters 2304,2308, 2316, to indicate information about computational operations to be performed. In at least one embodiment, invocation 2302 receives, when invoked, one or more parameters 2304,2308, 2316 to indicate information about instructions to be performed.

In at least one embodiment, invocation 2302 receives, as input, parameters 2304,2308, 2316 comprising a node pointer 2304. In at least one embodiment, node pointer 2304 is data comprising information indicating one or more nodes to be identified by operation 2300. In at least one embodiment, node pointer 2304 is a pointer to an address corresponding to one or more nodes to be identified by operation 2300. In at least one embodiment, node pointer 2304 is data to be input to a function call, if said function call is to perform invocation 2302. In at least one embodiment, node pointer 2304 is data to be input to an API, if said API is to cause invocation 2302 to be performed.

In at least one embodiment, invocation 2302 receives, as input, parameters 2304,2308, 2316 comprising a node 2308. In at least one embodiment, destination node 2308 is data comprising information indicating one or more nodes to which a dependency is to be identified by operation 2300. In at least one embodiment, node 2308 includes an array indicating one or more nodes for which dependent nodes are to be identified and returned by response 2320. In at least one embodiment, node 2308 is a pointer to an address corresponding to one or more nodes. In at least one embodiment, node 2308 is data to be input to a function call, if said function call is to perform invocation 2302. In at least one embodiment, node 2308 is data to be input to an API, if said API is to cause invocation 2302 to be performed.

In at least one embodiment, invocation 2302 receives, as input, parameters 2304,2308, 2316 comprising other parameter(s) 2316. In at least one embodiment, other parameter(s) 2316 are data comprising any other information usable by operation 2300. In at least one embodiment, other parameter(s) 2316 are data to be input to a function call, if said function call is to perform invocation 2302. In at least one embodiment, other parameter(s) 2316 are data to be input to an API, if said API is to cause invocation 2302 to be performed.

In at least one embodiment, an example instruction indicating operation 2300 in a parallel computing environment, such as compute uniform device architecture (CUDA), is as follows:

cudaGraphNodeGetDependentNodes (node, dependentNodes) where node corresponds to node 2308, dependentNodes corresponds to node pointer 2304.

In at least one embodiment, response 2320 generates, as output, parameters 2322, 2324, 2326 comprising a status 2322. In at least one embodiment, status 2322 is data comprising any other information presented by operation 2300. In at least one embodiment, status 2322 is data to be output in response to a function call, if said function call is to perform invocation 2302. In at least one embodiment, status 2322 is data to be output by an API, if said API is to cause invocation 2302 to be performed. In at least one embodiment, status 2322 indicates that operation 2300 was performed successfully. In at least one embodiment, status 2322 indicates that operation 2300 was not performed successfully, or otherwise failed.

In at least one embodiment, response 2320 generates, as output, parameters 2322, 2324, 2326, comprising node 2324. In at least one embodiment, node 2324 is data comprising information corresponding to one or more nodes which are dependent on one or more nodes indicated by node 2308. In at least one embodiment, node 2324 is output to a location indicated by node pointer 2304.

In at least one embodiment, response 2320 generates, as output, parameters 2322, 2324, 2326, comprising edge information 2326. In at least one embodiment, edge information 2326 is data comprising information corresponding to one or more dependencies of node 2308 and/or node 2324. In at least one embodiment, edge information 2326 includes information indicating one or more dependencies between a node associated with node 2308, and/or node 2324. In at least one embodiment, edge information 2326 includes an indication of one or more of a source port, a destination port, and/or a dependency type, as described above in conjunction with FIG. 1, FIG. 3, FIG. 4, and/or FIG. 5.

Figure 24:
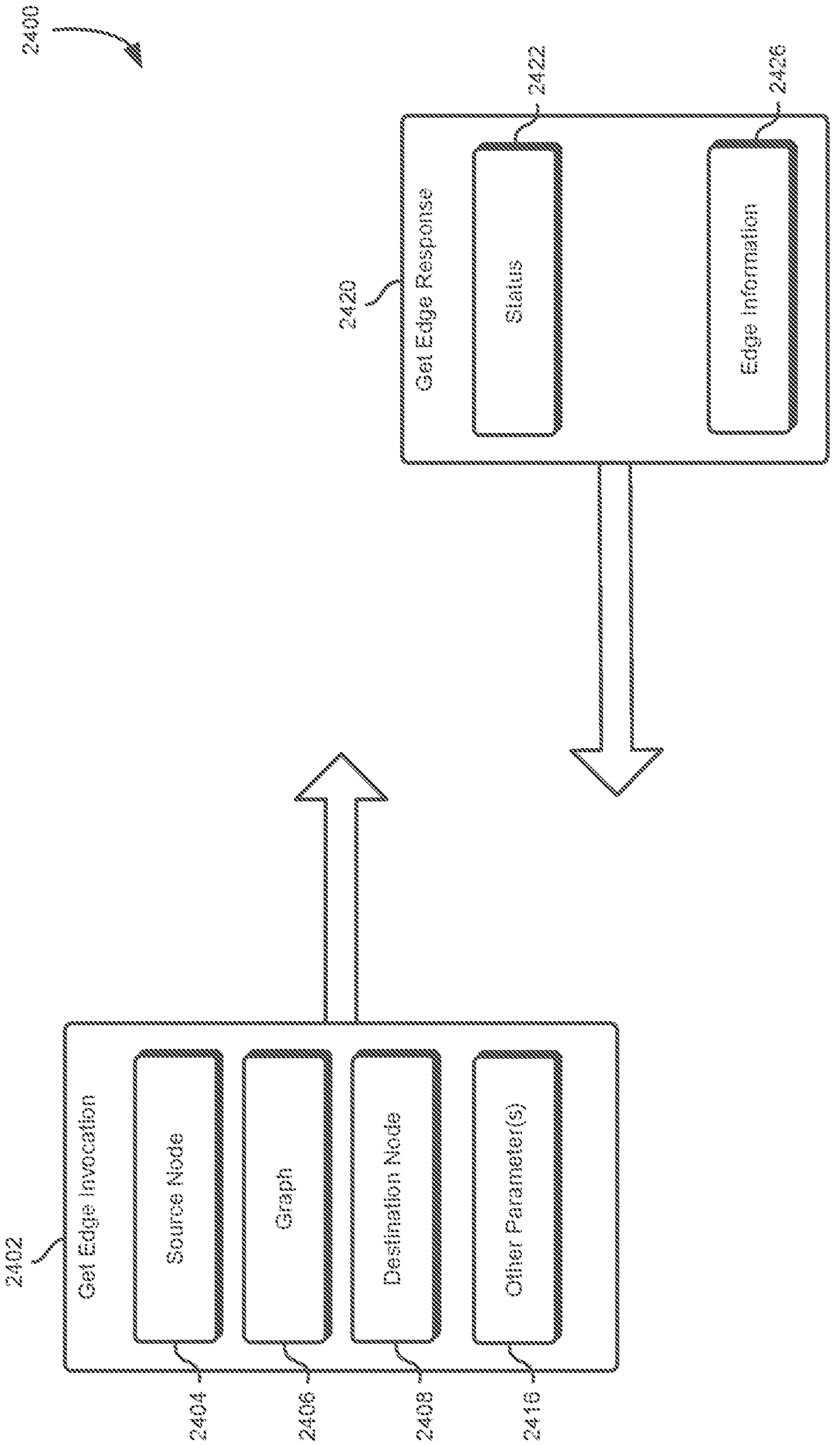
FIG. 24 is a block diagram illustrating a get edge operation, in accordance with at least one embodiment.

FIG. 24 is a block diagram illustrating a get edge operation 2400 ("operation 2400"), in accordance with at least one embodiment. In at least one embodiment, operation 2400 is one or more computational operations that, if performed, cause a one or more edges associated with one or more other nodes to be identified, as described above in conjunction with FIG. 1. In at least one embodiment, operation 2400 is to cause dependency type information between all graph nodes of a software graph to be indicated. In at least one embodiment, operation 2400 is to cause return one or more dependent edges and corresponding dependency information. In at least one embodiment, operation 2400 is a set of instructions that, if performed, cause one or more processors to cause one or more APIs to be performed.

In at least one embodiment, a get edge invocation 2402 ("invocation 2402") is a function call to be performed by one or more software programs, such as kernels to be performed by one or more parallel processing units (PPUs), such as graphics processing units (GPUs). In at least one embodiment, invocation 2402 is an invocation of an instruction to cause one or more processors to perform one or more computational operations 2422, 2424 of get edge response 2420 ("response 2420"). In at least one embodiment, invocation 2402 is an invocation of an API to cause one or more processors to perform one or more computational operations 2422, 2424 of response 2420.

In at least one embodiment, invocation 2402 receives, when invoked, one or more parameters 2404, 2406, 2408, 2416, to indicate information about computational operations to be performed. In at least one embodiment, invocation 2402 receives, when invoked, one or more parameters 2404, 2406, 2408, 2416 to indicate information about instructions to be performed.

In at least one embodiment, invocation 2402 receives, as input, parameters 2404, 2406, 2408, 2416 comprising a source node 2404. In at least one embodiment, source node 2404 is data comprising information indicating one or more nodes for which one or more corresponding edges are to be identified by operation 2400. In at least one embodiment, source node 2404 is a pointer to an address corresponding to one or more nodes to be identified by operation 2400. In at least one embodiment, source node 2404 is data to be input to a function call, if said function call is to perform invocation 2402. In at least one embodiment, source node 2404 is data to be input to an API, if said API is to cause invocation 2402 to be performed.

In at least one embodiment, invocation 2402 receives, as input, parameters 2404, 2406, 2408, 2416 comprising a destination node 2408. In at least one embodiment, destination node 2408 is data comprising information indicating one or more nodes for which one or more corresponding edges are to be identified by operation 2400. In at least one embodiment, destination node 2408 is a pointer to an address corresponding to one or more nodes to be identified by operation 2400. In at least one embodiment, destination node 2408 is data to be input to a function call, if said function call is to perform invocation 2402. In at least one embodiment, destination node 2408 is data to be input to an API, if said API is to cause invocation 2402 to be performed.

In at least one embodiment, invocation 2002 receives, as input, parameters 2004, 2006, 2008, 2016 comprising a graph 2006. In at least one embodiment, graph 2006 is data comprising information indicating one or more attributes of a graph, such as nodes, edges, dependencies, and/or any other suitable attribute. In at least one embodiment, graph 2406 is used by operation 2400 to identify edges between source node 2404 and destination node 2408 within graph 2406. In at least one embodiment, graph 2006 is associated with an instantiated graph that is evaluated to be generated and/or executed, as described above in conjunction with FIG. 1, and/or FIG. 2. In at least one embodiment, graph 2006 is data to be input to a function call, if said function call is to perform invocation 2002. In at least one embodiment, graph 2006 is data to be input to an API, if said API is to cause invocation 2002 to be performed.

In at least one embodiment, invocation 2402 receives, as input, parameters 2404, 2406, 2408, 2416 comprising other parameter(s) 2416. In at least one embodiment, other parameter(s) 2416 are data comprising any other information usable by operation 2400. In at least one embodiment, other parameter(s) 2416 are data to be input to a function call, if said function call is to perform invocation 2402. In at least one embodiment, other parameter(s) 2416 are data to be input to an API, if said API is to cause invocation 2402 to be performed.

In at least one embodiment, an example instruction indicating operation 2400 in a parallel computing environment, such as compute uniform device architecture (CUDA), is as follows:

cudaGraphNodeGetEdges(graph, sourceNode, destinationNode) where graph corresponds to graph 2406, dependentNode corresponds to dependent node 2408, and sourceNode corresponds to source node 2404.

In at least one embodiment, response 2420 generates, as output, parameters 2422, 2426 comprising a status 2422. In at least one embodiment, status 2422 is data comprising any other information presented by operation 2400. In at least one embodiment, status 2422 is data to be output in response to a function call, if said function call is to perform invocation 2402. In at least one embodiment, status 2422 is data to be output by an API, if said API is to cause invocation 2402 to be performed. In at least one embodiment, status 2422 indicates that operation 2400 was performed successfully. In at least one embodiment, status 2422 indicates that operation 2400 was not performed successfully, or otherwise failed.

In at least one embodiment, response 2420 generates, as output, parameters 2422, 2426, comprising edge information 2426. In at least one embodiment, edge information 2426 is data comprising information corresponding to one or more edges and/or dependencies of destination node 2408 and/or source node 2404. In at least one embodiment, edge information 2426 includes information indicating one or more dependencies between a node associated with destination node 2408, and/or source node 2404. In at least one embodiment, edge information 2426 includes an indication of one or more of a source port, a destination port, and/or a dependency type, as described above in conjunction with FIG. 1, FIG. 3, FIG. 4, and/or FIG. 5.

Figure 25:
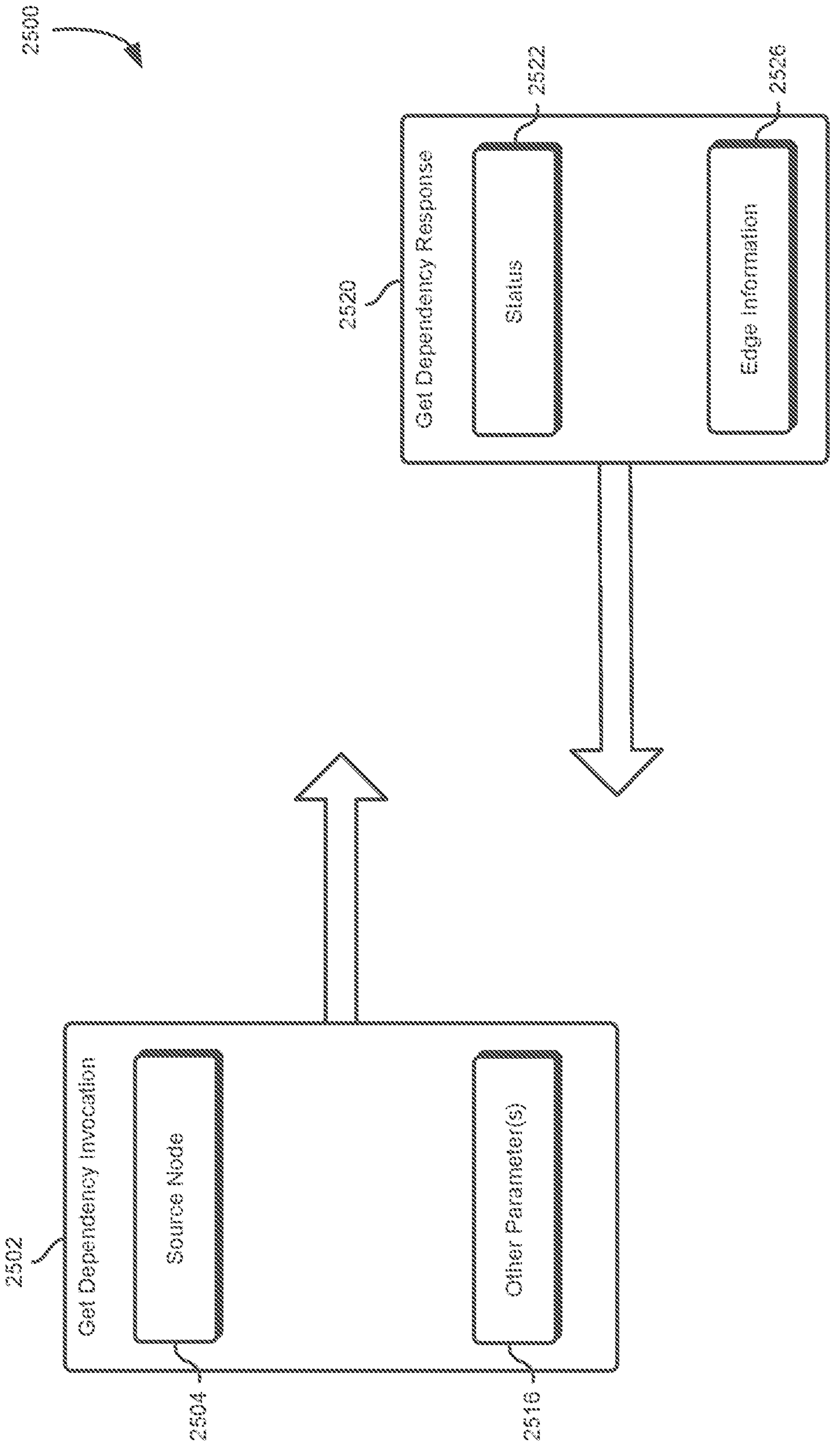
FIG. 25 is a block diagram illustrating a get dependency operation, in accordance with at least one embodiment.

FIG. 25 is a block diagram illustrating a get dependency operation 2500 ("operation 2500"), in accordance with at least one embodiment. In at least one embodiment, operation 2500 is one or more computational operations that, if performed, cause a one or more dependencies associated with one or more nodes to be identified, as described above in conjunction with FIG. 1. In at least one embodiment, operation 2500 is to cause dependency type information of one or more user-indicated graph nodes of a software graph to be indicated. In at least one embodiment, operation 2500 is to cause return dependency information corresponding to one or more nodes of a graph. In at least one embodiment, operation 2500 is a set of instructions that, if performed, cause one or more processors to cause one or more APIs to be performed.

In at least one embodiment, a get dependency invocation 2502 ("invocation 2502") is a function call to be performed by one or more software programs, such as kernels to be performed by one or more parallel processing units (PPUs), such as graphics processing units (GPUs). In at least one embodiment, invocation 2502 is an invocation of an instruction to cause one or more processors to perform one or more computational operations 2524 of get dependency response 2520 ("response 2520"). In at least one embodiment, invocation 2502 is an invocation of an API to cause one or more processors to perform one or more computational operations 2522, 2526 of response 2520.

In at least one embodiment, invocation 2502 receives, when invoked, one or more parameters 2504, 2516, to indicate information about computational operations to be performed. In at least one embodiment, invocation 2502 receives, when invoked, one or more parameters 2504, 2516 to indicate information about instructions to be performed.

In at least one embodiment, invocation 2502 receives, as input, parameters 2504, 2516 comprising a source node 2504. In at least one embodiment, source node 2504 is data comprising information indicating one or more nodes for which one or more corresponding dependencies are to be identified by operation 2500. In at least one embodiment, source node 2504 is a pointer to an address corresponding to one or more nodes to be identified by operation 2500. In at least one embodiment, source node 2504 is data to be input to a function call, if said function call is to perform invocation 2502. In at least one embodiment, source node 2504 is data to be input to an API, if said API is to cause invocation 2502 to be performed.

In at least one embodiment, invocation 2502 receives, as input, parameters 2504, 2516 comprising other parameter(s) 2516. In at least one embodiment, other parameter(s) 2516 are data comprising any other information usable by operation 2500. In at least one embodiment, other parameter(s) 2516 are data to be input to a function call, if said function call is to perform invocation 2502. In at least one embodiment, other parameter(s) 2516 are data to be input to an API, if said API is to cause invocation 2502 to be performed.

In at least one embodiment, an example instruction indicating operation 2500 in a parallel computing environment, such as compute uniform device architecture (CUDA), is as follows:

cudaGraphNodeGetEdges(sourceNode) where sourceNode corresponds to source node 2504.

In at least one embodiment, response 2520 generates, as output, parameters 2522, 2526 comprising a status 2522. In at least one embodiment, status 2522 is data comprising any other information presented by operation 2500. In at least one embodiment, status 2522 is data to be output in response to a function call, if said function call is to perform invocation 2502. In at least one embodiment, status 2522 is data to be output by an API, if said API is to cause invocation 2502 to be performed. In at least one embodiment, status 2522 indicates that operation 2500 was performed successfully. In at least one embodiment, status 2522 indicates that operation 2500 was not performed successfully, or otherwise failed.

In at least one embodiment, response 2520 generates, as output, parameters 2522, 2526, comprising edge information 2526. In at least one embodiment, edge information 2526 is data comprising information corresponding to one or more edges and/or dependencies of destination node 2508 and/or source node 2504. In at least one embodiment, edge information 2526 includes information indicating one or more dependencies between a node associated with destination node 2508, and/or source node 2504. In at least one embodiment, edge information 2526 includes an indication of one or more of a source port, a destination port, and/or a dependency type, as described above in conjunction with FIG. 1, FIG. 3, FIG. 4, and/or FIG. 5.

Figure 26:
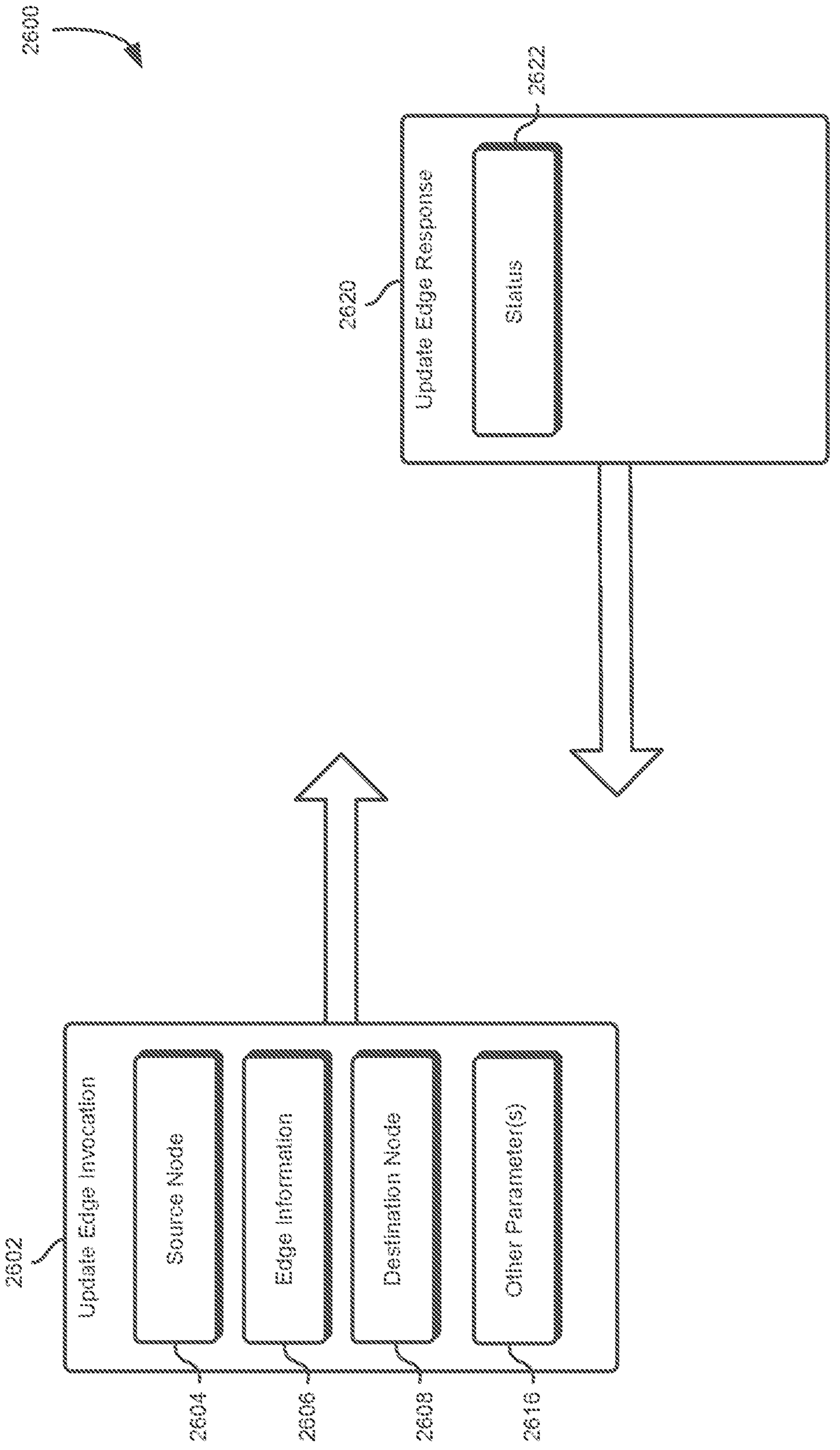
FIG. 26 is a block diagram illustrating an update dependency operation, in accordance with at least one embodiment.

FIG. 26 is a block diagram illustrating an update dependency operation 2600 ("operation 2600"), in accordance with at least one embodiment. In at least one embodiment, operation 2600 is one or more computational operations that, if performed, cause a one or more dependencies associated with one or more nodes to be updated, as described above in conjunction with FIG. 1. In at least one embodiment, operation 2600 is to cause dependency type information of one or more graph nodes of a software graph to be modified. In at least one embodiment, operation 2600 is to cause dependency information corresponding to one or more nodes of a graph to be modified. In at least one embodiment, operation 2600 is a set of instructions that, if performed, cause one or more processors to cause one or more APIs to be performed.

In at least one embodiment, an update dependency invocation 2602 ("invocation 2602") is a function call to be performed by one or more software programs, such as kernels to be performed by one or more parallel processing units (PPUs), such as graphics processing units (GPUs). In at least one embodiment, invocation 2602 is an invocation of an instruction to cause one or more processors to perform one or more computational operations 2622 of update dependency response 2620 ("response 2620"). In at least one embodiment, invocation 2602 is an invocation of an API to cause one or more processors to perform one or more computational operations 2622 of response 2620.

In at least one embodiment, invocation 2602 receives, when invoked, one or more parameters 2604, 2606, 2608, 2616, to indicate information about computational operations to be performed. In at least one embodiment, invocation 2602 receives, when invoked, one or more parameters 2604, 2606, 2608, 2616 to indicate information about instructions to be performed.

In at least one embodiment, invocation 2602 receives, as input, parameters 2604, 2606, 2608, 2616 comprising a source node 2604. In at least one embodiment, source node 2604 is data comprising information indicating one or more nodes for which one or more corresponding dependencies are to be modified by operation 2600. In at least one embodiment, source node 2604 is a pointer to an address corresponding to one or more nodes to be identified by operation 2600. In at least one embodiment, source node 2604 is data to be input to a function call, if said function call is to perform invocation 2602. In at least one embodiment, source node 2604 is data to be input to an API, if said API is to cause invocation 2602 to be performed.

In at least one embodiment, invocation 2602 receives, as input, parameters 2604, 2606, 2608, 2616 comprising a destination node 2608. In at least one embodiment, destination node 2608 is data comprising information indicating one or more nodes for which one or more corresponding dependencies are to be modified by operation 2600. In at least one embodiment, destination node 2608 is a pointer to an address corresponding to one or more nodes to be identified by operation 2600. In at least one embodiment, destination node 2608 is data to be input to a function call, if said function call is to perform invocation 2602. In at least one embodiment, destination node 2608 is data to be input to an API, if said API is to cause invocation 2602 to be performed.

In at least one embodiment, invocation 2602 receives, as input, parameters 2604, 2606, 2608, 2616 comprising edge information 2606. In at least one embodiment, edge information 2606 is data comprising information corresponding to one or more dependencies of graph 2606. In at least one embodiment, edge information 2606 includes information indicating one or more dependencies between a node associated with source node 2604 and destination node 2608. In at least one embodiment, edge information 2606 includes an indication of one or more of a source port, a destination port, and/or a dependency type, as described above in conjunction with FIG. 1, FIG. 3, FIG. 4, and/or FIG. 5. In at least one embodiment, edge information 2606 is data to be input to a function call, if said function call is to perform invocation 2602. In at least one embodiment, edge information 2606 is data to be input to an API, if said API is to cause invocation 2602 to be performed.

In at least one embodiment, invocation 2602 receives, as input, parameters 2604, 2606, 2608, 2616 comprising other parameter(s) 2616. In at least one embodiment, other parameter(s) 2616 are data comprising any other information usable by operation 2600. In at least one embodiment, other parameter(s) 2616 are data to be input to a function call, if said function call is to perform invocation 2602. In at least one embodiment, other parameter(s) 2616 are data to be input to an API, if said API is to cause invocation 2602 to be performed.

In at least one embodiment, an example instruction indicating operation 2600 in a parallel computing environment, such as compute uniform device architecture (CUDA), is as follows:

cudaGraphUpdateEdgeData(sourceNode, destinationNode, edgeInformaiton) where sourceNode corresponds to source node 2604, destinationNode corresponds to destination node 2608, and edgeInformation corresponds to edge information 2606.

In at least one embodiment, response 2620 generates, as output, parameters 2622 comprising a status 2622. In at least one embodiment, status 2622 is data comprising any other information presented by operation 2600. In at least one embodiment, status 2622 is data to be output in response to a function call, if said function call is to perform invocation 2602. In at least one embodiment, status 2622 is data to be output by an API, if said API is to cause invocation 2602 to be performed. In at least one embodiment, status 2622 indicates that operation 2600 was performed successfully. In at least one embodiment, status 2622 indicates that operation 2600 was not performed successfully, or otherwise failed.

Figure 27:
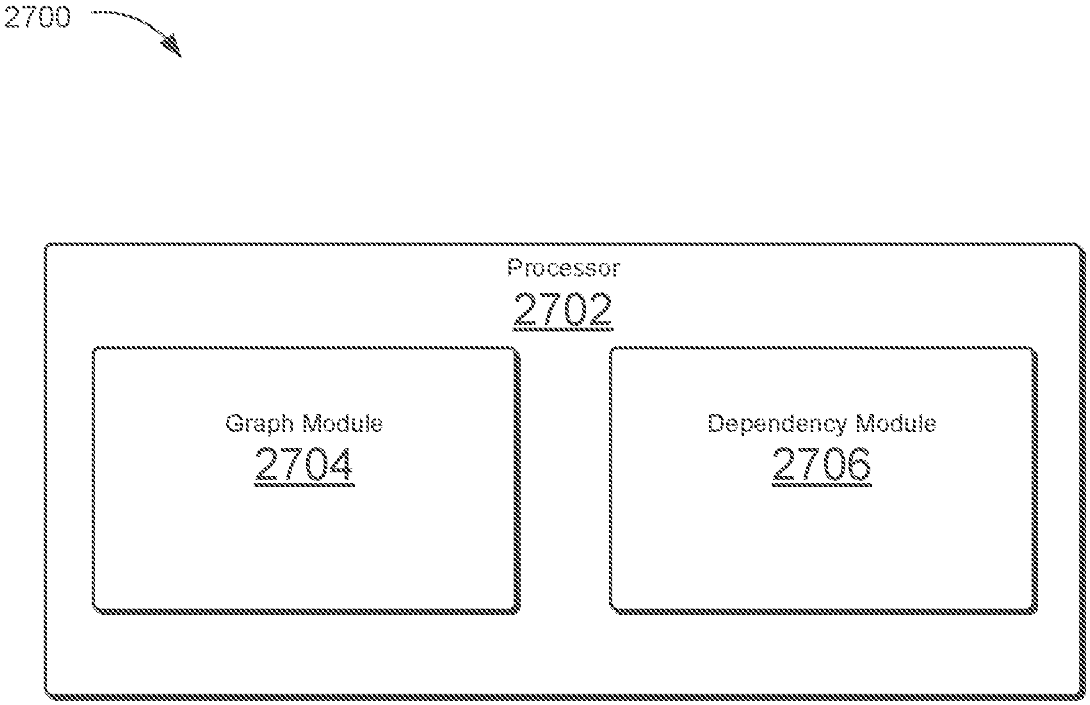
FIG. 27 illustrates an example of a processor, according to at least one embodiment.

FIG. 27 illustrates an example 2700 of a processor, according to at least one embodiment. In at least one embodiment, a processor 2702 performs one or more processes such as those described herein to prevent one or more dependencies from being added to two or more threads. In at least one embodiment, processor 2702 performs one or more operations and/or processes as described in connection with FIG. 1. In at least one embodiment, processor 2702 performs one or more processes such as those described in connection with FIGS. 1-26.

In at least one embodiment, processor 2702 comprises one or more processors such as those described in connection with FIGS. 34-46. In at least one embodiment, processor 2702 is any suitable processing unit and/or combination of processing units, such as one or more CPUs, GPUs, GPGPUs, PPUs, and/or variations thereof. In at least one embodiment, processor 2702 comprises a graph module 2704 and/or a dependency module 2706. In at least one embodiment, graph module 2704 and/or dependency module 2706 are part of processor 2702 and/or one or more other processors. In at least one embodiment, graph module 2704 and/or dependency module 2706 are distributed among multiple processors that communicate over a bus, network, by writing to shared memory, and/or any suitable communication process such as those described herein.

In at least one embodiment, as used in any implementation described herein, unless otherwise clear from context or stated explicitly to contrary, a module refers to any combination of software logic, firmware logic, hardware logic, and/or circuitry configured to provide functionality described herein. In at least one embodiment, software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth. In at least one embodiment, a module performs one or more processes in connection with any suitable processing unit and/or combination of processing units, such as one or more CPUs, GPUs, GPGPUs, PPUs, and/or variations thereof.

In at least one embodiment, graph module 2704 is a module that generates and/or accesses one or more graphs. In at least one embodiment, graph module 2704 performs one or more processes such as those described herein by at least including or otherwise encoding instructions that cause performance of or otherwise can be utilized to perform said one or more processes (e.g., by processor 2702). In at least one embodiment, graph module 2704 obtains or is otherwise provided with one or more graph nodes (e.g., by one or more systems such as those described in connection with FIG. 1). In at least one embodiment, graph module 2704 adds, removes, and/or modifies one or more graph nodes through one or more processes such as those described in connection with FIGS. 1-26. In at least one embodiment, graph module 2704 creates and/or executes a graph, such as those described in connection with FIG. 1.

In at least one embodiment, dependency module 2706 is a module that generates, removes, and/or modifies one or more dependencies. In at least one embodiment, dependency module 2706 performs one or more processes such as those described herein by at least including or otherwise encoding instructions that cause performance of or otherwise can be utilized to perform said one or more processes (e.g., by processor 2702). In at least one embodiment, dependency module 2706 accesses one or more dependencies of one or more operations in connection with graph module 2704. In at least one embodiment, dependency module 2706 generates one or more dependencies between two or more nodes of a graph. In at least one embodiment, dependency module 2706 handles dependencies corresponding to one or more operations through one or more processes such as those described in connection with FIGS. 1-26.

Data Center

Figure 28:
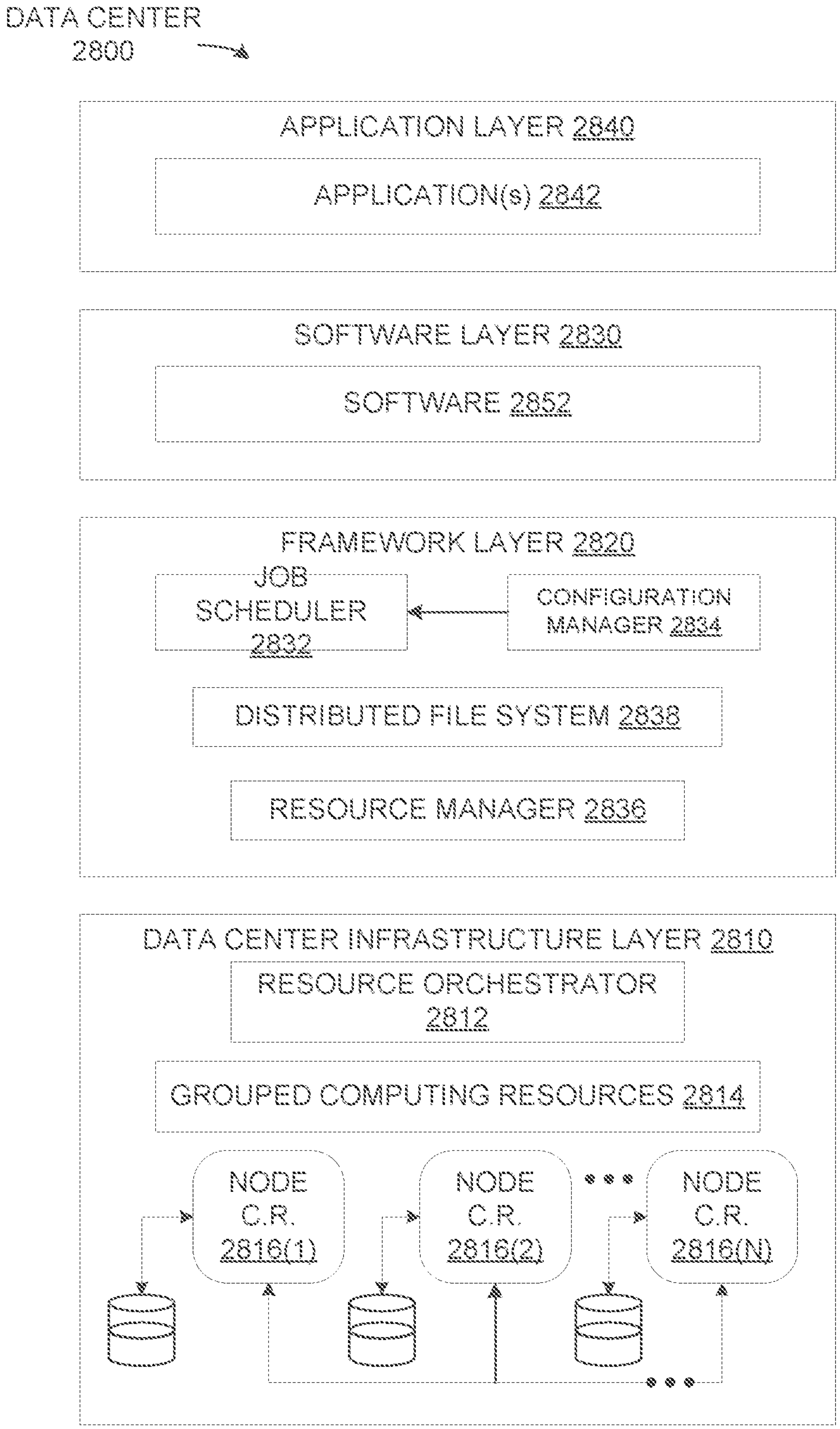
FIG. 28 illustrates an exemplary data center, in accordance with at least one embodiment.

FIG. 28 illustrates an exemplary data center 2800, in accordance with at least one embodiment. In at least one embodiment, data center 2800 includes, without limitation, a data center infrastructure layer 2810, a framework layer 2820, a software layer 2830 and an application layer 2840.

In at least one embodiment, as shown in FIG. 28, data center infrastructure layer 2810 may include a resource orchestrator 2812, grouped computing resources 2814, and node computing resources ("node C.R.s") 2816(1)-2816(N), where "N" represents any whole, positive integer. In at least one embodiment, node C.R.s 2816(1)-2816(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 2816(1)-2816(N) may be a server having one or more of above-mentioned computing resources.

In at least one embodiment, grouped computing resources 2814 may include separate groupings of node C.R.s housed within one or more racks (not shown), or many racks housed in data centers at various geographical locations (also not shown). Separate groupings of node C.R.s within grouped computing resources 2814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 2812 may configure or otherwise control one or more node C.R.s 2816(1)-2816(N) and/or grouped computing resources 2814. In at least one embodiment, resource orchestrator 2812 may include a software design infrastructure ("SDI") management entity for data center 2800. In at least one embodiment, resource orchestrator 2812 may include hardware, software or some combination thereof.

In at least one embodiment, as shown in FIG. 28, framework layer 2820 includes, without limitation, a job scheduler 2832, a configuration manager 2834, a resource manager 2836 and a distributed file system 2838. In at least one embodiment, framework layer 2820 may include a framework to support software 2852 of software layer 2830 and/or one or more application(s) 2842 of application layer 2840. In at least one embodiment, software 2852 or application(s) 2842 may respectively include web-based service software or applications, such as those provided by Amazon Web Services, Google Cloud and Microsoft Azure. In at least one embodiment, framework layer 2820 may be, but is not limited to, a type of free and open-source software web application framework such as Apache Spark™ (hereinafter "Spark") that may utilize distributed file system 2838 for large-scale data processing (e.g., "big data"). In at least one embodiment, job scheduler 2832 may include a Spark driver to facilitate scheduling of workloads supported by various layers of data center 2800. In at least one embodiment, configuration manager 2834 may be capable of configuring different layers such as software layer 2830 and framework layer 2820, including Spark and distributed file system 2838 for supporting large-scale data processing. In at least one embodiment, resource manager 2836 may be capable of managing clustered or grouped computing resources mapped to or allocated for support of distributed file system 2838 and job scheduler 2832. In at least one embodiment, clustered or grouped computing resources may include grouped computing resource 2814 at data center infrastructure layer 2810. In at least one embodiment, resource manager 2836 may coordinate with resource orchestrator 2812 to manage these mapped or allocated computing resources.

In at least one embodiment, software 2852 included in software layer 2830 may include software used by at least portions of node C.R.s 2816(1)-2816(N), grouped computing resources 2814, and/or distributed file system 2838 of framework layer 2820. One or more types of software may include, but are not limited to, Internet web page search software, e-mail virus scan software, database software, and streaming video content software.

In at least one embodiment, application(s) 2842 included in application layer 2840 may include one or more types of applications used by at least portions of node C.R.s 2816(1)-2816(N), grouped computing resources 2814, and/or distributed file system 2838 of framework layer 2820. In at least one or more types of applications may include, without limitation, CUDA applications.

In at least one embodiment, any of configuration manager 2834, resource manager 2836, and resource orchestrator 2812 may implement any number and type of self-modifying actions based on any amount and type of data acquired in any technically feasible fashion. In at least one embodiment, self-modifying actions may relieve a data center operator of data center 2800 from making possibly bad configuration decisions and possibly avoiding underutilized and/or poor performing portions of a data center.

In at least one embodiment, at least one component shown or described with respect to FIG. 28 is utilized to implement techniques and/or functions described in connection with FIGS. 1-27. In at least one embodiment, at least one component of FIG. 28 is used to identify, generate, remove, process, and/or modify one or more graph dependencies. In at least one embodiment, at least one component of FIG. 28 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operation 600-2600 of FIGS. 6-26, and/or processor 2700 of FIG. 27.

Computer-Based Systems

The following figures set forth, without limitation, exemplary computer-based systems that can be used to implement at least one embodiment.

Figure 29:
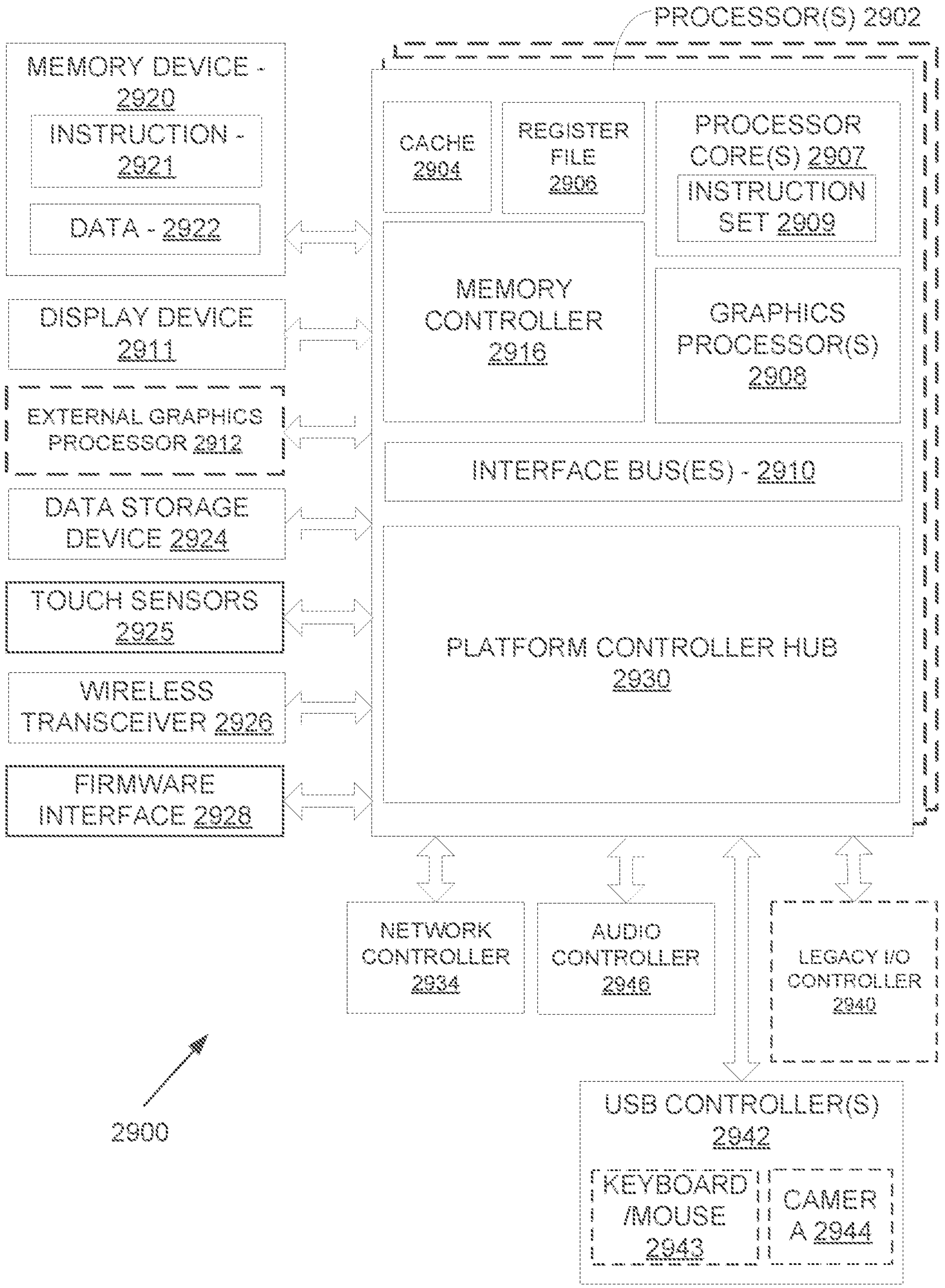
FIG. 29 illustrates a processing system, in accordance with at least one embodiment.

FIG. 29 illustrates a processing system 2900, in accordance with at least one embodiment. In at least one embodiment, processing system 2900 includes one or more processors 2902 and one or more graphics processors 2908, and may be a single processor desktop system, a multiprocessor workstation system, or a server system having a large number of processors 2902 or processor cores 2907. In at least one embodiment, processing system 2900 is a processing platform incorporated within a system-on-a-chip ("SoC") integrated circuit for use in mobile, handheld, or embedded devices. In at least one embodiment, a processors core 2907 is referred to as a computing unit or compute unit.

In at least one embodiment, processing system 2900 can include, or be incorporated within a server-based gaming platform, a game console, a media console, a mobile gaming console, a handheld game console, or an online game console. In at least one embodiment, processing system 2900 is a mobile phone, smart phone, tablet computing device or mobile Internet device. In at least one embodiment, processing system 2900 can also include, couple with, or be integrated within a wearable device, such as a smart watch wearable device, smart eyewear device, augmented reality device, or virtual reality device. In at least one embodiment, processing system 2900 is a television or set top box device having one or more processors 2902 and a graphical interface generated by one or more graphics processors 2908.

In at least one embodiment, one or more processors 2902 each include one or more processor cores 2907 to process instructions which, when executed, perform operations for system and user software. In at least one embodiment, each of one or more processor cores 2907 is configured to process a specific instruction set 2909. In at least one embodiment, instruction set 2909 may facilitate Complex Instruction Set Computing ("CISC"), Reduced Instruction Set Computing ("RISC"), or computing via a Very Long Instruction Word ("VLIW"). In at least one embodiment, processor cores 2907 may each process a different instruction set 2909, which may include instructions to facilitate emulation of other instruction sets. In at least one embodiment, processor core 2907 may also include other processing devices, such as a digital signal processor ("DSP").

In at least one embodiment, processor 2902 includes cache memory ('cache") 2904. In at least one embodiment, processor 2902 can have a single internal cache or multiple levels of internal cache. In at least one embodiment, cache memory is shared among various components of processor 2902. In at least one embodiment, processor 2902 also uses an external cache (e.g., a Level 3 ("L3") cache or Last Level Cache ("LLC")) (not shown), which may be shared among processor cores 2907 using known cache coherency techniques. In at least one embodiment, register file 2906 is additionally included in processor 2902 which may include different types of registers for storing different types of data (e.g., integer registers, floating point registers, status registers, and an instruction pointer register). In at least one embodiment, register file 2906 may include general-purpose registers or other registers.

In at least one embodiment, one or more processor(s) 2902 are coupled with one or more interface bus(es) 2910 to transmit communication signals such as address, data, or control signals between processor 2902 and other components in processing system 2900. In at least one embodiment interface bus 2910, in one embodiment, can be a processor bus, such as a version of a Direct Media Interface ("DMI") bus. In at least one embodiment, interface bus 2910 is not limited to a DMI bus, and may include one or more Peripheral Component Interconnect buses (e.g., "PCI," PCI Express ("PCIe")), memory buses, or other types of interface buses. In at least one embodiment processor(s) 2902 include an integrated memory controller 2916 and a platform controller hub 2930. In at least one embodiment, memory controller 2916 facilitates communication between a memory device and other components of processing system 2900, while platform controller hub ("PCH") 2930 provides connections to Input/Output ("I/O") devices via a local I/O bus.

In at least one embodiment, memory device 2920 can be a dynamic random access memory ("DRAM") device, a static random access memory ("SRAM") device, flash memory device, phase-change memory device, or some other memory device having suitable performance to serve as processor memory. In at least one embodiment memory device 2920 can operate as system memory for processing system 2900, to store data 2922 and instructions 2921 for use when one or more processors 2902 executes an application or process. In at least one embodiment, memory controller 2916 also couples with an optional external graphics processor 2912, which may communicate with one or more graphics processors 2908 in processors 2902 to perform graphics and media operations. In at least one embodiment, a display device 2911 can connect to processor(s) 2902. In at least one embodiment display device 2911 can include one or more of an internal display device, as in a mobile electronic device or a laptop device or an external display device attached via a display interface (e.g., DisplayPort, etc.). In at least one embodiment, display device 2911 can include a head mounted display ("HMD") such as a stereoscopic display device for use in virtual reality ("VR") applications or augmented reality ("AR") applications.

In at least one embodiment, platform controller hub 2930 enables peripherals to connect to memory device 2920 and processor 2902 via a high-speed I/O bus. In at least one embodiment, I/O peripherals include, but are not limited to, an audio controller 2946, a network controller 2934, a firmware interface 2928, a wireless transceiver 2926, touch sensors 2925, a data storage device 2924 (e.g., hard disk drive, flash memory, etc.). In at least one embodiment, data storage device 2924 can connect via a storage interface (e.g., SATA) or via a peripheral bus, such as PCI, or PCIe. In at least one embodiment, touch sensors 2925 can include touch screen sensors, pressure sensors, or fingerprint sensors. In at least one embodiment, wireless transceiver 2926 can be a Wi-Fi transceiver, a Bluetooth transceiver, or a mobile network transceiver such as a 3G, 4G, or Long Term Evolution ("LTE") transceiver. In at least one embodiment, firmware interface 2928 enables communication with system firmware, and can be, for example, a unified extensible firmware interface ("UEFI"). In at least one embodiment, network controller 2934 can enable a network connection to a wired network. In at least one embodiment, a high-performance network controller (not shown) couples with interface bus 2910. In at least one embodiment, audio controller 2946 is a multi-channel high definition audio controller. In at least one embodiment, processing system 2900 includes an optional legacy I/O controller 2940 for coupling legacy (e.g., Personal System 2 ("PS/2")) devices to processing system 2900. In at least one embodiment, platform controller hub 2930 can also connect to one or more Universal Serial Bus ("USB") controllers 2942 connect input devices, such as keyboard and mouse 2943 combinations, a camera 2944, or other USB input devices.

In at least one embodiment, an instance of memory controller 2916 and platform controller hub 2930 may be integrated into a discreet external graphics processor, such as external graphics processor 2912. In at least one embodiment, platform controller hub 2930 and/or memory controller 2916 may be external to one or more processor(s) 2902. For example, in at least one embodiment, processing system 2900 can include an external memory controller 2916 and platform controller hub 2930, which may be configured as a memory controller hub and peripheral controller hub within a system chipset that is in communication with processor(s) 2902.

In at least one embodiment, at least one component shown or described with respect to FIG. 29 is utilized to implement techniques and/or functions described in connection with FIGS. 1-27. In at least one embodiment, at least one component of FIG. 29 is used to identify, generate, remove, process, and/or modify one or more graph dependencies. In at least one embodiment, at least one component of FIG. 29 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operation 600-2600 of FIGS. 6-26, and/or processor 2700 of FIG. 27.

Figure 30:
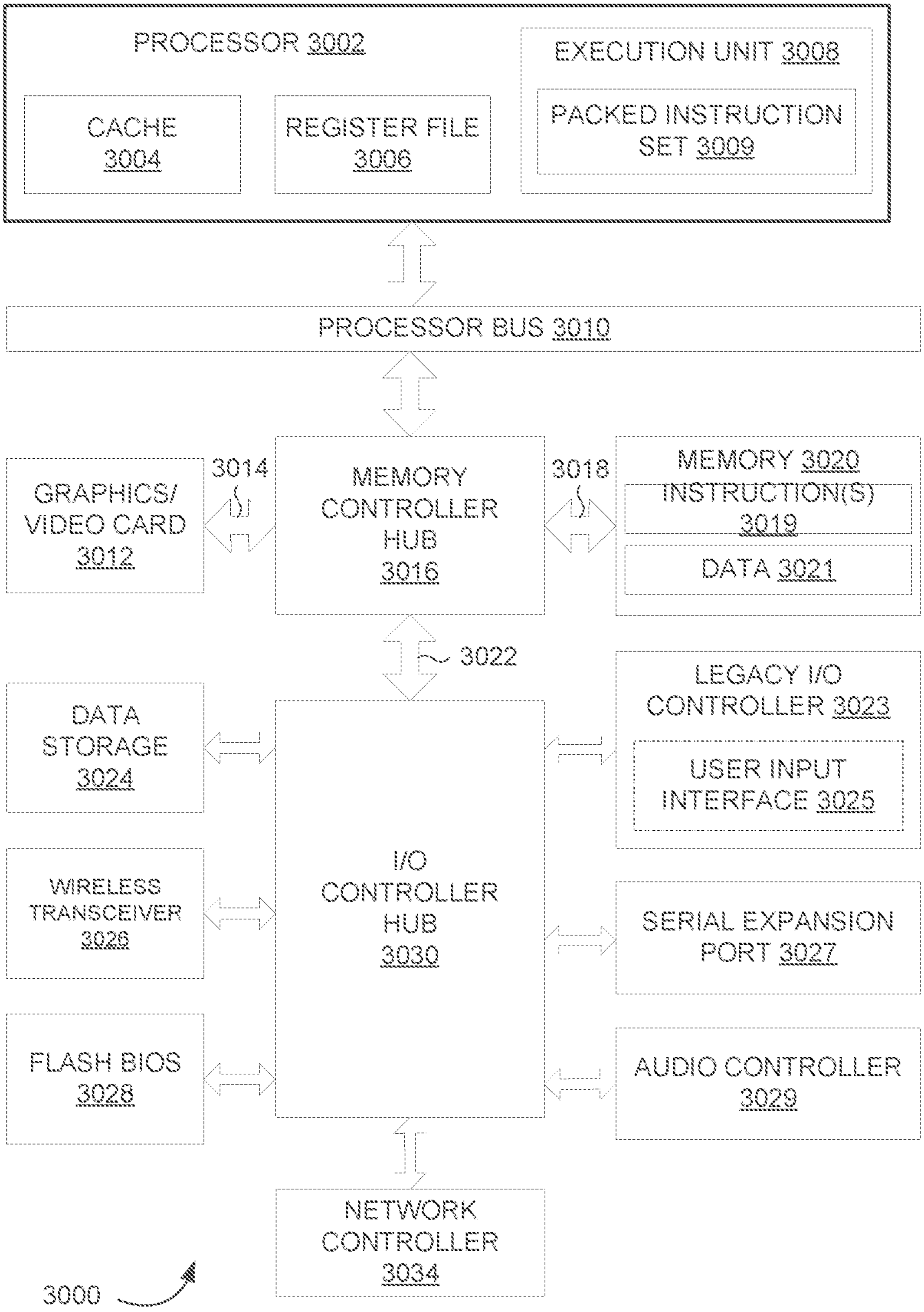
FIG. 30 illustrates a computer system, in accordance with at least one embodiment.

FIG. 30 illustrates a computer system 3000, in accordance with at least one embodiment. In at least one embodiment, computer system 3000 may be a system with interconnected devices and components, an SOC, or some combination. In at least on embodiment, computer system 3000 is formed with a processor 3002 that may include execution units to execute an instruction. In at least one embodiment, computer system 3000 may include, without limitation, a component, such as processor 3002 to employ execution units including logic to perform algorithms for processing data. In at least one embodiment, computer system 3000 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 3000 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 3000 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 3000 may include, without limitation, processor 3002 that may include, without limitation, one or more execution units 3008 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 3000 is a single processor desktop or server system. In at least one embodiment, computer system 3000 may be a multiprocessor system. In at least one embodiment, processor 3002 may include, without limitation, a CISC microprocessor, a RISC microprocessor, a VLIW microprocessor, a processor implementing a combination of instruction sets, or any other processor device, such as a digital signal processor, for example. In at least one embodiment, processor 3002 may be coupled to a processor bus 3010 that may transmit data signals between processor 3002 and other components in computer system 3000.

In at least one embodiment, processor 3002 may include, without limitation, a Level 1 ("L1") internal cache memory ("cache") 3004. In at least one embodiment, processor 3002 may have a single internal cache or multiple levels of internal cache. In at least one embodiment, cache memory may reside external to processor 3002. In at least one embodiment, processor 3002 may also include a combination of both internal and external caches. In at least one embodiment, a register file 3006 may store different types of data in various registers including, without limitation, integer registers, floating point registers, status registers, and instruction pointer register.

In at least one embodiment, execution unit 3008, including, without limitation, logic to perform integer and floating point operations, also resides in processor 3002. Processor 3002 may also include a microcode ("ucode") read only memory ("ROM") that stores microcode for certain macro instructions. In at least one embodiment, execution unit 3008 may include logic to handle a packed instruction set 3009. In at least one embodiment, by including packed instruction set 3009 in an instruction set of a general-purpose processor 3002, along with associated circuitry to execute instructions, operations used by many multimedia applications may be performed using packed data in a general-purpose processor 3002. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 3008 may also be used in microcontrollers, embedded processors, graphics devices, DSPs, and other types of logic circuits. In at least one embodiment, computer system 3000 may include, without limitation, a memory 3020. In at least one embodiment, memory 3020 may be implemented as a DRAM device, an SRAM device, flash memory device, or other memory device. Memory 3020 may store instruction(s) 3019 and/or data 3021 represented by data signals that may be executed by processor 3002.

In at least one embodiment, a system logic chip may be coupled to processor bus 3010 and memory 3020. In at least one embodiment, the system logic chip may include, without limitation, a memory controller hub ("MCH") 3016, and processor 3002 may communicate with MCH 3016 via processor bus 3010. In at least one embodiment, MCH 3016 may provide a high bandwidth memory path 3018 to memory 3020 for instruction and data storage and for storage of graphics commands, data and textures. In at least one embodiment, MCH 3016 may direct data signals between processor 3002, memory 3020, and other components in computer system 3000 and to bridge data signals between processor bus 3010, memory 3020, and a system I/O 3022. In at least one embodiment, system logic chip may provide a graphics port for coupling to a graphics controller. In at least one embodiment, MCH 3016 may be coupled to memory 3020 through high bandwidth memory path 3018 and graphics/video card 3012 may be coupled to MCH 3016 through an Accelerated Graphics Port ("AGP") interconnect 3014.

In at least one embodiment, computer system 3000 may use system I/O 3022 that is a proprietary hub interface bus to couple MCH 3016 to I/O controller hub ("ICH") 3030. In at least one embodiment, ICH 3030 may provide direct connections to some I/O devices via a local I/O bus. In at least one embodiment, local I/O bus may include, without limitation, a high-speed I/O bus for connecting peripherals to memory 3020, a chipset, and processor 3002. Examples may include, without limitation, an audio controller 3029, a firmware hub ("flash BIOS") 3028, a wireless transceiver 3026, a data storage 3024, a legacy I/O controller 3023 containing a user input interface 3025 and a keyboard interface, a serial expansion port 3027, such as a USB, and a network controller 3034. Data storage 3024 may comprise a hard disk drive, a floppy disk drive, a CD-ROM device, a flash memory device, or other mass storage device.

In at least one embodiment, FIG. 30 illustrates a system, which includes interconnected hardware devices or "chips."

In at least one embodiment, FIG. 30 may illustrate an exemplary SoC. In at least one embodiment, devices illustrated in FIG. 30 may be interconnected with proprietary interconnects, standardized interconnects (e.g., PCIe), or some combination thereof. In at least one embodiment, one or more components of system 3000 are interconnected using compute express link ("CXL") interconnects.

In at least one embodiment, at least one component shown or described with respect to FIG. 30 is utilized to implement techniques and/or functions described in connection with FIGS. 1-27. In at least one embodiment, at least one component of FIG. 30 is used to identify, generate, remove, process, and/or modify one or more graph dependencies. In at least one embodiment, at least one component of FIG. 30 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operation 600-2600 of FIGS. 6-26, and/or processor 2700 of FIG. 27.

Figure 31:
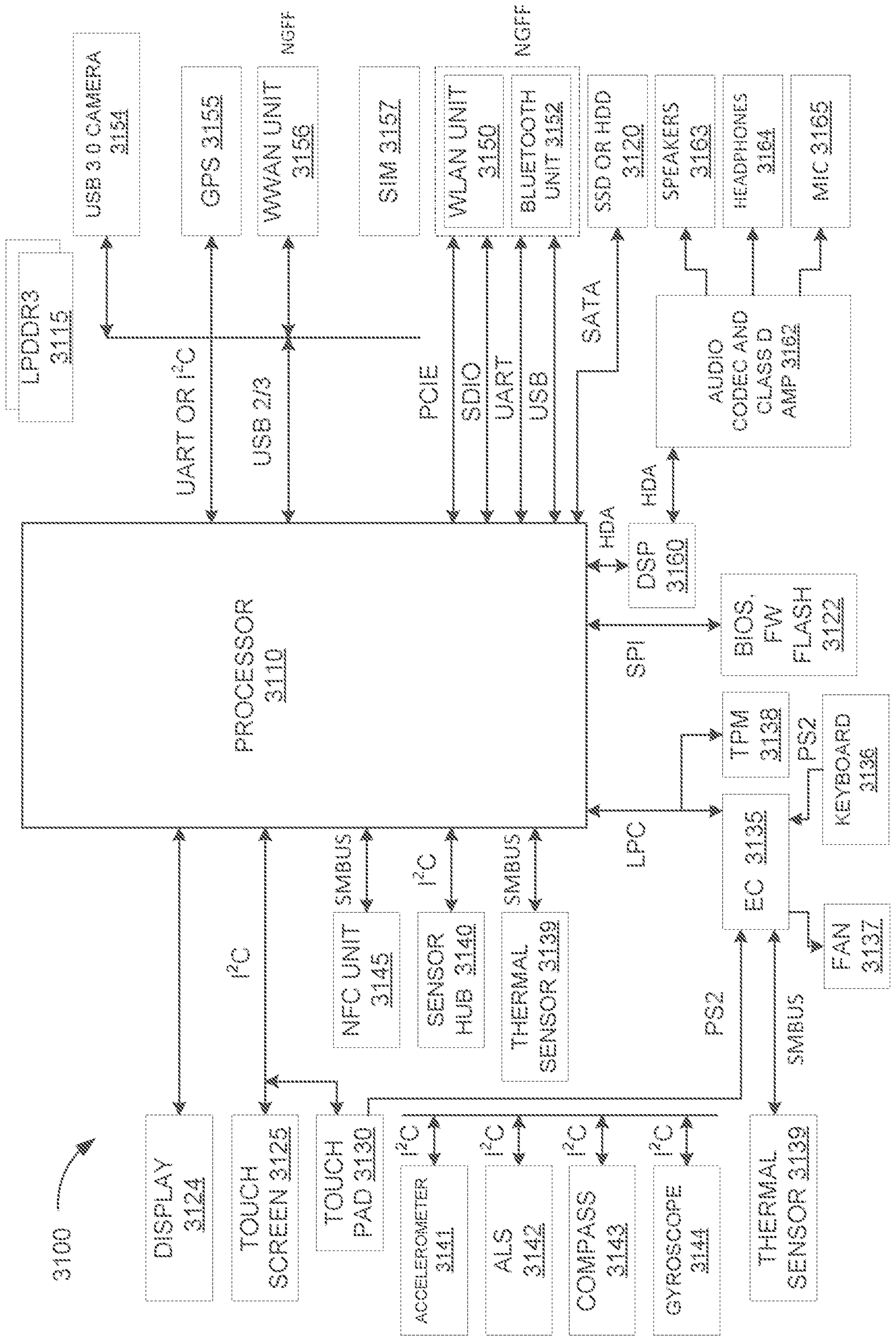
FIG. 31 illustrates a system, in accordance with at least one embodiment.

FIG. 31 illustrates a system 3100, in accordance with at least one embodiment. In at least one embodiment, system 3100 is an electronic device that utilizes a processor 3110. In at least one embodiment, system 3100 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 3100 may include, without limitation, processor 3110 communicatively coupled to any suitable number or kind of components, peripherals, modules, or devices. In at least one embodiment, processor 3110 is coupled using a bus or interface, such as an $I^2C$ bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 31 illustrates a system which includes interconnected hardware devices or "chips." In at least one embodiment, FIG. 31 may illustrate an exemplary SoC. In at least one embodiment, devices illustrated in FIG. 31 may be interconnected with proprietary interconnects, standardized interconnects (e.g., PCIe) or some combination thereof. In at least one embodiment, one or more components of FIG. 31 are interconnected using CXL interconnects.

In at least one embodiment, FIG. 31 may include a display 3124, a touch screen 3125, a touch pad 3130, a Near Field Communications unit ("NFC") 3145, a sensor hub 3140, a thermal sensor 3146, an Express Chipset ("EC") 3135, a Trusted Platform Module ("TPM") 3138, BIOS/firmware/flash memory ("BIOS, FW Flash") 3122, a DSP 3160, a Solid State Disk ("SSD") or Hard Disk Drive ("HDD") 3120, a wireless local area network unit ("WLAN") 3150, a Bluetooth unit 3152, a Wireless Wide Area Network unit ("WWAN") 3156, a Global Positioning System ("GPS") 3155, a camera ("USB 3.0 camera") 3154 such as a USB 3.0 camera, or a Low Power Double Data Rate ("LPDDR") memory unit ("LPDDR3") 3115 implemented in, for example, LPDDR3 standard. These components may each be implemented in any suitable manner.

In at least one embodiment, other components may be communicatively coupled to processor 3110 through components discussed above. In at least one embodiment, an accelerometer 3141, an Ambient Light Sensor ("ALS") 3142, a compass 3143, and a gyroscope 3144 may be communicatively coupled to sensor hub 3140. In at least one embodiment, a thermal sensor 3139, a fan 3137, a keyboard 3136, and a touch pad 3130 may be communicatively coupled to EC 3135. In at least one embodiment, a speaker 3163, a headphones 3164, and a microphone ("mic") 3165 may be communicatively coupled to an audio unit ("audio codec and class d amp") 3162, which may in turn be communicatively coupled to DSP 3160. In at least one embodiment, audio unit 3162 may include, for example and without limitation, an audio coder/decoder ("codec") and a class D amplifier. In at least one embodiment, a SIM card ("SIM") 3157 may be communicatively coupled to WWAN unit 3156. In at least one embodiment, components such as WLAN unit 3150 and Bluetooth unit 3152, as well as WWAN unit 3156 may be implemented in a Next Generation Form Factor ("NGFF").

In at least one embodiment, at least one component shown or described with respect to FIG. 31 is utilized to implement techniques and/or functions described in connection with FIGS. 1-27. In at least one embodiment, at least one component of FIG. 31 is used to identify, generate, remove, process, and/or modify one or more graph dependencies. In at least one embodiment, at least one component of FIG. 31 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operation 600-2600 of FIGS. 6-26, and/or processor 2700 of FIG. 27.

Figure 32:
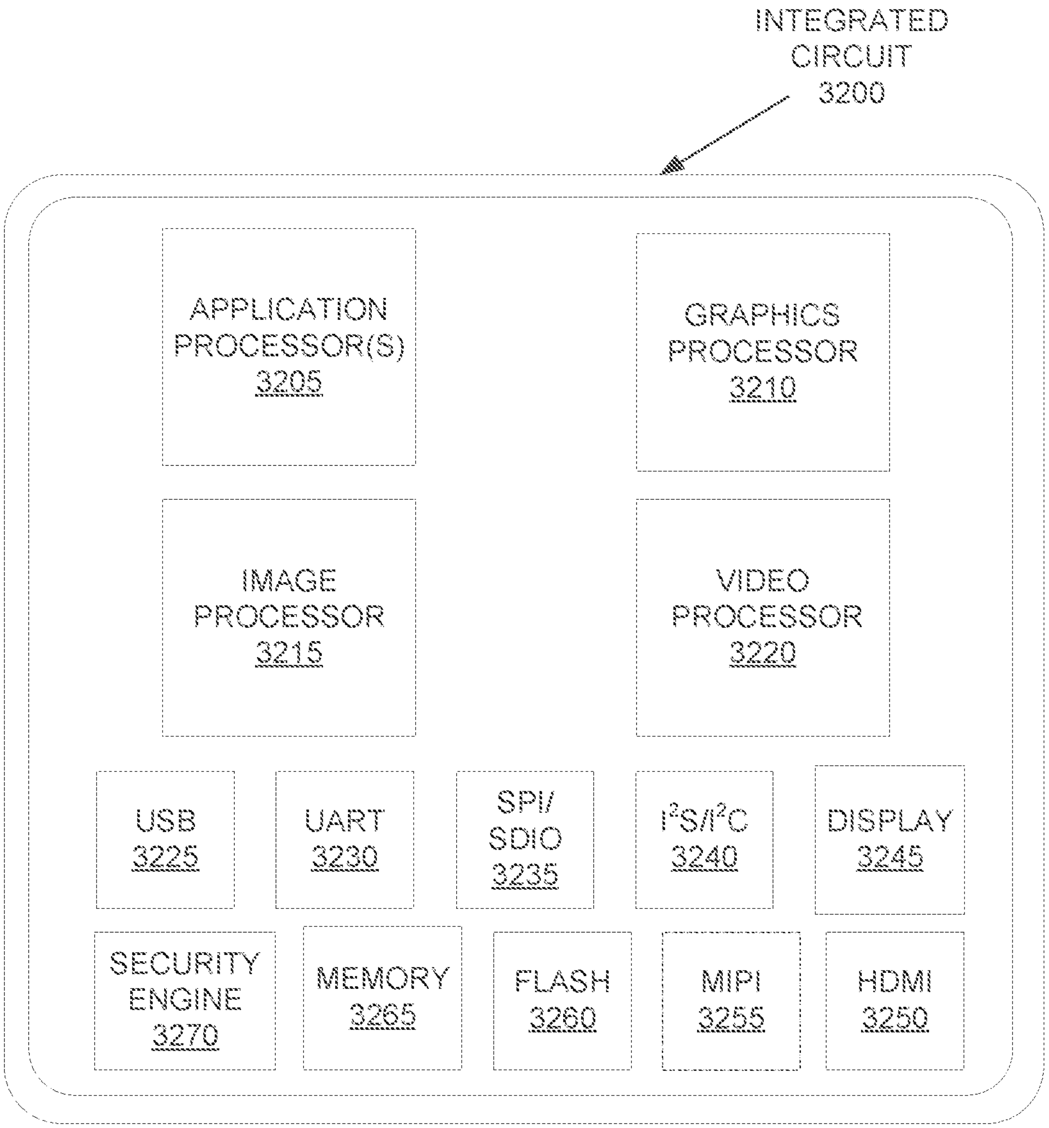
FIG. 32 illustrates an exemplary integrated circuit, in accordance with at least one embodiment.

FIG. 32 illustrates an exemplary integrated circuit 3200, in accordance with at least one embodiment. In at least one embodiment, exemplary integrated circuit 3200 is an SoC that may be fabricated using one or more IP cores. In at least one embodiment, integrated circuit 3200 includes one or more application processor(s) 3205 (e.g., CPUs, DPUs), at least one graphics processor 3210, and may additionally include an image processor 3215 and/or a video processor 3220, any of which may be a modular IP core. In at least one embodiment, integrated circuit 3200 includes peripheral or bus logic including a USB controller 3225, a UART controller 3230, an SPI/SDIO controller 3235, and an $I^2S/I^2C$ controller 3240. In at least one embodiment, integrated circuit 3200 can include a display device 3245 coupled to one or more of a high-definition multimedia interface ("HDMI") controller 3250 and a mobile industry processor interface ("MIPI") display interface 3255. In at least one embodiment, storage may be provided by a flash memory subsystem 3260 including flash memory and a flash memory controller. In at least one embodiment, a memory interface may be provided via a memory controller 3265 for access to SDRAM or SRAM memory devices. In at least one embodiment, some integrated circuits additionally include an embedded security engine 3270.

Figure 33:
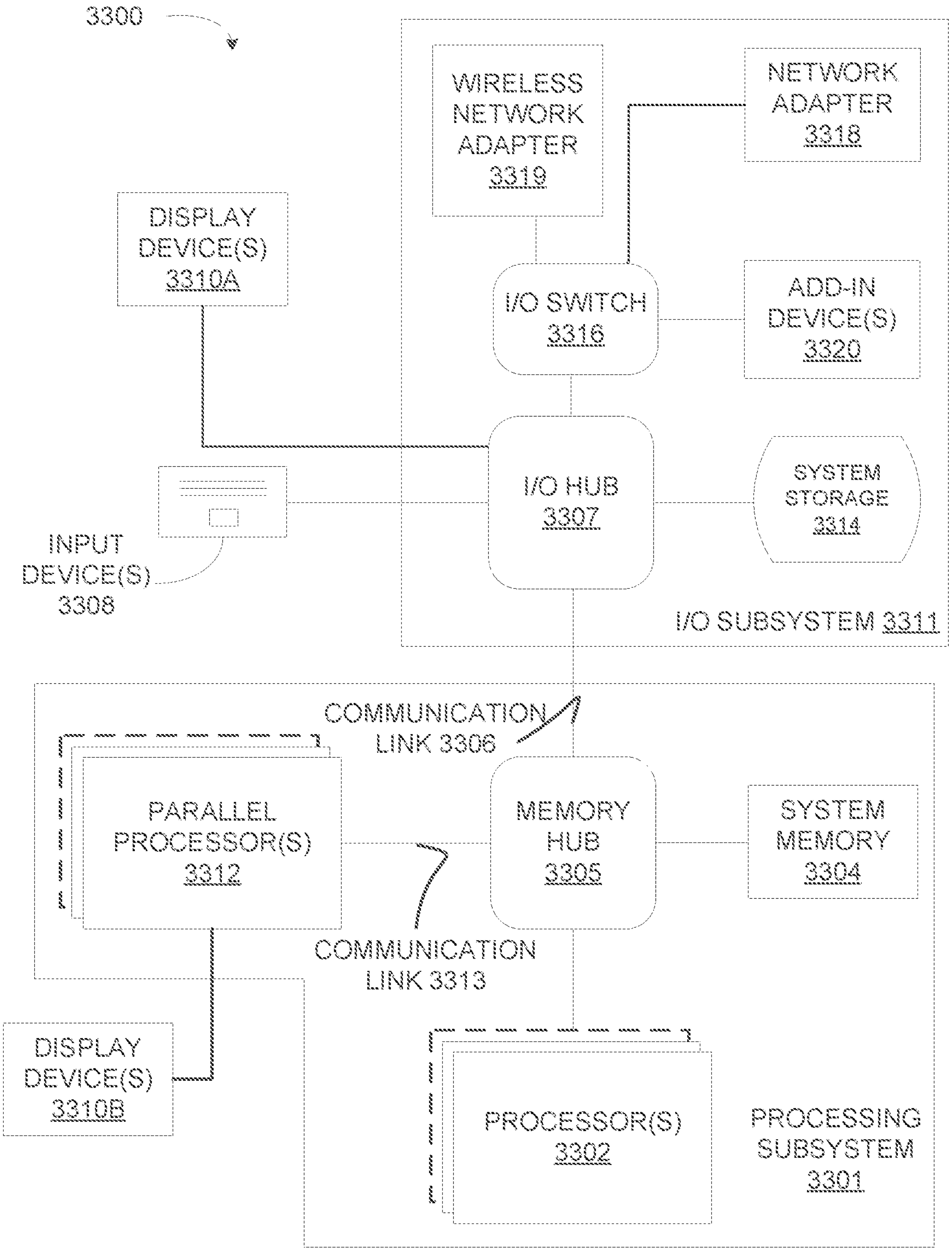
FIG. 33 illustrates a computing system, according to at least one embodiment.

FIG. 33 illustrates a computing system 3300, according to at least one embodiment; In at least one embodiment, computing system 3300 includes a processing subsystem 3301 having one or more processor(s) 3302 and a system memory 3304 communicating via an interconnection path that may include a memory hub 3305. In at least one embodiment, memory hub 3305 may be a separate component within a chipset component or may be integrated within one or more processor(s) 3302. In at least one embodiment, memory hub 3305 couples with an I/O subsystem 3311 via a communication link 3306. In at least one embodiment, I/O subsystem 3311 includes an I/O hub 3307 that can enable computing system 3300 to receive input from one or more input device(s) 3308. In at least one embodiment, I/O hub 3307 can enable a display controller, which may be included in one or more processor(s) 3302, to provide outputs to one or more display device(s) 3310A. In at least one embodiment, one or more display device(s) 3310A coupled with I/O hub 3307 can include a local, internal, or embedded display device.

In at least one embodiment, processing subsystem 3301 includes one or more parallel processor(s) 3312 coupled to memory hub 3305 via a bus or other communication link 3313. In at least one embodiment, communication link 3313 may be one of any number of standards based communication link technologies or protocols, such as, but not limited to PCIe, or may be a vendor specific communications interface or communications fabric. In at least one embodiment, one or more parallel processor(s) 3312 form a computationally focused parallel or vector processing system that can include a large number of processing cores and/or processing clusters, such as a many integrated core processor or compute units. In at least one embodiment, one or more parallel processor(s) 3312 form a graphics processing subsystem that can output pixels to one of one or more display device(s) 3310A coupled via I/O Hub 3307. In at least one embodiment, one or more parallel processor(s) 3312 can also include a display controller and display interface (not shown) to enable a direct connection to one or more display device(s) 3310B.

In at least one embodiment, a system storage unit 3314 can connect to I/O hub 3307 to provide a storage mechanism for computing system 3300. In at least one embodiment, an I/O switch 3316 can be used to provide an interface mechanism to enable connections between I/O hub 3307 and other components, such as a network adapter 3318 and/or wireless network adapter 3319 that may be integrated into a platform, and various other devices that can be added via one or more add-in device(s) 3320. In at least one embodiment, network adapter 3318 can be an Ethernet adapter or another wired network adapter. In at least one embodiment, wireless network adapter 3319 can include one or more of a Wi-Fi, Bluetooth, NFC, or other network device that includes one or more wireless radios.

In at least one embodiment, computing system 3300 can include other components not explicitly shown, including USB or other port connections, optical storage drives, video capture devices, and the like, that may also be connected to I/O hub 3307. In at least one embodiment, communication paths interconnecting various components in FIG. 33 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 3312 incorporate circuitry optimized for graphics and video processing, including, for example, video output circuitry, and constitutes a graphics processing unit ("GPU"). In at least one embodiment, one or more parallel processor(s) 3312 incorporate circuitry optimized for general purpose processing. In at least embodiment, components of computing system 3300 may be integrated with one or more other system elements on a single integrated circuit. For example, in at least one embodiment, one or more parallel processor(s) 3312, memory hub 3305, processor(s) 3302, and I/O hub 3307 can be integrated into an SoC integrated circuit. In at least one embodiment, components of computing system 3300 can be integrated into a single package to form a system in package ("SIP") configuration. In at least one embodiment, at least a portion of the components of computing system 3300 can be integrated into a multi-chip module ("MCM"), which can be interconnected with other multi-chip modules into a modular computing system. In at least one embodiment, I/O subsystem 3311 and display devices 3310B are omitted from computing system 3300.

In at least one embodiment, at least one component shown or described with respect to FIG. 33 is utilized to implement techniques and/or functions described in connection with FIGS. 1-27. In at least one embodiment, at least one component of FIG. 33 is used to identify, generate, remove, process, and/or modify one or more graph dependencies. In at least one embodiment, at least one component of FIG. 33 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operation 600-2600 of FIGS. 6-26, and/or processor 2700 of FIG. 27.

Processing Systems

The following figures set forth, without limitation, exemplary processing systems that can be used to implement at least one embodiment.

Figure 34:
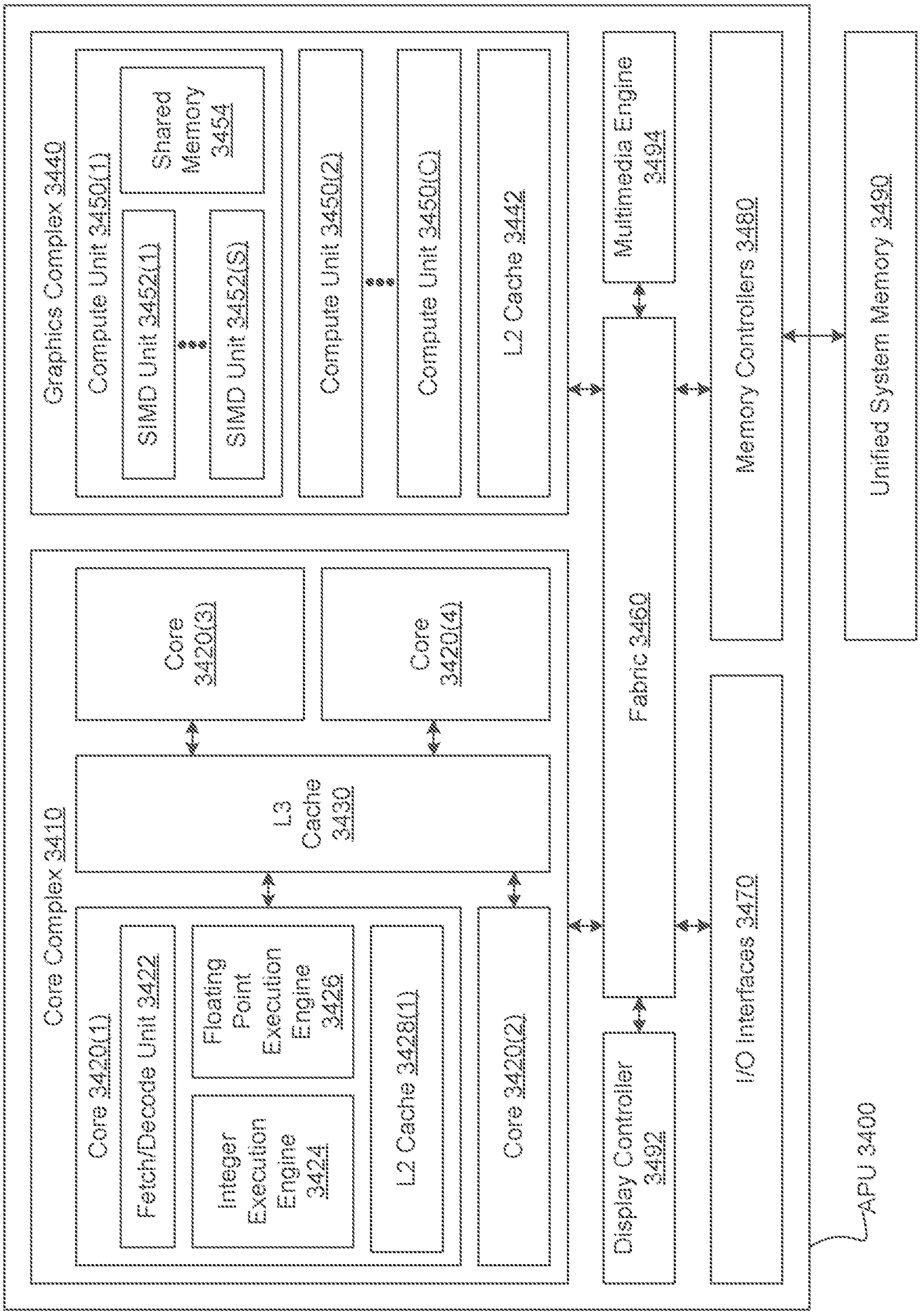
FIG. 34 illustrates an APU, in accordance with at least one embodiment.

FIG. 34 illustrates an accelerated processing unit ("APU") 3400, in accordance with at least one embodiment. In at least one embodiment, APU 3400 is developed by AMD Corporation of Santa Clara, CA. In at least one embodiment, APU 3400 can be configured to execute an application program, such as a CUDA program. In at least one embodiment, APU 3400 includes, without limitation, a core complex 3410, a graphics complex 3440, fabric 3460, I/O interfaces 3470, memory controllers 3480, a display controller 3492, and a multimedia engine 3494. In at least one embodiment, APU 3400 may include, without limitation, any number of core complexes 3410, any number of graphics complexes 3450, any number of display controllers 3492, and any number of multimedia engines 3494 in any combination. For explanatory purposes, multiple instances of like objects are denoted herein with reference numbers identifying the object and parenthetical numbers identifying the instance where needed.

In at least one embodiment, core complex 3410 is a CPU, graphics complex 3440 is a GPU, and APU 3400 is a processing unit that integrates, without limitation, 3410 and 3440 onto a single chip. In at least one embodiment, some tasks may be assigned to core complex 3410 and other tasks may be assigned to graphics complex 3440. In at least one embodiment, core complex 3410 is configured to execute main control software associated with APU 3400, such as an operating system. In at least one embodiment, core complex 3410 is the master processor of APU 3400, controlling and coordinating operations of other processors. In at least one embodiment, core complex 3410 issues commands that control the operation of graphics complex 3440. In at least one embodiment, core complex 3410 can be configured to execute host executable code derived from CUDA source code, and graphics complex 3440 can be configured to execute device executable code derived from CUDA source code.

In at least one embodiment, core complex 3410 includes, without limitation, cores 3420(1)-3420(4) and an L3 cache 3430. In at least one embodiment, core complex 3410 may include, without limitation, any number of cores 3420 and any number and type of caches in any combination. In at least one embodiment, cores 3420 are configured to execute instructions of a particular instruction set architecture ("ISA"). In at least one embodiment, each core 3420 is a CPU core. In at least one embodiment, core 3420 is referred to as a computing unit or compute unit.

In at least one embodiment, each core 3420 includes, without limitation, a fetch/decode unit 3422, an integer execution engine 3424, a floating point execution engine 3426, and an L2 cache 3428. In at least one embodiment, fetch/decode unit 3422 fetches instructions, decodes such instructions, generates micro-operations, and dispatches separate micro-instructions to integer execution engine 3424 and floating point execution engine 3426. In at least one embodiment, fetch/decode unit 3422 can concurrently dispatch one micro-instruction to integer execution engine 3424 and another micro-instruction to floating point execution engine 3426. In at least one embodiment, integer execution engine 3424 executes, without limitation, integer and memory operations. In at least one embodiment, floating point engine 3426 executes, without limitation, floating point and vector operations. In at least one embodiment, fetch-decode unit 3422 dispatches micro-instructions to a single execution engine that replaces both integer execution engine 3424 and floating point execution engine 3426.

In at least one embodiment, each core 3420(*i*), where i is an integer representing a particular instance of core 3420, may access L2 cache 3428(*i*) included in core 3420(*i*). In at least one embodiment, each core 3420 included in core complex 3410(*j*), where j is an integer representing a particular instance of core complex 3410, is connected to other cores 3420 included in core complex 3410(*j*) via L3 cache 3430(*j*) included in core complex 3410(*j*). In at least one embodiment, cores 3420 included in core complex 3410(*j*), where j is an integer representing a particular instance of core complex 3410, can access all of L3 cache 3430(*j*) included in core complex 3410(*j*). In at least one embodiment, L3 cache 3430 may include, without limitation, any number of slices.

In at least one embodiment, graphics complex 3440 can be configured to perform compute operations in a highly-parallel fashion. In at least one embodiment, graphics complex 3440 is configured to execute graphics pipeline operations such as draw commands, pixel operations, geometric computations, and other operations associated with rendering an image to a display. In at least one embodiment, graphics complex 3440 is configured to execute operations unrelated to graphics. In at least one embodiment, graphics complex 3440 is configured to execute both operations related to graphics and operations unrelated to graphics.

In at least one embodiment, graphics complex 3440 includes, without limitation, any number of compute units 3450 and an L2 cache 3442. In at least one embodiment, compute units 3450 share L2 cache 3442. In at least one embodiment, L2 cache 3442 is partitioned. In at least one embodiment, graphics complex 3440 includes, without limitation, any number of compute units 3450 and any number (including zero) and type of caches. In at least one embodiment, graphics complex 3440 includes, without limitation, any amount of dedicated graphics hardware.

In at least one embodiment, each compute unit 3450 includes, without limitation, any number of SIMD units 3452 and a shared memory 3454. In at least one embodiment, each SIMD unit 3452 implements a SIMD architecture and is configured to perform operations in parallel. In at least one embodiment, each compute unit 3450 may execute any number of thread blocks, but each thread block executes on a single compute unit 3450. In at least one embodiment, a thread block includes, without limitation, any number of threads of execution. In at least one embodiment, a workgroup is a thread block. In at least one embodiment, each SIMD unit 3452 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3454.

In at least one embodiment, fabric 3460 is a system interconnect that facilitates data and control transmissions across core complex 3410, graphics complex 3440, I/O interfaces 3470, memory controllers 3480, display controller 3492, and multimedia engine 3494. In at least one embodiment, APU 3400 may include, without limitation, any amount and type of system interconnect in addition to or instead of fabric 3460 that facilitates data and control transmissions across any number and type of directly or indirectly linked components that may be internal or external to APU 3400. In at least one embodiment, I/O interfaces 3470 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 3470 In at least one embodiment, peripheral devices that are coupled to I/O interfaces 3470 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 3494 includes, without limitation, any amount and type of circuitry that is related to multimedia, such as a video decoder, a video encoder, an image signal processor, etc. In at least one embodiment, memory controllers 3480 facilitate data transfers between APU 3400 and a unified system memory 3490. In at least one embodiment, core complex 3410 and graphics complex 3440 share unified system memory 3490.

In at least one embodiment, APU 3400 implements a memory subsystem that includes, without limitation, any amount and type of memory controllers 3480 and memory devices (e.g., shared memory 3454) that may be dedicated to one component or shared among multiple components. In at least one embodiment, APU 3400 implements a cache subsystem that includes, without limitation, one or more cache memories (e.g., L2 caches 3528, L3 cache 3430, and L2 cache 3442) that may each be private to or shared between any number of components (e.g., cores 3420, core complex 3410, SIMD units 3452, compute units 3450, and graphics complex 3440).

In at least one embodiment, at least one component shown or described with respect to FIG. 34 is utilized to implement techniques and/or functions described in connection with FIGS. 1-27. In at least one embodiment, at least one component of FIG. 34 is used to identify, generate, remove, process, and/or modify one or more graph dependencies. In at least one embodiment, at least one component of FIG. 34 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operation 600-2600 of FIGS. 6-26, and/or processor 2700 of FIG. 27.

Figure 35:
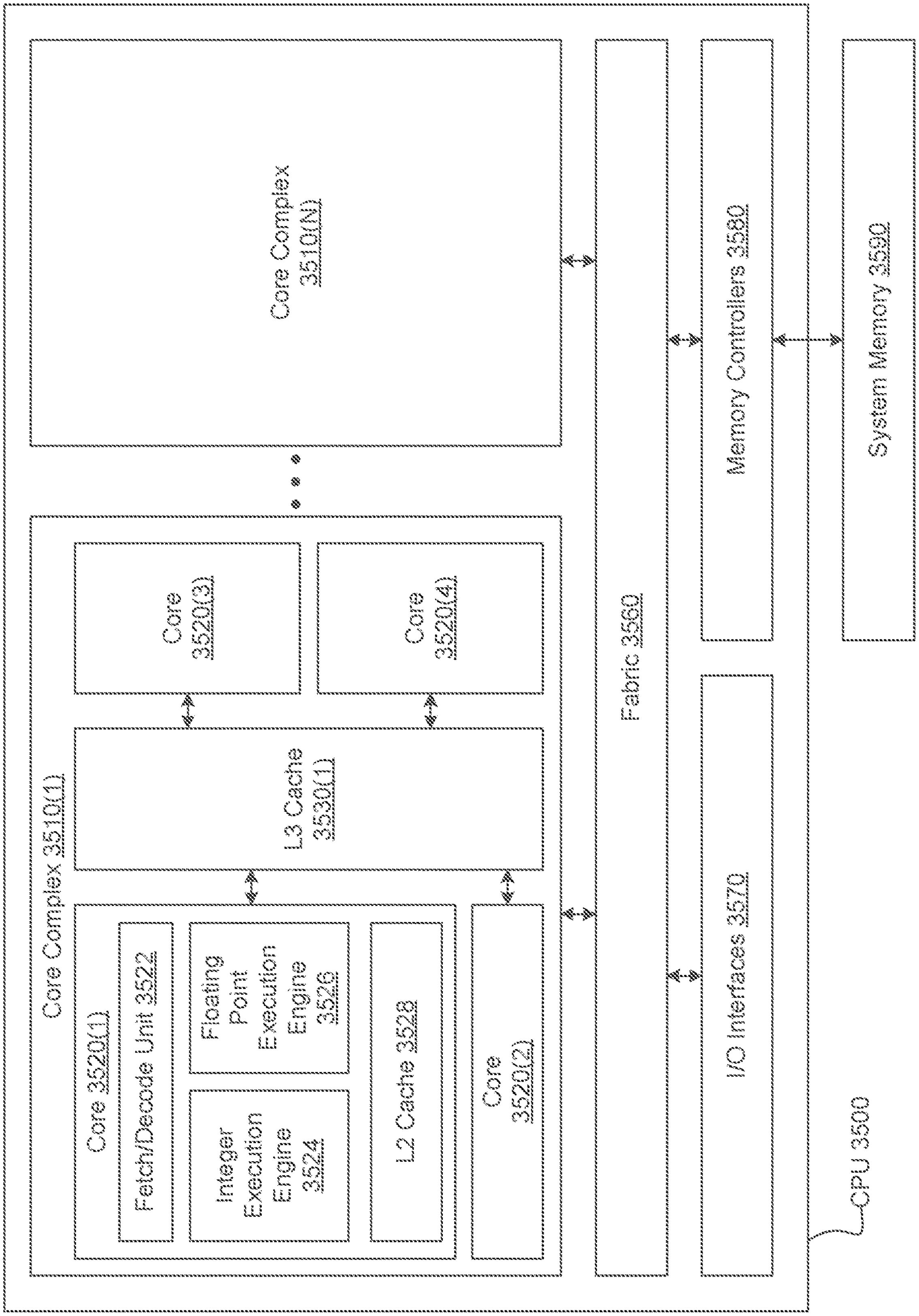
FIG. 35 illustrates a CPU, in accordance with at least one embodiment.

FIG. 35 illustrates a CPU 3500, in accordance with at least one embodiment. In at least one embodiment, CPU 3500 is developed by AMD Corporation of Santa Clara, CA. In at least one embodiment, CPU 3500 can be configured to execute an application program. In at least one embodiment, CPU 3500 is configured to execute main control software, such as an operating system. In at least one embodiment, CPU 3500 issues commands that control the operation of an external GPU (not shown). In at least one embodiment, CPU 3500 can be configured to execute host executable code derived from CUDA source code, and an external GPU can be configured to execute device executable code derived from such CUDA source code. In at least one embodiment, CPU 3500 includes, without limitation, any number of core complexes 3510, fabric 3560, I/O interfaces 3570, and memory controllers 3580.

In at least one embodiment, core complex 3510 includes, without limitation, cores 3520(1)-3520(4) and an L3 cache 3530. In at least one embodiment, core complex 3510 may include, without limitation, any number of cores 3520 and any number and type of caches in any combination. In at least one embodiment, cores 3520 are configured to execute instructions of a particular ISA. In at least one embodiment, each core 3520 is a CPU core.

In at least one embodiment, each core 3520 includes, without limitation, a fetch/decode unit 3522, an integer execution engine 3524, a floating point execution engine 3526, and an L2 cache 3528. In at least one embodiment, fetch/decode unit 3522 fetches instructions, decodes such instructions, generates micro-operations, and dispatches separate micro-instructions to integer execution engine 3524 and floating point execution engine 3526. In at least one embodiment, fetch/decode unit 3522 can concurrently dispatch one micro-instruction to integer execution engine 3524 and another micro-instruction to floating point execution engine 3526. In at least one embodiment, integer execution engine 3524 executes, without limitation, integer and memory operations. In at least one embodiment, floating point engine 3526 executes, without limitation, floating point and vector operations. In at least one embodiment, fetch-decode unit 3522 dispatches micro-instructions to a single execution engine that replaces both integer execution engine 3524 and floating point execution engine 3526.

In at least one embodiment, each core 3520(*i*), where i is an integer representing a particular instance of core 3520, may access L2 cache 3528(*i*) included in core 3520(*i*). In at least one embodiment, each core 3520 included in core complex 3510(*j*), where j is an integer representing a particular instance of core complex 3510, is connected to other cores 3520 in core complex 3510(*j*) via L3 cache 3530(*j*) included in core complex 3510(*j*). In at least one embodiment, cores 3520 included in core complex 3510(*j*), where j is an integer representing a particular instance of core complex 3510, can access all of L3 cache 3530(*j*) included in core complex 3510(*j*). In at least one embodiment, L3 cache 3530 may include, without limitation, any number of slices.

In at least one embodiment, fabric 3560 is a system interconnect that facilitates data and control transmissions across core complexes 3510(1)-3510(N) (where N is an integer greater than zero), I/O interfaces 3570, and memory controllers 3580. In at least one embodiment, CPU 3500 may include, without limitation, any amount and type of system interconnect in addition to or instead of fabric 3560 that facilitates data and control transmissions across any number and type of directly or indirectly linked components that may be internal or external to CPU 3500. In at least one embodiment, I/O interfaces 3570 are representative of any number and type of I/O interfaces (e.g., PCI, PCI-X, PCIe, GBE, USB, etc.). In at least one embodiment, various types of peripheral devices are coupled to I/O interfaces 3570 In at least one embodiment, peripheral devices that are coupled to I/O interfaces 3570 may include, without limitation, displays, keyboards, mice, printers, scanners, joysticks or other types of game controllers, media recording devices, external storage devices, network interface cards, and so forth.

In at least one embodiment, memory controllers 3580 facilitate data transfers between CPU 3500 and a system memory 3590. In at least one embodiment, core complex 3510 and graphics complex 3540 share system memory 3590. In at least one embodiment, CPU 3500 implements a memory subsystem that includes, without limitation, any amount and type of memory controllers 3580 and memory devices that may be dedicated to one component or shared among multiple components. In at least one embodiment, CPU 3500 implements a cache subsystem that includes, without limitation, one or more cache memories (e.g., L2 caches 3528 and L3 caches 3530) that may each be private to or shared between any number of components (e.g., cores 3520 and core complexes 3510).

In at least one embodiment, at least one component shown or described with respect to FIG. 35 is utilized to implement techniques and/or functions described in connection with FIGS. 1-27. In at least one embodiment, at least one component of FIG. 35 is used to identify, generate, remove, process, and/or modify one or more graph dependencies. In at least one embodiment, at least one component of FIG. 35 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operation 600-2600 of FIGS. 6-26, and/or processor 2700 of FIG. 27.

Figure 36:
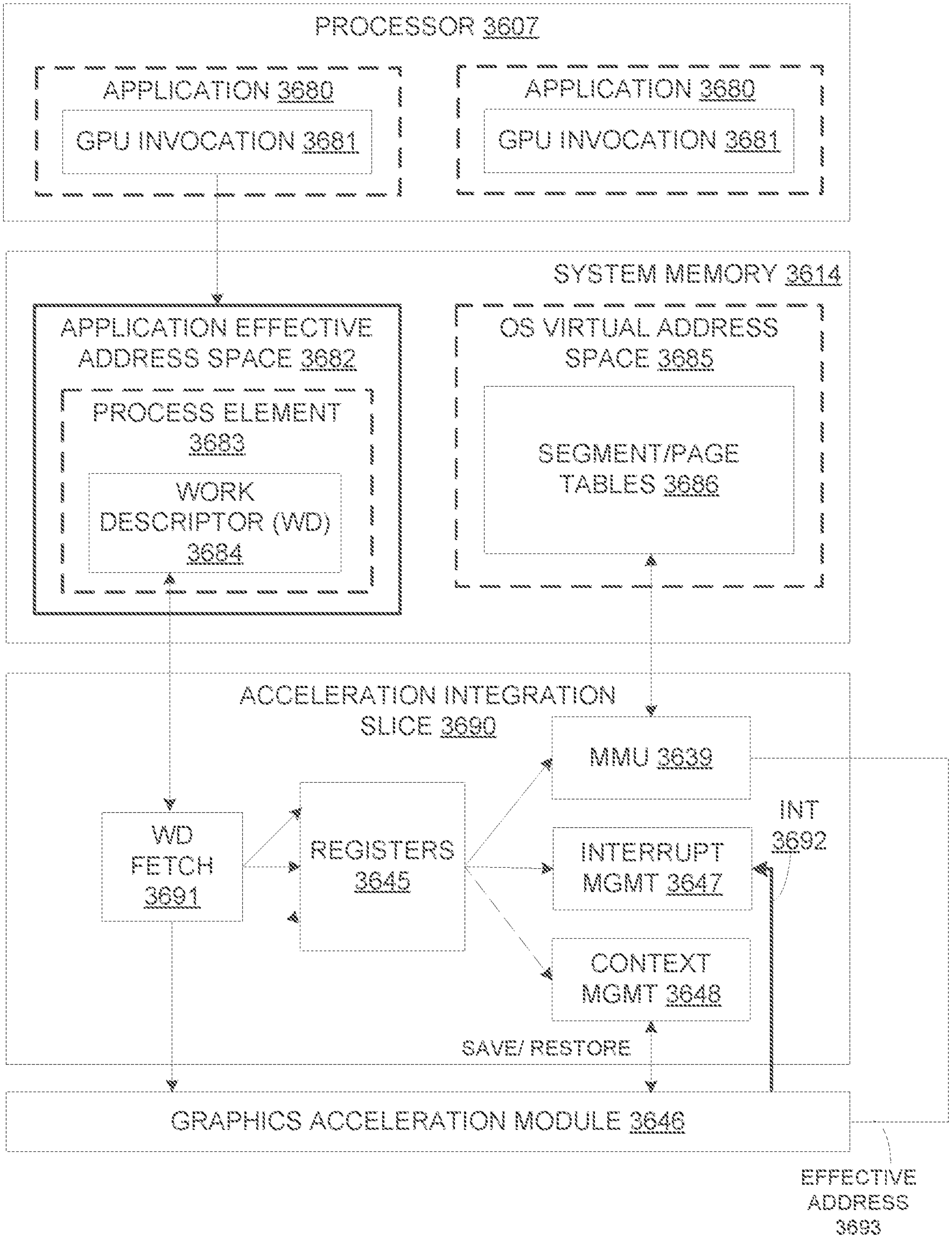
FIG. 36 illustrates an exemplary accelerator integration slice, in accordance with at least one embodiment.

FIG. 36 illustrates an exemplary accelerator integration slice 3690, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 3682 within system memory 3614 stores process elements 3683. In one embodiment, process elements 3683 are stored in response to GPU invocations 3681 from applications 3680 executed on processor 3607. A process element 3683 contains process state for corresponding application 3680. A work descriptor ("WD") 3684 contained in process element 3683 can be a single job requested by an application or may contain a pointer to a queue of jobs. In at least one embodiment, WD 3684 is a pointer to a job request queue in application effective address space 3682.

Graphics acceleration module 3646 and/or individual graphics processing engines can be shared by all or a subset of processes in a system. In at least one embodiment, an infrastructure for setting up process state and sending WD 3684 to graphics acceleration module 3646 to start a job in a virtualized environment may be included.

In at least one embodiment, a dedicated-process programming model is implementation-specific. In this model, a single process owns graphics acceleration module 3646 or an individual graphics processing engine. Because graphics acceleration module 3646 is owned by a single process, a hypervisor initializes an accelerator integration circuit for an owning partition and an operating system initializes accelerator integration circuit for an owning process when graphics acceleration module 3646 is assigned.

In operation, a WD fetch unit 3691 in accelerator integration slice 3690 fetches next WD 3684 which includes an indication of work to be done by one or more graphics processing engines of graphics acceleration module 3646. Data from WD 3684 may be stored in registers 3645 and used by a memory management unit ("MMU") 3639, interrupt management circuit 3647 and/or context management circuit 3648 as illustrated. For example, one embodiment of MMU 3639 includes segment/page walk circuitry for accessing segment/page tables 3686 within OS virtual address space 3685. Interrupt management circuit 3647 may process interrupt events ("INT") 3692 received from graphics acceleration module 3646. When performing graphics operations, an effective address 3693 generated by a graphics processing engine is translated to a real address by MMU 3639.

In one embodiment, a same set of registers 3645 are duplicated for each graphics processing engine and/or graphics acceleration module 3646 and may be initialized by a hypervisor or operating system. Each of these duplicated registers may be included in accelerator integration slice 3690. Exemplary registers that may be initialized by a hypervisor are shown in Table 1.

TABLE 1

| Hypervisor Initialized Registers | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 3684 is specific to a particular graphics acceleration module 3646 and/or a particular graphics processing engine. It contains all information required by a graphics processing engine to do work or it can be a pointer to a memory location where an application has set up a command queue of work to be completed.

Figure 37A:
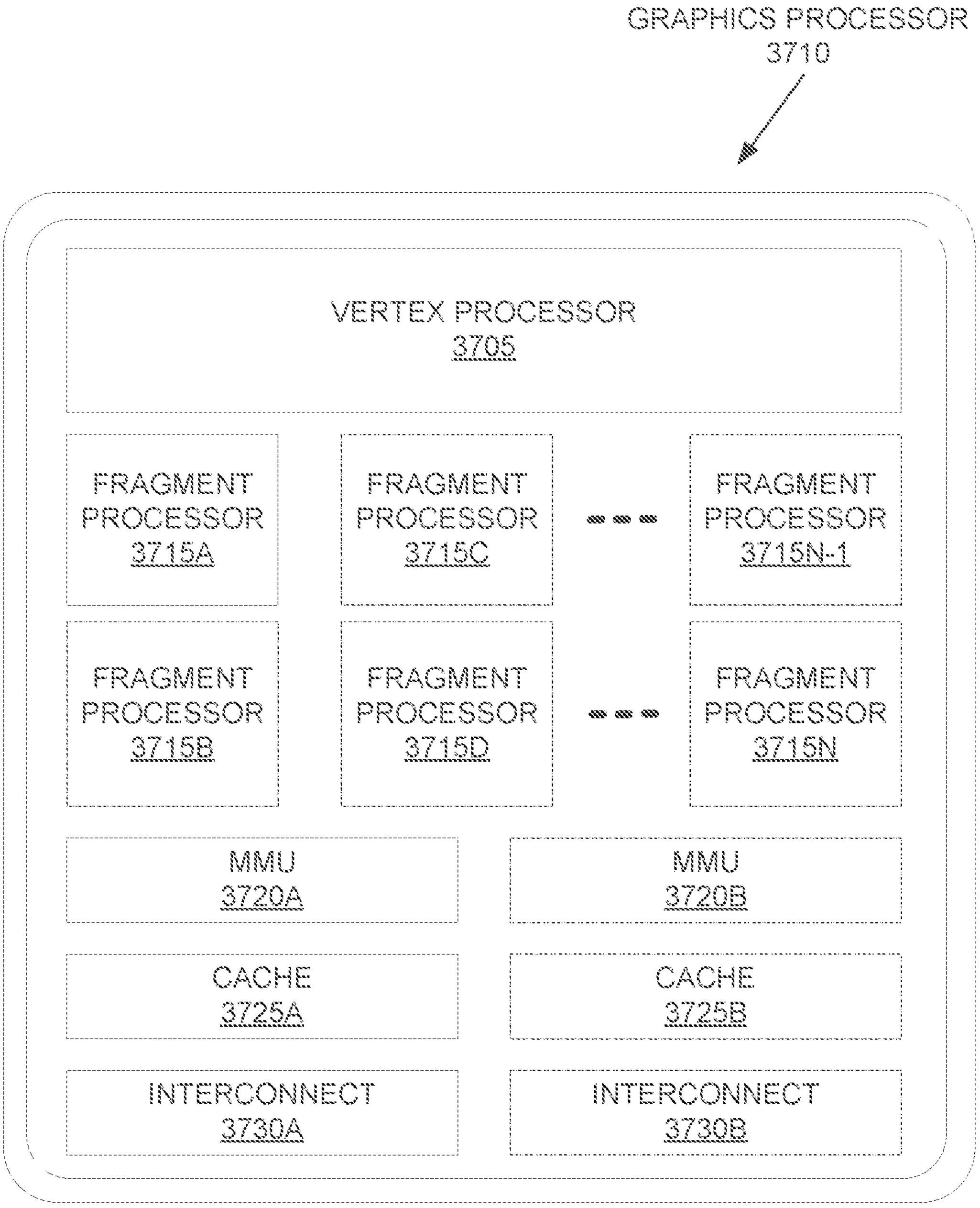
FIGS. 37A and 37B illustrate exemplary graphics processors, in accordance with at least one embodiment.
Figure 37B:
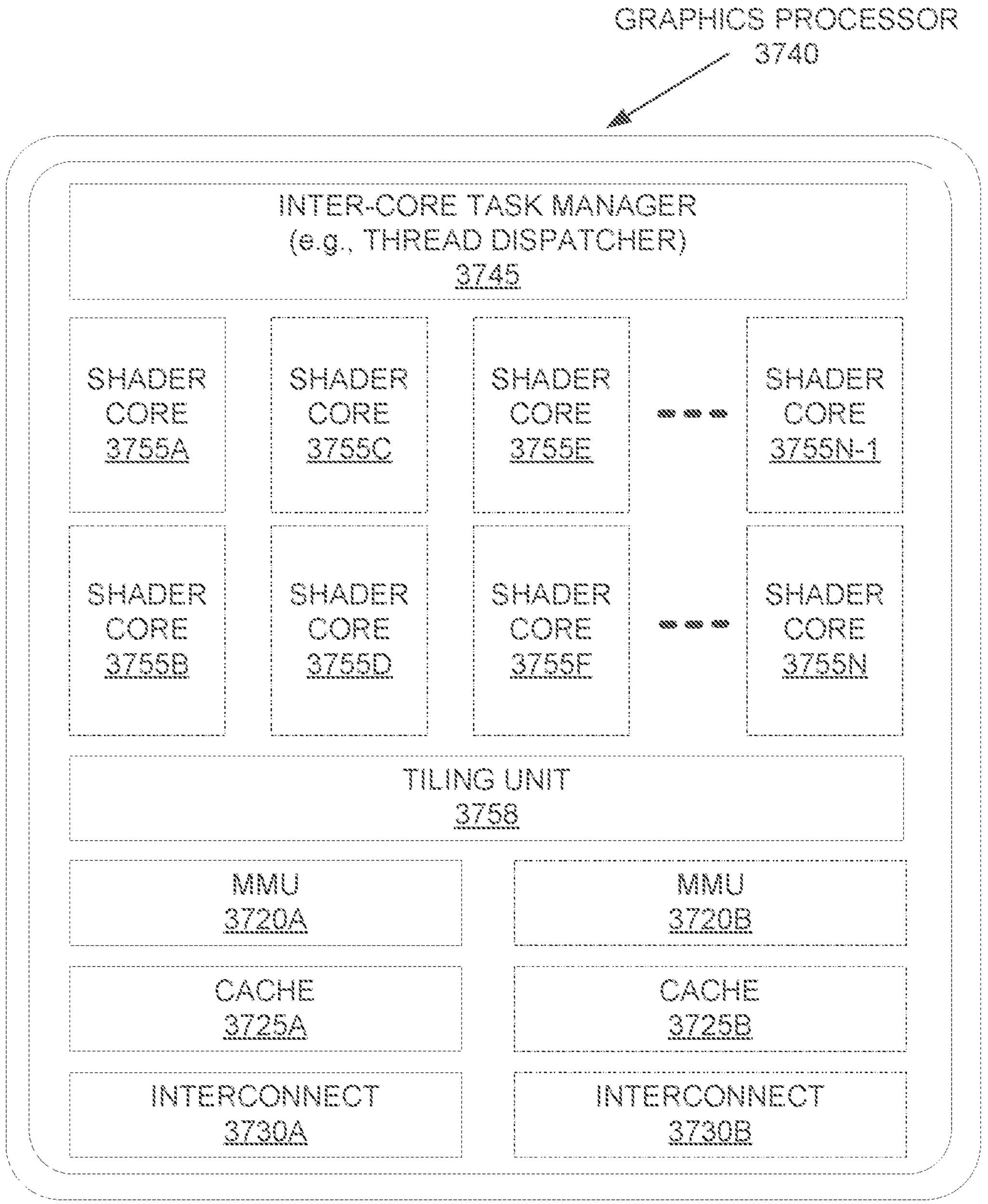

FIGS. 37A and 37B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 37A illustrates an exemplary graphics processor 3710 of an SoC integrated circuit that may be fabricated using one or more IP cores, in accordance with at least one embodiment. FIG. 37B illustrates an additional exemplary graphics processor 3740 of an SoC integrated circuit that may be fabricated using one or more IP cores, in accordance with at least one embodiment. In at least one embodiment, graphics processor 3710 of FIG. 37A is a low power graphics processor core. In at least one embodiment, graphics processor 3740 of FIG. 37B is a higher performance graphics processor core. In at least one embodiment, each of graphics processors 3710, 3740 can be variants of graphics processor 3210 of FIG. 32.

In at least one embodiment, graphics processor 3710 includes a vertex processor 3705 and one or more fragment processor(s) 3715A-3715N (e.g., 3715A, 3715B, 3715C, 3715D, through 3715N-1, and 3715N). In at least one embodiment, graphics processor 3710 can execute different shader programs via separate logic, such that vertex processor 3705 is optimized to execute operations for vertex shader programs, while one or more fragment processor(s) 3715A-3715N execute fragment (e.g., pixel) shading operations for fragment or pixel shader programs. In at least one embodiment, vertex processor 3705 performs a vertex processing stage of a 3D graphics pipeline and generates primitives and vertex data. In at least one embodiment, fragment processor(s) 3715A-3715N use primitive and vertex data generated by vertex processor 3705 to produce a framebuffer that is displayed on a display device. In at least one embodiment, fragment processor(s) 3715A-3715N are optimized to execute fragment shader programs as provided for in an OpenGL API, which may be used to perform similar operations as a pixel shader program as provided for in a Direct 3D API.

In at least one embodiment, graphics processor 3710 additionally includes one or more MMU(s) 3720A-3720B, cache(s) 3725A-3725B, and circuit interconnect(s) 3730A-3730B. In at least one embodiment, one or more MMU(s) 3720A-3720B provide for virtual to physical address mapping for graphics processor 3710, including for vertex processor 3705 and/or fragment processor(s) 3715A-3715N, which may reference vertex or image/texture data stored in memory, in addition to vertex or image/texture data stored in one or more cache(s) 3725A-3725B. In at least one embodiment, one or more MMU(s) 3720A-3720B may be synchronized with other MMUs within a system, including one or more MMUs associated with one or more application processor(s) 3205, image processors 3215, and/or video processors 3220 of FIG. 32, such that each processor 3205-3220 can participate in a shared or unified virtual memory system. In at least one embodiment, one or more circuit interconnect(s) 3730A-3730B enable graphics processor 3710 to interface with other IP cores within an SoC, either via an internal bus of the SoC or via a direct connection.

In at least one embodiment, graphics processor 3740 includes one or more MMU(s) 3720A-3720B, caches 3725A-3725B, and circuit interconnects 3730A-3730B of graphics processor 3710 of FIG. 37A. In at least one embodiment, graphics processor 3740 includes one or more shader core(s) 3755A-3755N (e.g., 3755A, 3755B, 3755C, 3755D, 3755E, 3755F, through 3755N-1, and 3755N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 3740 includes an inter-core task manager 3745, which acts as a thread dispatcher to dispatch execution threads to one or more shader cores 3755A-3755N and a tiling unit 3758 to accelerate tiling operations for tile-based rendering, in which rendering operations for a scene are subdivided in image space, for example to exploit local spatial coherence within a scene or to optimize use of internal caches.

In at least one embodiment, at least one component shown or described with respect to FIG. 37 is utilized to implement techniques and/or functions described in connection with FIGS. 1-27. In at least one embodiment, at least one component of FIG. 37 is used to identify, generate, remove, process, and/or modify one or more graph dependencies. In at least one embodiment, at least one component of FIG. 37 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operation 600-2600 of FIGS. 6-26, and/or processor 2700 of FIG. 27.

Figure 38A:
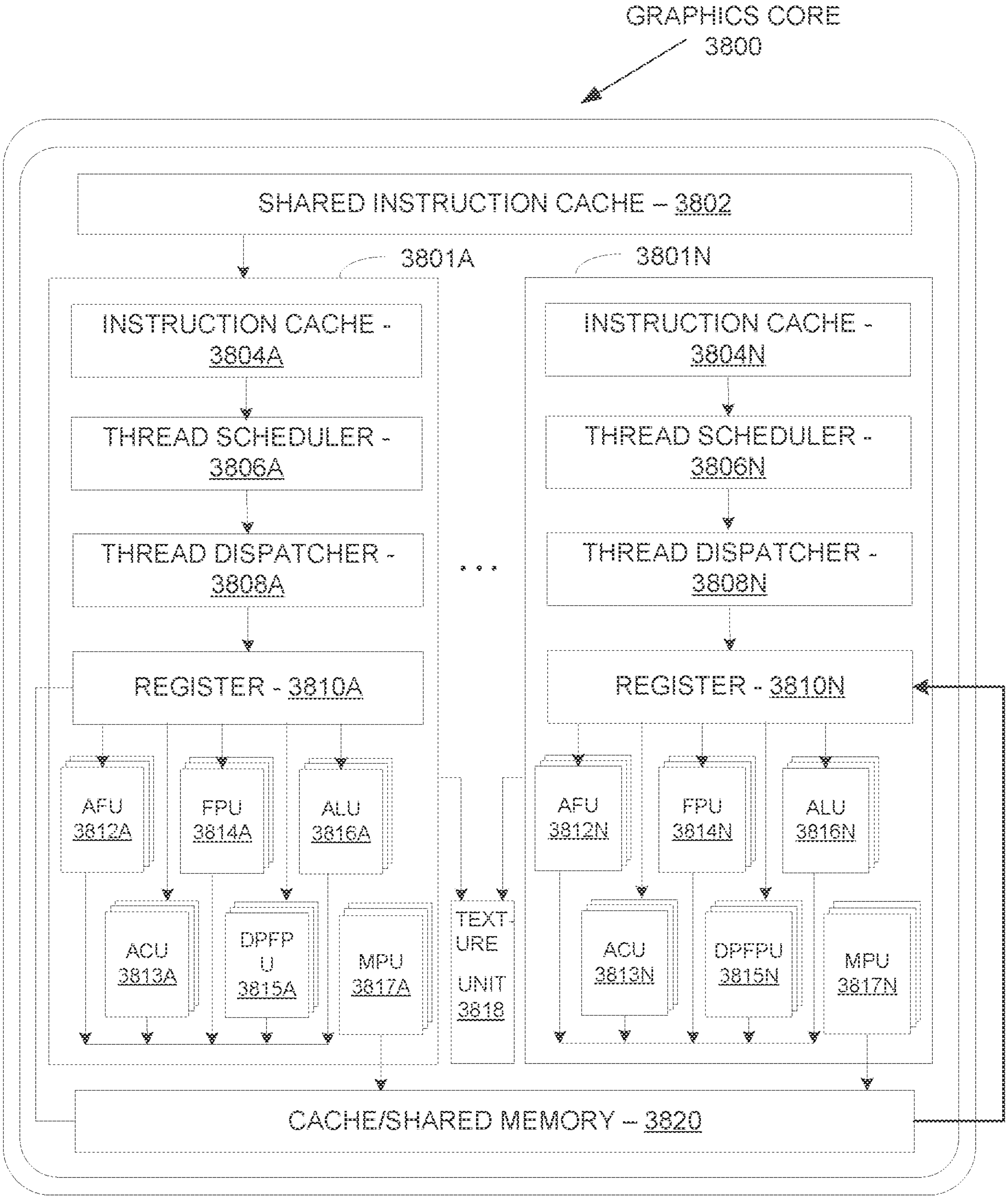
FIG. 38A illustrates a graphics core, in accordance with at least one embodiment.

FIG. 38A illustrates a graphics core 3800, in accordance with at least one embodiment. In at least one embodiment, graphics core 3800 may be included within graphics processor 3210 of FIG. 32. In at least one embodiment, graphics core 3800 may be a unified shader core 3755A-3755N as in FIG. 37B. In at least one embodiment, graphics core 3800 includes a shared instruction cache 3802, a texture unit 3818, and a cache/shared memory 3820 that are common to execution resources within graphics core 3800. In at least one embodiment, graphics core 3800 can include multiple slices 3801A-3801N or partition for each core, and a graphics processor can include multiple instances of graphics core 3800. Slices 3801A-3801N can include support logic including a local instruction cache 3804A-3804N, a thread scheduler 3806A-3806N, a thread dispatcher 3808A-3808N, and a set of registers 3810A-3810N. In at least one embodiment, slices 3801A-3801N can include a set of additional function units ("AFUs") 3812A-3812N, floating-point units ("FPUs") 3814A-3814N, integer arithmetic logic units ("ALUs") 3816-3816N, address computational units ("ACUs") 3813A-3813N, double-precision floating-point units ("DPFPUs") 3815A-3815N, and matrix processing units ("MPUs") 3817A-3817N. In at least one embodiment, a graphics core 3800 is referred to as a compute unit or computing unit.

In at least one embodiment, FPUs 3814A-3814N can perform single-precision (32-bit) and half-precision (16-bit) floating point operations, while DPFPUs 3815A-3815N perform double precision (64-bit) floating point operations. In at least one embodiment, ALUs 3816A-3816N can perform variable precision integer operations at 8-bit, 16-bit, and 32-bit precision, and can be configured for mixed precision operations. In at least one embodiment, MPUs 3817A-3817N can also be configured for mixed precision matrix operations, including half-precision floating point and 8-bit integer operations. In at least one embodiment, MPUs 3817-3817N can perform a variety of matrix operations to accelerate CUDA programs, including enabling support for accelerated general matrix to matrix multiplication ("GEMM"). In at least one embodiment, AFUs 3812A-3812N can perform additional logic operations not supported by floating-point or integer units, including trigonometric operations (e.g., Sine, Cosine, etc.).

Figure 38B:
FIG. 38B illustrates a GPGPU, in accordance with at least one embodiment.

FIG. 38B illustrates a general-purpose graphics processing unit ("GPGPU") 3830, in accordance with at least one embodiment. In at least one embodiment, GPGPU 3830 is highly-parallel and suitable for deployment on a multi-chip module. In at least one embodiment, GPGPU 3830 can be configured to enable highly-parallel compute operations to be performed by an array of GPUs. In at least one embodiment, GPGPU 3830 can be linked directly to other instances of GPGPU 3830 to create a multi-GPU cluster to improve execution time for CUDA programs. In at least one embodiment, GPGPU 3830 includes a host interface 3832 to enable a connection with a host processor. In at least one embodiment, host interface 3832 is a PCIe interface. In at least one embodiment, host interface 3832 can be a vendor specific communications interface or communications fabric. In at least one embodiment, GPGPU 3830 receives commands from a host processor and uses a global scheduler 3834 to distribute execution threads associated with those commands to a set of compute clusters 3836A-3836H. In at least one embodiment, compute clusters 3836A-3836H share a cache memory 3838. In at least one embodiment, cache memory 3838 can serve as a higher-level cache for cache memories within compute clusters 3836A-3836H.

In at least one embodiment, GPGPU 3830 includes memory 3844A-3844B coupled with compute clusters 3836A-3836H via a set of memory controllers 3842A-3842B. In at least one embodiment, memory 3844A-3844B can include various types of memory devices including DRAM or graphics random access memory, such as synchronous graphics random access memory ("SGRAM"), including graphics double data rate ("GDDR") memory.

In at least one embodiment, compute clusters 3836A-3836H each include a set of graphics cores, such as graphics core 3800 of FIG. 38A, which can include multiple types of integer and floating point logic units that can perform computational operations at a range of precisions including suited for computations associated with CUDA programs. For example, in at least one embodiment, at least a subset of floating point units in each of compute clusters 3836A-3836H can be configured to perform 16-bit or 32-bit floating point operations, while a different subset of floating point units can be configured to perform 64-bit floating point operations.

In at least one embodiment, multiple instances of GPGPU 3830 can be configured to operate as a compute cluster. Compute clusters 3836A-3836H may implement any technically feasible communication techniques for synchronization and data exchange. In at least one embodiment, multiple instances of GPGPU 3830 communicate over host interface 3832. In at least one embodiment, GPGPU 3830 includes an I/O hub 3839 that couples GPGPU 3830 with a GPU link 3840 that enables a direct connection to other instances of GPGPU 3830. In at least one embodiment, GPU link 3840 is coupled to a dedicated GPU-to-GPU bridge that enables communication and synchronization between multiple instances of GPGPU 3830. In at least one embodiment GPU link 3840 couples with a high speed interconnect to transmit and receive data to other GPGPUs 3830 or parallel processors. In at least one embodiment, multiple instances of GPGPU 3830 are located in separate data processing systems and communicate via a network device that is accessible via host interface 3832. In at least one embodiment GPU link 3840 can be configured to enable a connection to a host processor in addition to or as an alternative to host interface 3832. In at least one embodiment, GPGPU 3830 can be configured to execute a CUDA program.

In at least one embodiment, at least one component shown or described with respect to FIG. 38 is utilized to implement techniques and/or functions described in connection with FIGS. 1-27. In at least one embodiment, at least one component of FIG. 38 is used to identify, generate, remove, process, and/or modify one or more graph dependencies. In at least one embodiment, at least one component of FIG. 38 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operation 600-2600 of FIGS. 6-26, and/or processor 2700 of FIG. 27.

Figure 39A:
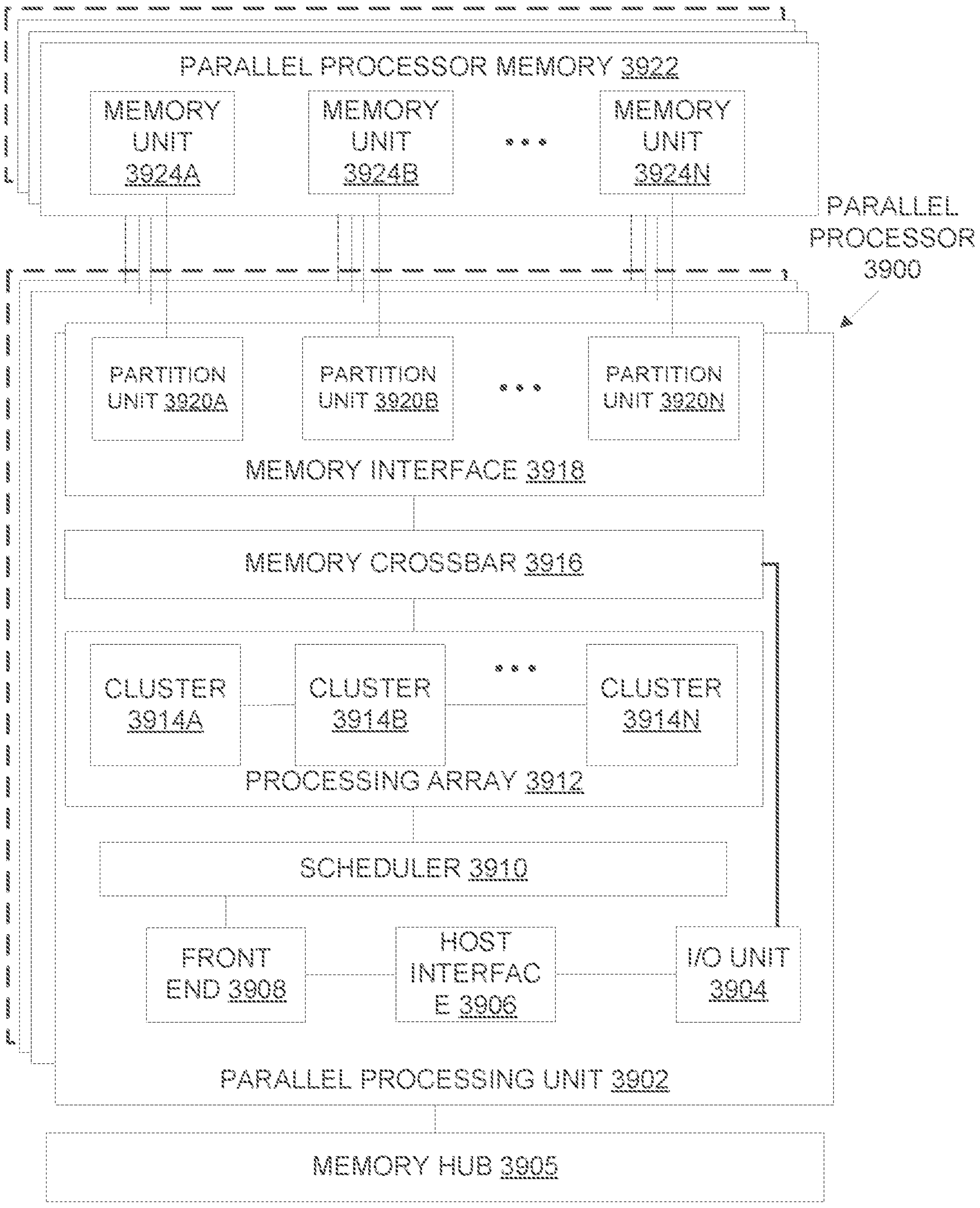
FIG. 39A illustrates a parallel processor, in accordance with at least one embodiment.

FIG. 39A illustrates a parallel processor 3900, in accordance with at least one embodiment. In at least one embodiment, various components of parallel processor 3900 may be implemented using one or more integrated circuit devices, such as programmable processors, application specific integrated circuits ("ASICs"), or FPGAs.

In at least one embodiment, parallel processor 3900 includes a parallel processing unit 3902. In at least one embodiment, parallel processing unit 3902 includes an I/O unit 3904 that enables communication with other devices, including other instances of parallel processing unit 3902. In at least one embodiment, I/O unit 3904 may be directly connected to other devices. In at least one embodiment, I/O unit 3904 connects with other devices via use of a hub or switch interface, such as memory hub 3905. In at least one embodiment, connections between memory hub 3905 and I/O unit 3904 form a communication link. In at least one embodiment, I/O unit 3904 connects with a host interface 3906 and a memory crossbar 3916, where host interface 3906 receives commands directed to performing processing operations and memory crossbar 3916 receives commands directed to performing memory operations.

In at least one embodiment, when host interface 3906 receives a command buffer via I/O unit 3904, host interface 3906 can direct work operations to perform those commands to a front end 3908. In at least one embodiment, front end 3908 couples with a scheduler 3910, which is configured to distribute commands or other work items to a processing array 3912. In at least one embodiment, scheduler 3910 ensures that processing array 3912 is properly configured and in a valid state before tasks are distributed to processing array 3912. In at least one embodiment, scheduler 3910 is implemented via firmware logic executing on a microcontroller. In at least one embodiment, microcontroller implemented scheduler 3910 is configurable to perform complex scheduling and work distribution operations at coarse and fine granularity, enabling rapid preemption and context switching of threads executing on processing array 3912. In at least one embodiment, host software can prove workloads for scheduling on processing array 3912 via one of multiple graphics processing doorbells. In at least one embodiment, workloads can then be automatically distributed across processing array 3912 by scheduler 3910 logic within a microcontroller including scheduler 3910.

In at least one embodiment, processing array 3912 can include up to "N" clusters (e.g., cluster 3914A, cluster 3914B, through cluster 3914N). In at least one embodiment, each cluster 3914A-3914N of processing array 3912 can execute a large number of concurrent threads. In at least one embodiment, scheduler 3910 can allocate work to clusters 3914A-3914N of processing array 3912 using various scheduling and/or work distribution algorithms, which may vary depending on the workload arising for each type of program or computation. In at least one embodiment, scheduling can be handled dynamically by scheduler 3910, or can be assisted in part by compiler logic during compilation of program logic configured for execution by processing array 3912. In at least one embodiment, different clusters 3914A-3914N of processing array 3912 can be allocated for processing different types of programs or for performing different types of computations.

In at least one embodiment, processing array 3912 can be configured to perform various types of parallel processing operations. In at least one embodiment, processing array 3912 is configured to perform general-purpose parallel compute operations. For example, in at least one embodiment, processing array 3912 can include logic to execute processing tasks including filtering of video and/or audio data, performing modeling operations, including physics operations, and performing data transformations.

In at least one embodiment, processing array 3912 is configured to perform parallel graphics processing operations. In at least one embodiment, processing array 3912 can include additional logic to support execution of such graphics processing operations, including, but not limited to texture sampling logic to perform texture operations, as well as tessellation logic and other vertex processing logic. In at least one embodiment, processing array 3912 can be configured to execute graphics processing related shader programs such as, but not limited to vertex shaders, tessellation shaders, geometry shaders, and pixel shaders. In at least one embodiment, parallel processing unit 3902 can transfer data from system memory via I/O unit 3904 for processing. In at least one embodiment, during processing, transferred data can be stored to on-chip memory (e.g., a parallel processor memory 3922) during processing, then written back to system memory.

In at least one embodiment, when parallel processing unit 3902 is used to perform graphics processing, scheduler 3910 can be configured to divide a processing workload into approximately equal sized tasks, to better enable distribution of graphics processing operations to multiple clusters 3914A-3914N of processing array 3912. In at least one embodiment, portions of processing array 3912 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3914A-3914N may be stored in buffers to allow intermediate data to be transmitted between clusters 3914A-3914N for further processing.

In at least one embodiment, processing array 3912 can receive processing tasks to be executed via scheduler 3910, which receives commands defining processing tasks from front end 3908. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3910 may be configured to fetch indices corresponding to tasks or may receive indices from front end 3908. In at least one embodiment, front end 3908 can be configured to ensure processing array 3912 is configured to a valid state before a workload specified by incoming command buffers (e.g., batch-buffers, push buffers, etc.) is initiated.

In at least one embodiment, each of one or more instances of parallel processing unit 3902 can couple with parallel processor memory 3922. In at least one embodiment, parallel processor memory 3922 can be accessed via memory crossbar 3916, which can receive memory requests from processing array 3912 as well as I/O unit 3904. In at least one embodiment, memory crossbar 3916 can access parallel processor memory 3922 via a memory interface 3918. In at least one embodiment, memory interface 3918 can include multiple partition units (e.g., a partition unit 3920A, partition unit 3920B, through partition unit 3920N) that can each couple to a portion (e.g., memory unit) of parallel processor memory 3922. In at least one embodiment, a number of partition units 3920A-3920N is configured to be equal to a number of memory units, such that a first partition unit 3920A has a corresponding first memory unit 3924A, a second partition unit 3920B has a corresponding memory unit 3924B, and an Nth partition unit 3920N has a corresponding Nth memory unit 3924N. In at least one embodiment, a number of partition units 3920A-3920N may not be equal to a number of memory devices.

In at least one embodiment, memory units 3924A-3924N can include various types of memory devices, including DRAM or graphics random access memory, such as SGRAM, including GDDR memory. In at least one embodiment, memory units 3924A-3924N may also include 3D stacked memory, including but not limited to high bandwidth memory ("HBM"). In at least one embodiment, render targets, such as frame buffers or texture maps may be stored across memory units 3924A-3924N, allowing partition units 3920A-3920N to write portions of each render target in parallel to efficiently use available bandwidth of parallel processor memory 3922. In at least one embodiment, a local instance of parallel processor memory 3922 may be excluded in favor of a unified memory design that utilizes system memory in conjunction with local cache memory.

In at least one embodiment, any one of clusters 3914A-3914N of processing array 3912 can process data that will be written to any of memory units 3924A-3924N within parallel processor memory 3922. In at least one embodiment, memory crossbar 3916 can be configured to transfer an output of each cluster 3914A-3914N to any partition unit 3920A-3920N or to another cluster 3914A-3914N, which can perform additional processing operations on an output. In at least one embodiment, each cluster 3914A-3914N can communicate with memory interface 3918 through memory crossbar 3916 to read from or write to various external memory devices. In at least one embodiment, memory crossbar 3916 has a connection to memory interface 3918 to communicate with I/O unit 3904, as well as a connection to a local instance of parallel processor memory 3922, enabling processing units within different clusters 3914A-3914N to communicate with system memory or other memory that is not local to parallel processing unit 3902. In at least one embodiment, memory crossbar 3916 can use virtual channels to separate traffic streams between clusters 3914A-3914N and partition units 3920A-3920N.

In at least one embodiment, multiple instances of parallel processing unit 3902 can be provided on a single add-in card, or multiple add-in cards can be interconnected. In at least one embodiment, different instances of parallel processing unit 3902 can be configured to inter-operate even if different instances have different numbers of processing cores, different amounts of local parallel processor memory, and/or other configuration differences. For example, in at least one embodiment, some instances of parallel processing unit 3902 can include higher precision floating point units relative to other instances. In at least one embodiment, systems incorporating one or more instances of parallel processing unit 3902 or parallel processor 3900 can be implemented in a variety of configurations and form factors, including but not limited to desktop, laptop, or handheld personal computers, servers, workstations, game consoles, and/or embedded systems.

Figure 39B:
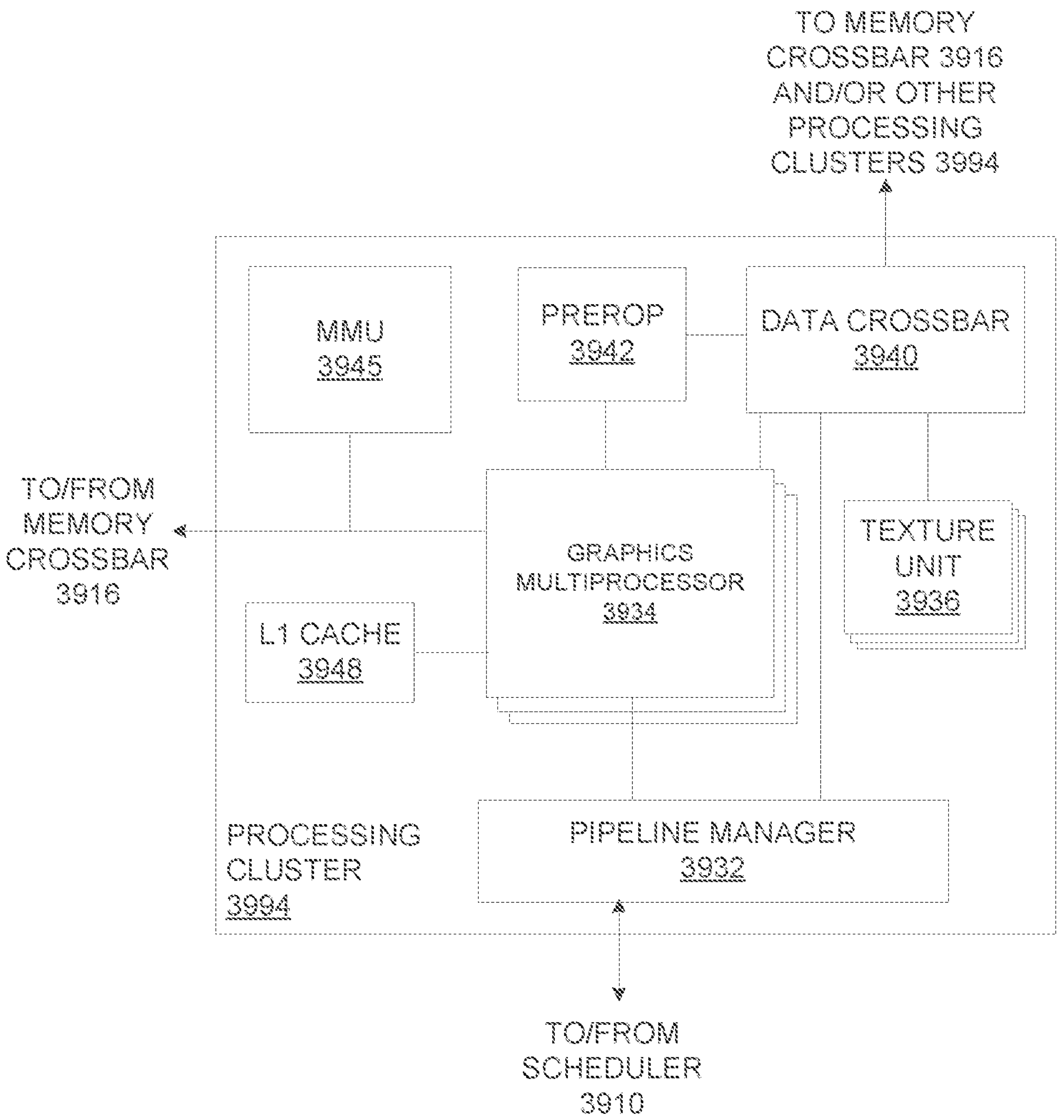
FIG. 39B illustrates a processing cluster, in accordance with at least one embodiment.

FIG. 39B illustrates a processing cluster 3994, in accordance with at least one embodiment. In at least one embodiment, processing cluster 3994 is included within a parallel processing unit. In at least one embodiment, processing cluster 3994 is one of processing clusters 3914A-3914N of FIG. 39. In at least one embodiment, processing cluster 3994 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 3994.

In at least one embodiment, operation of processing cluster 3994 can be controlled via a pipeline manager 3932 that distributes processing tasks to SIMT parallel processors. In at least one embodiment, pipeline manager 3932 receives instructions from scheduler 3910 of FIG. 39 and manages execution of those instructions via a graphics multiprocessor 3934 and/or a texture unit 3936. In at least one embodiment, graphics multiprocessor 3934 is an exemplary instance of a SIMT parallel processor. However, in at least one embodiment, various types of SIMT parallel processors of differing architectures may be included within processing cluster 3994. In at least one embodiment, one or more instances of graphics multiprocessor 3934 can be included within processing cluster 3994. In at least one embodiment, graphics multiprocessor 3934 can process data and a data crossbar 3940 can be used to distribute processed data to one of multiple possible destinations, including other shader units. In at least one embodiment, pipeline manager 3932 can facilitate distribution of processed data by specifying destinations for processed data to be distributed via data crossbar 3940.

In at least one embodiment, each graphics multiprocessor 3934 within processing cluster 3994 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3994 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 3934. In at least one embodiment, a thread group may include fewer threads than a number of processing engines within graphics multiprocessor 3934. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 3934. In at least one embodiment, when a thread group includes more threads than the number of processing engines within graphics multiprocessor 3934, processing can be performed over consecutive clock cycles. In at least one embodiment, multiple thread groups can be executed concurrently on graphics multiprocessor 3934.

In at least one embodiment, graphics multiprocessor 3934 includes an internal cache memory to perform load and store operations. In at least one embodiment, graphics multiprocessor 3934 can forego an internal cache and use a cache memory (e.g., L1 cache 3948) within processing cluster 3994. In at least one embodiment, each graphics multiprocessor 3934 also has access to Level 2 ("L2") caches within partition units (e.g., partition units 3920A-3920N of FIG. 39A) that are shared among all processing clusters 3994 and may be used to transfer data between threads. In at least one embodiment, graphics multiprocessor 3934 may also access off-chip global memory, which can include one or more of local parallel processor memory and/or system memory. In at least one embodiment, any memory external to parallel processing unit 3902 may be used as global memory. In at least one embodiment, processing cluster 3994 includes multiple instances of graphics multiprocessor 3934 that can share common instructions and data, which may be stored in L1 cache 3948.

In at least one embodiment, each processing cluster 3994 may include an MMU 3945 that is configured to map virtual addresses into physical addresses. In at least one embodiment, one or more instances of MMU 3945 may reside within memory interface 3918 of FIG. 39. In at least one embodiment, MMU 3945 includes a set of page table entries ("PTEs") used to map a virtual address to a physical address of a tile and optionally a cache line index. In at least one embodiment, MMU 3945 may include address translation lookaside buffers ("TLBs") or caches that may reside within graphics multiprocessor 3934 or L1 cache 3948 or processing cluster 3994. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 3994 may be configured such that each graphics multiprocessor 3934 is coupled to a texture unit 3936 for performing texture mapping operations, e.g., determining texture sample positions, reading texture data, and filtering texture data. In at least one embodiment, texture data is read from an internal texture L1 cache (not shown) or from an L1 cache within graphics multiprocessor 3934 and is fetched from an L2 cache, local parallel processor memory, or system memory, as needed. In at least one embodiment, each graphics multiprocessor 3934 outputs a processed task to data crossbar 3940 to provide the processed task to another processing cluster 3994 for further processing or to store the processed task in an L2 cache, a local parallel processor memory, or a system memory via memory crossbar 3916. In at least one embodiment, a pre-raster operations unit ("preROP") 3942 is configured to receive data from graphics multiprocessor 3934, direct data to ROP units, which may be located with partition units as described herein (e.g., partition units 3920A-3920N of FIG. 39). In at least one embodiment, PreROP 3942 can perform optimizations for color blending, organize pixel color data, and perform address translations.

Figure 39C:
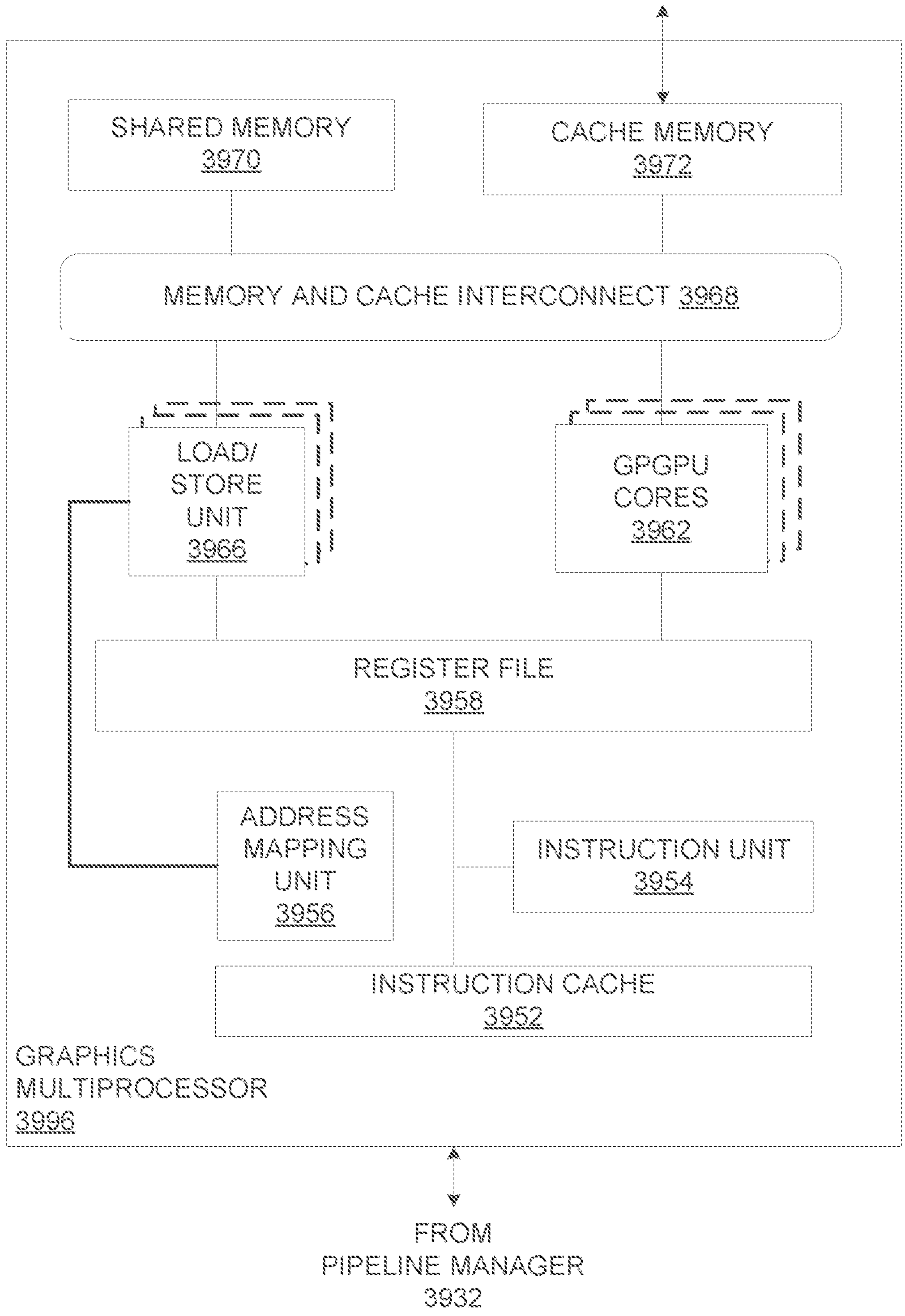
FIG. 39C illustrates a graphics multiprocessor, in accordance with at least one embodiment.

FIG. 39C illustrates a graphics multiprocessor 3996, in accordance with at least one embodiment. In at least one embodiment, graphics multiprocessor 3996 is graphics multiprocessor 3934 of FIG. 39B. In at least one embodiment, graphics multiprocessor 3996 couples with pipeline manager 3932 of processing cluster 3994. In at least one embodiment, graphics multiprocessor 3996 has an execution pipeline including but not limited to an instruction cache 3952, an instruction unit 3954, an address mapping unit 3956, a register file 3958, one or more GPGPU cores 3962, and one or more LSUs 3966. GPGPU cores 3962 and LSUs 3966 are coupled with cache memory 3972 and shared memory 3970 via a memory and cache interconnect 3968.

In at least one embodiment, instruction cache 3952 receives a stream of instructions to execute from pipeline manager 3932. In at least one embodiment, instructions are cached in instruction cache 3952 and dispatched for execution by instruction unit 3954. In at least one embodiment, instruction unit 3954 can dispatch instructions as thread groups (e.g., warps), with each thread of a thread group assigned to a different execution unit within GPGPU core 3962. In at least one embodiment, an instruction can access any of a local, shared, or global address space by specifying an address within a unified address space. In at least one embodiment, address mapping unit 3956 can be used to translate addresses in a unified address space into a distinct memory address that can be accessed by LSUs 3966.

In at least one embodiment, register file 3958 provides a set of registers for functional units of graphics multiprocessor 3996. In at least one embodiment, register file 3958 provides temporary storage for operands connected to data paths of functional units (e.g., GPGPU cores 3962, LSUs 3966) of graphics multiprocessor 3996. In at least one embodiment, register file 3958 is divided between each of functional units such that each functional unit is allocated a dedicated portion of register file 3958. In at least one embodiment, register file 3958 is divided between different thread groups being executed by graphics multiprocessor 3996.

In at least one embodiment, GPGPU cores 3962 can each include FPUs and/or integer ALUs that are used to execute instructions of graphics multiprocessor 3996. GPGPU cores 3962 can be similar in architecture or can differ in architecture. In at least one embodiment, a first portion of GPGPU cores 3962 include a single precision FPU and an integer ALU while a second portion of GPGPU cores 3962 include a double precision FPU. In at least one embodiment, FPUs can implement IEEE 754-2008 standard for floating point arithmetic or enable variable precision floating point arithmetic. In at least one embodiment, graphics multiprocessor 3996 can additionally include one or more fixed function or special function units to perform specific functions such as copy rectangle or pixel blending operations. In at least one embodiment one or more of GPGPU cores 3962 can also include fixed or special function logic.

In at least one embodiment, GPGPU cores 3962 include SIMD logic capable of performing a single instruction on multiple sets of data. In at least one embodiment GPGPU cores 3962 can physically execute SIMD4, SIMD8, and SIMD16 instructions and logically execute SIMD1, SIMD2, and SIMD32 instructions. In at least one embodiment, SIMD instructions for GPGPU cores 3962 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 3968 is an interconnect network that connects each functional unit of graphics multiprocessor 3996 to register file 3958 and to shared memory 3970. In at least one embodiment, memory and cache interconnect 3968 is a crossbar interconnect that allows LSU 3966 to implement load and store operations between shared memory 3970 and register file 3958. In at least one embodiment, register file 3958 can operate at a same frequency as GPGPU cores 3962, thus data transfer between GPGPU cores 3962 and register file 3958 is very low latency. In at least one embodiment, shared memory 3970 can be used to enable communication between threads that execute on functional units within graphics multiprocessor 3996. In at least one embodiment, cache memory 3972 can be used as a data cache for example, to cache texture data communicated between functional units and texture unit 3936. In at least one embodiment, shared memory 3970 can also be used as a program managed cached. In at least one embodiment, threads executing on GPGPU cores 3962 can programmatically store data within shared memory in addition to automatically cached data that is stored within cache memory 3972.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 40:
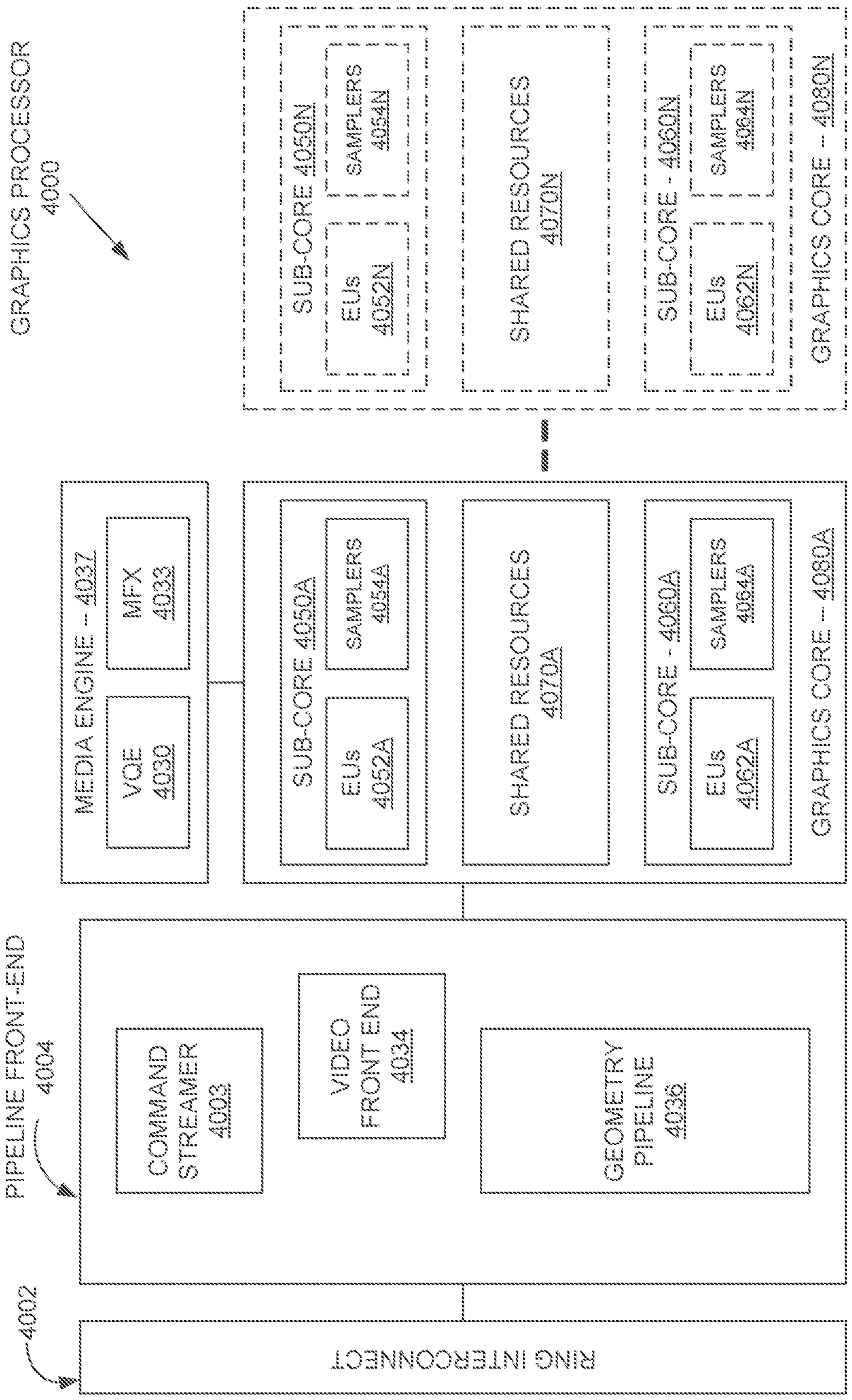
FIG. 40 illustrates a graphics processor, in accordance with at least one embodiment.

In at least one embodiment, at least one component shown or described with respect to FIG. 40 is utilized to implement techniques and/or functions described in connection with FIGS. 1-27. In at least one embodiment, at least one component of FIG. 40 is used to identify, generate, remove, process, and/or modify one or more graph dependencies. In at least one embodiment, at least one component of FIG. 40 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

FIG. 40 illustrates a graphics processor 4000, in accordance with at least one embodiment. In at least one embodiment, graphics processor 4000 includes a ring interconnect 4002, a pipeline front-end 4004, a media engine 4037, and graphics cores 4080A-4080N. In at least one embodiment, ring interconnect 4002 couples graphics processor 4000 to other processing units, including other graphics processors or one or more general-purpose processor cores. In at least one embodiment, graphics processor 4000 is one of many processors integrated within a multi-core processing system.

In at least one embodiment, graphics processor 4000 receives batches of commands via ring interconnect 4002. In at least one embodiment, incoming commands are interpreted by a command streamer 4003 in pipeline front-end 4004. In at least one embodiment, graphics processor 4000 includes scalable execution logic to perform 3D geometry processing and media processing via graphics core(s) 4080A-4080N. In at least one embodiment, for 3D geometry processing commands, command streamer 4003 supplies commands to geometry pipeline 4036. In at least one embodiment, for at least some media processing commands, command streamer 4003 supplies commands to a video front end 4034, which couples with a media engine 4037. In at least one embodiment, media engine 4037 includes a Video Quality Engine ("VQE") 4030 for video and image post-processing and a multi-format encode/decode ("MFX") engine 4033 to provide hardware-accelerated media data encode and decode. In at least one embodiment, geometry pipeline 4036 and media engine 4037 each generate execution threads for thread execution resources provided by at least one graphics core 4080A.

In at least one embodiment, graphics processor 4000 includes scalable thread execution resources featuring modular graphics cores 4080A-4080N (sometimes referred to as core slices), each having multiple sub-cores 4050A-550N, 4060A-4060N (sometimes referred to as core sub-slices). In at least one embodiment, graphics processor 4000 can have any number of graphics cores 4080A through 4080N. In at least one embodiment, graphics processor 4000 includes a graphics core 4080A having at least a first sub-core 4050A and a second sub-core 4060A. In at least one embodiment, graphics processor 4000 is a low power processor with a single sub-core (e.g., sub-core 4050A). In at least one embodiment, graphics processor 4000 includes multiple graphics cores 4080A-4080N, each including a set of first sub-cores 4050A-4050N and a set of second sub-cores 4060A-4060N. In at least one embodiment, each sub-core in first sub-cores 4050A-4050N includes at least a first set of execution units ("EUs") 4052A-4052N and media/texture samplers 4054A-4054N. In at least one embodiment, each sub-core in second sub-cores 4060A-4060N includes at least a second set of execution units 4062A-4062N and samplers 4064A-4064N. In at least one embodiment, each sub-core 4050A-4050N, 4060A-4060N shares a set of shared resources 4070A-4070N. In at least one embodiment, shared resources 4070 include shared cache memory and pixel operation logic.

Figure 41:
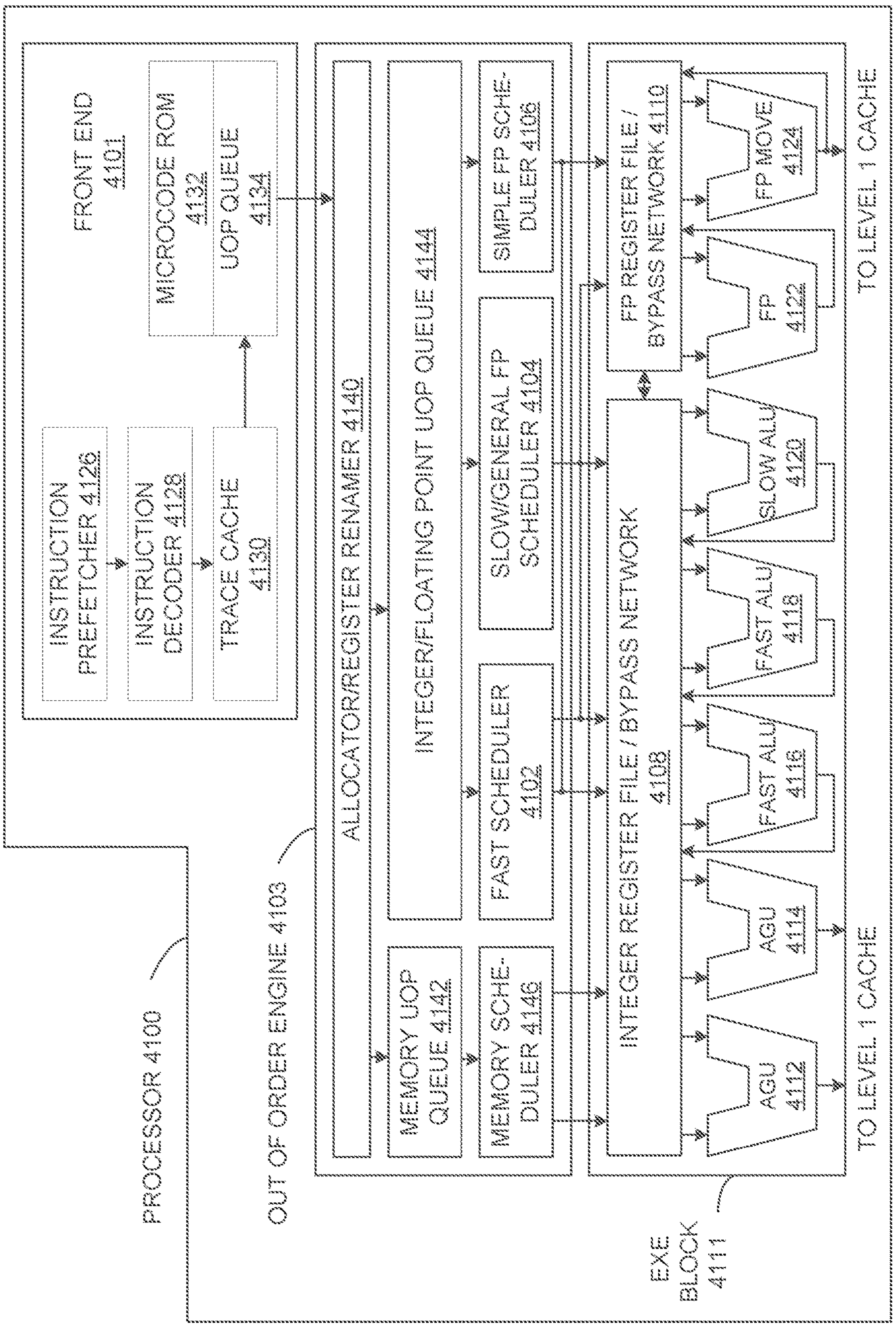
FIG. 41 illustrates a processor, in accordance with at least one embodiment.

FIG. 41 illustrates a processor 4100, in accordance with at least one embodiment. In at least one embodiment, processor 4100 may include, without limitation, logic circuits to perform instructions. In at least one embodiment, processor 4100 may perform instructions, including x86 instructions, ARM instructions, specialized instructions for ASICs, etc. In at least one embodiment, processor 4110 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 4110 may perform instructions to accelerate CUDA programs.

In at least one embodiment, processor 4100 includes an in-order front end ("front end") 4101 to fetch instructions to be executed and prepare instructions to be used later in processor pipeline. In at least one embodiment, front end 4101 may include several units. In at least one embodiment, an instruction prefetcher 4126 fetches instructions from memory and feeds instructions to an instruction decoder 4128 which in turn decodes or interprets instructions. For example, in at least one embodiment, instruction decoder 4128 decodes a received instruction into one or more operations called "micro-instructions" or "micro-operations" (also called "micro ops" or "uops") for execution. In at least one embodiment, instruction decoder 4128 parses instruction into an opcode and corresponding data and control fields that may be used by micro-architecture to perform operations. In at least one embodiment, a trace cache 4130 may assemble decoded uops into program ordered sequences or traces in a uop queue 4134 for execution. In at least one embodiment, when trace cache 4130 encounters a complex instruction, a microcode ROM 4132 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 4128 may access microcode ROM 4132 to perform instruction. In at least one embodiment, an instruction may be decoded into a small number of micro-ops for processing at instruction decoder 4128. In at least one embodiment, an instruction may be stored within microcode ROM 4132 should a number of micro-ops be needed to accomplish operation. In at least one embodiment, trace cache 4130 refers to an entry point programmable logic array ("PLA") to determine a correct micro-instruction pointer for reading microcode sequences to complete one or more instructions from microcode ROM 4132. In at least one embodiment, after microcode ROM 4132 finishes sequencing micro-ops for an instruction, front end 4101 of machine may resume fetching micro-ops from trace cache 4130.

In at least one embodiment, out-of-order execution engine ("out of order engine") 4103 may prepare instructions for execution. In at least one embodiment, out-of-order execution logic has a number of buffers to smooth out and re-order the flow of instructions to optimize performance as they go down a pipeline and get scheduled for execution. Out-of-order execution engine 4103 includes, without limitation, an allocator/register renamer 4140, a memory uop queue 4142, an integer/floating point uop queue 4144, a memory scheduler 4146, a fast scheduler 4102, a slow/general floating point scheduler ("slow/general FP scheduler") 4104, and a simple floating point scheduler ("simple FP scheduler") 4106. In at least one embodiment, fast schedule 4102, slow/general floating point scheduler 4104, and simple floating point scheduler 4106 are also collectively referred to herein as "uop schedulers 4102, 4104, 4106." Allocator/register renamer 4140 allocates machine buffers and resources that each uop needs in order to execute. In at least one embodiment, allocator/register renamer 4140 renames logic registers onto entries in a register file. In at least one embodiment, allocator/register renamer 4140 also allocates an entry for each uop in one of two uop queues, memory uop queue 4142 for memory operations and integer/floating point uop queue 4144 for non-memory operations, in front of memory scheduler 4146 and uop schedulers 4102, 4104, 4106. In at least one embodiment, uop schedulers 4102, 4104, 4106, determine when a uop is ready to execute based on readiness of their dependent input register operand sources and availability of execution resources uops need to complete their operation. In at least one embodiment, fast scheduler 4102 of at least one embodiment may schedule on each half of main clock cycle while slow/general floating point scheduler 4104 and simple floating point scheduler 4106 may schedule once per main processor clock cycle. In at least one embodiment, uop schedulers 4102, 4104, 4106 arbitrate for dispatch ports to schedule uops for execution.

In at least one embodiment, execution block 4111 includes, without limitation, an integer register file/bypass network 4108, a floating point register file/bypass network ("FP register file/bypass network") 4110, address generation units ("AGUs") 4112 and 4114, fast ALUs 4116 and 4118, a slow ALU 4120, a floating point ALU ("FP") 4122, and a floating point move unit ("FP move") 4124. In at least one embodiment, integer register file/bypass network 4108 and floating point register file/bypass network 4110 are also referred to herein as "register files 4108, 4110." In at least one embodiment, AGUSs 4112 and 4114, fast ALUs 4116 and 4118, slow ALU 4120, floating point ALU 4122, and floating point move unit 4124 are also referred to herein as "execution units 4112, 4114, 4116, 4118, 4120, 4122, and 4124." In at least one embodiment, an execution block may include, without limitation, any number (including zero) and type of register files, bypass networks, address generation units, and execution units, in any combination.

In at least one embodiment, register files 4108, 4110 may be arranged between uop schedulers 4102, 4104, 4106, and execution units 4112, 4114, 4116, 4118, 4120, 4122, and 4124. In at least one embodiment, integer register file/bypass network 4108 performs integer operations. In at least one embodiment, floating point register file/bypass network 4110 performs floating point operations. In at least one embodiment, each of register files 4108, 4110 may include, without limitation, a bypass network that may bypass or forward just completed results that have not yet been written into register file to new dependent uops. In at least one embodiment, register files 4108, 4110 may communicate data with each other. In at least one embodiment, integer register file/bypass network 4108 may include, without limitation, two separate register files, one register file for low-order thirty-two bits of data and a second register file for high order thirty-two bits of data. In at least one embodiment, floating point register file/bypass network 4110 may include, without limitation, 128-bit wide entries because floating point instructions typically have operands from 64 to 128 bits in width.

In at least one embodiment, execution units 4112, 4114, 4116, 4118, 4120, 4122, 4124 may execute instructions. In at least one embodiment, register files 4108, 4110 store integer and floating point data operand values that micro-instructions need to execute. In at least one embodiment, processor 4100 may include, without limitation, any number and combination of execution units 4112, 4114, 4116, 4118, 4120, 4122, 4124. In at least one embodiment, floating point ALU 4122 and floating point move unit 4124 may execute floating point, MMX, SIMD, AVX and SSE, or other operations. In at least one embodiment, floating point ALU 4122 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 4116, 4118. In at least one embodiment, fast ALUS 4116, 4118 may execute fast operations with an effective latency of half a clock cycle. In at least one embodiment, most complex integer operations go to slow ALU 4120 as slow ALU 4120 may include, without limitation, integer execution hardware for long-latency type of operations, such as a multiplier, shifts, flag logic, and branch processing. In at least one embodiment, memory load/store operations may be executed by AGUs 4112, 4114. In at least one embodiment, fast ALU 4116, fast ALU 4118, and slow ALU 4120 may perform integer operations on 64-bit data operands. In at least one embodiment, fast ALU 4116, fast ALU 4118, and slow ALU 4120 may be implemented to support a variety of data bit sizes including sixteen, thirty-two, 128, 256, etc. In at least one embodiment, floating point ALU 4122 and floating point move unit 4124 may be implemented to support a range of operands having bits of various widths. In at least one embodiment, floating point ALU 4122 and floating point move unit 4124 may operate on 128-bit wide packed data operands in conjunction with SIMD and multimedia instructions.

In at least one embodiment, uop schedulers 4102, 4104, 4106 dispatch dependent operations before parent load has finished executing. In at least one embodiment, as uops may be speculatively scheduled and executed in processor 4100, processor 4100 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

In at least one embodiment, at least one component shown or described with respect to FIG. 41 is utilized to implement techniques and/or functions described in connection with FIGS. 1-27. In at least one embodiment, at least one component of FIG. 41 is used to identify, generate, remove, process, and/or modify one or more graph dependencies. In at least one embodiment, at least one component of FIG. 41 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 42:
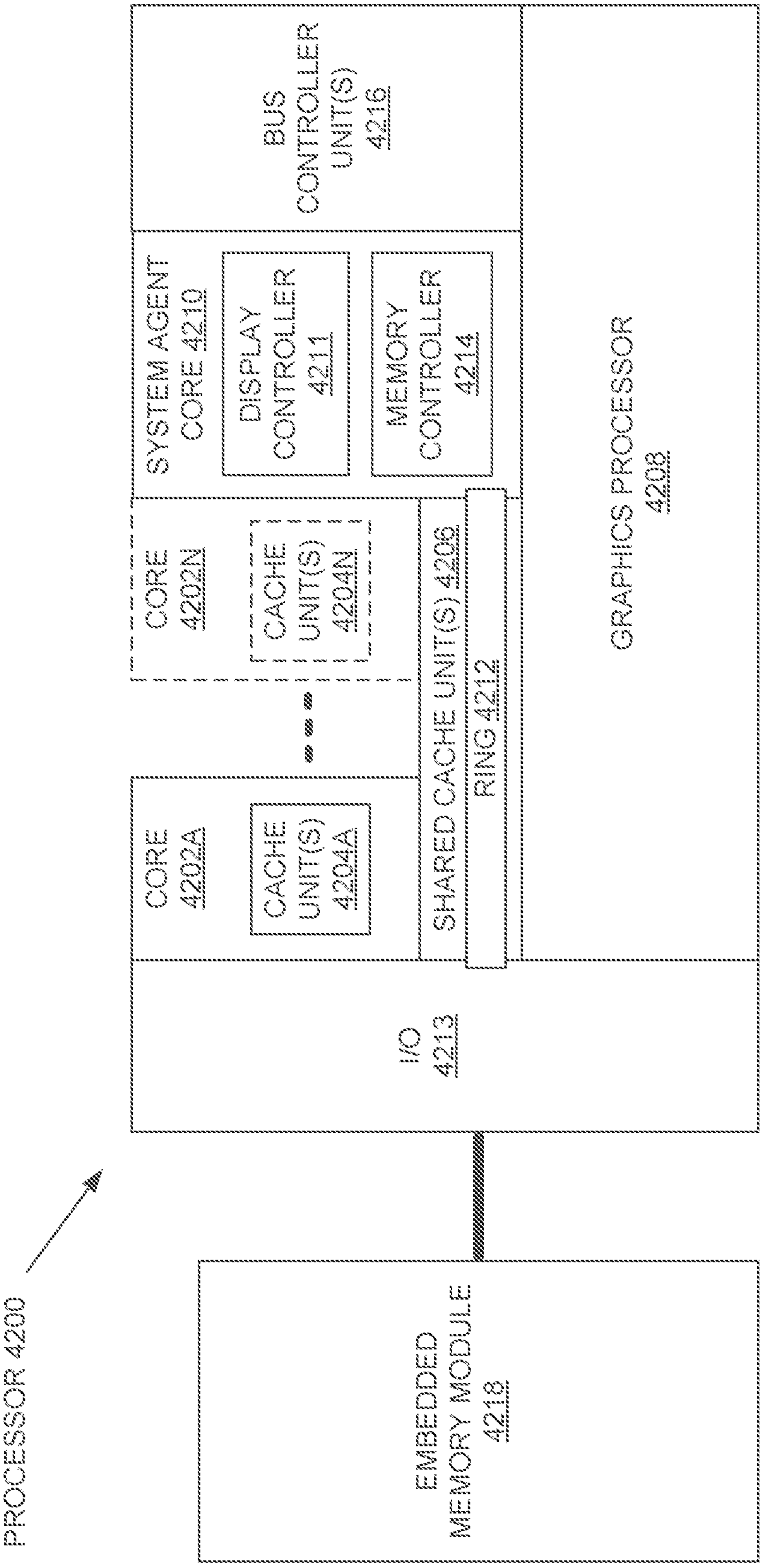
FIG. 42 illustrates a processor, in accordance with at least one embodiment.

FIG. 42 illustrates a processor 4200, in accordance with at least one embodiment. In at least one embodiment, processor 4200 includes, without limitation, one or more processor cores ("cores") 4202A-4202N, an integrated memory controller 4214, and an integrated graphics processor 4208. In at least one embodiment, processor 4200 can include additional cores up to and including additional processor core 4202N represented by dashed lined boxes. In at least one embodiment, each of processor cores 4202A-4202N includes one or more internal cache units 4204A-4204N. In at least one embodiment, each processor core also has access to one or more shared cached units 4206. In at least one embodiment, one or more processor cores 4202A-4202N are referred to as one or more compute units or computing units.

In at least one embodiment, internal cache units 4204A-4204N and shared cache units 4206 represent a cache memory hierarchy within processor 4200. In at least one embodiment, cache memory units 4204A-4204N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 4206 and 4204A-4204N.

In at least one embodiment, processor 4200 may also include a set of one or more bus controller units 4216 and a system agent core 4210. In at least one embodiment, one or more bus controller units 4216 manage a set of peripheral buses, such as one or more PCI or PCI express buses. In at least one embodiment, system agent core 4210 provides management functionality for various processor components. In at least one embodiment, system agent core 4210 includes one or more integrated memory controllers 4214 to manage access to various external memory devices (not shown).

In at least one embodiment, one or more of processor cores 4202A-4202N include support for simultaneous multi-threading. In at least one embodiment, system agent core 4210 includes components for coordinating and operating processor cores 4202A-4202N during multi-threaded processing. In at least one embodiment, system agent core 4210 may additionally include a power control unit ("PCU"), which includes logic and components to regulate one or more power states of processor cores 4202A-4202N and graphics processor 4208.

In at least one embodiment, processor 4200 additionally includes graphics processor 4208 to execute graphics processing operations. In at least one embodiment, graphics processor 4208 couples with shared cache units 4206, and system agent core 4210, including one or more integrated memory controllers 4214. In at least one embodiment, system agent core 4210 also includes a display controller 4211 to drive graphics processor output to one or more coupled displays. In at least one embodiment, display controller 4211 may also be a separate module coupled with graphics processor 4208 via at least one interconnect, or may be integrated within graphics processor 4208.

In at least one embodiment, a ring based interconnect unit 4212 is used to couple internal components of processor 4200. In at least one embodiment, an alternative interconnect unit may be used, such as a point-to-point interconnect, a switched interconnect, or other techniques. In at least one embodiment, graphics processor 4208 couples with ring interconnect 4212 via an I/O link 4213.

In at least one embodiment, I/O link 4213 represents at least one of multiple varieties of I/O interconnects, including an on package I/O interconnect which facilitates communication between various processor components and a high-performance embedded memory module 4218, such as an eDRAM module. In at least one embodiment, each of processor cores 4202A-4202N and graphics processor 4208 use embedded memory modules 4218 as a shared LLC.

In at least one embodiment, processor cores 4202A-4202N are homogeneous cores executing a common instruction set architecture. In at least one embodiment, processor cores 4202A-4202N are heterogeneous in terms of ISA, where one or more of processor cores 4202A-4202N execute a common instruction set, while one or more other cores of processor cores 4202A-42-02N executes a subset of a common instruction set or a different instruction set. In at least one embodiment, processor cores 4202A-4202N are heterogeneous in terms of microarchitecture, where one or more cores having a relatively higher power consumption couple with one or more cores having a lower power consumption. In at least one embodiment, processor 4200 can be implemented on one or more chips or as an SoC integrated circuit.

In at least one embodiment, at least one component shown or described with respect to FIG. 42 is utilized to implement techniques and/or functions described in connection with FIGS. 1-27. In at least one embodiment, at least one component of FIG. 42 is used to identify, generate, remove, process, and/or modify one or more graph dependencies. In at least one embodiment, at least one component of FIG. 42 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 43:
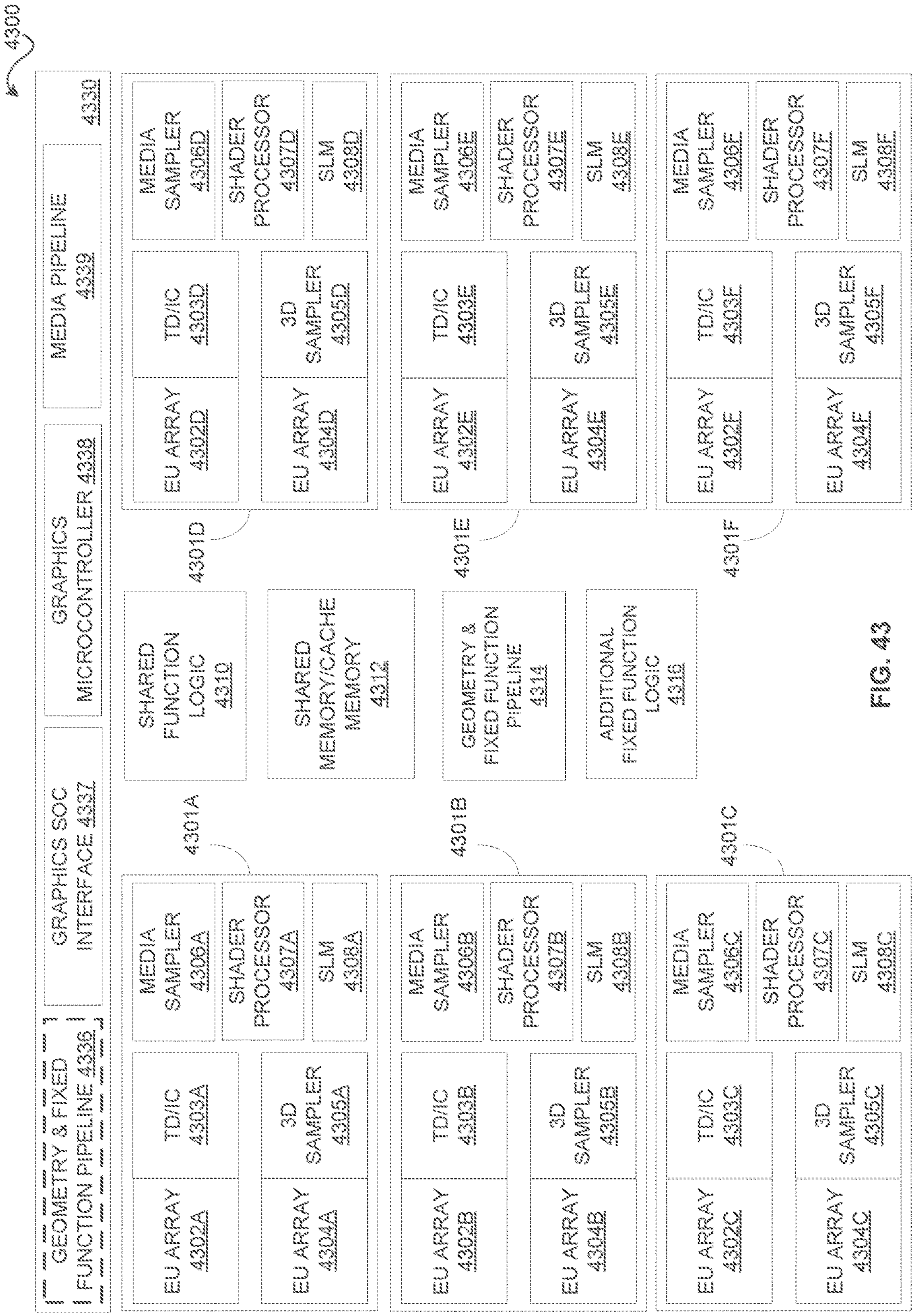
FIG. 43 illustrates a graphics processor core, in accordance with at least one embodiment.

FIG. 43 illustrates a graphics processor core 4300, in accordance with at least one embodiment described. In at least one embodiment, graphics processor core 4300 is included within a graphics core array. In at least one embodiment, graphics processor core 4300, sometimes referred to as a core slice, can be one or multiple graphics cores within a modular graphics processor. In at least one embodiment, graphics processor core 4300 is exemplary of one graphics core slice, and a graphics processor as described herein may include multiple graphics core slices based on target power and performance envelopes. In at least one embodiment, each graphics core 4300 can include a fixed function block 4330 coupled with multiple sub-cores 4301A-4301F, also referred to as sub-slices, that include modular blocks of general-purpose and fixed function logic.

In at least one embodiment, fixed function block 4330 includes a geometry/fixed function pipeline 4336 that can be shared by all sub-cores in graphics processor 4300, for example, in lower performance and/or lower power graphics processor implementations. In at least one embodiment, geometry/fixed function pipeline 4336 includes a 3D fixed function pipeline, a video front-end unit, a thread spawner and thread dispatcher, and a unified return buffer manager, which manages unified return buffers.

In at least one embodiment, fixed function block 4330 also includes a graphics SoC interface 4337, a graphics microcontroller 4338, and a media pipeline 4339. Graphics SoC interface 4337 provides an interface between graphics core 4300 and other processor cores within an SoC integrated circuit. In at least one embodiment, graphics microcontroller 4338 is a programmable sub-processor that is configurable to manage various functions of graphics processor 4300, including thread dispatch, scheduling, and pre-emption. In at least one embodiment, media pipeline 4339 includes logic to facilitate decoding, encoding, preprocessing, and/or post-processing of multimedia data, including image and video data. In at least one embodiment, media pipeline 4339 implements media operations via requests to compute or sampling logic within sub-cores 4301-4301F.

In at least one embodiment, SoC interface 4337 enables graphics core 4300 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 4337 can also enable communication with fixed function devices within an SoC, such as camera imaging pipelines, and enables use of and/or implements global memory atomics that may be shared between graphics core 4300 and CPUs within an SoC. In at least one embodiment, SoC interface 4337 can also implement power management controls for graphics core 4300 and enable an interface between a clock domain of graphic core 4300 and other clock domains within an SoC. In at least one embodiment, SoC interface 4337 enables receipt of command buffers from a command streamer and global thread dispatcher that are configured to provide commands and instructions to each of one or more graphics cores within a graphics processor. In at least one embodiment, commands and instructions can be dispatched to media pipeline 4339, when media operations are to be performed, or a geometry and fixed function pipeline (e.g., geometry and fixed function pipeline 4336, geometry and fixed function pipeline 4314) when graphics processing operations are to be performed.

In at least one embodiment, graphics microcontroller 4338 can be configured to perform various scheduling and management tasks for graphics core 4300. In at least one embodiment, graphics microcontroller 4338 can perform graphics and/or compute workload scheduling on various graphics parallel engines within execution unit (EU) arrays 4302A-4302F, 4304A-4304F within sub-cores 4301A-4301F. In at least one embodiment, host software executing on a CPU core of an SoC including graphics core 4300 can submit workloads one of multiple graphic processor doorbells, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 4338 can also facilitate low-power or idle states for graphics core 4300, providing graphics core 4300 with an ability to save and restore registers within graphics core 4300 across low-power state transitions independently from an operating system and/or graphics driver software on a system.

In at least one embodiment, graphics core 4300 may have greater than or fewer than illustrated sub-cores 4301A-4301F, up to N modular sub-cores. For each set of N sub-cores, in at least one embodiment, graphics core 4300 can also include shared function logic 4310, shared and/or cache memory 4312, a geometry/fixed function pipeline 4314, as well as additional fixed function logic 4316 to accelerate various graphics and compute processing operations. In at least one embodiment, shared function logic 4310 can include logic units (e.g., sampler, math, and/or inter-thread communication logic) that can be shared by each N sub-cores within graphics core 4300. Shared and/or cache memory 4312 can be an LLC for N sub-cores 4301A-4301F within graphics core 4300 and can also serve as shared memory that is accessible by multiple sub-cores. In at least one embodiment, geometry/fixed function pipeline 4314 can be included instead of geometry/fixed function pipeline 4336 within fixed function block 4330 and can include same or similar logic units.

In at least one embodiment, graphics core 4300 includes additional fixed function logic 4316 that can include various fixed function acceleration logic for use by graphics core 4300. In at least one embodiment, additional fixed function logic 4316 includes an additional geometry pipeline for use in position only shading. In position-only shading, at least two geometry pipelines exist, whereas in a full geometry pipeline within geometry/fixed function pipeline 4316, 4336, and a cull pipeline, which is an additional geometry pipeline which may be included within additional fixed function logic 4316. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 4316 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 4316 can also include general purpose processing acceleration logic, such as fixed function matrix multiplication logic, for accelerating CUDA programs.

In at least one embodiment, each graphics sub-core 4301A-4301F includes a set of execution resources that may be used to perform graphics, media, and compute operations in response to requests by graphics pipeline, media pipeline, or shader programs. In at least one embodiment, graphics sub-cores 4301A-4301F include multiple EU arrays 4302A-4302F, 4304A-4304F, thread dispatch and inter-thread communication ("TD/IC") logic 4303A-4303F, a 3D (e.g., texture) sampler 4305A-4305F, a media sampler 4306A-4306F, a shader processor 4307A-4307F, and shared local memory ("SLM") 4308A-4308F. EU arrays 4302A-4302F, 4304A-4304F each include multiple execution units, which are GPGPUs capable of performing floating-point and integer/fixed-point logic operations in service of a graphics, media, or compute operation, including graphics, media, or compute shader programs. In at least one embodiment, TD/IC logic 4303A-4303F performs local thread dispatch and thread control operations for execution units within a sub-core and facilitate communication between threads executing on execution units of a sub-core. In at least one embodiment, 3D sampler 4305A-4305F can read texture or other 3D graphics related data into memory. In at least one embodiment, 3D sampler can read texture data differently based on a configured sample state and texture format associated with a given texture. In at least one embodiment, media sampler 4306A-4306F can perform similar read operations based on a type and format associated with media data. In at least one embodiment, each graphics sub-core 4301A-4301F can alternately include a unified 3D and media sampler. In at least one embodiment, threads executing on execution units within each of sub-cores 4301A-4301F can make use of shared local memory 4308A-4308F within each sub-core, to enable threads executing within a thread group to execute using a common pool of on-chip memory.

In at least one embodiment, at least one component shown or described with respect to FIG. 43 is utilized to implement techniques and/or functions described in connection with FIGS. 1-27. In at least one embodiment, at least one component of FIG. 43 is used to identify, generate, remove, process, and/or modify one or more graph dependencies. In at least one embodiment, at least one component of FIG. 43 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 44:
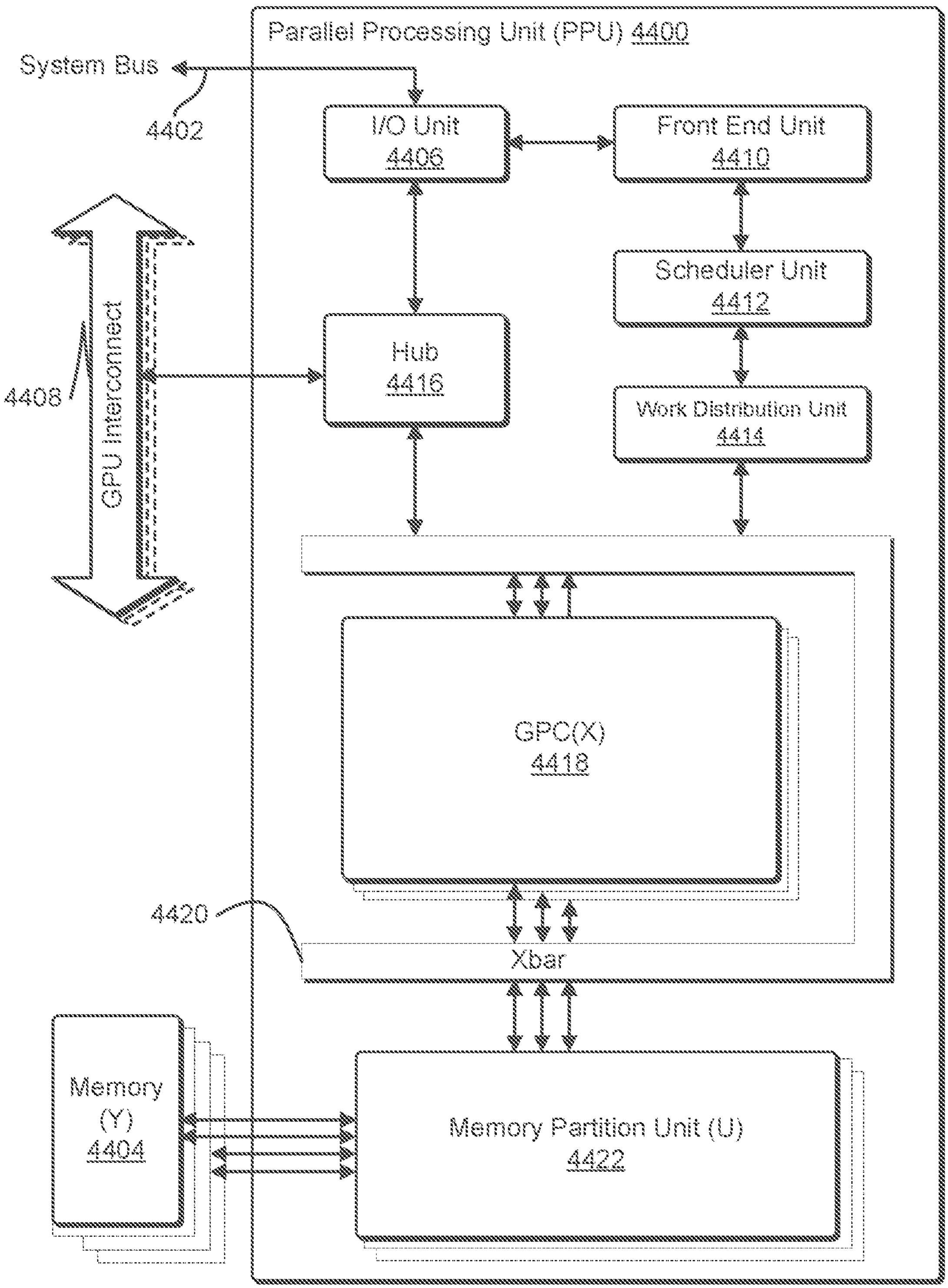
FIG. 44 illustrates a PPU, in accordance with at least one embodiment.

FIG. 44 illustrates a parallel processing unit ("PPU") 4400, in accordance with at least one embodiment. In at least one embodiment, PPU 4400 is configured with machine-readable code that, if executed by PPU 4400, causes PPU 4400 to perform some or all of processes and techniques described herein. In at least one embodiment, PPU 4400 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 4400. In at least one embodiment, PPU 4400 is a GPU configured to implement a graphics rendering pipeline for processing three-dimensional ("3D") graphics data in order to generate two-dimensional ("2D") image data for display on a display device such as an LCD device. In at least one embodiment, PPU 4400 is utilized to perform computations such as linear algebra operations and machine-learning operations. FIG. 44 illustrates an example parallel processor for illustrative purposes only and should be construed as a non-limiting example of a processor architecture that may be implemented in at least one embodiment.

In at least one embodiment, one or more PPUs 4400 are configured to accelerate High Performance Computing ("HPC"), data center, and machine learning applications. In at least one embodiment, one or more PPUs 4400 are configured to accelerate CUDA programs. In at least one embodiment, PPU 4400 includes, without limitation, an I/O unit 4406, a front-end unit 4410, a scheduler unit 4412, a work distribution unit 4414, a hub 4416, a crossbar ("Xbar") 4420, one or more general processing clusters ("GPCs") 4418, and one or more partition units ("memory partition units") 4422. In at least one embodiment, PPU 4400 is connected to a host processor or other PPUs 4400 via one or more high-speed GPU interconnects ("GPU interconnects") 4408. In at least one embodiment, PPU 4400 is connected to a host processor or other peripheral devices via a system bus or interconnect 4402. In at least one embodiment, PPU 4400 is connected to a local memory comprising one or more memory devices ("memory") 4404. In at least one embodiment, memory devices 4404 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 4408 may refer to a wire-based multi-lane communications link that is used by systems to scale and include one or more PPUs 4400 combined with one or more CPUs, supports cache coherence between PPUs 4400 and CPUs, and CPU mastering. In at least one embodiment, data and/or commands are transmitted by high-speed GPU interconnect 4408 through hub 4416 to/from other units of PPU 4400 such as one or more copy engines, video encoders, video decoders, power management units, and other components which may not be explicitly illustrated in FIG. 44.

In at least one embodiment, I/O unit 4406 is configured to transmit and receive communications (e.g., commands, data) from a host processor (not illustrated in FIG. 44) over system bus 4402. In at least one embodiment, I/O unit 4406 communicates with host processor directly via system bus 4402 or through one or more intermediate devices such as a memory bridge. In at least one embodiment, I/O unit 4406 may communicate with one or more other processors, such as one or more of PPUs 4400 via system bus 4402. In at least one embodiment, I/O unit 4406 implements a PCIe interface for communications over a PCIe bus. In at least one embodiment, I/O unit 4406 implements interfaces for communicating with external devices.

In at least one embodiment, I/O unit 4406 decodes packets received via system bus 4402. In at least one embodiment, at least some packets represent commands configured to cause PPU 4400 to perform various operations. In at least one embodiment, I/O unit 4406 transmits decoded commands to various other units of PPU 4400 as specified by commands. In at least one embodiment, commands are transmitted to front-end unit 4410 and/or transmitted to hub 4416 or other units of PPU 4400 such as one or more copy engines, a video encoder, a video decoder, a power management unit, etc. (not explicitly illustrated in FIG. 44). In at least one embodiment, I/O unit 4406 is configured to route communications between and among various logical units of PPU 4400.

In at least one embodiment, a program executed by host processor encodes a command stream in a buffer that provides workloads to PPU 4400 for processing. In at least one embodiment, a workload comprises instructions and data to be processed by those instructions. In at least one embodiment, buffer is a region in a memory that is accessible (e.g., read/write) by both a host processor and PPU 4400—a host interface unit may be configured to access buffer in a system memory connected to system bus 4402 via memory requests transmitted over system bus 4402 by I/O unit 4406. In at least one embodiment, a host processor writes a command stream to a buffer and then transmits a pointer to the start of the command stream to PPU 4400 such that front-end unit 4410 receives pointers to one or more command streams and manages one or more command streams, reading commands from command streams and forwarding commands to various units of PPU 4400.

In at least one embodiment, front-end unit 4410 is coupled to scheduler unit 4412 that configures various GPCs 4418 to process tasks defined by one or more command streams. In at least one embodiment, scheduler unit 4412 is configured to track state information related to various tasks managed by scheduler unit 4412 where state information may indicate which of GPCs 4418 a task is assigned to, whether task is active or inactive, a priority level associated with task, and so forth. In at least one embodiment, scheduler unit 4412 manages execution of a plurality of tasks on one or more of GPCs 4418.

In at least one embodiment, scheduler unit 4412 is coupled to work distribution unit 4414 that is configured to dispatch tasks for execution on GPCs 4418. In at least one embodiment, work distribution unit 4414 tracks a number of scheduled tasks received from scheduler unit 4412 and work distribution unit 4414 manages a pending task pool and an active task pool for each of GPCs 4418. In at least one embodiment, pending task pool comprises a number of slots (e.g., 32 slots) that contain tasks assigned to be processed by a particular GPC 4418; active task pool may comprise a number of slots (e.g., 4 slots) for tasks that are actively being processed by GPCs 4418 such that as one of GPCs 4418 completes execution of a task, that task is evicted from active task pool for GPC 4418 and one of other tasks from pending task pool is selected and scheduled for execution on GPC 4418. In at least one embodiment, if an active task is idle on GPC 4418, such as while waiting for a data dependency to be resolved, then the active task is evicted from GPC 4418 and returned to a pending task pool while another task in the pending task pool is selected and scheduled for execution on GPC 4418.

In at least one embodiment, work distribution unit 4414 communicates with one or more GPCs 4418 via XBar 4420. In at least one embodiment, XBar 4420 is an interconnect network that couples many units of PPU 4400 to other units of PPU 4400 and can be configured to couple work distribution unit 4414 to a particular GPC 4418. In at least one embodiment, one or more other units of PPU 4400 may also be connected to XBar 4420 via hub 4416.

In at least one embodiment, tasks are managed by scheduler unit 4412 and dispatched to one of GPCs 4418 by work distribution unit 4414. GPC 4418 is configured to process task and generate results. In at least one embodiment, results may be consumed by other tasks within GPC 4418, routed to a different GPC 4418 via XBar 4420, or stored in memory 4404. In at least one embodiment, results can be written to memory 4404 via partition units 4422, which implement a memory interface for reading and writing data to/from memory 4404. In at least one embodiment, results can be transmitted to another PPU 4404 or CPU via high-speed GPU interconnect 4408. In at least one embodiment, PPU 4400 includes, without limitation, a number U of partition units 4422 that is equal to number of separate and distinct memory devices 4404 coupled to PPU 4400.

In at least one embodiment, a host processor executes a driver kernel that implements an application programming interface ("API") that enables one or more applications executing on host processor to schedule operations for execution on PPU 4400. In at least one embodiment, multiple compute applications are simultaneously executed by PPU 4400 and PPU 4400 provides isolation, quality of service ("QoS"), and independent address spaces for multiple compute applications. In at least one embodiment, an application generates instructions (e.g., in the form of API calls) that cause a driver kernel to generate one or more tasks for execution by PPU 4400 and the driver kernel outputs tasks to one or more streams being processed by PPU 4400. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

In at least one embodiment, at least one component shown or described with respect to FIG. 44 is utilized to implement techniques and/or functions described in connection with FIGS. 1-27. In at least one embodiment, at least one component of FIG. 44 is used to identify, generate, remove, process, and/or modify one or more graph dependencies. In at least one embodiment, at least one component of FIG. 44 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 45:
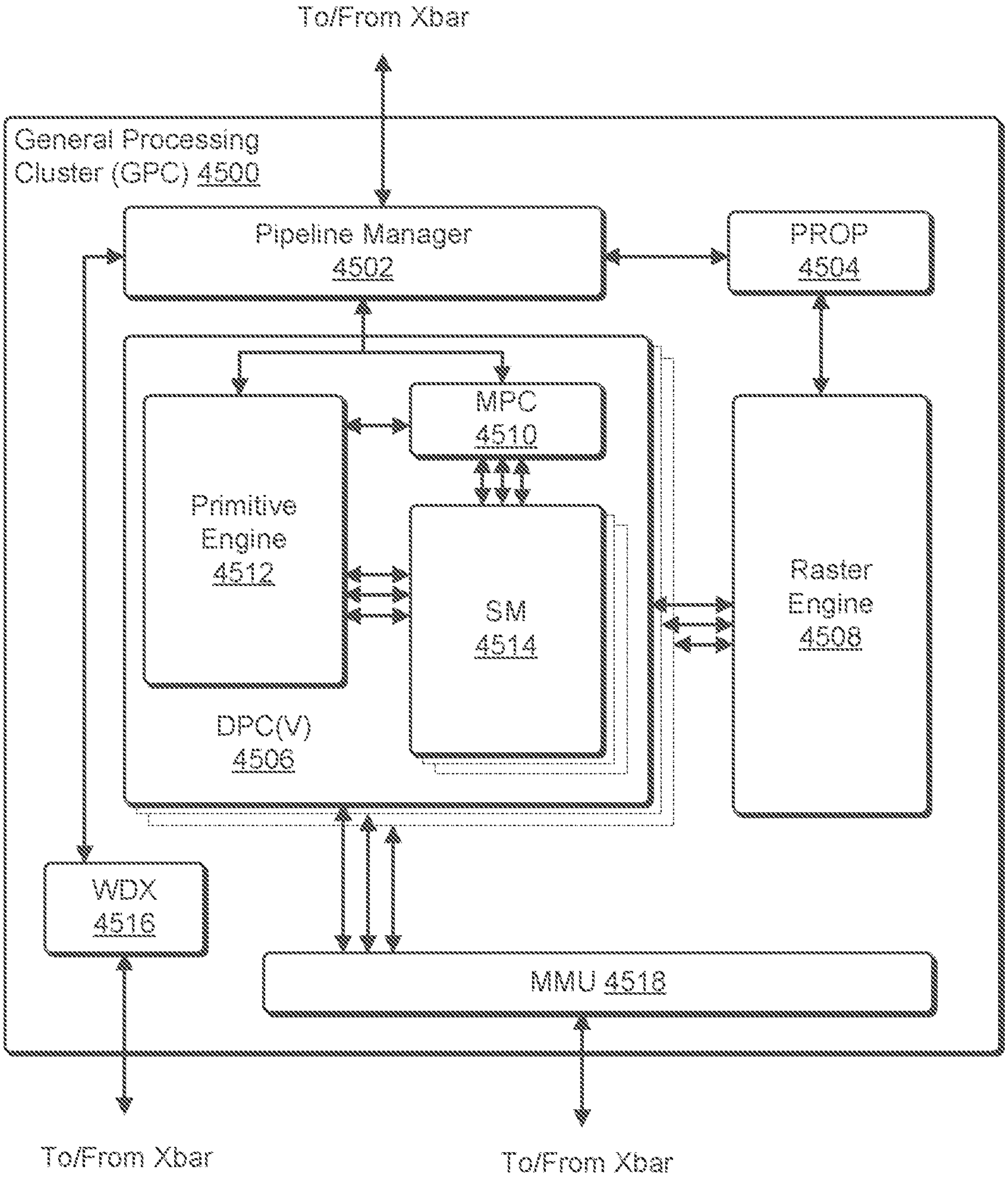
FIG. 45 illustrates a GPC, in accordance with at least one embodiment.

FIG. 45 illustrates a GPC 4500, in accordance with at least one embodiment. In at least one embodiment, GPC 4500 is GPC 4418 of FIG. 44. In at least one embodiment, each GPC 4500 includes, without limitation, a number of hardware units for processing tasks and each GPC 4500 includes, without limitation, a pipeline manager 4502, a pre-raster operations unit ("PROP") 4504, a raster engine 4508, a work distribution crossbar ("WDX") 4516, an MMU 4518, one or more Data Processing Clusters ("DPCs") 4506, and any suitable combination of parts.

In at least one embodiment, operation of GPC 4500 is controlled by pipeline manager 4502. In at least one embodiment, pipeline manager 4502 manages configuration of one or more DPCs 4506 for processing tasks allocated to GPC 4500. In at least one embodiment, pipeline manager 4502 configures at least one of one or more DPCs 4506 to implement at least a portion of a graphics rendering pipeline. In at least one embodiment, DPC 4506 is configured to execute a vertex shader program on a programmable streaming multiprocessor ("SM") 4514. In at least one embodiment, pipeline manager 4502 is configured to route packets received from a work distribution unit to appropriate logical units within GPC 4500 and, in at least one embodiment, some packets may be routed to fixed function hardware units in PROP 4504 and/or raster engine 4508 while other packets may be routed to DPCs 4506 for processing by a primitive engine 4512 or SM 4514. In at least one embodiment, pipeline manager 4502 configures at least one of DPCs 4506 to implement a computing pipeline. In at least one embodiment, pipeline manager 4502 configures at least one of DPCs 4506 to execute at least a portion of a CUDA program.

In at least one embodiment, PROP unit 4504 is configured to route data generated by raster engine 4508 and DPCs 4506 to a Raster Operations ("ROP") unit in a partition unit, such as memory partition unit 4422 described in more detail above in conjunction with FIG. 44. In at least one embodiment, PROP unit 4504 is configured to perform optimizations for color blending, organize pixel data, perform address translations, and more. In at least one embodiment, raster engine 4508 includes, without limitation, a number of fixed function hardware units configured to perform various raster operations and, in at least one embodiment, raster engine 4508 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 4508 comprises fragments to be processed by any suitable entity such as by a fragment shader implemented within DPC 4506.

In at least one embodiment, each DPC 4506 included in GPC 4500 comprise, without limitation, an M-Pipe Controller ("MPC") 4510; primitive engine 4512; one or more SMs 4514; and any suitable combination thereof. In at least one embodiment, MPC 4510 controls operation of DPC 4506, routing packets received from pipeline manager 4502 to appropriate units in DPC 4506. In at least one embodiment, packets associated with a vertex are routed to primitive engine 4512, which is configured to fetch vertex attributes associated with vertex from memory; in contrast, packets associated with a shader program may be transmitted to SM 4514.

In at least one embodiment, SM 4514 comprises, without limitation, a programmable streaming processor that is configured to process tasks represented by a number of threads. In at least one embodiment, SM 4514 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 4514 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 4514 is described in more detail in conjunction with FIG. 46.

In at least one embodiment, MMU 4518 provides an interface between GPC 4500 and a memory partition unit (e.g., partition unit 4422 of FIG. 44) and MMU 4518 provides translation of virtual addresses into physical addresses, memory protection, and arbitration of memory requests. In at least one embodiment, MMU 4518 provides one or more translation lookaside buffers (TLBs) for performing translation of virtual addresses into physical addresses in memory.

In at least one embodiment, at least one component shown or described with respect to FIG. 45 is utilized to implement techniques and/or functions described in connection with FIGS. 1-27. In at least one embodiment, at least one component of FIG. 45 is used to identify, generate, remove, process, and/or modify one or more graph dependencies. In at least one embodiment, at least one component of FIG. 45 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 46:
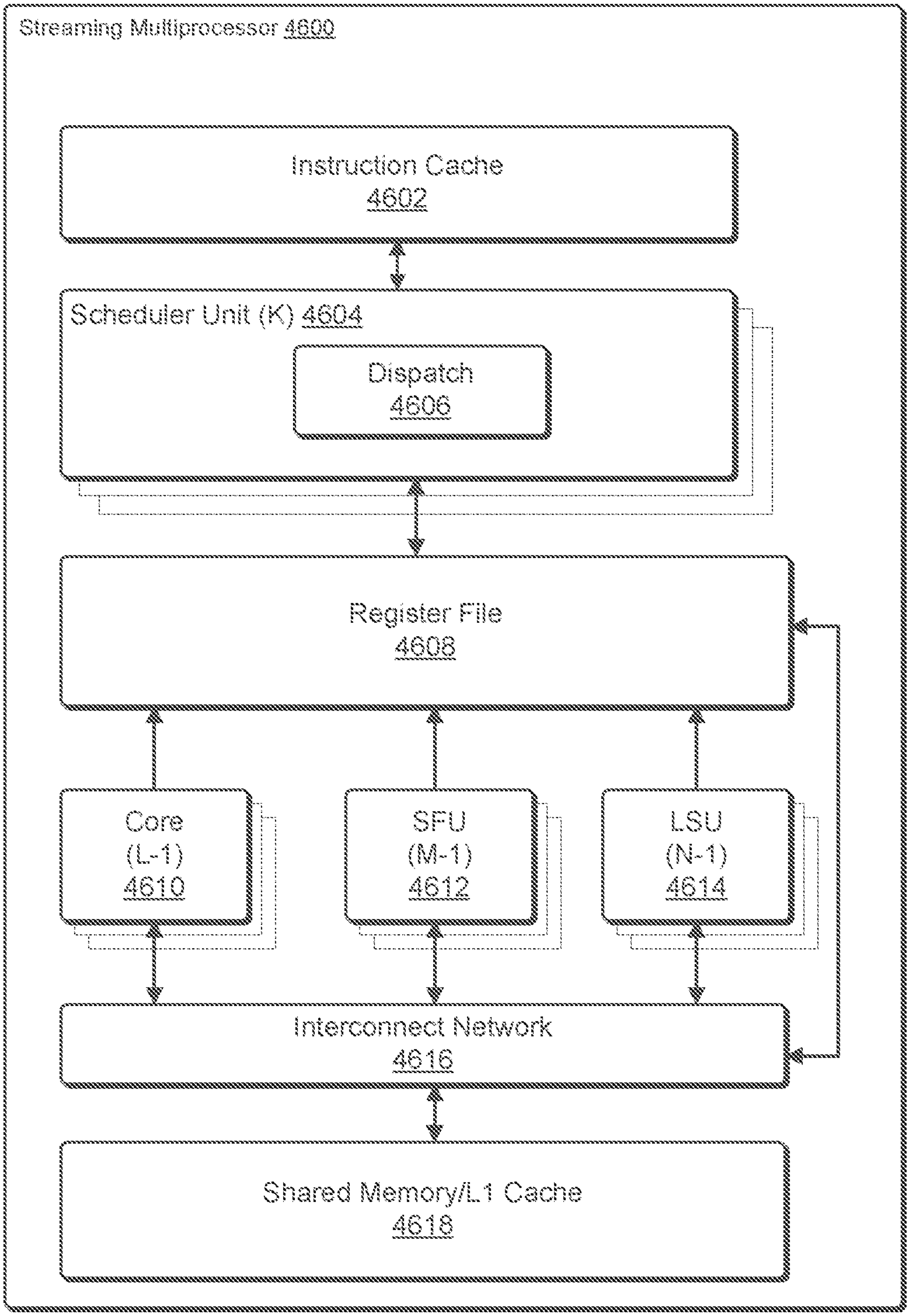
FIG. 46 illustrates a streaming multiprocessor, in accordance with at least one embodiment.

FIG. 46 illustrates a streaming multiprocessor ("SM") 4600, in accordance with at least one embodiment. In at least one embodiment, SM 4600 is SM 4514 of FIG. 45. In at least one embodiment, SM 4600 includes, without limitation, an instruction cache 4602; one or more scheduler units 4604; a register file 4608; one or more processing cores ("cores") 4610; one or more special function units ("SFUs") 4612; one or more LSUs 4614; an interconnect network 4616; a shared memory/L1 cache 4618; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 4600. In at least one embodiment, scheduler unit 4604 receives tasks from a work distribution unit and manages instruction scheduling for one or more thread blocks assigned to SM 4600. In at least one embodiment, scheduler unit 4604 schedules thread blocks for execution as warps of parallel threads, wherein each thread block is allocated at least one warp. In at least one embodiment, each warp executes threads. In at least one embodiment, scheduler unit 4604 manages a plurality of different thread blocks, allocating warps to different thread blocks and then dispatching instructions from a plurality of different cooperative groups to various functional units (e.g., processing cores 4610, SFUs 4612, and LSUs 4614) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 4606 is configured to transmit instructions to one or more of functional units and scheduler unit 4604 includes, without limitation, two dispatch units 4606 that enable two different instructions from same warp to be dispatched during each clock cycle. In at least one embodiment, each scheduler unit 4604 includes a single dispatch unit 4606 or additional dispatch units 4606.

In at least one embodiment, each SM 4600, in at least one embodiment, includes, without limitation, register file 4608 that provides a set of registers for functional units of SM 4600. In at least one embodiment, register file 4608 is divided between each of the functional units such that each functional unit is allocated a dedicated portion of register file 4608. In at least one embodiment, register file 4608 is divided between different warps being executed by SM 4600 and register file 4608 provides temporary storage for operands connected to data paths of functional units. In at least one embodiment, each SM 4600 comprises, without limitation, a plurality of L processing cores 4610. In at least one embodiment, SM 4600 includes, without limitation, a large number (e.g., 128 or more) of distinct processing cores 4610. In at least one embodiment, each processing core 4610 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4610 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 4610. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 4600 comprises, without limitation, M SFUs 4612 that perform special functions (e.g., attribute evaluation, reciprocal square root, and like). In at least one embodiment, SFUs 4612 include, without limitation, a tree traversal unit configured to traverse a hierarchical tree data structure. In at least one embodiment, SFUs 4612 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4600. In at least one embodiment, texture maps are stored in shared memory/L1 cache 4618. In at least one embodiment, texture units implement texture operations such as filtering operations using mip-maps (e.g., texture maps of varying levels of detail). In at least one embodiment, each SM 4600 includes, without limitation, two texture units.

In at least one embodiment, each SM 4600 comprises, without limitation, N LSUs 4614 that implement load and store operations between shared memory/L1 cache 4618 and register file 4608. In at least one embodiment, each SM 4600 includes, without limitation, interconnect network 4616 that connects each of the functional units to register file 4608 and LSU 4614 to register file 4608 and shared memory/L1 cache 4618. In at least one embodiment, interconnect network 4616 is a crossbar that can be configured to connect any of the functional units to any of the registers in register file 4608 and connect LSUs 4614 to register file 4608 and memory locations in shared memory/L1 cache 4618.

In at least one embodiment, shared memory/L1 cache 4618 is an array of on-chip memory that allows for data storage and communication between SM 4600 and a primitive engine and between threads in SM 4600. In at least one embodiment, shared memory/L1 cache 4618 comprises, without limitation, 128 KB of storage capacity and is in a path from SM 4600 to a partition unit. In at least one embodiment, shared memory/L1 cache 4618 is used to cache reads and writes. In at least one embodiment, one or more of shared memory/L1 cache 4618, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 4618 enables shared memory/L1 cache 4618 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 4600 to execute a program and perform calculations, shared memory/L1 cache 4618 to communicate between threads, and LSU 4614 to read and write global memory through shared memory/L1 cache 4618 and a memory partition unit. In at least one embodiment, when configured for general purpose parallel computation, SM 4600 writes commands that scheduler unit 4604 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

In at least one embodiment, at least one component shown or described with respect to FIG. 46 is utilized to implement techniques and/or functions described in connection with FIGS. 1-27. In at least one embodiment, at least one component of FIG. 46 is used to identify, generate, remove, process, and/or modify one or more graph dependencies. In at least one embodiment, at least one component of FIG. 46 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Software Constructions for General-Purpose Computing

The following figures set forth, without limitation, exemplary software constructs for implementing at least one embodiment.

Figure 47:
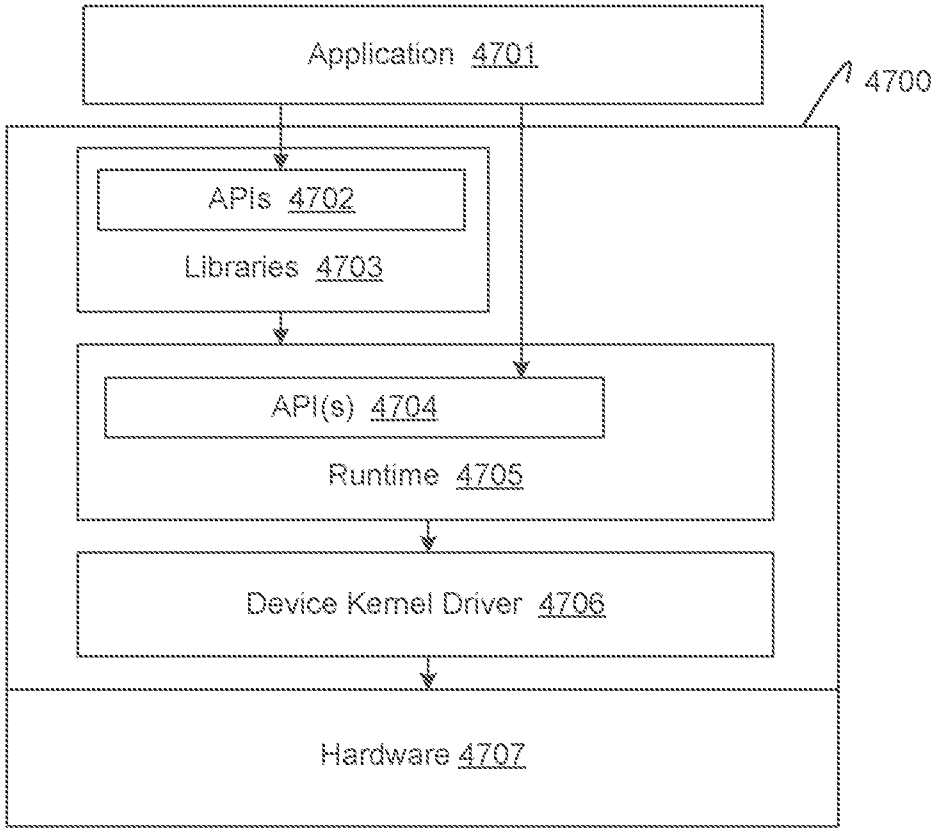
FIG. 47 illustrates a software stack of a programming platform, in accordance with at least one embodiment.

FIG. 47 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4700 of a programming platform provides an execution environment for an application 4701. In at least one embodiment, application 4701 may include any computer software capable of being launched on software stack 4700. In at least one embodiment, application 4701 may include, but is not limited to, an artificial intelligence ("AI")/machine learning ("ML") application, a high performance computing ("HPC") application, a virtual desktop infrastructure ("VDI"), or a data center workload.

In at least one embodiment, application 4701 and software stack 4700 run on hardware 4707. Hardware 4707 may include one or more GPUs, CPUs, FPGAs, AI engines, and/or other types of compute devices that support a programming platform, in at least one embodiment. In at least one embodiment, such as with CUDA, software stack 4700 may be vendor specific and compatible with only devices from particular vendor(s). In at least one embodiment, such as in with OpenCL, software stack 4700 may be used with devices from different vendors. In at least one embodiment, hardware 4707 includes a host connected to one more devices that can be accessed to perform computational tasks via application programming interface ("API") calls. A device within hardware 4707 may include, but is not limited to, a GPU, FPGA, AI engine, or other compute device (but may also include a CPU) and its memory, as opposed to a host within hardware 4707 that may include, but is not limited to, a CPU (but may also include a compute device) and its memory, in at least one embodiment.

In at least one embodiment, software stack 4700 of a programming platform includes, without limitation, a number of libraries 4703, a runtime 4705, and a device kernel driver 4706. Each of libraries 4703 may include data and programming code that can be used by computer programs and leveraged during software development, in at least one embodiment. In at least one embodiment, libraries 4703 may include, but are not limited to, pre-written code and subroutines, classes, values, type specifications, configuration data, documentation, help data, and/or message templates. In at least one embodiment, libraries 4703 include functions that are optimized for execution on one or more types of devices. In at least one embodiment, libraries 4703 may include, but are not limited to, functions for performing mathematical, deep learning, and/or other types of operations on devices. In at least one embodiment, libraries 4703 are associated with corresponding APIs 4702, which may include one or more APIs, that expose functions implemented in libraries 4703. In at least one embodiment, a processor (e.g. CPU, GPU) performs, calls, or otherwise uses one or more APIs to prioritize kernels. For example, a first kernel (e.g., parent) can launch a second kernel (e.g., child kernel), and said second kernel can be used by a processor to launch additional kernels (e.g., grandchildren kernels) independent of said first kernel. In at least one embodiment, a processor performs an API to support dynamic stream priority (e.g., updating priority while a stream is being used to perform operations). For example, when a processor performs said API, it allows a programmer to copy stream priority from one stream to one or more other streams.

In at least one embodiment, software stack 4700 includes an API to support dynamic stream priority (e.g., updating priority while a stream is being used to perform operations), which allows a programmer to set priority of a stream at any time after creation. In at least one embodiment, software stack 4700 includes an API to support dynamic stream priority (e.g., updating priority while the stream is being used to perform operations), which allows a programmer to obtain current priority of a stream, where the priority is one of a plurality of attributes of a stream. In at least one embodiment, software stack 4700 includes an API to support dynamic stream priority (e.g., updating priority while the stream is being used to perform operations), which allows a programmer to obtain current priority of a stream as a single attribute. In at least one embodiment, software stack 4700 includes an API to support dynamic stream priority (e.g., updating priority while the stream is being used to perform operations), which allows a programmer to launch a kernel to perform operations on a stream at a set priority, which may be different from the stream priority.

In at least one embodiment, application 4701 is written as source code that is compiled into executable code, as discussed in greater detail below in conjunction with FIGS. 52-54. Executable code of application 4701 may run, at least in part, on an execution environment provided by software stack 4700, in at least one embodiment. In at least one embodiment, during execution of application 4701, code may be reached that needs to run on a device, as opposed to a host. In such a case, runtime 4705 may be called to load and launch requisite code on the device, in at least one embodiment. In at least one embodiment, runtime 4705 may include any technically feasible runtime system that is able to support execution of application S01.

In at least one embodiment, runtime 4705 is implemented as one or more runtime libraries associated with corresponding APIs, which are shown as API(s) 4704. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4704 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 4706 is configured to facilitate communication with an underlying device. In at least one embodiment, device kernel driver 4706 may provide low-level functionalities upon which APIs, such as API(s) 4704, and/or other software relies. In at least one embodiment, device kernel driver 4706 may be configured to compile intermediate representation ("IR") code into binary code at runtime. For CUDA, device kernel driver 4706 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4706 to compile IR code at runtime.

In at least one embodiment, at least one component shown or described with respect to FIG. 47 is utilized to implement techniques and/or functions described in connection with FIGS. 1-27. In at least one embodiment, at least one component of FIG. 47 is used to identify, generate, remove, process, and/or modify one or more graph dependencies. In at least one embodiment, at least one component of FIG. 47 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 48:
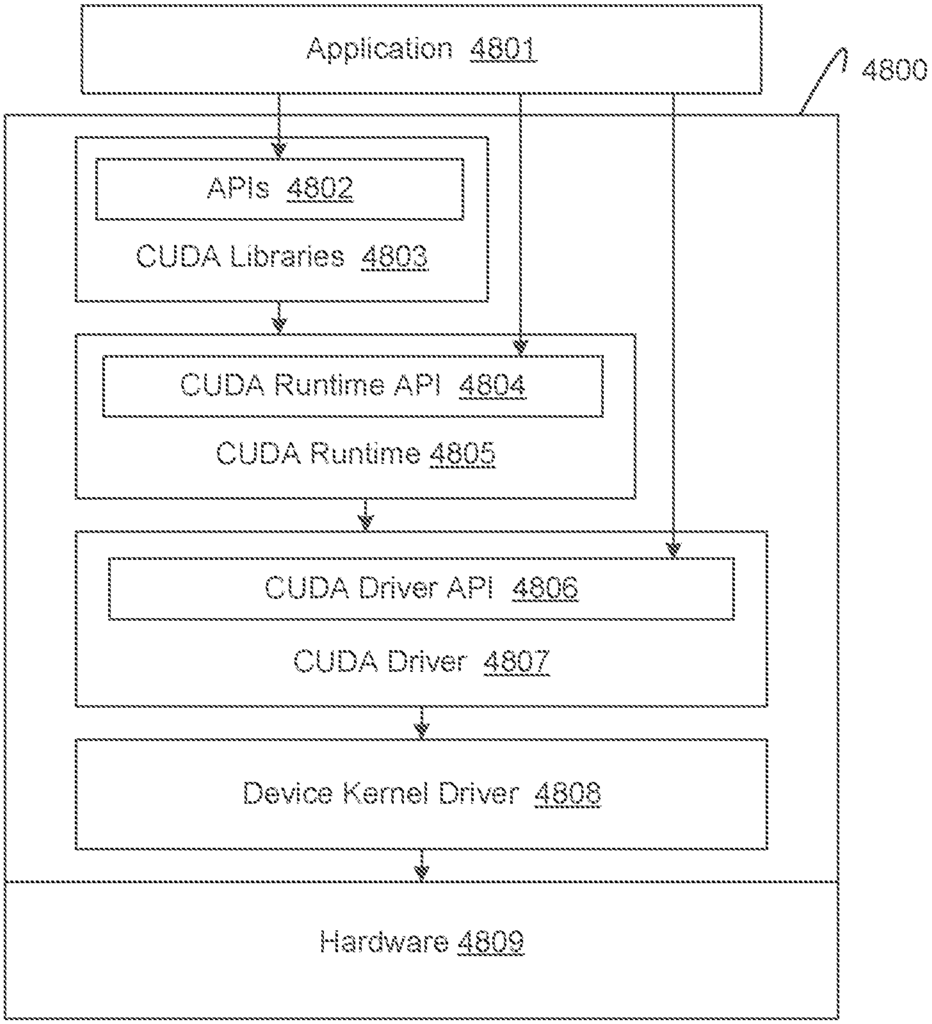
FIG. 48 illustrates a CUDA implementation of a software stack of FIG. 47, in accordance with at least one embodiment.

FIG. 48 illustrates a CUDA implementation of software stack 4700 of FIG. 47, in accordance with at least one embodiment. In at least one embodiment, a CUDA software stack 4800, on which an application 4801 may be launched, includes CUDA libraries 4803, a CUDA runtime 4805, a CUDA driver 4807, and a device kernel driver 4808. In at least one embodiment, CUDA software stack 4800 executes on hardware 4809, which may include a GPU that supports CUDA and is developed by NVIDIA Corporation of Santa Clara, CA.

In at least one embodiment, application 4801, CUDA runtime 4805, and device kernel driver 4808 may perform similar functionalities as application 4701, runtime 4705, and device kernel driver 4706, respectively, which are described above in conjunction with FIG. 47. In at least one embodiment, CUDA driver 4807 includes a library (libcuda.so) that implements a CUDA driver API 4806. Similar to a CUDA runtime API 4804 implemented by a CUDA runtime library (cudart), CUDA driver API 4806 may, without limitation, expose functions for memory management, execution control, device management, error handling, synchronization, and/or graphics interoperability, among other things, in at least one embodiment. In at least one embodiment, CUDA driver API 4806 differs from CUDA runtime API 4804 in that CUDA runtime API 4804 simplifies device code management by providing implicit initialization, context (analogous to a process) management, and module (analogous to dynamically loaded libraries) management. In contrast to high-level CUDA runtime API 4804, CUDA driver API 4806 is a low-level API providing more fine-grained control of the device, particularly with respect to contexts and module loading, in at least one embodiment. In at least one embodiment, CUDA driver API 4806 may expose functions for context management that are not exposed by CUDA runtime API 4804. In at least one embodiment, CUDA driver API 4806 is also language-independent and supports, e.g., OpenCL in addition to CUDA runtime API 4804. Further, in at least one embodiment, development libraries, including CUDA runtime 4805, may be considered as separate from driver components, including user-mode CUDA driver 4807 and kernel-mode device driver 4808 (also sometimes referred to as a "display" driver).

In at least one embodiment, CUDA libraries 4803 may include, but are not limited to, mathematical libraries, deep learning libraries, parallel algorithm libraries, and/or signal/image/video processing libraries, which parallel computing applications such as application 4801 may utilize. In at least one embodiment, CUDA libraries 4803 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4803 may include deep learning libraries such as a cuDNN library of primitives for deep neural networks and a TensorRT platform for high-performance deep learning inference, among others.

Figure 49:
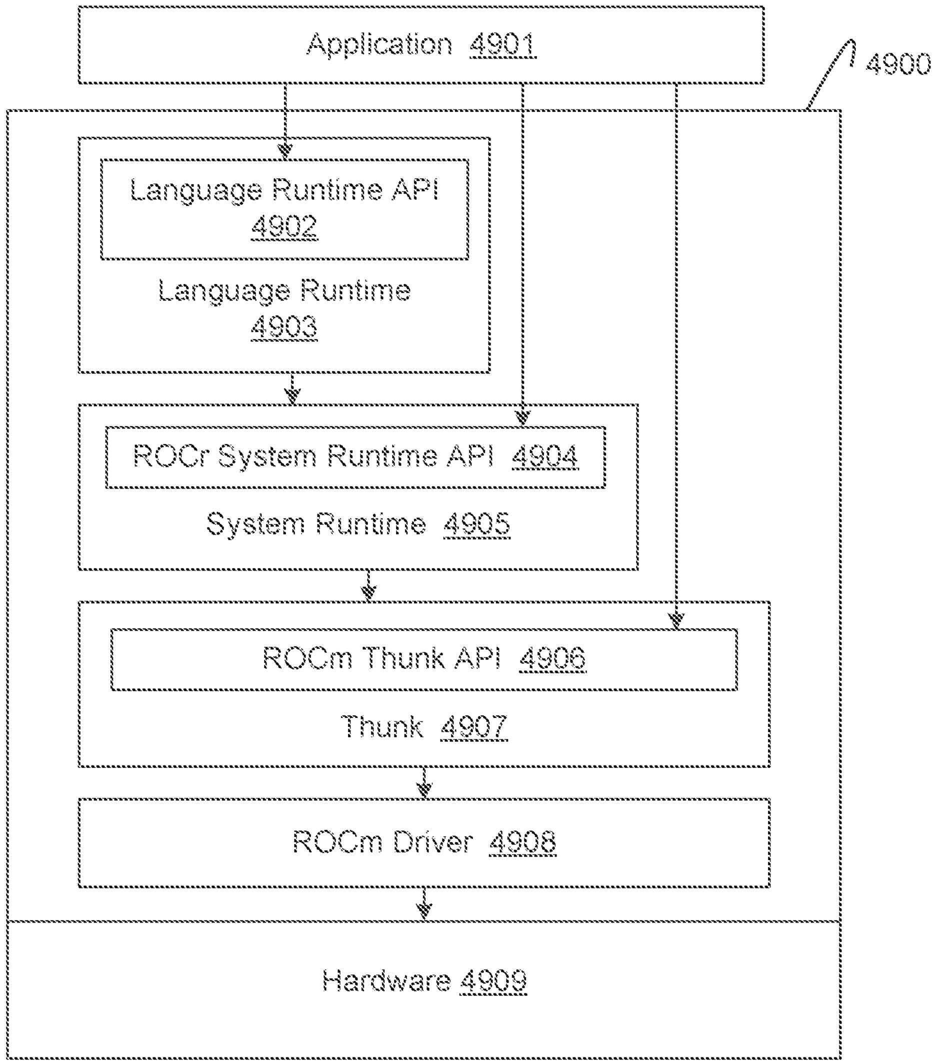
FIG. 49 illustrates a ROCm implementation of a software stack of FIG. 47, in accordance with at least one embodiment.

FIG. 49 illustrates a ROCm implementation of software stack 4700 of FIG. 47, in accordance with at least one embodiment. In at least one embodiment, a ROCm software stack 4900, on which an application 4901 may be launched, includes a language runtime 4903, a system runtime 4905, a thunk 4907, and a ROCm kernel driver 4908. In at least one embodiment, ROCm software stack 4900 executes on hardware 4909, which may include a GPU that supports ROCm and is developed by AMD Corporation of Santa Clara, CA.

In at least one embodiment, application 4901 may perform similar functionalities as application 4701 discussed above in conjunction with FIG. 47. In addition, language runtime 4903 and system runtime 4905 may perform similar functionalities as runtime 4705 discussed above in conjunction with FIG. 47, in at least one embodiment. In at least one embodiment, language runtime 4903 and system runtime 4905 differ in that system runtime 4905 is a language-independent runtime that implements a ROCr system runtime API 4904 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4905, language runtime 4903 is an implementation of a language-specific runtime API 4902 layered on top of ROCr system runtime API 4904, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4804 discussed above in conjunction with FIG. 48, such as functions for memory management, execution control, device management, error handling, and synchronization, among other things.

In at least one embodiment, thunk (ROCt) 4907 is an interface 4906 that can be used to interact with underlying ROCm driver 4908. In at least one embodiment, ROCm driver 4908 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 4706 discussed above in conjunction with FIG. 47. In at least one embodiment, HSA kernel driver is a driver permitting different types of processors to share system resources more effectively via hardware features.

In at least one embodiment, various libraries (not shown) may be included in ROCm software stack 4900 above language runtime 4903 and provide functionality similarity to CUDA libraries 4803, discussed above in conjunction with FIG. 48. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, at least one component shown or described with respect to FIG. 49 is utilized to implement techniques and/or functions described in connection with FIGS. 1-27. In at least one embodiment, at least one component of FIG. 49 is used to identify, generate, remove, process, and/or modify one or more graph dependencies. In at least one embodiment, at least one component of FIG. 49 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 50:
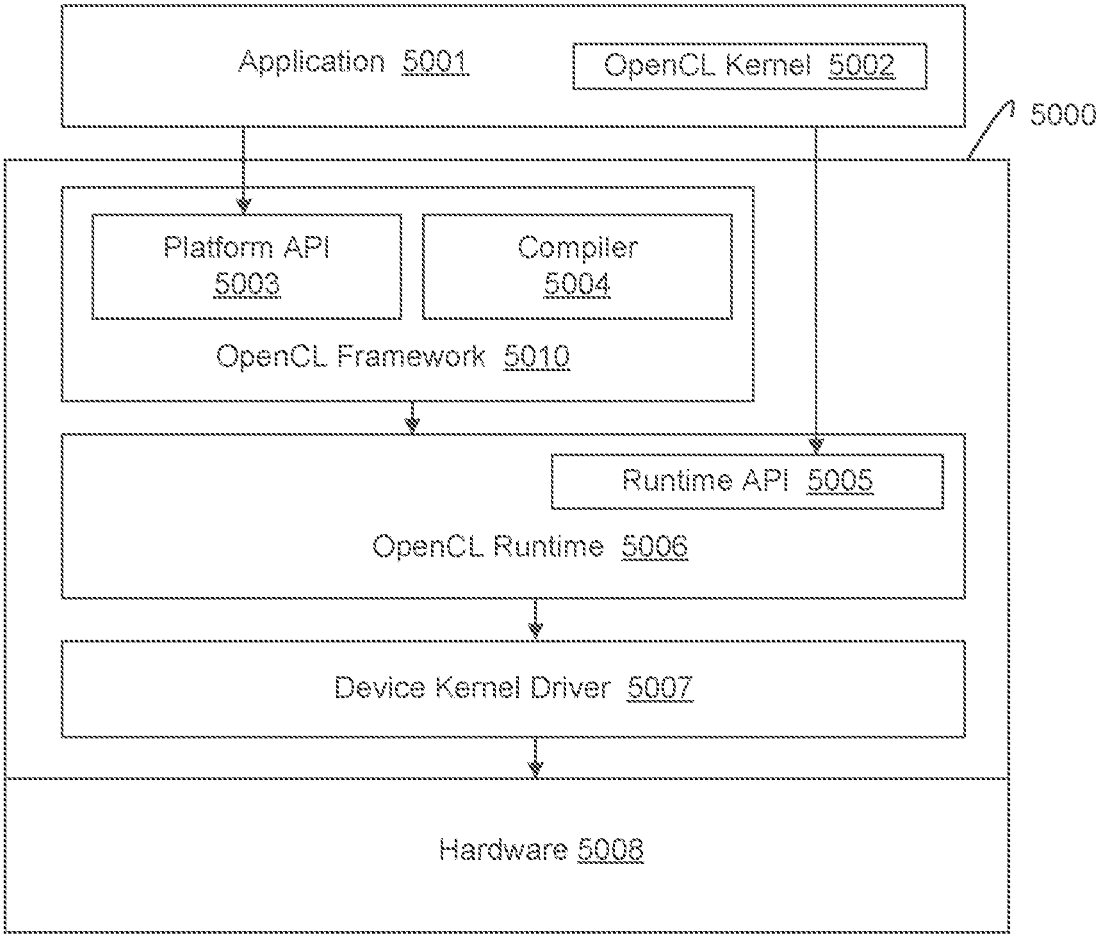
FIG. 50 illustrates an OpenCL implementation of a software stack of FIG. 47, in accordance with at least one embodiment.

FIG. 50 illustrates an OpenCL implementation of software stack 4700 of FIG. 47, in accordance with at least one embodiment. In at least one embodiment, an OpenCL software stack 5000, on which an application 5001 may be launched, includes an OpenCL framework 5010, an OpenCL runtime 5006, and a driver 5007. In at least one embodiment, OpenCL software stack 5000 executes on hardware 4809 that is not vendor-specific. As OpenCL is supported by devices developed by different vendors, specific OpenCL drivers may be required to interoperate with hardware from such vendors, in at least one embodiment.

In at least one embodiment, application 5001, OpenCL runtime 5006, device kernel driver 5007, and hardware 5008 may perform similar functionalities as application 4701, runtime 4705, device kernel driver 4706, and hardware 4707, respectively, that are discussed above in conjunction with FIG. 47. In at least one embodiment, application 5001 further includes an OpenCL kernel 5002 with code that is to be executed on a device.

In at least one embodiment, OpenCL defines a "platform" that allows a host to control devices connected to the host. In at least one embodiment, an OpenCL framework provides a platform layer API and a runtime API, shown as platform API 5003 and runtime API 5005. In at least one embodiment, runtime API 5005 uses contexts to manage execution of kernels on devices. In at least one embodiment, each identified device may be associated with a respective context, which runtime API 5005 may use to manage command queues, program objects, and kernel objects, share memory objects, among other things, for that device. In at least one embodiment, platform API 5003 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 5004 is also included in OpenCL frame-work 5010. Source code may be compiled offline prior to executing an application or online during execution of an application, in at least one embodiment. In contrast to CUDA and ROCm, OpenCL applications in at least one embodiment may be compiled online by compiler 5004, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

In at least one embodiment, at least one component shown or described with respect to FIG. 50 is utilized to implement techniques and/or functions described in connection with FIGS. 1-27. In at least one embodiment, at least one component of FIG. 50 is used to identify, generate, remove, process, and/or modify one or more graph dependencies. In at least one embodiment, at least one component of FIG. 50 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 51:
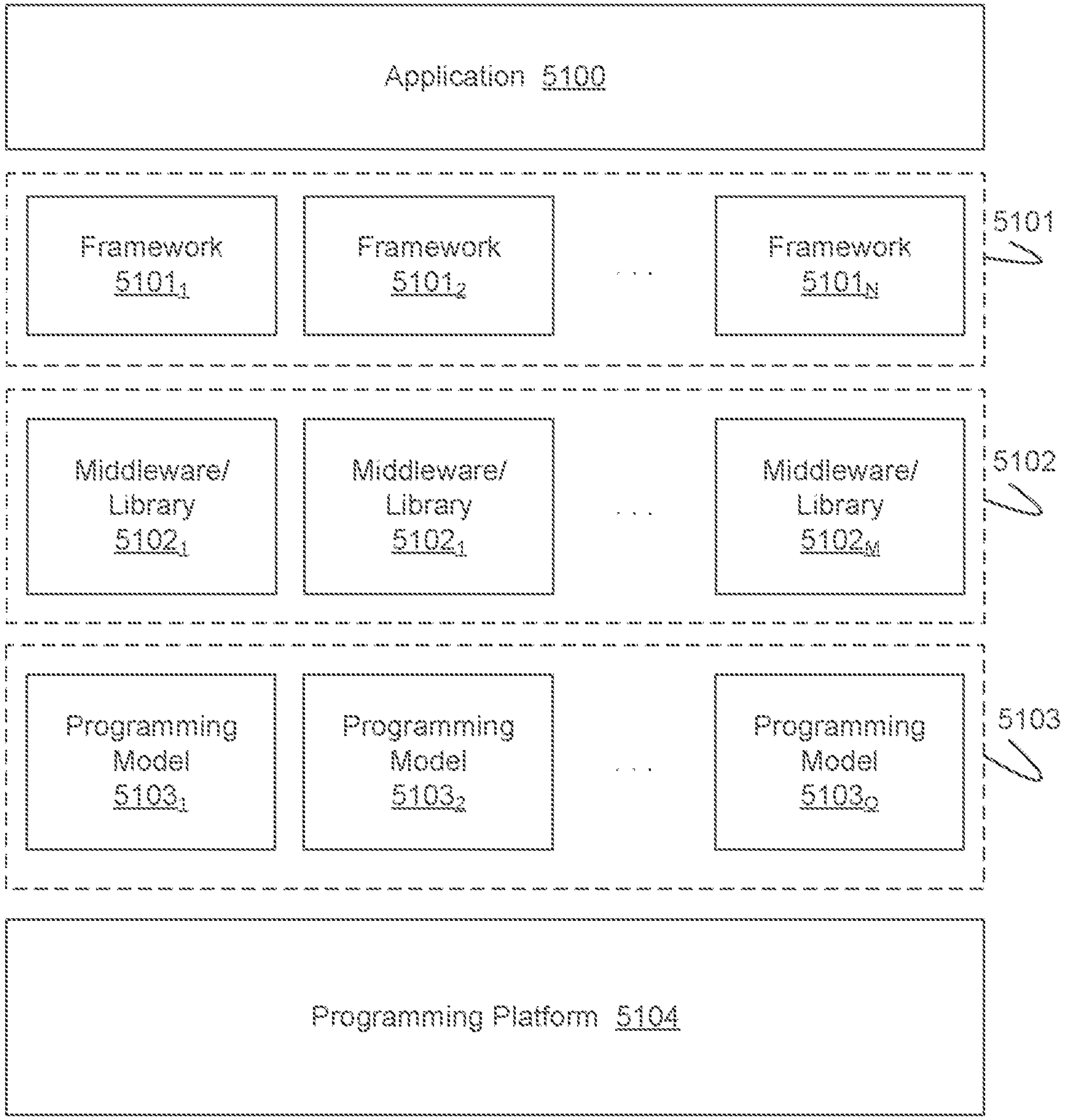
FIG. 51 illustrates software that is supported by a programming platform, in accordance with at least one embodiment.

FIG. 51 illustrates software that is supported by a programming platform, in accordance with at least one embodiment. In at least one embodiment, a programming platform 5104 is configured to support various programming models 5103, middlewares and/or libraries 5102, and frameworks 5101 that an application 5100 may rely upon. In at least one embodiment, application 5100 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 5104 may be one of a CUDA, ROCm, or OpenCL platform described above in conjunction with FIG. 48, FIG. 49, and FIG. 50, respectively. In at least one embodiment, programming platform 5104 supports multiple programming models 5103, which are abstractions of an underlying computing system permitting expressions of algorithms and data structures. Programming models 5103 may expose features of underlying hardware in order to improve performance, in at least one embodiment. In at least one embodiment, programming models 5103 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 5102 provide implementations of abstractions of programming models 5104. In at least one embodiment, such libraries include data and programming code that may be used by computer programs and leveraged during software development. In at least one embodiment, such middlewares include software that provides services to applications beyond those available from programming platform 5104. In at least one embodiment, libraries and/or middlewares 5102 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 5102 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 5101 depend on libraries and/or middlewares 5102. In at least one embodiment, each of application frameworks 5101 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

In at least one embodiment, at least one component shown or described with respect to FIG. 51 is utilized to implement techniques and/or functions described in connection with FIGS. 1-27. In at least one embodiment, at least one component of FIG. 51 is used to identify, generate, remove, process, and/or modify one or more graph dependencies. In at least one embodiment, at least one component of FIG. 51 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 52:
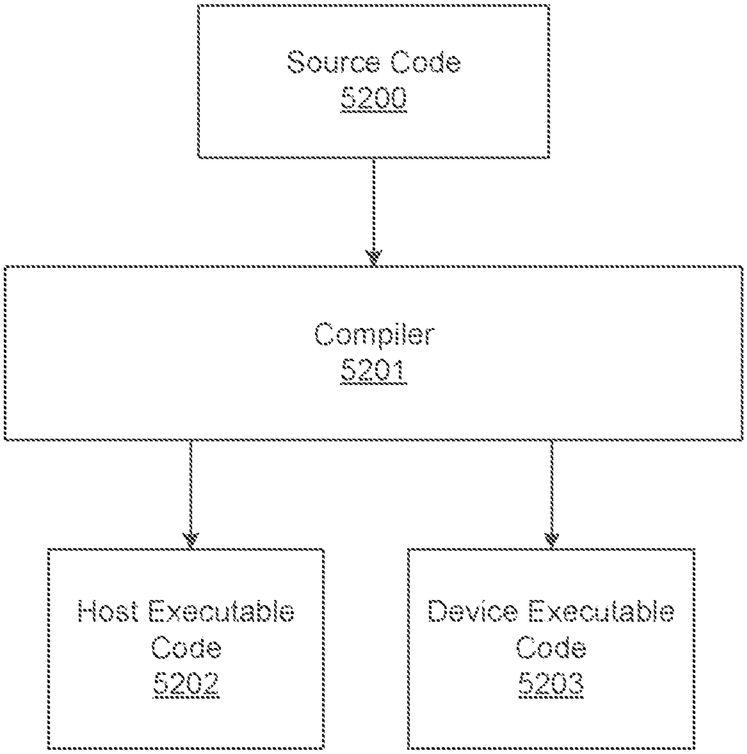
FIG. 52 illustrates compiling code to execute on programming platforms of FIGS. 47-50, in accordance with at least one embodiment.

FIG. 52 illustrates compiling code to execute on one of programming platforms of FIGS. 47-50, in accordance with at least one embodiment. In at least one embodiment, a compiler 5201 receives source code 5200 that includes both host code as well as device code. In at least one embodiment, compiler 5201 is configured to convert source code 5200 into host executable code 5202 for execution on a host and device executable code 5203 for execution on a device. In at least one embodiment, source code 5200 may either be compiled offline prior to execution of an application, or online during execution of an application.

In at least one embodiment, source code 5200 may include code in any programming language supported by compiler 5201, such as C++, C, Fortran, etc. In at least one embodiment, source code 5200 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 5200 may include multiple source code files, rather than a single-source file, into which host code and device code are separated.

In at least one embodiment, compiler 5201 is configured to compile source code 5200 into host executable code 5202 for execution on a host and device executable code 5203 for execution on a device. In at least one embodiment, compiler 5201 performs operations including parsing source code 5200 into an abstract system tree (AST), performing optimizations, and generating executable code. In at least one embodiment in which source code 5200 includes a single-source file, compiler 5201 may separate device code from host code in such a single-source file, compile device code and host code into device executable code 5203 and host executable code 5202, respectively, and link device executable code 5203 and host executable code 5202 together in a single file, as discussed in greater detail below with respect to FIG. 53.

In at least one embodiment, host executable code 5202 and device executable code 5203 may be in any suitable format, such as binary code and/or IR code. In the case of CUDA, host executable code 5202 may include native object code and device executable code 5203 may include code in PTX intermediate representation, in at least one embodiment. In the case of ROCm, both host executable code 5202 and device executable code 5203 may include target binary code, in at least one embodiment.

In at least one embodiment, at least one component shown or described with respect to FIG. 52 is utilized to implement techniques and/or functions described in connection with FIGS. 1-27. In at least one embodiment, at least one component of FIG. 52 is used to identify, generate, remove, process, and/or modify one or more graph dependencies. In at least one embodiment, at least one component of FIG. 52 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 53:
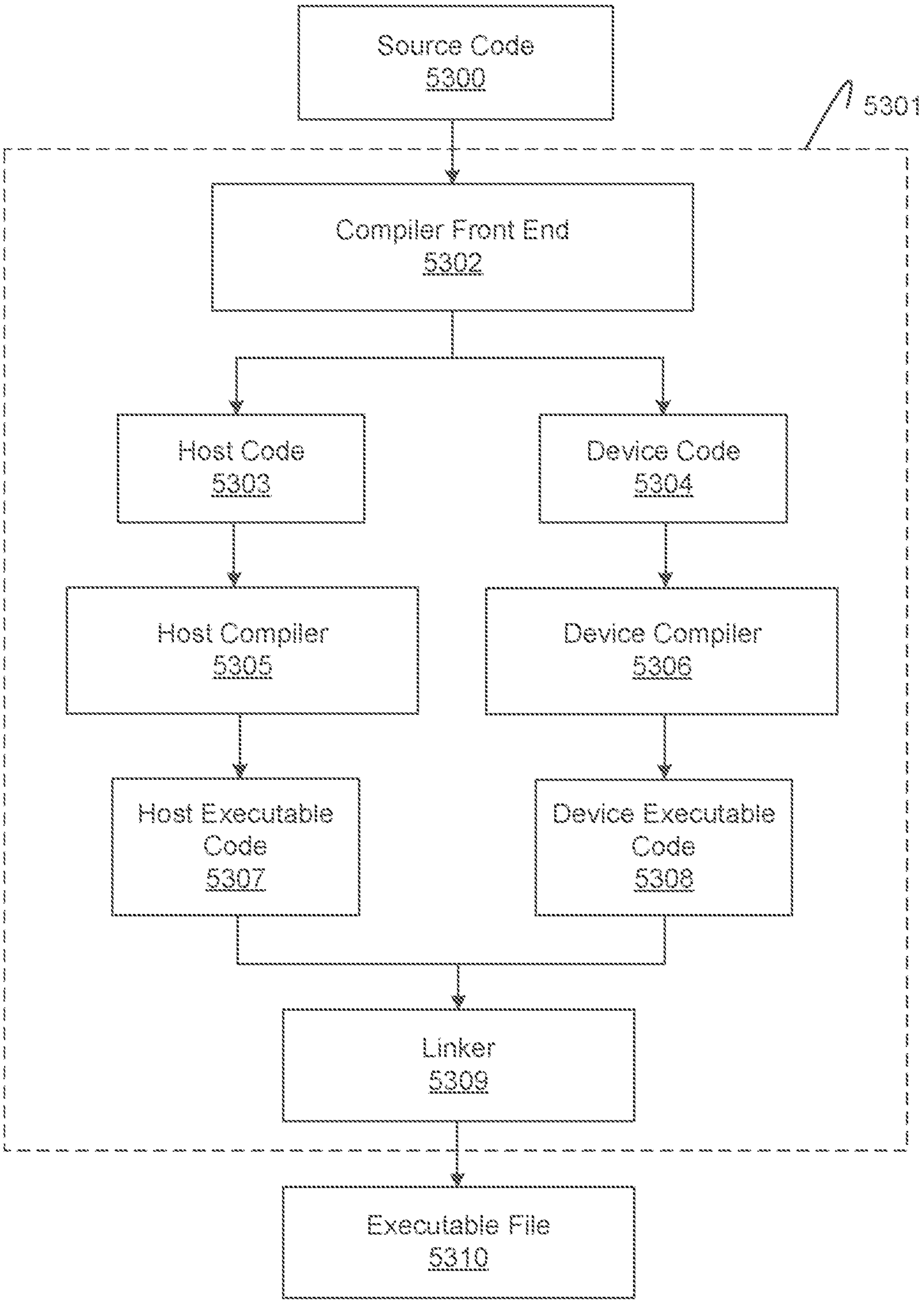
FIG. 53 illustrates in greater detail compiling code to execute on programming platforms of FIGS. 47-50, in accordance with at least one embodiment.

FIG. 53 is a more detailed illustration of compiling code to execute on one of programming platforms of FIGS. 47-50, in accordance with at least one embodiment. In at least one embodiment, a compiler 5301 is configured to receive source code 5300, compile source code 5300, and output an executable file 5310. In at least one embodiment, source code 5300 is a single-source file, such as a .cu file, a .hip.cpp file, or a file in another format, that includes both host and device code. In at least one embodiment, compiler 5301 may be, but is not limited to, an NVIDIA CUDA compiler ("NVCC") for compiling CUDA code in .cu files, or a HCC compiler for compiling HIP code in .hip.cpp files.

In at least one embodiment, compiler 5301 includes a compiler front end 5302, a host compiler 5305, a device compiler 5306, and a linker 5309. In at least one embodiment, compiler front end 5302 is configured to separate device code 5304 from host code 5303 in source code 5300. Device code 5304 is compiled by device compiler 5306 into device executable code 5308, which as described may include binary code or IR code, in at least one embodiment. Separately, host code 5303 is compiled by host compiler 5305 into host executable code 5307, in at least one embodiment. For NVCC, host compiler 5305 may be, but is not limited to, a general purpose C/C++ compiler that outputs native object code, while device compiler 5306 may be, but is not limited to, a Low Level Virtual Machine ("LLVM")-based compiler that forks a LLVM compiler infrastructure and outputs PTX code or binary code, in at least one embodiment. For HCC, both host compiler 5305 and device compiler 5306 may be, but are not limited to, LLVM-based compilers that output target binary code, in at least one embodiment.

Subsequent to compiling source code 5300 into host executable code 5307 and device executable code 5308, linker 5309 links host and device executable code 5307 and 5308 together in executable file 5310, in at least one embodiment. In at least one embodiment, native object code for a host and PTX or binary code for a device may be linked together in an Executable and Linkable Format ("ELF") file, which is a container format used to store object code.

In at least one embodiment, at least one component shown or described with respect to FIG. 53 is utilized to implement techniques and/or functions described in connection with FIGS. 1-27. In at least one embodiment, at least one component of FIG. 53 is used to identify, generate, remove, process, and/or modify one or more graph dependencies. In at least one embodiment, at least one component of FIG. 53 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 54:
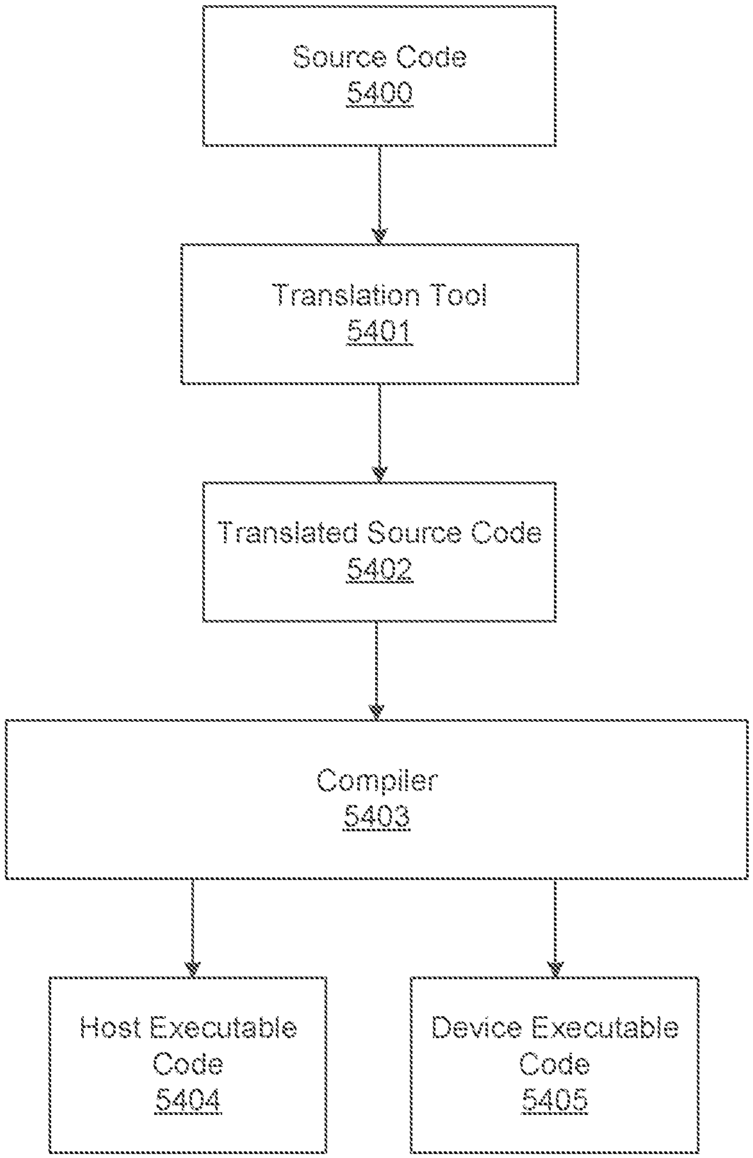
FIG. 54 illustrates translating source code prior to compiling source code, in accordance with at least one embodiment.

FIG. 54 illustrates translating source code prior to compiling source code, in accordance with at least one embodiment. In at least one embodiment, source code 5400 is passed through a translation tool 5401, which translates source code 5400 into translated source code 5402. In at least one embodiment, a compiler 5403 is used to compile translated source code 5402 into host executable code 5404 and device executable code 5405 in a process that is similar to compilation of source code 5200 by compiler 5201 into host executable code 5202 and device executable 5203, as discussed above in conjunction with FIG. 52.

In at least one embodiment, a translation performed by translation tool 5401 is used to port source 5400 for execution in a different environment than that in which it was originally intended to run. In at least one embodiment, translation tool 5401 may include, but is not limited to, a HIP translator that is used to "hipify" CUDA code intended for a CUDA platform into HIP code that can be compiled and executed on a ROCm platform. In at least one embodiment, translation of source code 5400 may include parsing source code 5400 and converting calls to API(s) provided by one programming model (e.g., CUDA) into corresponding calls to API(s) provided by another programming model (e.g., HIP), as discussed in greater detail below in conjunction with FIGS. 55A-56. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 5401 may sometimes be incomplete, requiring additional, manual effort to fully port source code 5400.

In at least one embodiment, at least one component shown or described with respect to FIG. 54 is utilized to implement techniques and/or functions described in connection with FIGS. 1-27. In at least one embodiment, at least one component of FIG. 54 is used to identify, generate, remove, process, and/or modify one or more graph dependencies. In at least one embodiment, at least one component of FIG. 54 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Configuring GPUS for General-Purpose Computing

The following figures set forth, without limitation, exemplary architectures for compiling and executing compute source code, in accordance with at least one embodiment.

Figure 55A:
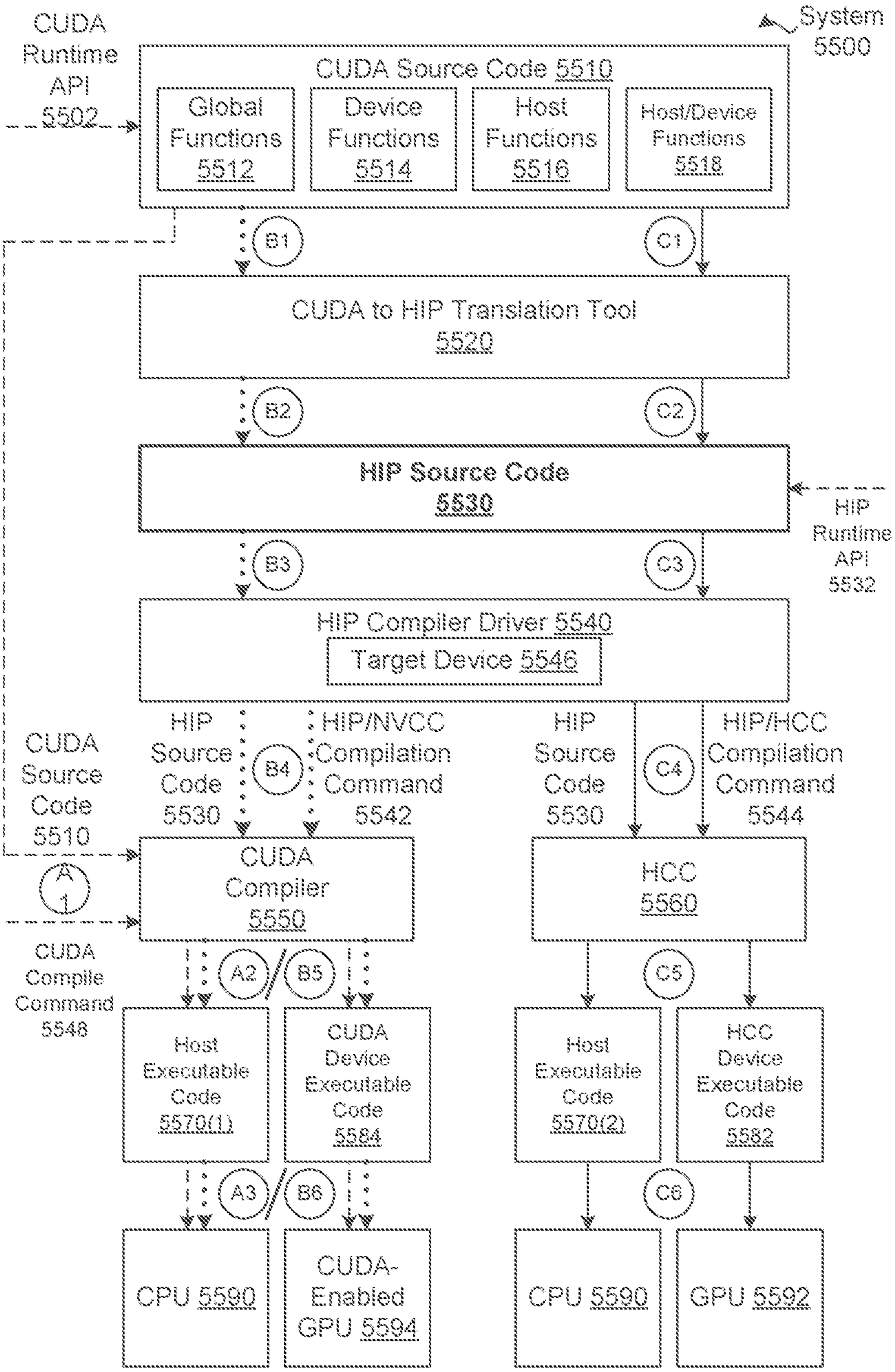
FIG. 55A illustrates a system configured to compile and execute CUDA source code using different types of processing units, in accordance with at least one embodiment.

FIG. 55A illustrates a system 5500 configured to compile and execute CUDA source code 5510 using different types of processing units, in accordance with at least one embodiment. In at least one embodiment, system 5500 includes, without limitation, CUDA source code 5510, a CUDA compiler 5550, host executable code 5570(1), host executable code 5570(2), CUDA device executable code 5584, a CPU 5590, a CUDA-enabled GPU 5594, a GPU 5592, a CUDA to HIP translation tool 5520, HIP source code 5530, a HIP compiler driver 5540, an HCC 5560, and HCC device executable code 5582.

In at least one embodiment, CUDA source code 5510 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 5590, GPU 55192, or another GPGPU, etc. In at least one embodiment, host code is source code that, after compilation, is executable on a host. In at least one embodiment, a host is a processor that is optimized for sequential instruction processing, such as CPU 5590.

In at least one embodiment, CUDA source code 5510 includes, without limitation, any number (including zero) of global functions 5512, any number (including zero) of device functions 5514, any number (including zero) of host functions 5516, and any number (including zero) of host/device functions 5518. In at least one embodiment, global functions 5512, device functions 5514, host functions 5516, and host/device functions 5518 may be mixed in CUDA source code 5510. In at least one embodiment, each of global functions 5512 is executable on a device and callable from a host. In at least one embodiment, one or more of global functions 5512 may therefore act as entry points to a device. In at least one embodiment, each of global functions 5512 is a kernel. In at least one embodiment and in a technique known as dynamic parallelism, one or more of global functions 5512 defines a kernel that is executable on a device and callable from such a device. In at least one embodiment, a kernel is executed N (where N is any positive integer) times in parallel by N different threads on a device during execution.

In at least one embodiment, each of device functions 5514 is executed on a device and callable from such a device only. In at least one embodiment, each of host functions 5516 is executed on a host and callable from such a host only. In at least one embodiment, each of host/device functions 5516 defines both a host version of a function that is executable on a host and callable from such a host only and a device version of the function that is executable on a device and callable from such a device only.

In at least one embodiment, CUDA source code 5510 may also include, without limitation, any number of calls to any number of functions that are defined via a CUDA runtime API 5502. In at least one embodiment, CUDA runtime API 5502 may include, without limitation, any number of functions that execute on a host to allocate and deallocate device memory, transfer data between host memory and device memory, manage systems with multiple devices, etc. In at least one embodiment, CUDA source code 5510 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 5502, a CUDA driver API, APIs for any number of CUDA libraries, etc. In at least one embodiment and relative to CUDA runtime API 5502, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 5550 compiles input CUDA code (e.g., CUDA source code 5510) to generate host executable code 5570(1) and CUDA device executable code 5584. In at least one embodiment, CUDA compiler 5550 is NVCC. In at least one embodiment, host executable code 5570(1) is a compiled version of host code included in input source code that is executable on CPU 5590. In at least one embodiment, CPU 5590 may be any processor that is optimized for sequential instruction processing.

In at least one embodiment, CUDA device executable code 5584 is a compiled version of device code included in input source code that is executable on CUDA-enabled GPU 5594. In at least one embodiment, CUDA device executable code 5584 includes, without limitation, binary code. In at least one embodiment, CUDA device executable code 5584 includes, without limitation, IR code, such as PTX code, that is further compiled at runtime into binary code for a specific target device (e.g., CUDA-enabled GPU 5594) by a device driver. In at least one embodiment, CUDA-enabled GPU 5594 may be any processor that is optimized for parallel instruction processing and that supports CUDA. In at least one embodiment, CUDA-enabled GPU 5594 is developed by NVIDIA Corporation of Santa Clara, CA.

In at least one embodiment, CUDA to HIP translation tool 5520 is configured to translate CUDA source code 5510 to functionally similar HIP source code 5530. In a least one embodiment, HIP source code 5530 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 5512, but such a HIP programming language may lack support for dynamic parallelism and therefore global functions 5512 defined in HIP code may be callable from a host only.

In at least one embodiment, HIP source code 5530 includes, without limitation, any number (including zero) of global functions 5512, any number (including zero) of device functions 5514, any number (including zero) of host functions 5516, and any number (including zero) of host/device functions 5518. In at least one embodiment, HIP source code 5530 may also include any number of calls to any number of functions that are specified in a HIP runtime API 5532. In at least one embodiment, HIP runtime API 5532 includes, without limitation, functionally similar versions of a subset of functions included in CUDA runtime API 5502. In at least one embodiment, HIP source code 5530 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 5532, a HIP driver API, APIs for any number of HIP libraries, APIs for any number of ROCm libraries, etc.

In at least one embodiment, CUDA to HIP translation tool 5520 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 5520 converts any number of calls to functions specified in CUDA runtime API 5502 to any number of calls to functions specified in HIP runtime API 5532.

In at least one embodiment, CUDA to HIP translation tool 5520 is a tool known as hipify-perl that executes a text-based translation process. In at least one embodiment, CUDA to HIP translation tool 5520 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 5520.

In at least one embodiment, HIP compiler driver 5540 is a front end that determines a target device 5546 and then configures a compiler that is compatible with target device 5546 to compile HIP source code 5530. In at least one embodiment, target device 5546 is a processor that is optimized for parallel instruction processing. In at least one embodiment, HIP compiler driver 5540 may determine target device 5546 in any technically feasible fashion.

In at least one embodiment, if target device 5546 is compatible with CUDA (e.g., CUDA-enabled GPU 5594), then HIP compiler driver 5540 generates a HIP/NVCC compilation command 5542. In at least one embodiment and as described in greater detail in conjunction with FIG. 55B, HIP/NVCC compilation command 5542 configures CUDA compiler 5550 to compile HIP source code 5530 using, without limitation, a HIP to CUDA translation header and a CUDA runtime library. In at least one embodiment and in response to HIP/NVCC compilation command 5542, CUDA compiler 5550 generates host executable code 5570(1) and CUDA device executable code 5584.

In at least one embodiment, if target device 5546 is not compatible with CUDA, then HIP compiler driver 5540 generates a HIP/HCC compilation command 5544. In at least one embodiment and as described in greater detail in conjunction with FIG. 55C, HIP/HCC compilation command 5544 configures HCC 5560 to compile HIP source code 5530 using, without limitation, an HCC header and a HIP/HCC runtime library. In at least one embodiment and in response to HIP/HCC compilation command 5544, HCC 5560 generates host executable code 5570(2) and HCC device executable code 5582. In at least one embodiment, HCC device executable code 5582 is a compiled version of device code included in HIP source code 5530 that is executable on GPU 5592. In at least one embodiment, GPU 5592 may be any processor that is optimized for parallel instruction processing, is not compatible with CUDA, and is compatible with HCC. In at least one embodiment, GPU 5592 is developed by AMD Corporation of Santa Clara, CA. In at least one embodiment GPU, 5592 is a non-CUDA-enabled GPU 5592.

For explanatory purposes only, three different flows that may be implemented in at least one embodiment to compile CUDA source code 5510 for execution on CPU 5590 and different devices are depicted in FIG. 55A. In at least one embodiment, a direct CUDA flow compiles CUDA source code 5510 for execution on CPU 5590 and CUDA-enabled GPU 5594 without translating CUDA source code 5510 to HIP source code 5530. In at least one embodiment, an indirect CUDA flow translates CUDA source code 5510 to HIP source code 5530 and then compiles HIP source code 5530 for execution on CPU 5590 and CUDA-enabled GPU 5594. In at least one embodiment, a CUDA/HCC flow translates CUDA source code 5510 to HIP source code 5530 and then compiles HIP source code 5530 for execution on CPU 5590 and GPU 5592.

A direct CUDA flow that may be implemented in at least one embodiment is depicted via dashed lines and a series of bubbles annotated A1-A3. In at least one embodiment and as depicted with bubble annotated A1, CUDA compiler 5550 receives CUDA source code 5510 and a CUDA compile command 5548 that configures CUDA compiler 5550 to compile CUDA source code 5510. In at least one embodiment, CUDA source code 5510 used in a direct CUDA flow is written in a CUDA programming language that is based on a programming language other than C++(e.g., C, Fortran, Python, Java, etc.). In at least one embodiment and in response to CUDA compile command 5548, CUDA compiler 5550 generates host executable code 5570(1) and CUDA device executable code 5584 (depicted with bubble annotated A2). In at least one embodiment and as depicted with bubble annotated A3, host executable code 5570(1) and CUDA device executable code 5584 may be executed on, respectively, CPU 5590 and CUDA-enabled GPU 5594. In at least one embodiment, CUDA device executable code 5584 includes, without limitation, binary code. In at least one embodiment, CUDA device executable code 5584 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 5520 receives CUDA source code 5510. In at least one embodiment and as depicted with bubble annotated B2, CUDA to HIP translation tool 5520 translates CUDA source code 5510 to HIP source code 5530. In at least one embodiment and as depicted with bubble annotated B3, HIP compiler driver 5540 receives HIP source code 5530 and determines that target device 5546 is CUDA-enabled.

In at least one embodiment and as depicted with bubble annotated B4, HIP compiler driver 5540 generates HIP/NVCC compilation command 5542 and transmits both HIP/NVCC compilation command 5542 and HIP source code 5530 to CUDA compiler 5550. In at least one embodiment and as described in greater detail in conjunction with FIG. 55B, HIP/NVCC compilation command 5542 configures CUDA compiler 5550 to compile HIP source code 5530 using, without limitation, a HIP to CUDA translation header and a CUDA runtime library. In at least one embodiment and in response to HIP/NVCC compilation command 5542, CUDA compiler 5550 generates host executable code 5570 (1) and CUDA device executable code 5584 (depicted with bubble annotated B5). In at least one embodiment and as depicted with bubble annotated B6, host executable code 5570(1) and CUDA device executable code 5584 may be executed on, respectively, CPU 5590 and CUDA-enabled GPU 5594. In at least one embodiment, CUDA device executable code 5584 includes, without limitation, binary code. In at least one embodiment, CUDA device executable code 5584 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 5520 receives CUDA source code 5510. In at least one embodiment and as depicted with bubble annotated C2, CUDA to HIP translation tool 5520 translates CUDA source code 5510 to HIP source code 5530. In at least one embodiment and as depicted with bubble annotated C3, HIP compiler driver 5540 receives HIP source code 5530 and determines that target device 5546 is not CUDA-enabled.

In at least one embodiment, HIP compiler driver 5540 generates HIP/HCC compilation command 5544 and transmits both HIP/HCC compilation command 5544 and HIP source code 5530 to HCC 5560 (depicted with bubble annotated C4). In at least one embodiment and as described in greater detail in conjunction with FIG. 55C, HIP/HCC compilation command 5544 configures HCC 5560 to compile HIP source code 5530 using, without limitation, an HCC header and a HIP/HCC runtime library. In at least one embodiment and in response to HIP/HCC compilation command 5544, HCC 5560 generates host executable code 5570(2) and HCC device executable code 5582 (depicted with bubble annotated C5). In at least one embodiment and as depicted with bubble annotated C6, host executable code 5570(2) and HCC device executable code 5582 may be executed on, respectively, CPU 5590 and GPU 5592.

In at least one embodiment, after CUDA source code 5510 is translated to HIP source code 5530, HIP compiler driver 5540 may subsequently be used to generate executable code for either CUDA-enabled GPU 5594 or GPU 5592 without re-executing CUDA to HIP translation tool 5520. In at least one embodiment, CUDA to HIP translation tool 5520 translates CUDA source code 5510 to HIP source code 5530 that is then stored in memory. In at least one embodiment, HIP compiler driver 5540 then configures HCC 5560 to generate host executable code 5570(2) and HCC device executable code 5582 based on HIP source code 5530. In at least one embodiment, HIP compiler driver 5540 subsequently configures CUDA compiler 5550 to generate host executable code 5570(1) and CUDA device executable code 5584 based on stored HIP source code 5530.

Figure 55B:
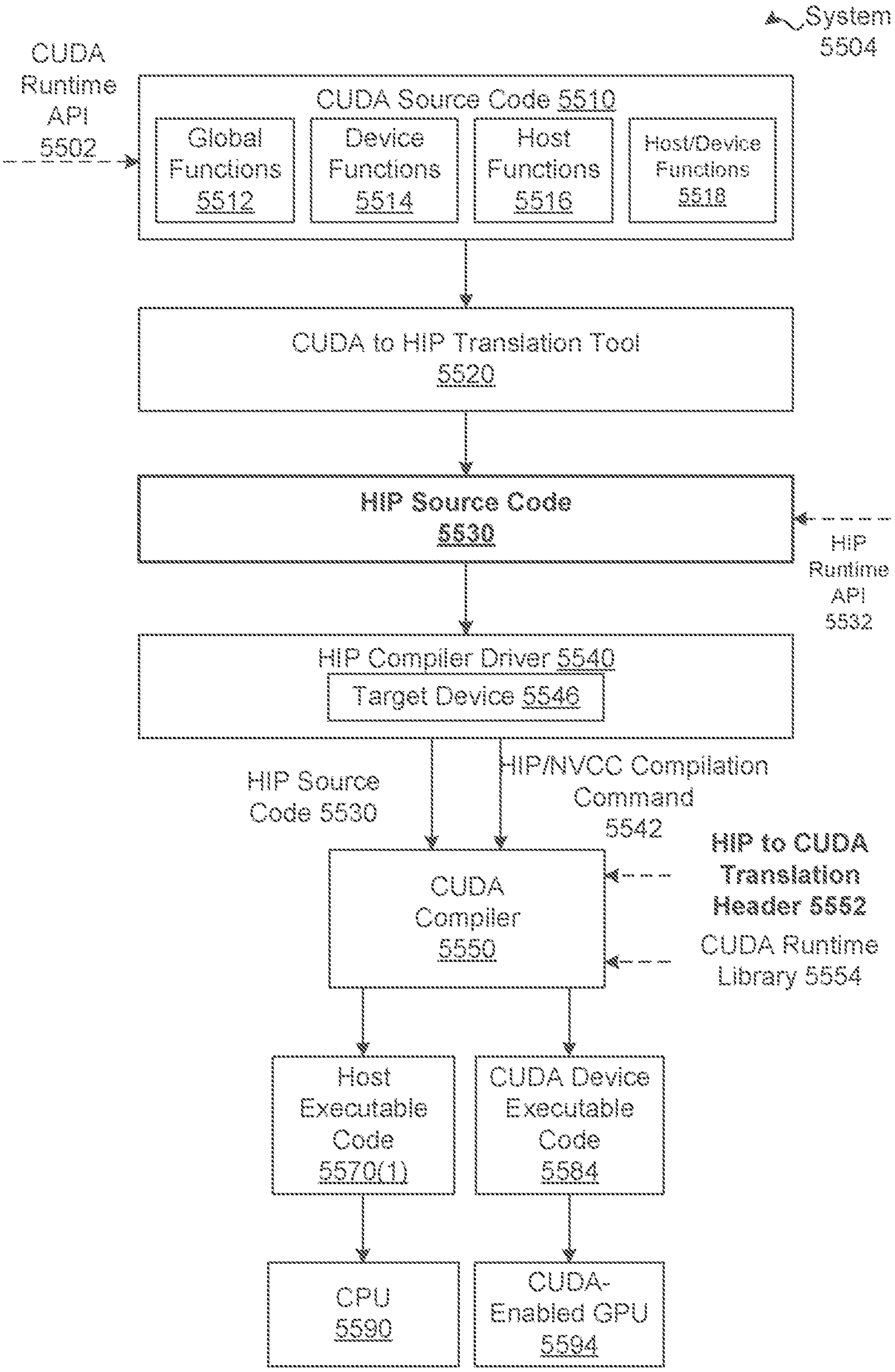
FIG. 55B illustrates a system configured to compile and execute CUDA source code of FIG. 55A using a CPU and a CUDA-enabled GPU, in accordance with at least one embodiment.

FIG. 55B illustrates a system 5504 configured to compile and execute CUDA source code 5510 of FIG. 55A using CPU 5590 and CUDA-enabled GPU 5594, in accordance with at least one embodiment. In at least one embodiment, system 5504 includes, without limitation, CUDA source code 5510, CUDA to HIP translation tool 5520, HIP source code 5530, HIP compiler driver 5540, CUDA compiler 5550, host executable code 5570(1), CUDA device executable code 5584, CPU 5590, and CUDA-enabled GPU 5594.

In at least one embodiment and as described previously herein in conjunction with FIG. 55A, CUDA source code 5510 includes, without limitation, any number (including zero) of global functions 5512, any number (including zero) of device functions 5514, any number (including zero) of host functions 5516, and any number (including zero) of host/device functions 5518. In at least one embodiment, CUDA source code 5510 also includes, without limitation, any number of calls to any number of functions that are specified in any number of CUDA APIs.

In at least one embodiment, CUDA to HIP translation tool 5520 translates CUDA source code 5510 to HIP source code 5530. In at least one embodiment, CUDA to HIP translation tool 5520 converts each kernel call in CUDA source code 5510 from a CUDA syntax to a HIP syntax and converts any number of other CUDA calls in CUDA source code 5510 to any number of other functionally similar HIP calls.

In at least one embodiment, HIP compiler driver 5540 determines that target device 5546 is CUDA-enabled and generates HIP/NVCC compilation command 5542. In at least one embodiment, HIP compiler driver 5540 then configures CUDA compiler 5550 via HIP/NVCC compilation command 5542 to compile HIP source code 5530. In at least one embodiment, HIP compiler driver 5540 provides access to a HIP to CUDA translation header 5552 as part of configuring CUDA compiler 5550. In at least one embodiment, HIP to CUDA translation header 5552 translates any number of mechanisms (e.g., functions) specified in any number of HIP APIs to any number of mechanisms specified in any number of CUDA APIs. In at least one embodiment, CUDA compiler 5550 uses HIP to CUDA translation header 5552 in conjunction with a CUDA runtime library 5554 corresponding to CUDA runtime API 5502 to generate host executable code 5570(1) and CUDA device executable code 5584. In at least one embodiment, host executable code 5570(1) and CUDA device executable code 5584 may then be executed on, respectively, CPU 5590 and CUDA-enabled GPU 5594. In at least one embodiment, CUDA device executable code 5584 includes, without limitation, binary code. In at least one embodiment, CUDA device executable code 5584 includes, without limitation, PTX code and is further compiled into binary code for a specific target device at runtime.

Figure 55C:
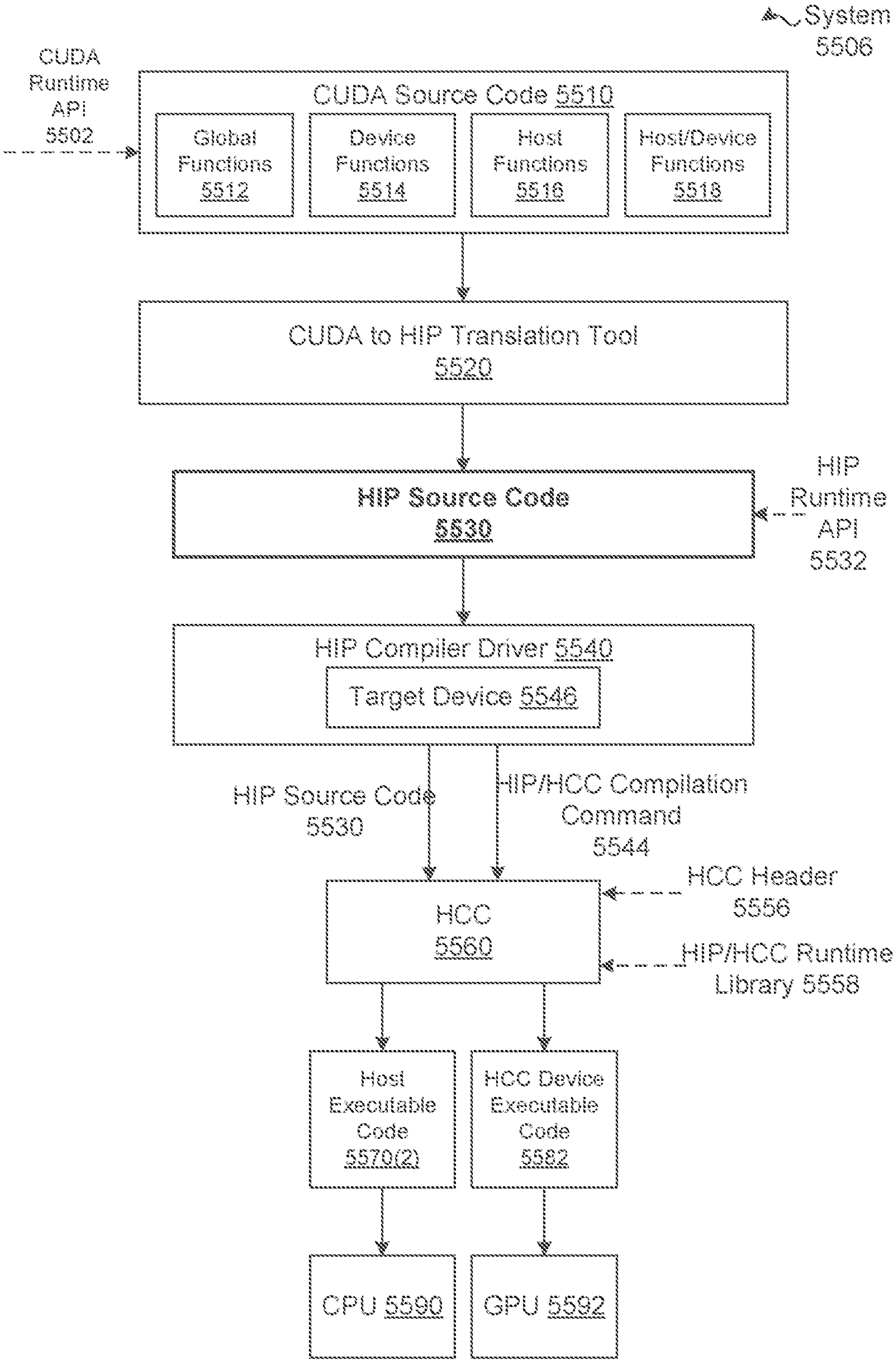
FIG. 55C illustrates a system configured to compile and execute CUDA source code of FIG. 55A using a CPU and a non-CUDA-enabled GPU, in accordance with at least one embodiment.

FIG. 55C illustrates a system 5506 configured to compile and execute CUDA source code 5510 of FIG. 55A using CPU 5590 and non-CUDA-enabled GPU 5592, in accordance with at least one embodiment. In at least one embodiment, system 5506 includes, without limitation, CUDA source code 5510, CUDA to HIP translation tool 5520, HIP source code 5530, HIP compiler driver 5540, HCC 5560, host executable code 5570(2), HCC device executable code 5582, CPU 5590, and GPU 5592.

In at least one embodiment and as described previously herein in conjunction with FIG. 55A, CUDA source code 5510 includes, without limitation, any number (including zero) of global functions 5512, any number (including zero) of device functions 5514, any number (including zero) of host functions 5516, and any number (including zero) of host/device functions 5518. In at least one embodiment, CUDA source code 5510 also includes, without limitation, any number of calls to any number of functions that are specified in any number of CUDA APIs.

In at least one embodiment, CUDA to HIP translation tool 5520 translates CUDA source code 5510 to HIP source code 5530. In at least one embodiment, CUDA to HIP translation tool 5520 converts each kernel call in CUDA source code 5510 from a CUDA syntax to a HIP syntax and converts any number of other CUDA calls in source code 5510 to any number of other functionally similar HIP calls.

In at least one embodiment, HIP compiler driver 5540 subsequently determines that target device 5546 is not CUDA-enabled and generates HIP/HCC compilation command 5544. In at least one embodiment, HIP compiler driver 5540 then configures HCC 5560 to execute HIP/HCC compilation command 5544 to compile HIP source code 5530. In at least one embodiment, HIP/HCC compilation command 5544 configures HCC 5560 to use, without limitation, a HIP/HCC runtime library 5558 and an HCC header 5556 to generate host executable code 5570(2) and HCC device executable code 5582. In at least one embodiment, HIP/HCC runtime library 5558 corresponds to HIP runtime API 5532. In at least one embodiment, HCC header 5556 includes, without limitation, any number and type of interoperability mechanisms for HIP and HCC. In at least one embodiment, host executable code 5570(2) and HCC device executable code 5582 may be executed on, respectively, CPU 5590 and GPU 5592.

In at least one embodiment, at least one component shown or described with respect to FIG. 55 is utilized to implement techniques and/or functions described in connection with FIGS. 1-27. In at least one embodiment, at least one component of FIG. 55 is used to identify, generate, remove, process, and/or modify one or more graph dependencies. In at least one embodiment, at least one component of FIG. 55 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 56:
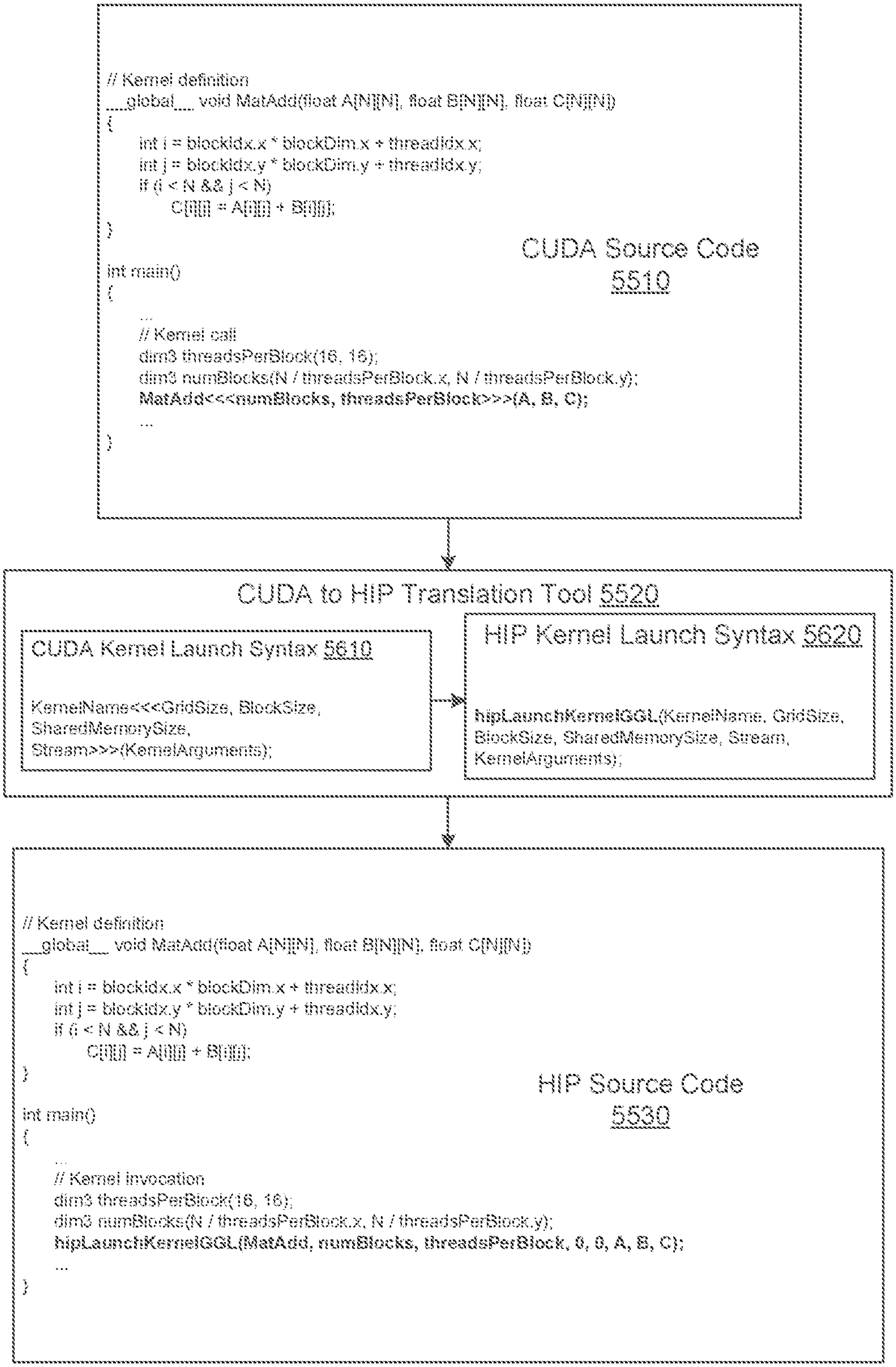
FIG. 56 illustrates an exemplary kernel translated by CUDA-to-HIP translation tool of FIG. 55C, in accordance with at least one embodiment.

FIG. 56 illustrates an exemplary kernel translated by CUDA-to-HIP translation tool 5520 of FIG. 55C, in accordance with at least one embodiment. In at least one embodiment, CUDA source code 5510 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 5510 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 5610. In at least one embodiment, CUDA kernel launch syntax 5610 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 5610 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 5610, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 5610, SharedMemorySize defaults to zero. In at least one embodiment and with respect to CUDA kernel launch syntax 5610, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 5510 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 5610, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 5510 to HIP source code 5530, CUDA to HIP translation tool 5520 translates each kernel call in CUDA source code 5510 from CUDA kernel launch syntax 5610 to a HIP kernel launch syntax 5620 and converts any number of other CUDA calls in source code 5510 to any number of other functionally similar HIP calls. In at least one embodiment, HIP kernel launch syntax 5620 is specified as "hipLaunchKernelGGL(KernelName, GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 5620 as in CUDA kernel launch syntax 5610 (described previously herein). In at least one embodiment, arguments SharedMemorySize and Stream are required in HIP kernel launch syntax 5620 and are optional in CUDA kernel launch syntax 5610.

In at least one embodiment, a portion of HIP source code 5530 depicted in FIG. 56 is identical to a portion of CUDA source code 5510 depicted in FIG. 56 except for a kernel call that causes kernel MatAdd to execute on a device. In at least one embodiment, kernel MatAdd is defined in HIP source code 5530 with the same "_global_" declaration specifier with which kernel MatAdd is defined in CUDA source code 5510. In at least one embodiment, a kernel call in HIP source code 5530 is "hipLaunchKernelGGL(MatAdd, numBlocks, threadsPerBlock, 0, 0, A, B, C);", while a corresponding kernel call in CUDA source code 5510 is "MatAdd<<<numBlocks, threadsPerBlock>>>(A, B, C);".

In at least one embodiment, at least one component shown or described with respect to FIG. 56 is utilized to implement techniques and/or functions described in connection with FIGS. 1-27. In at least one embodiment, at least one component of FIG. 56 is used to identify, generate, remove, process, and/or modify one or more graph dependencies. In at least one embodiment, at least one component of FIG. 56 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 57:
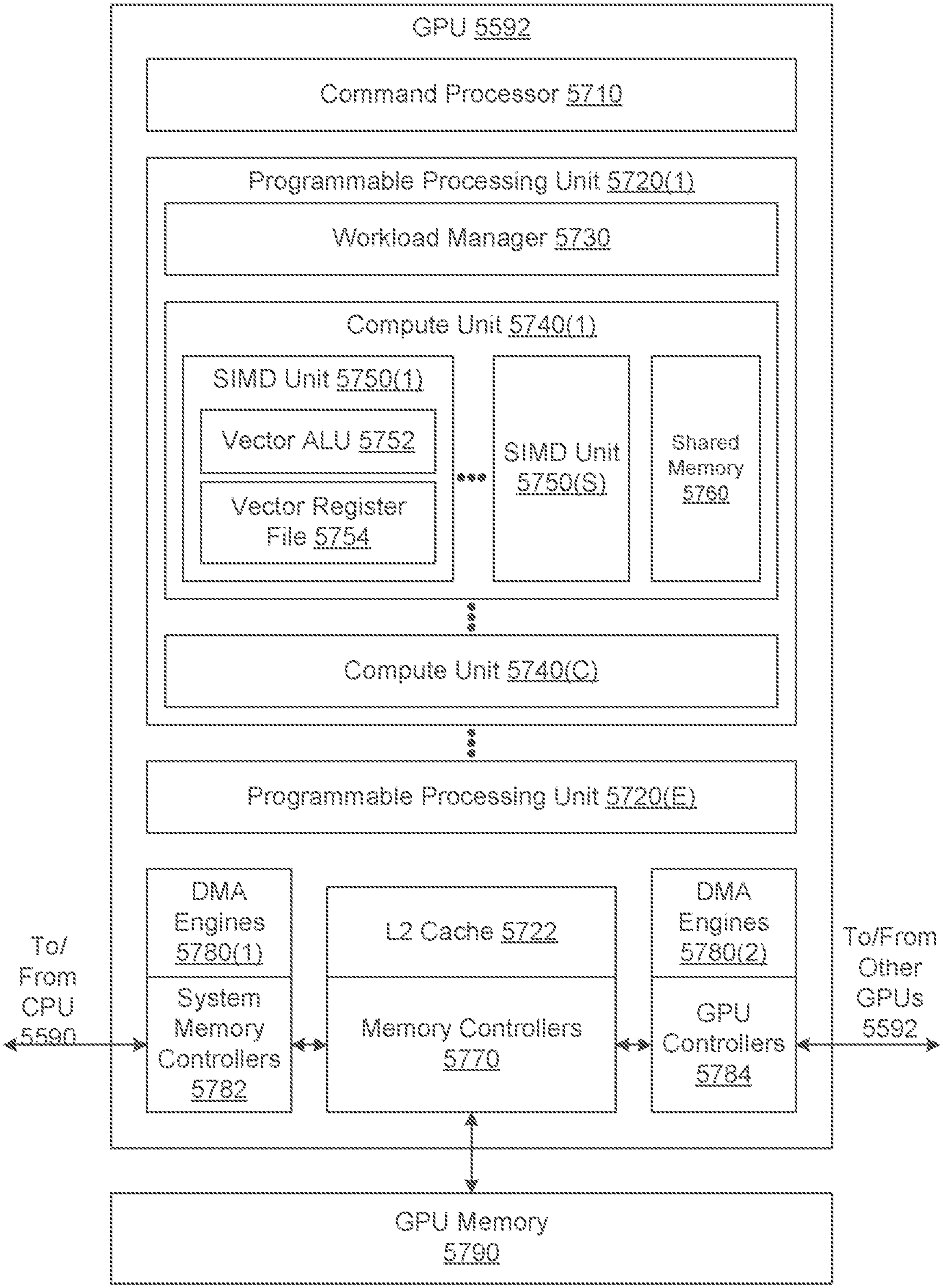
FIG. 57 illustrates non-CUDA-enabled GPU of FIG. 55C in greater detail, in accordance with at least one embodiment.

FIG. 57 illustrates non-CUDA-enabled GPU 5592 of FIG. 55C in greater detail, in accordance with at least one embodiment. In at least one embodiment, GPU 5592 is developed by AMD corporation of Santa Clara. In at least one embodiment, GPU 5592 can be configured to perform compute operations in a highly-parallel fashion. In at least one embodiment, GPU 5592 is configured to execute graphics pipeline operations such as draw commands, pixel operations, geometric computations, and other operations associated with rendering an image to a display. In at least one embodiment, GPU 5592 is configured to execute operations unrelated to graphics. In at least one embodiment, GPU 5592 is configured to execute both operations related to graphics and operations unrelated to graphics. In at least one embodiment, GPU 5592 can be configured to execute device code included in HIP source code 5530.

In at least one embodiment, GPU 5592 includes, without limitation, any number of programmable processing units 5720, a command processor 5710, an L2 cache 5722, memory controllers 5770, DMA engines 5780(1), system memory controllers 5782, DMA engines 5780(2), and GPU controllers 5784. In at least one embodiment, each programmable processing unit 5720 includes, without limitation, a workload manager 5730 and any number of compute units 5740. In at least one embodiment, command processor 5710 reads commands from one or more command queues (not shown) and distributes commands to workload managers 5730. In at least one embodiment, for each programmable processing unit 5720, associated workload manager 5730 distributes work to compute units 5740 included in programmable processing unit 5720. In at least one embodiment, each compute unit 5740 may execute any number of thread blocks, but each thread block executes on a single compute unit 5740. In at least one embodiment, a workgroup is a thread block.

In at least one embodiment, each compute unit 5740 includes, without limitation, any number of SIMD units 5750 and a shared memory 5760. In at least one embodiment, each SIMD unit 5750 implements a SIMD architecture and is configured to perform operations in parallel. In at least one embodiment, each SIMD unit 5750 includes, without limitation, a vector ALU 5752 and a vector register file 5754. In at least one embodiment, each SIMD unit 5750 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 5760.

In at least one embodiment, programmable processing units 5720 are referred to as "shader engines." In at least one embodiment, each programmable processing unit 5720 includes, without limitation, any amount of dedicated graphics hardware in addition to compute units 5740. In at least one embodiment, each programmable processing unit 5720 includes, without limitation, any number (including zero) of geometry processors, any number (including zero) of rasterizers, any number (including zero) of render back ends, workload manager 5730, and any number of compute units 5740.

In at least one embodiment, compute units 5740 share L2 cache 5722. In at least one embodiment, L2 cache 5722 is partitioned. In at least one embodiment, a GPU memory 5790 is accessible by all compute units 5740 in GPU 5592. In at least one embodiment, memory controllers 5770 and system memory controllers 5782 facilitate data transfers between GPU 5592 and a host, and DMA engines 5780(1) enable asynchronous memory transfers between GPU 5592 and such a host. In at least one embodiment, memory controllers 5770 and GPU controllers 5784 facilitate data transfers between GPU 5592 and other GPUs 5592, and DMA engines 5780(2) enable asynchronous memory transfers between GPU 5592 and other GPUs 5592.

In at least one embodiment, GPU 5592 includes, without limitation, any amount and type of system interconnect that facilitates data and control transmissions across any number and type of directly or indirectly linked components that may be internal or external to GPU 5592. In at least one embodiment, GPU 5592 includes, without limitation, any number and type of I/O interfaces (e.g., PCIe) that are coupled to any number and type of peripheral devices. In at least one embodiment, GPU 5592 may include, without limitation, any number (including zero) of display engines and any number (including zero) of multimedia engines. In at least one embodiment, GPU 5592 implements a memory subsystem that includes, without limitation, any amount and type of memory controllers (e.g., memory controllers 5770 and system memory controllers 5782) and memory devices (e.g., shared memories 5760) that may be dedicated to one component or shared among multiple components. In at least one embodiment, GPU 5592 implements a cache subsystem that includes, without limitation, one or more cache memories (e.g., L2 cache 5722) that may each be private to or shared between any number of components (e.g., SIMD units 5750, compute units 5740, and programmable processing units 5720).

In at least one embodiment, at least one component shown or described with respect to FIG. 57 is utilized to implement techniques and/or functions described in connection with FIGS. 1-27. In at least one embodiment, at least one component of FIG. 57 is used to identify, generate, remove, process, and/or modify one or more graph dependencies. In at least one embodiment, at least one component of FIG. 57 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 58:
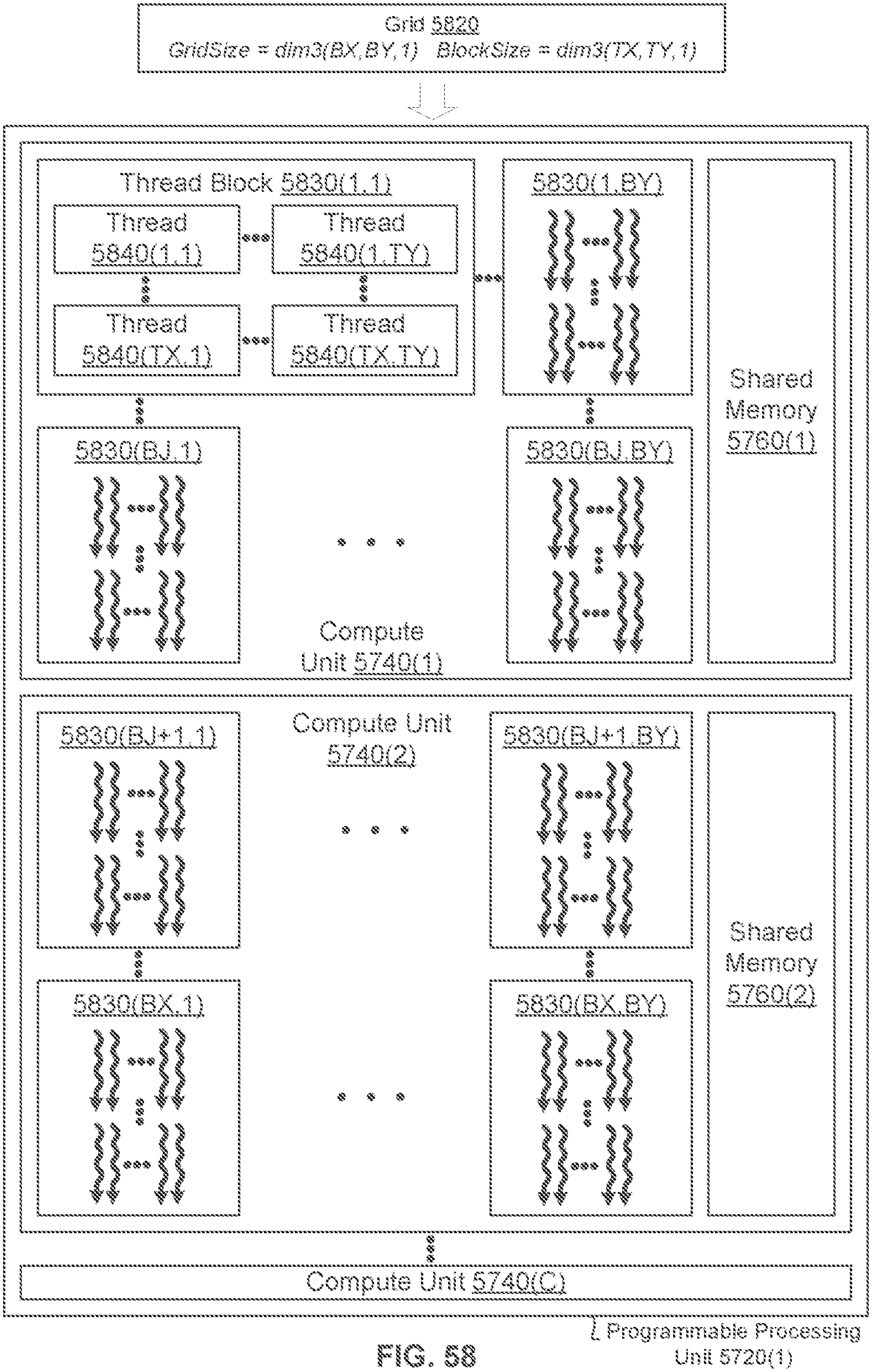
FIG. 58 illustrates how threads of an exemplary CUDA grid are mapped to different compute units of FIG. 57, in accordance with at least one embodiment.

FIG. 58 illustrates how threads of an exemplary CUDA grid 5820 are mapped to different compute units 5740 of FIG. 57, in accordance with at least one embodiment. In at least one embodiment and for explanatory purposes only, grid 5820 has a GridSize of BX by BY by 1 and a BlockSize of TX by TY by 1. In at least one embodiment, grid 5820 therefore includes, without limitation, (BX*BY) thread blocks 5830 and each thread block 5830 includes, without limitation, (TX*TY) threads 5840. Threads 5840 are depicted in FIG. 58 as squiggly arrows.

In at least one embodiment, grid 5820 is mapped to programmable processing unit 5720(1) that includes, without limitation, compute units 5740(1)-5740(C). In at least one embodiment and as shown, (BJ*BY) thread blocks 5830 are mapped to compute unit 5740(1), and the remaining thread blocks 5830 are mapped to compute unit 5740(2). In at least one embodiment, each thread block 5830 may include, without limitation, any number of warps, and each warp is mapped to a different SIMD unit 5750 of FIG. 57.

In at least one embodiment, warps in a given thread block 5830 may synchronize together and communicate through shared memory 5760 included in associated compute unit 5740. For example and in at least one embodiment, warps in thread block 5830(BJ,1) can synchronize together and communicate through shared memory 5760(1). For example and in at least one embodiment, warps in thread block 5830(BJ+1,1) can synchronize together and communicate through shared memory 5760(2).

In at least one embodiment, at least one component shown or described with respect to FIG. 58 is utilized to implement techniques and/or functions described in connection with FIGS. 1-27. In at least one embodiment, at least one component of FIG. 58 is used to identify, generate, remove, process, and/or modify one or more graph dependencies. In at least one embodiment, at least one component of FIG. 58 performs at least one aspect described with respect to graph 102, edge information 110, edge information 112, graph create 120 and/or graph create 122 of FIG. 1, node dependencies 300 of FIG. 3, dependency edge information 400 of FIG. 4, edge information 500 of FIG. 5, operations 600-2600 of FIGS. 6-26, and/or processor 2700 of FIG. 27.

Figure 59:
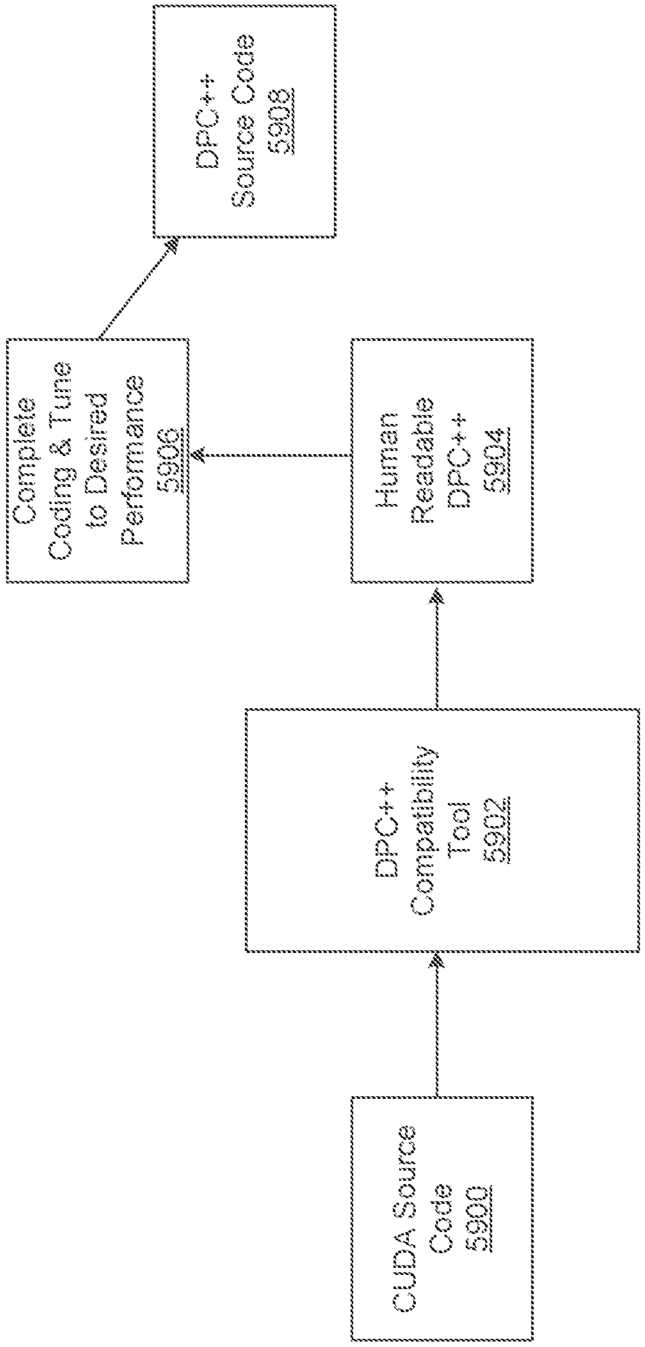
FIG. 59 illustrates how to migrate existing CUDA code to Data Parallel C++ code, in accordance with at least one embodiment.

FIG. 59 illustrates how to migrate existing CUDA code to Data Parallel C++ code, in accordance with at least one embodiment. Data Parallel C++(DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a “single-source” style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 5900 is provided as an input to a DPC++ compatibility tool 5902 to generate human readable DPC++ 5904. In at least one embodiment, human readable DPC++ 5904 includes inline comments generated by DPC++ compatibility tool 5902 that guides a developer on how and/or where to modify DPC++ code to complete coding and tuning to desired performance 5906, thereby generating DPC++ source code 5908.

In at least one embodiment, CUDA source code 5900 is or includes a collection of human-readable source code in a CUDA programming language. In at least one embodiment, CUDA source code 5900 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 5900 described in connection with FIG. 59 may be in accordance with those discussed elsewhere in this document.

In at least one embodiment, DPC++ compatibility tool 5902 refers to an executable tool, program, application, or any other suitable type of tool that is used to facilitate migration of CUDA source code 5900 to DPC++ source code 5908. In at least one embodiment, DPC++ compatibility tool 5902 is a command-line-based code migration tool available as part of a DPC++ tool kit that is used to port existing CUDA sources to DPC++. In at least one embodiment, DPC++ compatibility tool 5902 converts some or all source code of a CUDA application from CUDA to DPC++ and generates a resulting file that is written at least partially in DPC++, referred to as human readable DPC++ 5904. In at least one embodiment, human readable DPC++ 5904 includes comments that are generated by DPC++ compatibility tool 5902 to indicate where user intervention may be necessary. In at least one embodiment, user intervention is necessary when CUDA source code 5900 calls a CUDA API that has no analogous DPC++ API; other examples where user intervention is required are discussed later in greater detail.

In at least one embodiment, a workflow for migrating CUDA source code 5900 (e.g., application or portion thereof) includes creating one or more compilation database files; migrating CUDA to DPC++ using a DPC++ compatibility tool 5902; completing migration and verifying correctness, thereby generating DPC++ source code 5908; and compiling DPC++ source code 5908 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 5902 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 5902 migrates CUDA code (e.g., applications) written in CUDA to DPC++ by generating DPC++ wherever possible. In at least one embodiment, DPC++ compatibility tool 5902 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 5902 to migrate CUDA code to DPC++. In at least one embodiment, non-CUDA C++ code and files are migrated as is. In at least one embodiment, DPC++ compatibility tool 5902 generates human readable DPC++ 5904 which may be DPC++ code that, as generated by DPC++ compatibility tool 5902, cannot be compiled by DPC++ compiler and requires additional plumbing for verifying portions of code that were not migrated correctly, and may involve manual intervention, such as by a developer. In at least one embodiment, DPC++ compatibility tool 5902 provides hints or tools embedded in code to help developers manually migrate additional code that could not be migrated automatically. In at least one embodiment, migration is a one-time activity for a source file, project, or application.

In at least one embodiment, DPC++ compatibility tool 59002 is able to successfully migrate all portions of CUDA code to DPC++ and there may simply be an optional step for manually verifying and tuning performance of DPC++ source code that was generated. In at least one embodiment, DPC++ compatibility tool 5902 directly generates DPC++ source code 5908 which is compiled by a DPC++ compiler without requiring or utilizing human intervention to modify DPC++ code generated by DPC++ compatibility tool 5902. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 5902. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ]global__void VectorAddKernel(float* A, float* B,
   float* C)
{
   A[threadIdx.x]=threadIdx.x+1.0f;
   B[threadIdx.x]=threadIdx.x+1.0f;
   C[threadIdx.x]=A[threadIdx.x]+B[threadIdx.x];
}
int main( )
{
   float *d_A, *d_B, *d_C;
   cudaMalloc(&d_A, VECTOR_SIZE*sizeof(float));
   cudaMalloc(&d_B, VECTOR_SIZE*sizeof(float));
   cudaMalloc(&d_C, VECTOR_SIZE*sizeof(float));
   VectorAddKernel<<<<1, VECTOR_SIZE>>>(d_A,
      d_B, d_C);
   float Result[VECTOR_SIZE]={ };
   cudaMemcpy(Result, d_C, VECTOR_SIZE*sizeof
      (float),
cudaMemcpyDeviceToHost);
   cudaFree(d_A);
   cudaFree(d_B);
   cudaFree(d_C);
   for (int i=0; i<VECTOR_SIZE; i++{
      if(i % 16==0) {
         printf("\n");
      }
      printf("% f", Result[i]);
   }
   return 0;
}
```

In at least one embodiment and in connection with CUDA source file presented above, DPC++ compatibility tool 5902 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 5902 converts CUDA thread IDs used to index work elements to SYCL standard addressing for work elements via a local ID as part of migrating CUDA code to DPC++ code. In at least one embodiment, DPC++ code generated by DPC++ compatibility tool 5902 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 5902. In at least one embodiment, DPC++ compatibility tool 5902 modify CUDA APIs for memory setup and/or host calls to execute kernel on the acceleration device. In at least one embodiment and in connection with CUDA source file presented above, a corresponding human readable DPC++ 5904 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
   sycl::nd_item<3>item_ct1)
{
   A[item_ct1.get_local_id(2)]=item_ct1.get_local_id
      (2)+1.0f;
   B[item_ct1.get_local_id(2)]=item_ct1.get_local_id
      (2)+1.0f;
   C[item_ct1.get_local_id(2)]=
      A[item_ct1.get_local_id(2)]+B
         [item_ct1.get_local_id(2)];
}
int main( )
{
   float *d_A, *d_B, *d_C;
   d_A=(float *)sycl::malloc_device
      (VECTOR_SIZE*sizeof(float),
      dpct::get_current_device( ),
      dpct::get_default_context( ));
   d_B=(float *)sycl::malloc_device
   (VECTOR_SIZE*sizeof(float),
   dpct::get_current_device( ),
   dpct::get_default_context( );
   d_C=(float *)sycl::malloc_device
   (VECTOR_SIZE*sizeof(float),
   dpct::get_current_device( ),
   dpct::get_default_context( );
dpct::get_default_queue_wait( ).submit([&](sycl::handler
   &cgh) {
   cgh.parallel_for(
      sycl::nd_range<3>(sycl::range<3>(1, 1, 1) *
         sycl::range<3>(1, 1, VECTOR_SIZE) *
         sycl::range<3>(1, 1, VECTOR_SIZE)),
      [=](sycl::nd_items<3>item_ct1) {
         VectorAddKernel(d_A, d_B, d_C, item_ct1);
      });
   });
   float Result[VECTOR_SIZE]={ };
```

```
    dpct::get_default_queue_wait( )
      .memcpy(Result, d_C, VECTOR_SIZE * sizeof
        (float))
      .wait( );
    sycl::free(d_A, dpct::get_default_context( ));
    sycl::free(d_B, dpct::get_default_context( );
    sycl::free(d_C, dpct::get_default_context( );
    for (int i=0; i<VECTOR_SIZE; i++ {
      if(i % 16==0) {
        printf("\n");
      }
      printf("% f", Result[i]);
    }
    return 0;
}
```

In at least one embodiment, human readable DPC++ 5904 refers to output generated by DPC++ compatibility tool 5902 and may be optimized in one manner or another. In at least one embodiment, human readable DPC++ 5904 generated by DPC++ compatibility tool 5902 can be manually edited by a developer after migration to make it more maintainable, performance, or other considerations. In at least one embodiment, DPC++ code generated by DPC++ compatibility tool 59002 such as DPC++ disclosed can be optimized by removing repeat calls to get_current_device( ) and/or get_default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 5902 replace uses of unified shared memory with accessors. In at least one embodiment, DPC++ compatibility tool 5902 has an option to change how it migrates CUDA code to DPC++ code. In at least one embodiment, DPC++ compatibility tool 5902 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 5902; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

It should be noted that, while example embodiments described herein may relate to a CUDA programming model, techniques described herein can be utilized with any suitable programming model, such HIP, oneAPI (e.g., using oneAPI-based programming to perform or implement a method disclosed herein), and/or variations thereof.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

At least one embodiment of the disclosure can be described in view of the following first set of clauses:

1. A processor, comprising: one or more circuits to perform an application programming interface (API) to cause a null-operation graph node to be added to a software graph, based, at least in part, on a dependency type indicated by the API.

2. The processor of clause 1, wherein the API is to cause the null-operation graph node to be added to the software graph, based, at least in part, on the dependency type, one or more edges of the software graph, the one or more edges to or from the null-operation graph node.

3. The processor of clause 1 or 2, wherein the API is to further indicate a port identifier of a node associated with the null-operation graph node.

4. The processor of any one of clauses 1-3, wherein the API is to cause the null-operation graph node to be added to the software graph by identifying one or more graph nodes of the software graph dependent to or dependent on the null-operation graph node.

5. The processor of any one of clauses 1-4, wherein the dependency type includes one or more of a full execution dependency, a launch order dependency, or an anti-deadlock dependency.

6. The processor of any one of clauses 1-5, wherein the null-operation graph node is to be performed by one or more graphics processing units (GPUs) based, at least in part, on the dependency type.

7. The processor of any one of clauses 1-6, wherein the API is to receive a set of parameters comprising an identifier of the null-operation graph node and dependency information corresponding to the dependency type.

8. A computer-implemented method comprising: performing an application programming interface (API) to cause a null-operation graph node to be added to a software graph, based, at least in part, on a dependency type indicated by the API.

9. The computer-implemented method of clause 8, wherein the API is to cause the null-operation graph node to be added to the software graph, based, at least in part, on the dependency type, one or more edges of the software graph, the one or more edges to or from the null-operation graph node.

10. The computer-implemented method of clause 8 or 9, wherein the API is to further indicate a port identifier of a node associated with the null-operation graph node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the null-operation graph node is to be performed by one or more graphics processing units (GPUs) based, at least in part, on the dependency type.

13. The computer-implemented method of any one of clauses 8-12, wherein the API is to receive a set of parameters comprising an identifier of the null-operation graph node and dependency information corresponding to the dependency type.

14. The computer-implemented method of any one of clauses 8-13, wherein the API is to cause the null-operation graph node to be added to the software graph by identifying one or more graph nodes of the software graph dependent to or dependent on the null-operation graph node.

15. A computer system comprising: one or more processors and memory storing executable instructions that, if performed by the one or more processors, are to perform an application programming interface (API)) to cause a null-operation graph node to be added to a software graph, based, at least in part, on a dependency type indicated by the API.

16. The computer system of clause 15, wherein the API is to cause the null-operation graph node to be added to the software graph, based, at least in part, on the dependency type, one or more edges of the software graph, the one or more edges to or from the null-operation graph node.

17. The computer system of clause 15 or 16, wherein the API is to further indicate a port identifier of a node associated with the null-operation graph node.

18. The computer system of any one of clauses 15-17, wherein the API is to cause the null-operation graph node to be added to the software graph by identifying one or more graph nodes of the software graph dependent to or dependent on the null-operation graph node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the null-operation graph node and dependency information corresponding to the dependency type.

At least one embodiment of the disclosure can be described in view of the following second set of clauses:

1. A processor, comprising: one or more circuits to perform an application programming interface (API) to store an indication of whether a node within a software graph was performed based, at least in part, on a dependency type indicated by the API.

2. The processor of clause 1, wherein the API is to store the indication of whether the node within the software graph was performed, based, at least in part, on the dependency type, one or more edges of the software graph, the one or more edges to or from the null-operation graph node.

3. The processor of clause 1 or 2, wherein the API is to further indicate a port identifier of a graph node associated with the node.

4. The processor of any one of clauses 1-3, wherein the API is to store the indication of whether the node within the software graph was performed by identifying one or more graph nodes of the software graph dependent to or dependent on the node.

5. The processor of any one of clauses 1-4, wherein the dependency type includes one or more of a full execution dependency, a launch order dependency, or an anti-deadlock dependency.

6. The processor of any one of clauses 1-5, wherein the node is to be performed by one or more graphics processing units (GPUs) based, at least in part, on the dependency type.

7. The processor of any one of clauses 1-6, wherein the API is to receive a set of parameters comprising an identifier of the node and dependency information corresponding to the dependency type.

8. A computer-implemented method comprising: performing an application programming interface (API) to store an indication of whether a node within a software graph was performed based, at least in part, on a dependency type indicated by the API.

9. The computer-implemented method of clause 8, wherein the API is to store the indication of whether the node within the software graph was performed, based, at least in part, on the dependency type, one or more edges of the software graph, the one or more edges to or from the null-operation graph node.

10. The computer-implemented method of clause 8 or 9, wherein the API is to further indicate a port identifier of a graph node associated with the node.

11. The computer-implemented method of any one of clauses 8-10, wherein the API is to store the indication of whether the node within the software graph was performed by identifying one or more graph nodes of the software graph dependent to or dependent on the node.

12. The computer-implemented method of any one of clauses 8-11, wherein the dependency type includes one or more of a full execution dependency, a launch order dependency, or an anti-deadlock dependency.

13. The computer-implemented method of any one of clauses 8-12, wherein the node is to be performed by one or more graphics processing units (GPUs) based, at least in part, on the dependency type.

14. The computer-implemented method of any one of clauses 8-13, wherein the API is to receive a set of parameters comprising an identifier of the node and dependency information corresponding to the dependency type.

15. A computer system comprising: one or more processors and memory storing executable instructions that, if performed by the one or more processors, are to perform an application programming interface (API)) to store an indication of whether a node within a software graph was performed based, at least in part, on a dependency type indicated by the API.

16. The computer system of clause 15, wherein the API is to store the indication of whether the node within the software graph was performed, based, at least in part, on the dependency type, one or more edges of the software graph, the one or more edges to or from the null-operation graph node.

17. The computer system of clause 15 or 16, wherein the API is to further indicate a port identifier of a graph node associated with the node.

18. The computer system of any one of clauses 15-17, wherein the API is to store the indication of whether the node within the software graph was performed by identifying one or more graph nodes of the software graph dependent to or dependent on the node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the node and dependency information corresponding to the dependency type.

At least one embodiment of the disclosure can be described in view of the following third set of clauses:

1. A processor, comprising: one or more circuits to perform an application programming interface (API) to cause an event wait node to be added to a software graph, based, at least in part, on a dependency type indicated by the API.

2. The processor of clause 1, wherein the API is to cause the event wait node to be added to the software graph, based, at least in part, on the dependency type, one or more edges of the software graph, the one or more edges to or from the event wait node.

3. The processor of clause 1 or 2, wherein the API is to further indicate a port identifier of a node associated with the event wait node.

4. The processor of any one of clauses 1-3, wherein the API is to cause the event wait node to be added to the software graph by identifying one or more graph nodes of the software graph dependent to or dependent on the event wait node.

5. The processor of any one of clauses 1-4, wherein the dependency type includes one or more of a full execution dependency, a launch order dependency, or an anti-deadlock dependency.

6. The processor of any one of clauses 1-5, wherein the event wait node is to be performed by one or more graphics processing units (GPUs) based, at least in part, on the dependency type.

7. The processor of any one of clauses 1-6, wherein the API is to receive a set of parameters comprising an identifier of the event wait node and dependency information corresponding to the dependency type.

8. A computer-implemented method comprising: performing an application programming interface (API) to cause an event wait node to be added to a software graph, based, at least in part, on a dependency type indicated by the API.

9. The computer-implemented method of clause 8, wherein the API is to cause the event wait node to be added to the software graph, based, at least in part, on the dependency type, one or more edges of the software graph, the one or more edges to or from the event wait node.

10. The computer-implemented method of clause 8 or 9, wherein the API is to further indicate a port identifier of a node associated with the event wait node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the event wait node is to be performed by one or more graphics processing units (GPUs) based, at least in part, on the dependency type.

13. The computer-implemented method of any one of clauses 8-12, wherein the API is to receive a set of parameters comprising an identifier of the event wait node and dependency information corresponding to the dependency type.

14. The computer-implemented method of any one of clauses 8-13, wherein the API is to cause the event wait node to be added to the software graph by identifying one or more graph nodes of the software graph dependent to or dependent on the event wait node.

15. A computer system comprising: one or more processors and memory storing executable instructions that, if performed by the one or more processors, are to perform an application programming interface (API)) to cause an event wait node to be added to a software graph, based, at least in part, on a dependency type indicated by the API.

16. The computer system of clause 15, wherein the API is to cause the event wait node to be added to the software graph, based, at least in part, on the dependency type, one or more edges of the software graph, the one or more edges to or from the event wait node.

17. The computer system of clause 15 or 16, wherein the API is to further indicate a port identifier of a node associated with the event wait node.

18. The computer system of any one of clauses 15-17, wherein the API is to cause the event wait node to be added to the software graph by identifying one or more graph nodes of the software graph dependent to or dependent on the event wait node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the event wait node and dependency information corresponding to the dependency type.

At least one embodiment of the disclosure can be described in view of the following fourth set of clauses:

1. A processor, comprising: one or more circuits to perform an application programming interface (API) to cause a semaphore update node to be added to a software graph, based, at least in part, on a dependency type indicated by the API.

2. The processor of clause 1, wherein the API is to cause the semaphore update node to be added to the software graph, based, at least in part, on the dependency type, one or more edges of the software graph, the one or more edges to or from the semaphore update node.

3. The processor of clause 1 or 2, wherein the API is to further indicate a port identifier of a node associated with the semaphore update node.

4. The processor of any one of clauses 1-3, wherein the API is to cause the semaphore update node to be added to the software graph by identifying one or more graph nodes of the software graph dependent to or dependent on the semaphore update node.

5. The processor of any one of clauses 1-4, wherein the dependency type includes one or more of a full execution dependency, a launch order dependency, or an anti-deadlock dependency.

6. The processor of any one of clauses 1-5, wherein the semaphore update node is to be performed by one or more graphics processing units (GPUs) based, at least in part, on the dependency type.

7. The processor of any one of clauses 1-6, wherein the API is to receive a set of parameters comprising an identifier of the semaphore update node and dependency information corresponding to the dependency type.

8. A computer-implemented method comprising: performing an application programming interface (API) to cause a semaphore update node to be added to a software graph, based, at least in part, on a dependency type indicated by the API.

9. The computer-implemented method of clause 8, wherein the API is to cause the semaphore update node to be added to the software graph, based, at least in part, on the dependency type, one or more edges of the software graph, the one or more edges to or from the semaphore update node.

10. The computer-implemented method of clause 8 or 9, wherein the API is to further indicate a port identifier of a node associated with the semaphore update node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the semaphore update node is to be performed by one or more graphics processing units (GPUs) based, at least in part, on the dependency type.

13. The computer-implemented method of any one of clauses 8-12, wherein the API is to receive a set of parameters comprising an identifier of the semaphore update node and dependency information corresponding to the dependency type.

14. The computer-implemented method of any one of clauses 8-13, wherein the API is to cause the semaphore update node to be added to the software graph by identifying one or more graph nodes of the software graph dependent to or dependent on the semaphore update node.

15. A computer system comprising: one or more processors and memory storing executable instructions that, if performed by the one or more processors, are to perform an application programming interface (API)) to cause a semaphore update node to be added to a software graph, based, at least in part, on a dependency type indicated by the API.

16. The computer system of clause 15, wherein the API is to cause the semaphore update node to be added to the software graph, based, at least in part, on the dependency type, one or more edges of the software graph, the one or more edges to or from the semaphore update node.

17. The computer system of clause 15 or 16, wherein the API is to further indicate a port identifier of a node associated with the semaphore update node.

18. The computer system of any one of clauses 15-17, wherein the API is to cause the semaphore update node to be added to the software graph by identifying one or more graph nodes of the software graph dependent to or dependent on the semaphore update node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the semaphore update node and dependency information corresponding to the dependency type.

At least one embodiment of the disclosure can be described in view of the following fifth set of clauses:

1. A processor, comprising: one or more circuits to perform an application programming interface (API) to cause a semaphore wait node to be added to a software graph, based, at least in part, on a dependency type indicated by the API.

2. The processor of clause 1, wherein the API is to cause the semaphore wait node to be added to the software graph, based, at least in part, on the dependency type, one or more edges of the software graph, the one or more edges to or from the semaphore wait node.

3. The processor of clause 1 or 2, wherein the API is to further indicate a port identifier of a node associated with the semaphore wait node.

4. The processor of any one of clauses 1-3, wherein the API is to cause the semaphore wait node to be added to the software graph by identifying one or more graph nodes of the software graph dependent to or dependent on the semaphore wait node.

5. The processor of any one of clauses 1-4, wherein the dependency type includes one or more of a full execution dependency, a launch order dependency, or an anti-deadlock dependency.

6. The processor of any one of clauses 1-5, wherein the semaphore wait node is to be performed by one or more graphics processing units (GPUs) based, at least in part, on the dependency type.

7. The processor of any one of clauses 1-6, wherein the API is to receive a set of parameters comprising an identifier of the semaphore wait node and dependency information corresponding to the dependency type.

8. A computer-implemented method comprising: performing an application programming interface (API) to cause a semaphore wait node to be added to a software graph, based, at least in part, on a dependency type indicated by the API.

9. The computer-implemented method of clause 8, wherein the API is to cause the semaphore wait node to be added to the software graph, based, at least in part, on the dependency type, one or more edges of the software graph, the one or more edges to or from the semaphore wait node.

10. The computer-implemented method of clause 8 or 9, wherein the API is to further indicate a port identifier of a node associated with the semaphore wait node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the semaphore wait node is to be performed by one or more graphics processing units (GPUs) based, at least in part, on the dependency type.

13. The computer-implemented method of any one of clauses 8-12, wherein the API is to receive a set of parameters comprising an identifier of the semaphore wait node and dependency information corresponding to the dependency type.

14. The computer-implemented method of any one of clauses 8-13, wherein the API is to cause the semaphore wait node to be added to the software graph by identifying one or more graph nodes of the software graph dependent to or dependent on the semaphore wait node.

15. A computer system comprising: one or more processors and memory storing executable instructions that, if performed by the one or more processors, are to perform an application programming interface (API)) to cause a semaphore wait node to be added to a software graph, based, at least in part, on a dependency type indicated by the API.

16. The computer system of clause 15, wherein the API is to cause the semaphore wait node to be added to the software graph, based, at least in part, on the dependency type, one or more edges of the software graph, the one or more edges to or from the semaphore wait node.

17. The computer system of clause 15 or 16, wherein the API is to further indicate a port identifier of a node associated with the semaphore wait node.

18. The computer system of any one of clauses 15-17, wherein the API is to cause the semaphore wait node to be added to the software graph by identifying one or more graph nodes of the software graph dependent to or dependent on the semaphore wait node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the semaphore wait node and dependency information corresponding to the dependency type.

At least one embodiment of the disclosure can be described in view of the following sixth set of clauses:

1. A processor, comprising: one or more circuits to perform an application programming interface (API) to cause a host node to be added to a software graph, based, at least in part, on a dependency type indicated by the API.

2. The processor of clause 1, wherein the API is to cause the host node to be added to the software graph, based, at least in part, on the dependency type, one or more edges of the software graph, the one or more edges to or from the host node.

3. The processor of clause 1 or 2, wherein the API is to further indicate a port identifier of a node associated with the host node.

4. The processor of any one of clauses 1-3, wherein the API is to cause the host node to be added to the software graph by identifying one or more graph nodes of the software graph dependent to or dependent on the host node.

5. The processor of any one of clauses 1-4, wherein the dependency type includes one or more of a full execution dependency, a launch order dependency, or an anti-deadlock dependency.

6. The processor of any one of clauses 1-5, wherein the host node is to be performed by one or more graphics processing units (GPUs) based, at least in part, on the dependency type.

7. The processor of any one of clauses 1-6, wherein the API is to receive a set of parameters comprising an identifier of the host node and dependency information corresponding to the dependency type.

8. A computer-implemented method comprising: performing an application programming interface (API) to cause a host node to be added to a software graph, based, at least in part, on a dependency type indicated by the API.

9. The computer-implemented method of clause 8, wherein the API is to cause the host node to be added to the software graph, based, at least in part, on the dependency type, one or more edges of the software graph, the one or more edges to or from the host node.

10. The computer-implemented method of clause 8 or 9, wherein the API is to further indicate a port identifier of a node associated with the host node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the host node is to be performed by one or more graphics processing units (GPUs) based, at least in part, on the dependency type.

13. The computer-implemented method of any one of clauses 8-12, wherein the API is to receive a set of parameters comprising an identifier of the host node and dependency information corresponding to the dependency type.

14. The computer-implemented method of any one of clauses 8-13, wherein the API is to cause the host node to be added to the software graph by identifying one or more graph nodes of the software graph dependent to or dependent on the host node.

15. A computer system comprising: one or more processors and memory storing executable instructions that, if performed by the one or more processors, are to perform an application programming interface (API)) to cause a host node to be added to a software graph, based, at least in part, on a dependency type indicated by the API.

16. The computer system of clause 15, wherein the API is to cause the host node to be added to the software graph, based, at least in part, on the dependency type, one or more edges of the software graph, the one or more edges to or from the host node.

17. The computer system of clause 15 or 16, wherein the API is to further indicate a port identifier of a node associated with the host node.

18. The computer system of any one of clauses 15-17, wherein the API is to cause the host node to be added to the software graph by identifying one or more graph nodes of the software graph dependent to or dependent on the host node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the host node and dependency information corresponding to the dependency type.

At least one embodiment of the disclosure can be described in view of the following seventh set of clauses:

1. A processor, comprising: one or more circuits to perform an application programming interface (API) to cause a kernel node to be added to a software graph, based, at least in part, on a dependency type indicated by the API.

2. The processor of clause 1, wherein the API is to cause the kernel node to be added to the software graph, based, at least in part, on the dependency type, one or more edges of the software graph, the one or more edges to or from the kernel node.

3. The processor of clause 1 or 2, wherein the API is to further indicate a port identifier of a node associated with the kernel node.

4. The processor of any one of clauses 1-3, wherein the API is to cause the kernel node to be added to the software graph by identifying one or more graph nodes of the software graph dependent to or dependent on the kernel node.

5. The processor of any one of clauses 1-4, wherein the dependency type includes one or more of a full execution dependency, a launch order dependency, or an anti-deadlock dependency.

6. The processor of any one of clauses 1-5, wherein the kernel node is to be performed by one or more graphics processing units (GPUs) based, at least in part, on the dependency type.

7. The processor of any one of clauses 1-6, wherein the API is to receive a set of parameters comprising an identifier of the kernel node and dependency information corresponding to the dependency type.

8. A computer-implemented method comprising: performing an application programming interface (API) to cause a kernel node to be added to a software graph, based, at least in part, on a dependency type indicated by the API.

9. The computer-implemented method of clause 8, wherein the API is to cause the kernel node to be added to the software graph, based, at least in part, on the dependency type, one or more edges of the software graph, the one or more edges to or from the kernel node.

10. The computer-implemented method of clause 8 or 9, wherein the API is to further indicate a port identifier of a node associated with the kernel node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the kernel node is to be performed by one or more graphics processing units (GPUs) based, at least in part, on the dependency type.

13. The computer-implemented method of any one of clauses 8-12, wherein the API is to receive a set of parameters comprising an identifier of the kernel node and dependency information corresponding to the dependency type.

14. The computer-implemented method of any one of clauses 8-13, wherein the API is to cause the kernel node to be added to the software graph by identifying one or more graph nodes of the software graph dependent to or dependent on the kernel node.

15. A computer system comprising: one or more processors and memory storing executable instructions that, if performed by the one or more processors, are to perform an application programming interface (API)) to cause a kernel node to be added to a software graph, based, at least in part, on a dependency type indicated by the API.

16. The computer system of clause 15, wherein the API is to cause the kernel node to be added to the software graph, based, at least in part, on the dependency type, one or more edges of the software graph, the one or more edges to or from the kernel node.

17. The computer system of clause 15 or 16, wherein the API is to further indicate a port identifier of a node associated with the kernel node.

18. The computer system of any one of clauses 15-17, wherein the API is to cause the kernel node to be added to the software graph by identifying one or more graph nodes of the software graph dependent to or dependent on the kernel node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the kernel node and dependency information corresponding to the dependency type.

At least one embodiment of the disclosure can be described in view of the following eighth set of clauses:

1. A processor, comprising: one or more circuits to perform an application programming interface (API) to cause a memory allocation node to be added to a software graph, based, at least in part, on a dependency type indicated by the API.

2. The processor of clause 1, wherein the API is to cause the memory allocation node to be added to the software graph, based, at least in part, on the dependency type, one or more edges of the software graph, the one or more edges to or from the memory allocation node.

3. The processor of clause 1 or 2, wherein the API is to further indicate a port identifier of a node associated with the memory allocation node.

4. The processor of any one of clauses 1-3, wherein the API is to cause the memory allocation node to be added to the software graph by identifying one or more graph nodes of the software graph dependent to or dependent on the memory allocation node.

5. The processor of any one of clauses 1-4, wherein the dependency type includes one or more of a full execution dependency, a launch order dependency, or an anti-deadlock dependency.

6. The processor of any one of clauses 1-5, wherein the memory allocation node is to be performed by one or more graphics processing units (GPUs) based, at least in part, on the dependency type.

7. The processor of any one of clauses 1-6, wherein the API is to receive a set of parameters comprising an identifier of the memory allocation node and dependency information corresponding to the dependency type.

8. A computer-implemented method comprising: performing an application programming interface (API) to cause a memory allocation node to be added to a software graph, based, at least in part, on a dependency type indicated by the API.

9. The computer-implemented method of clause 8, wherein the API is to cause the memory allocation node to be added to the software graph, based, at least in part, on the dependency type, one or more edges of the software graph, the one or more edges to or from the memory allocation node.

10. The computer-implemented method of clause 8 or 9, wherein the API is to further indicate a port identifier of a node associated with the memory allocation node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the memory allocation node is to be performed by one or more graphics processing units (GPUs) based, at least in part, on the dependency type.

13. The computer-implemented method of any one of clauses 8-12, wherein the API is to receive a set of parameters comprising an identifier of the memory allocation node and dependency information corresponding to the dependency type.

14. The computer-implemented method of any one of clauses 8-13, wherein the API is to cause the memory allocation node to be added to the software graph by identifying one or more graph nodes of the software graph dependent to or dependent on the memory allocation node.

15. A computer system comprising: one or more processors and memory storing executable instructions that, if performed by the one or more processors, are to perform an application programming interface (API)) to cause a memory allocation node to be added to a software graph, based, at least in part, on a dependency type indicated by the API.

16. The computer system of clause 15, wherein the API is to cause the memory allocation node to be added to the software graph, based, at least in part, on the dependency type, one or more edges of the software graph, the one or more edges to or from the memory allocation node.

17. The computer system of clause 15 or 16, wherein the API is to further indicate a port identifier of a node associated with the memory allocation node.

18. The computer system of any one of clauses 15-17, wherein the API is to cause the memory allocation node to be added to the software graph by identifying one or more graph nodes of the software graph dependent to or dependent on the memory allocation node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the memory allocation node and dependency information corresponding to the dependency type.

At least one embodiment of the disclosure can be described in view of the following ninth set of clauses:

1. A processor, comprising: one or more circuits to perform an application programming interface (API) to cause a memory deallocation node to be added to a software graph, based, at least in part, on a dependency type indicated by the API.

2. The processor of clause 1, wherein the API is to cause the memory deallocation node to be added to the software graph, based, at least in part, on the dependency type, one or more edges of the software graph, the one or more edges to or from the memory deallocation node.

3. The processor of clause 1 or 2, wherein the API is to further indicate a port identifier of a node associated with the memory deallocation node.

4. The processor of any one of clauses 1-3, wherein the API is to cause the memory deallocation node to be added to the software graph by identifying one or more graph nodes of the software graph dependent to or dependent on the memory deallocation node.

5. The processor of any one of clauses 1-4, wherein the dependency type includes one or more of a full execution dependency, a launch order dependency, or an anti-deadlock dependency.

6. The processor of any one of clauses 1-5, wherein the memory deallocation node is to be performed by one or more graphics processing units (GPUs) based, at least in part, on the dependency type.

7. The processor of any one of clauses 1-6, wherein the API is to receive a set of parameters comprising an identifier of the memory deallocation node and dependency information corresponding to the dependency type.

8. A computer-implemented method comprising: performing an application programming interface (API) to cause a memory deallocation node to be added to a software graph, based, at least in part, on a dependency type indicated by the API.

9. The computer-implemented method of clause 8, wherein the API is to cause the memory deallocation node to be added to the software graph, based, at least in part, on the dependency type, one or more edges of the software graph, the one or more edges to or from the memory deallocation node.

10. The computer-implemented method of clause 8 or 9, wherein the API is to further indicate a port identifier of a node associated with the memory deallocation node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the memory deallocation node is to be performed by one or more graphics processing units (GPUs) based, at least in part, on the dependency type.

13. The computer-implemented method of any one of clauses 8-12, wherein the API is to receive a set of parameters comprising an identifier of the memory deallocation node and dependency information corresponding to the dependency type.

14. The computer-implemented method of any one of clauses 8-13, wherein the API is to cause the memory deallocation node to be added to the software graph by identifying one or more graph nodes of the software graph dependent to or dependent on the memory deallocation node.

15. A computer system comprising: one or more processors and memory storing executable instructions that, if performed by the one or more processors, are to perform an application programming interface (API)) to cause a memory deallocation node to be added to a software graph, based, at least in part, on a dependency type indicated by the API.

16. The computer system of clause 15, wherein the API is to cause the memory deallocation node to be added to the software graph, based, at least in part, on the dependency type, one or more edges of the software graph, the one or more edges to or from the memory deallocation node.

17. The computer system of clause 15 or 16, wherein the API is to further indicate a port identifier of a node associated with the memory deallocation node.

18. The computer system of any one of clauses 15-17, wherein the API is to cause the memory deallocation node to be added to the software graph by identifying one or more graph nodes of the software graph dependent to or dependent on the memory deallocation node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the memory deallocation node and dependency information corresponding to the dependency type.

At least one embodiment of the disclosure can be described in view of the following tenth set of clauses:

1. A processor, comprising: one or more circuits to perform an application programming interface (API) to cause a memory copy node to be added to a software graph, based, at least in part, on a dependency type indicated by the API.

2. The processor of clause 1, wherein the API is to cause the memory copy node to be added to the software graph, based, at least in part, on the dependency type, one or more edges of the software graph, the one or more edges to or from the memory copy node.

3. The processor of clause 1 or 2, wherein the API is to further indicate a port identifier of a node associated with the memory copy node.

4. The processor of any one of clauses 1-3, wherein the API is to cause the memory copy node to be added to the software graph by identifying one or more graph nodes of the software graph dependent to or dependent on the memory copy node.

5. The processor of any one of clauses 1-4, wherein the dependency type includes one or more of a full execution dependency, a launch order dependency, or an anti-deadlock dependency.

6. The processor of any one of clauses 1-5, wherein the memory copy node is to be performed by one or more graphics processing units (GPUs) based, at least in part, on the dependency type.

7. The processor of any one of clauses 1-6, wherein the API is to receive a set of parameters comprising an identifier of the memory copy node and dependency information corresponding to the dependency type.

8. A computer-implemented method comprising: performing an application programming interface (API) to cause a memory copy node to be added to a software graph, based, at least in part, on a dependency type indicated by the API.

9. The computer-implemented method of clause 8, wherein the API is to cause the memory copy node to be added to the software graph, based, at least in part, on the dependency type, one or more edges of the software graph, the one or more edges to or from the memory copy node.

10. The computer-implemented method of clause 8 or 9, wherein the API is to further indicate a port identifier of a node associated with the memory copy node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the memory copy node is to be performed by one or more graphics processing units (GPUs) based, at least in part, on the dependency type.

13. The computer-implemented method of any one of clauses 8-12, wherein the API is to receive a set of parameters comprising an identifier of the memory copy node and dependency information corresponding to the dependency type.

14. The computer-implemented method of any one of clauses 8-13, wherein the API is to cause the memory copy node to be added to the software graph by identifying one or more graph nodes of the software graph dependent to or dependent on the memory copy node.

15. A computer system comprising: one or more processors and memory storing executable instructions that, if performed by the one or more processors, are to perform an application programming interface (API)) to cause a memory copy node to be added to a software graph, based, at least in part, on a dependency type indicated by the API.

16. The computer system of clause 15, wherein the API is to cause the memory copy node to be added to the software graph, based, at least in part, on the dependency type, one or more edges of the software graph, the one or more edges to or from the memory copy node.

17. The computer system of clause 15 or 16, wherein the API is to further indicate a port identifier of a node associated with the memory copy node.

18. The computer system of any one of clauses 15-17, wherein the API is to cause the memory copy node to be added to the software graph by identifying one or more graph nodes of the software graph dependent to or dependent on the memory copy node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the memory copy node and dependency information corresponding to the dependency type.

At least one embodiment of the disclosure can be described in view of the following eleventh set of clauses:

1. A processor, comprising: one or more circuits to perform an application programming interface (API) to cause an array storage node to be added to a software graph, based, at least in part, on a dependency type indicated by the API.

2. The processor of clause 1, wherein the API is to cause the array storage node to be added to the software graph, based, at least in part, on the dependency type, one or more edges of the software graph, the one or more edges to or from the array storage node.

3. The processor of clause 1 or 2, wherein the API is to further indicate a port identifier of a node associated with the array storage node.

4. The processor of any one of clauses 1-3, wherein the API is to cause the array storage node to be added to the software graph by identifying one or more graph nodes of the software graph dependent to or dependent on the array storage node.

5. The processor of any one of clauses 1-4, wherein the dependency type includes one or more of a full execution dependency, a launch order dependency, or an anti-deadlock dependency.

6. The processor of any one of clauses 1-5, wherein the array storage node is to be performed by one or more graphics processing units (GPUs) based, at least in part, on the dependency type.

7. The processor of any one of clauses 1-6, wherein the API is to receive a set of parameters comprising an identifier of the array storage node and dependency information corresponding to the dependency type.

8. A computer-implemented method comprising: performing an application programming interface (API) to cause an array storage node to be added to a software graph, based, at least in part, on a dependency type indicated by the API.

9. The computer-implemented method of clause 8, wherein the API is to cause the array storage node to be added to the software graph, based, at least in part, on the dependency type, one or more edges of the software graph, the one or more edges to or from the array storage node.

10. The computer-implemented method of clause 8 or 9, wherein the API is to further indicate a port identifier of a node associated with the array storage node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the array storage node is to be performed by one or more graphics processing units (GPUs) based, at least in part, on the dependency type.

13. The computer-implemented method of any one of clauses 8-12, wherein the API is to receive a set of parameters comprising an identifier of the array storage node and dependency information corresponding to the dependency type.

14. The computer-implemented method of any one of clauses 8-13, wherein the API is to cause the array storage node to be added to the software graph by identifying one or more graph nodes of the software graph dependent to or dependent on the array storage node.

15. A computer system comprising: one or more processors and memory storing executable instructions that, if performed by the one or more processors, are to perform an application programming interface (API) to cause an array storage node to be added to a software graph, based, at least in part, on a dependency type indicated by the API.

16. The computer system of clause 15, wherein the API is to cause the array storage node to be added to the software graph, based, at least in part, on the dependency type, one or more edges of the software graph, the one or more edges to or from the array storage node.

17. The computer system of clause 15 or 16, wherein the API is to further indicate a port identifier of a node associated with the array storage node.

18. The computer system of any one of clauses 15-17, wherein the API is to cause the array storage node to be added to the software graph by identifying one or more graph nodes of the software graph dependent to or dependent on the array storage node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the array storage node and dependency information corresponding to the dependency type.

At least one embodiment of the disclosure can be described in view of the following thirteenth set of clauses:

1. A processor, comprising: one or more circuits to perform an application programming interface (API) to cause an event wait node to be added to a software graph, based, at least in part, on a dependency type indicated by the API.

2. The processor of clause 1, wherein the API is to cause the event wait node to be added to the software graph, based, at least in part, on the dependency type, one or more edges of the software graph, the one or more edges to or from the event wait node.

3. The processor of clause 1 or 2, wherein the API is to further indicate a port identifier of a node associated with the event wait node.

4. The processor of any one of clauses 1-3, wherein the API is to cause the event wait node to be added to the software graph by identifying one or more graph nodes of the software graph dependent to or dependent on the event wait node.

5. The processor of any one of clauses 1-4, wherein the dependency type includes one or more of a full execution dependency, a launch order dependency, or an anti-deadlock dependency.

6. The processor of any one of clauses 1-5, wherein the event wait node is to be performed by one or more graphics processing units (GPUs) based, at least in part, on the dependency type.

7. The processor of any one of clauses 1-6, wherein the API is to receive a set of parameters comprising an identifier of the event wait node and dependency information corresponding to the dependency type.

8. A computer-implemented method comprising: performing an application programming interface (API) to cause an event wait node to be added to a software graph, based, at least in part, on a dependency type indicated by the API.

9. The computer-implemented method of clause 8, wherein the API is to cause the event wait node to be added to the software graph, based, at least in part, on the dependency type, one or more edges of the software graph, the one or more edges to or from the event wait node.

10. The computer-implemented method of clause 8 or 9, wherein the API is to further indicate a port identifier of a node associated with the event wait node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the event wait node is to be performed by one or more graphics processing units (GPUs) based, at least in part, on the dependency type.

13. The computer-implemented method of any one of clauses 8-12, wherein the API is to receive a set of parameters comprising an identifier of the event wait node and dependency information corresponding to the dependency type.

14. The computer-implemented method of any one of clauses 8-13, wherein the API is to cause the event wait node to be added to the software graph by identifying one or more graph nodes of the software graph dependent to or dependent on the event wait node.

15. A computer system comprising: one or more processors and memory storing executable instructions that, if performed by the one or more processors, are to perform an application programming interface (API)) to cause an event wait node to be added to a software graph, based, at least in part, on a dependency type indicated by the API.

16. The computer system of clause 15, wherein the API is to cause the event wait node to be added to the software graph, based, at least in part, on the dependency type, one or more edges of the software graph, the one or more edges to or from the event wait node.

17. The computer system of clause 15 or 16, wherein the API is to further indicate a port identifier of a node associated with the event wait node.

18. The computer system of any one of clauses 15-17, wherein the API is to cause the event wait node to be added to the software graph by identifying one or more graph nodes of the software graph dependent to or dependent on the event wait node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the event wait node and dependency information corresponding to the dependency type.

At least one embodiment of the disclosure can be described in view of the following fourteenth set of clauses:

1. A processor, comprising: one or more circuits to perform an application programming interface (API) to cause a user-indicated value storage node to be added to a software graph, based, at least in part, on a dependency type indicated by the API.

2. The processor of clause 1, wherein the API is to cause the user-indicated value storage node to be added to the software graph, based, at least in part, on the dependency type, one or more edges of the software graph, the one or more edges to or from the user-indicated value storage node.

3. The processor of clause 1 or 2, wherein the API is to further indicate a port identifier of a node associated with the user-indicated value storage node.

4. The processor of any one of clauses 1-3, wherein the API is to cause the user-indicated value storage node to be added to the software graph by identifying one or more graph nodes of the software graph dependent to or dependent on the user-indicated value storage node.

5. The processor of any one of clauses 1-4, wherein the dependency type includes one or more of a full execution dependency, a launch order dependency, or an anti-deadlock dependency.

6. The processor of any one of clauses 1-5, wherein the user-indicated value storage node is to be performed by one or more graphics processing units (GPUs) based, at least in part, on the dependency type.

7. The processor of any one of clauses 1-6, wherein the API is to receive a set of parameters comprising an identifier of the user-indicated value storage node and dependency information corresponding to the dependency type.

8. A computer-implemented method comprising: performing an application programming interface (API) to cause a user-indicated value storage node to be added to a software graph, based, at least in part, on a dependency type indicated by the API.

9. The computer-implemented method of clause 8, wherein the API is to cause the user-indicated value storage node to be added to the software graph, based, at least in part, on the dependency type, one or more edges of the software graph, the one or more edges to or from the user-indicated value storage node.

10. The computer-implemented method of clause 8 or 9, wherein the API is to further indicate a port identifier of a node associated with the user-indicated value storage node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the user-indicated value storage node is to be performed by one or more graphics processing units (GPUs) based, at least in part, on the dependency type.

13. The computer-implemented method of any one of clauses 8-12, wherein the API is to receive a set of parameters comprising an identifier of the user-indicated value storage node and dependency information corresponding to the dependency type.

14. The computer-implemented method of any one of clauses 8-13, wherein the API is to cause the user-indicated value storage node to be added to the software graph by identifying one or more graph nodes of the software graph dependent to or dependent on the user-indicated value storage node.

15. A computer system comprising: one or more processors and memory storing executable instructions that, if performed by the one or more processors, are to perform an application programming interface (API) to cause a user-indicated value storage node to be added to a software graph, based, at least in part, on a dependency type indicated by the API.

16. The computer system of clause 15, wherein the API is to cause the user-indicated value storage node to be added to the software graph, based, at least in part, on the dependency type, one or more edges of the software graph, the one or more edges to or from the user-indicated value storage node.

17. The computer system of clause 15 or 16, wherein the API is to further indicate a port identifier of a node associated with the user-indicated value storage node.

18. The computer system of any one of clauses 15-17, wherein the API is to cause the user-indicated value storage node to be added to the software graph by identifying one or more graph nodes of the software graph dependent to or dependent on the user-indicated value storage node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the user-indicated value storage node and dependency information corresponding to the dependency type.

At least one embodiment of the disclosure can be described in view of the following fifteenth set of clauses:

1. A processor, comprising: one or more circuits to perform an application programming interface (API) to cause a child graph node to be added to a software graph, based, at least in part, on a dependency type indicated by the API.

2. The processor of clause 1, wherein the API is to cause the child graph node to be added to the software graph, based, at least in part, on the dependency type, one or more edges of the software graph, the one or more edges to or from the child graph node.

3. The processor of clause 1 or 2, wherein the API is to further indicate a port identifier of a node associated with the child graph node.

4. The processor of any one of clauses 1-3, wherein the API is to cause the child graph node to be added to the software graph by identifying one or more graph nodes of the software graph dependent to or dependent on the child graph node.

5. The processor of any one of clauses 1-4, wherein the dependency type includes one or more of a full execution dependency, a launch order dependency, or an anti-deadlock dependency.

6. The processor of any one of clauses 1-5, wherein the child graph node is to be performed by one or more graphics processing units (GPUs) based, at least in part, on the dependency type.

7. The processor of any one of clauses 1-6, wherein the API is to receive a set of parameters comprising an identifier of the child graph node and dependency information corresponding to the dependency type.

8. A computer-implemented method comprising: performing an application programming interface (API) to cause a child graph node to be added to a software graph, based, at least in part, on a dependency type indicated by the API.

9. The computer-implemented method of clause 8, wherein the API is to cause the child graph node to be added to the software graph, based, at least in part, on the dependency type, one or more edges of the software graph, the one or more edges to or from the child graph node.

10. The computer-implemented method of clause 8 or 9, wherein the API is to further indicate a port identifier of a node associated with the child graph node.

11. The computer-implemented method of any one of clauses 8-10, wherein the dependency type includes one or more of a full execution dependency, a launch order dependency, or an anti-deadlock dependency.

12. The computer-implemented method of any one of clauses 8-11, wherein the child graph node is to be performed by one or more graphics processing units (GPUs) based, at least in part, on the dependency type.

13. The computer-implemented method of any one of clauses 8-12, wherein the API is to receive a set of parameters comprising an identifier of the child graph node and dependency information corresponding to the dependency type.

14. The computer-implemented method of any one of clauses 8-13, wherein the API is to cause the child graph node to be added to the software graph by identifying one or more graph nodes of the software graph dependent to or dependent on the child graph node.

15. A computer system comprising: one or more processors and memory storing executable instructions that, if performed by the one or more processors, are to perform an application programming interface (API) to cause a child graph node to be added to a software graph, based, at least in part, on a dependency type indicated by the API.

16. The computer system of clause 15, wherein the API is to cause the child graph node to be added to the software graph, based, at least in part, on the dependency type, one or more edges of the software graph, the one or more edges to or from the child graph node.

17. The computer system of clause 15 or 16, wherein the API is to further indicate a port identifier of a node associated with the child graph node.

18. The computer system of any one of clauses 15-17, wherein the API is to cause the child graph node to be added to the software graph by identifying one or more graph nodes of the software graph dependent to or dependent on the child graph node.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of the child graph node and dependency information corresponding to the dependency type.

At least one embodiment of the disclosure can be described in view of the following sixteenth set of clauses:

1. A processor, comprising: one or more circuits to perform an application programming interface (API) to cause one or more dependencies between two or more graph nodes to be added to a software graph based, at least in part, on a dependency type indicated by the API.

2. The processor of clause 1, wherein the API is to cause one or more dependencies between two or more graph nodes to be added to a software graph based, at least in part, adding one or more edges to the software graph, the one or more edges having the dependency type.

3. The processor of clause 1 or 2, wherein the API is to further indicate a port identifier of a node associated with the one or more dependencies.

4. The processor of any one of clauses 1-3, wherein the API is to cause the one or more dependencies to be added to a software graph by identifying one or more source nodes and one or more destination nodes of the two or more graph nodes.

5. The processor of any one of clauses 1-4, wherein the dependency type includes one or more of a full execution dependency, a launch order dependency, or an anti-deadlock dependency.

6. The processor of any one of clauses 1-5, wherein the two or more graph nodes are to be performed by one or more graphics processing units (GPUs) based, at least in part, on the dependency type.

7. The processor of any one of clauses 1-6, wherein the API is to receive a set of parameters comprising an identifier of a graph node and dependency information corresponding to the dependency type.

8. A computer-implemented method comprising: performing an application programming interface (API) to cause one or more dependencies between two or more graph nodes to be added to a software graph based, at least in part, on a dependency type indicated by the API.

9. The computer-implemented method of clause 8, wherein the API is to cause one or more dependencies between two or more graph nodes to be added to a software graph based, at least in part, adding one or more edges to the software graph, the one or more edges having the dependency type.

10. The computer-implemented method of clause 8 or 9, wherein the API is to further indicate a port identifier of a node associated with the one or more dependencies.

11. The computer-implemented method of any one of clauses 8-10, wherein the API is to cause the one or more dependencies to be added to a software graph by identifying one or more source nodes and one or more destination nodes of the two or more graph nodes.

12. The computer-implemented method of any one of clauses 8-11, wherein the dependency type includes one or more of a full execution dependency, a launch order dependency, or an anti-deadlock dependency.

13. The computer-implemented method of any one of clauses 8-12, wherein the two or more graph nodes are to be performed by one or more graphics processing units (GPUs) based, at least in part, on the dependency type.

14. The computer-implemented method of any one of clauses 8-13, wherein the API is to receive a set of parameters comprising an identifier of a graph node and dependency information corresponding to the dependency type.

15. A computer system comprising: one or more processors and memory storing executable instructions that, if performed by the one or more processors, are to perform an application programming interface (API) to cause one or more dependencies between two or more graph nodes to be added to a software graph based, at least in part, on a dependency type indicated by the API.

16. The computer system of clause 15, wherein the API is to cause one or more dependencies between two or more graph nodes to be added to a software graph based, at least in part, adding one or more edges to the software graph, the one or more edges having the dependency type.

17. The computer system of clause 15 or 16, wherein the API is to further indicate a port identifier of a node associated with the one or more dependencies.

18. The computer system of any one of clauses 15-17, wherein the API is to cause the one or more dependencies to be added to a software graph by identifying one or more source nodes and one or more destination nodes of the two or more graph nodes.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of a graph node and dependency information corresponding to the dependency type.

At least one embodiment of the disclosure can be described in view of the following seventeenth set of clauses:

1. A processor, comprising: one or more circuits to perform an application programming interface (API) to cause one or more dependencies between two or more graph nodes to be removed from a software graph based, at least in part, on a dependency type indicated by the API.

2. The processor of clause 1, wherein the API is to cause one or more dependencies between two or more graph nodes to be removed from a software graph based, at least in part, removing one or more edges to the software graph, the one or more edges having the dependency type.

3. The processor of clause 1 or 2, wherein the API is to receive an indication of the software graph.

4. The processor of any one of clauses 1-3, wherein the API is to cause the one or more dependencies to be removed from a software graph by identifying one or more source nodes and one or more destination nodes of the two or more graph nodes.

5. The processor of any one of clauses 1-4, wherein the dependency type includes one or more of a full execution dependency, a launch order dependency, or an anti-deadlock dependency.

6. The processor of any one of clauses 1-5, wherein the two or more graph nodes are to be performed by one or more graphics processing units (GPUs).

7. The processor of any one of clauses 1-6, wherein the API is to receive a set of parameters comprising an identifier of a graph node and dependency information corresponding to the dependency type.

8. A computer-implemented method comprising: performing an application programming interface (API) to cause one or more dependencies between two or more graph nodes to be removed from a software graph based, at least in part, on a dependency type indicated by the API.

9. The computer-implemented method of clause 8, wherein the API is to cause one or more dependencies between two or more graph nodes to be removed from a software graph based, at least in part, removing one or more edges to the software graph, the one or more edges having the dependency type.

10. The computer-implemented method of clause 8 or 9, wherein the API is to receive an indication of the software graph.

11. The computer-implemented method of any one of clauses 8-10, wherein the API is to cause the one or more dependencies to be removed from a software graph by identifying one or more source nodes and one or more destination nodes of the two or more graph nodes.

12. The computer-implemented method of any one of clauses 8-11, wherein the dependency type includes one or more of a full execution dependency, a launch order dependency, or an anti-deadlock dependency.

13. The computer-implemented method of any one of clauses 8-12, wherein the two or more graph nodes are to be performed by one or more graphics processing units (GPUs).

14. The computer-implemented method of any one of clauses 8-13, wherein the API is to receive a set of parameters comprising an identifier of a graph node and dependency information corresponding to the dependency type.

15. A computer system comprising: one or more processors and memory storing executable instructions that, if performed by the one or more processors, are to perform an application programming interface (API) to cause one or more dependencies between two or more graph nodes to be removed from a software graph based, at least in part, on a dependency type indicated by the API.

16. The computer system of clause 15, wherein the API is to cause one or more dependencies between two or more graph nodes to be removed from a software graph based, at least in part, removing one or more edges to the software graph, the one or more edges having the dependency type.

17. The computer system of clause 15 or 16, wherein the API is to receive an indication of the software graph.

18. The computer system of any one of clauses 15-17, wherein the API is to cause the one or more dependencies to be removed from a software graph by identifying one or more source nodes and one or more destination nodes of the two or more graph nodes.

19. The computer system of any one of clauses 15-18, wherein the dependency type includes one or more of a full execution dependency, a launch order dependency, or an anti-deadlock dependency.

20. The computer system of any one of clauses 15-19, wherein the API is to receive a set of parameters comprising an identifier of a graph node and dependency information corresponding to the dependency type.

At least one embodiment of the disclosure can be described in view of the following eighteenth set of clauses:

1. A processor, comprising: one or more circuits to perform an application programming interface (API) to cause dependency type information between two or more graph nodes of a software graph to be indicated.

2. The processor of clause 1, wherein the API is to cause dependency type information between two or more graph nodes of a software graph to be indicated based, at least in part, identifying one or more edges to the software graph, the one or more edges having a dependency type corresponding to the dependency type information.

3. The processor of clause 1 or 2, wherein the API is to receive an indication of a source node of the two or more graph nodes, the source node having a dependency with one or more destination nodes of the two or more graph nodes.

4. The processor of any one of clauses 1-3, wherein the API is to cause one or more graph nodes in the software graph to be indicated based, at least in part on the dependency type information.

5. The processor of any one of clauses 1-4, wherein the dependency type information includes a dependency which is one or more of a full execution dependency, a launch order dependency, or an anti-deadlock dependency.

6. The processor of any one of clauses 1-5, wherein the two or more graph nodes are to be performed by one or more graphics processing units (GPUs).

7. The processor of any one of clauses 1-6, wherein the API is to receive a set of parameters comprising an identifier of a graph node.

8. A computer-implemented method comprising: performing an application programming interface (API) to cause dependency type information between two or more graph nodes of a software graph to be indicated.

9. The computer-implemented method of clause 8, wherein the API is to cause dependency type information between two or more graph nodes of a software graph to be indicated based, at least in part, identifying one or more edges to the software graph, the one or more edges having a dependency type corresponding to the dependency type information.

10. The computer-implemented method of clause 8 or 9, wherein the API is to receive an indication of a source node of the two or more graph nodes, the source node having a dependency with one or more destination nodes of the two or more graph nodes.

11. The computer-implemented method of any one of clauses 8-10, wherein the API is to cause one or more graph nodes in the software graph to be indicated based, at least in part on the dependency type information.

12. The computer-implemented method of any one of clauses 8-11, wherein the dependency type information includes a dependency which is one or more of a full execution dependency, a launch order dependency, or an anti-deadlock dependency.

13. The computer-implemented method of any one of clauses 8-12, wherein the two or more graph nodes are to be performed by one or more graphics processing units (GPUs).

14. The computer-implemented method of any one of clauses 8-13, wherein the API is to receive a set of parameters comprising an identifier of a graph node.

15. A computer system comprising: one or more processors and memory storing executable instructions that, if performed by the one or more processors, are to perform an application programming interface (API) to cause dependency type information between two or more graph nodes of a software graph to be indicated.

16. The computer system of clause 15, wherein the API is to cause dependency type information between two or more graph nodes of a software graph to be indicated based, at least in part, identifying one or more edges to the software graph, the one or more edges having a dependency type corresponding to the dependency type information.

17. The computer system of clause 15 or 16, wherein the API is to receive an indication of a source node of the two or more graph nodes, the source node having a dependency with one or more destination nodes of the two or more graph nodes.

18. The computer system of any one of clauses 15-17, wherein the API is to cause one or more graph nodes in the software graph to be indicated based, at least in part on the dependency type information.

19. The computer system of any one of clauses 15-18, wherein the dependency type information includes a dependency which is one or more of a full execution dependency, a launch order dependency, or an anti-deadlock dependency.

20. The computer system of any one of clauses 15-19, wherein the API is to receive a set of parameters comprising an identifier of a graph node.

At least one embodiment of the disclosure can be described in view of the following nineteenth set of clauses:

1. A processor, comprising: one or more circuits to perform an application programming interface (API) to cause dependency type information between all graph nodes of a software graph to be indicated.

2. The processor of clause 1, wherein the API is to cause dependency type information between all graph nodes of a software graph to be indicated based, at least in part, identifying one or more edges to the software graph, the one or more edges having a dependency type corresponding to the dependency type information.

3. The processor of clause 1 or 2, wherein the API is to receive an indication of a source node of the graph nodes, the source node having a dependency with one or more destination nodes of the graph nodes.

4. The processor of any one of clauses 1-3, wherein the API is to cause one or more edges of the software graph to be indicated.

5. The processor of any one of clauses 1-4, wherein the dependency type information includes a dependency which is one or more of a full execution dependency, a launch order dependency, or an anti-deadlock dependency.

6. The processor of any one of clauses 1-5, wherein the graph nodes are to be performed by one or more graphics processing units (GPUs).

7. The processor of any one of clauses 1-6, wherein the API is to receive a set of parameters comprising an identifier of the software graph.

8. A computer-implemented method comprising: performing an application programming interface (API) to cause dependency type information between all graph nodes of a software graph to be indicated.

9. The computer-implemented method of clause 8, wherein the API is to cause dependency type information between all graph nodes of a software graph to be indicated based, at least in part, identifying one or more edges to the software graph, the one or more edges having a dependency type corresponding to the dependency type information.

10. The computer-implemented method of clause 8 or 9, wherein the API is to receive an indication of a source node of the graph nodes, the source node having a dependency with one or more destination nodes of the graph nodes.

11. The computer-implemented method of any one of clauses 8-10, wherein the API is to cause one or more edges of the software graph to be indicated.

12. The computer-implemented method of any one of clauses 8-11, wherein the dependency type information includes a dependency which is one or more of a full execution dependency, a launch order dependency, or an anti-deadlock dependency.

13. The computer-implemented method of any one of clauses 8-12, wherein the graph nodes are to be performed by one or more graphics processing units (GPUs).

14. The computer-implemented method of any one of clauses 8-13, wherein the API is to receive a set of parameters comprising an identifier of the software graph.

15. A computer system comprising: one or more processors and memory storing executable instructions that, if performed by the one or more processors, are to perform an application programming interface (API) to cause dependency type information between all graph nodes of a software graph to be indicated.

16. The computer system of clause 15, wherein the API is to cause dependency type information between all graph nodes of a software graph to be indicated based, at least in part, identifying one or more edges to the software graph, the one or more edges having a dependency type corresponding to the dependency type information.

17. The computer system of clause 15 or 16, wherein the API is to receive an indication of a source node of the graph nodes, the source node having a dependency with one or more destination nodes of the graph nodes.

18. The computer system of any one of clauses 15-17, wherein the API is to cause one or more edges of the software graph to be indicated.

19. The computer system of any one of clauses 15-18, wherein the dependency type information includes a dependency which is one or more of a full execution dependency, a launch order dependency, or an anti-deadlock dependency.

20. The computer system of any one of clauses 15-19, wherein the API is to receive a set of parameters comprising an identifier of the software graph.

At least one embodiment of the disclosure can be described in view of the following twentieth set of clauses:

1. A processor, comprising: one or more circuits to perform an application programming interface (API) to cause dependency type information of one or more user-indicated graph nodes of a software graph to be indicated.

2. The processor of clause 1, wherein the API is to cause dependency type information of one or more user-indicated graph nodes of a software graph to be indicated based, at least in part, identifying one or more edges to the software graph, the one or more edges dependent on or dependent from the one or more user-indicated graph nodes.

3. The processor of clause 1 or 2, wherein the API is to receive an indication of a source node of the one or more user-indicated graph nodes, the source node having a dependency with one or more destination nodes of the software graph.

4. The processor of any one of clauses 1-3, wherein the API is to cause one or more edges of the software graph to be indicated.

5. The processor of any one of clauses 1-4, wherein the dependency type information includes a dependency which is one or more of a full execution dependency, a launch order dependency, or an anti-deadlock dependency.

6. The processor of any one of clauses 1-5, wherein the one or more user-indicated graph nodes are to be performed by one or more graphics processing units (GPUs).

7. The processor of any one of clauses 1-6, wherein the API is to receive a set of parameters comprising an identifier of the one or more user-indicated graph nodes.

8. A computer-implemented method comprising: performing an application programming interface (API) to cause dependency type information of one or more user-indicated graph nodes of a software graph to be indicated.

9. The computer-implemented method of clause 8, wherein the API is to cause dependency type information of one or more user-indicated graph nodes of a software graph to be indicated based, at least in part, identifying one or more edges to the software graph, the one or more edges dependent on or dependent from the one or more user-indicated graph nodes.

10. The computer-implemented method of clause 8 or 9, wherein the API is to receive an indication of a source node of the one or more user-indicated graph nodes, the source node having a dependency with one or more destination nodes of the software graph.

11. The computer-implemented method of any one of clauses 8-10, wherein the API is to cause one or more edges of the software graph to be indicated.

12. The computer-implemented method of any one of clauses 8-11, wherein the dependency type information includes a dependency which is one or more of a full execution dependency, a launch order dependency, or an anti-deadlock dependency.

13. The computer-implemented method of any one of clauses 8-12, wherein the one or more user-indicated graph nodes are to be performed by one or more graphics processing units (GPUs).

14. The computer-implemented method of any one of clauses 8-13, wherein the API is to receive a set of parameters comprising an identifier of the one or more user-indicated graph nodes.

15. A computer system comprising: one or more processors and memory storing executable instructions that, if performed by the one or more processors, are to perform an application programming interface (API) to cause dependency type information of one or more user-indicated graph nodes of a software graph to be indicated.

16. The computer system of clause 15, wherein the API is to cause dependency type information of one or more user-indicated graph nodes of a software graph to be indicated based, at least in part, identifying one or more edges to the software graph, the one or more edges dependent on or dependent from the one or more user-indicated graph nodes.

17. The computer system of clause 15 or 16, wherein the API is to receive an indication of a source node of the one or more user-indicated graph nodes, the source node having a dependency with one or more destination nodes of the software graph.

18. The computer system of any one of clauses 15-17, wherein the API is to cause one or more edges of the software graph to be indicated.

19. The computer system of any one of clauses 15-18, wherein the dependency type information includes a dependency which is one or more of a full execution dependency, a launch order dependency, or an anti-deadlock dependency.

20. The computer system of any one of clauses 15-19, wherein the API is to receive a set of parameters comprising an identifier of the one or more user-indicated graph nodes.

At least one embodiment of the disclosure can be described in view of the following twenty first set of clauses:

1. A processor, comprising: one or more circuits to perform an application programming interface (API) to cause dependency type information of one or more graph nodes of a software graph to be modified.

2. The processor of clause 1, wherein the API is to cause dependency type information of one or more graph nodes of a software graph to be modified based, at least in part, identifying one or more edges to the software graph, the one or more edges dependent on or dependent from the one or more graph nodes.

3. The processor of clause 1 or 2, wherein the API is to receive a set of parameters comprising a dependency type to be used to modify the dependency type information of one or more graph nodes.

4. The processor of any one of clauses 1-3, wherein the API is to cause a first dependency type of an edge of the software graph to be updated to a second dependency type.

5. The processor of any one of clauses 1-4, wherein the dependency type information includes a dependency which is one or more of a full execution dependency, a launch order dependency, or an anti-deadlock dependency.

6. The processor of any one of clauses 1-5, wherein the one or more graph nodes are to be performed by one or more graphics processing units (GPUs).

7. The processor of any one of clauses 1-6, wherein the API is to receive a set of parameters comprising an identifier of the one or more graph nodes.

8. A computer-implemented method comprising: performing an application programming interface (API) to cause dependency type information of one or more graph nodes of a software graph to be modified.

9. The computer-implemented method of clause 8, wherein the API is to cause dependency type information of one or more graph nodes of a software graph to be modified based, at least in part, identifying one or more edges to the software graph, the one or more edges dependent on or dependent from the one or more graph nodes.

10. The computer-implemented method of clause 8 or 9, wherein the API is to receive a set of parameters comprising a dependency type to be used to modify the dependency type information of one or more graph nodes.

11. The computer-implemented method of any one of clauses 8-10, wherein the API is to cause a first dependency type of an edge of the software graph to be updated to a second dependency type.

12. The computer-implemented method of any one of clauses 8-11, wherein the dependency type information includes a dependency which is one or more of a full execution dependency, a launch order dependency, or an anti-deadlock dependency.

13. The computer-implemented method of any one of clauses 8-12, wherein the one or more graph nodes are to be performed by one or more graphics processing units (GPUs).

14. The computer-implemented method of any one of clauses 8-13, wherein the API is to receive a set of parameters comprising an identifier of the one or more graph nodes.

15. A computer system comprising: one or more processors and memory storing executable instructions that, if performed by the one or more processors, are to perform an application programming interface (API) to cause dependency type information of one or more graph nodes of a software graph to be modified.

16. The computer system of clause 15, wherein the API is to cause dependency type information of one or more graph nodes of a software graph to be modified based, at least in part, identifying one or more edges to the software graph, the one or more edges dependent on or dependent from the one or more graph nodes.

17. The computer system of clause 15 or 16, wherein the API is to receive a set of parameters comprising a dependency type to be used to modify the dependency type information of one or more graph nodes.

18. The computer system of any one of clauses 15-17, wherein the API is to cause a first dependency type of an edge of the software graph to be updated to a second dependency type.

19. The computer system of any one of clauses 15-18, wherein the dependency type information includes a dependency which is one or more of a full execution dependency, a launch order dependency, or an anti-deadlock dependency.

20. The computer system of any one of clauses 15-19, wherein the API is to receive a set of parameters comprising an identifier of the one or more graph nodes.

At least one embodiment of the disclosure can be described in view of the following twenty-second set of clauses:

1. A processor, comprising: one or more circuits to perform an application programming interface (API) to indicate one or more graph node functions of one or more graph nodes to be added to a software graph based, at least in part, on a dependency type indicated by the API.

2. The processor of clause 1, wherein the API is to indicate one or more graph node functions, based, at least in part, on a graph node type indicated by one or more node parameters.

3. The processor of clause 1 or 2, wherein the API is to further indicate a port identifier of a node associated with the one or more graph nodes.

4. The processor of any one of clauses 1-3, wherein the API is to cause the one or more graph nodes to be added to the software graph by identifying one or more nodes of the software graph dependent to or dependent on the one or more graph nodes.

5. The processor of any one of clauses 1-4, wherein the dependency type includes one or more of a full execution dependency, a launch order dependency, or an anti-deadlock dependency.

6. The processor of any one of clauses 1-5, wherein the graph node functions include one or more of a memory operation, a kernel operation, a child graph operation, a null-operation, a variable operation, or an event operation.

7. The processor of any one of clauses 1-6, wherein the API is to receive a set of parameters comprising an identifier of the one or more graph nodes and dependency information corresponding to the dependency type.

8. A computer-implemented method comprising: performing an application programming interface (API) to indicate one or more graph node functions of one or more graph nodes to be added to a software graph based, at least in part, on a dependency type indicated by the API.

9. The computer-implemented method of clause 8, wherein the API is to indicate one or more graph node functions, based, at least in part, on a graph node type indicated by one or more node parameters.

10. The computer-implemented method of clause 8 or 9, wherein the API is to further indicate a port identifier of a node associated with the one or more graph nodes.

11. The computer-implemented method of any one of clauses 8-10, wherein the API is to cause the one or more graph nodes to be added to the software graph by identifying one or more nodes of the software graph dependent to or dependent on the one or more graph nodes.

12. The computer-implemented method of any one of clauses 8-11, wherein the dependency type includes one or more of a full execution dependency, a launch order dependency, or an anti-deadlock dependency.

13. The computer-implemented method of any one of clauses 8-12, wherein the graph node functions include one or more of a memory operation, a kernel operation, a child graph operation, a null-operation, a variable operation, or an event operation.

14. The computer-implemented method of any one of clauses 8-13, wherein the API is to receive a set of parameters comprising an identifier of the one or more graph nodes and dependency information corresponding to the dependency type.

15. A computer system comprising: one or more processors and memory storing executable instructions that, if performed by the one or more processors, are to perform an application programming interface (API) to indicate one or more graph node functions of one or more graph nodes to be added to a software graph based, at least in part, on a dependency type indicated by the API.

16. The computer system of clause 15, wherein the API is to indicate one or more graph node functions, based, at least in part, on a graph node type indicated by one or more node parameters.

17. The computer system of clause 15 or 16, wherein the API is to further indicate a port identifier of a node associated with the one or more graph nodes.

18. The computer system of any one of clauses 15-17, wherein the API is to cause the one or more graph nodes to be added to the software graph by identifying one or more nodes of the software graph dependent to or dependent on the one or more graph nodes.

19. The computer system of any one of clauses 15-18, wherein the dependency type includes one or more of a full execution dependency, a launch order dependency, or an anti-deadlock dependency.

20. The computer system of any one of clauses 15-19, wherein the graph node functions include one or more of a memory operation, a kernel operation, a child graph operation, a null-operation, a variable operation, or an event operation.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms “a” and “an” and “the” and similar referents in context of describing disclosed embodiments (especially in context of following claims) are to be construed to cover both singular and plural, unless otherwise indicated herein or clearly contradicted by context, and not as a definition of a term. Terms “comprising,” “having,” “including,” and “containing” are to be construed as open-ended terms (meaning “including, but not limited to,”) unless otherwise noted. term “connected,” when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term “set” (e.g., “a set of items”) or “subset” unless otherwise noted or contradicted by context, is to be construed as a nonempty collection comprising one or more members. Further, unless otherwise noted or contradicted by context, term “subset” of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:

circuitry to, in response to an application programming interface (API) call, cause dependency type information of one or more graph nodes of a software graph to be modified, wherein modifying the dependency type information comprises altering the dependency type information from a first dependency type to a second dependency type of a plurality of dependency types, the second dependency type indicated by one or more input parameters of the API call.

2. The one or more processors of claim 1, wherein the circuitry is to cause the dependency type information of the one or more graph nodes of the software graph to be modified based, at least in part, identifying one or more edges to the software graph, the one or more edges dependent on or dependent from the one or more graph nodes.

3. The one or more processors of claim 1, wherein the API call is to receive a set of parameters comprising a dependency type to be used to modify the dependency type information of the one or more graph nodes.

4. The one or more processors of claim 1, wherein the circuitry is to cause the first dependency type of an edge of the software graph to be updated to the second dependency type.

5. The one or more processors of claim 1, wherein the dependency type information includes a dependency which is one or more of a full execution dependency, a launch order dependency, or an anti-deadlock dependency.

6. The one or more processors of claim 1, wherein the one or more graph nodes are to be performed by one or more graphics processing units (GPUs).

7. The one or more processors of claim 1, wherein the API call is to receive a set of parameters comprising an identifier of the one or more graph nodes.

8. A computer-implemented method comprising:

in response to an application programming interface (API) call, causing dependency type information of one or more graph nodes of a software graph to be modified, wherein modifying the dependency type information comprises altering the dependency type information from a first dependency type to a second dependency type of a plurality of dependency types, the second dependency type indicated by one or more input parameters of the API call.

9. The computer-implemented method of claim 8, wherein the dependency type information of the one or more graph nodes of the software graph is to be modified based, at least in part, identifying one or more edges to the software graph, the one or more edges dependent on or dependent from the one or more graph nodes.

10. The computer-implemented method of claim 8, wherein the API call is to receive a set of parameters comprising a dependency type to be used to modify the dependency type information of the one or more graph nodes.

11. The computer-implemented method of claim 8, wherein an invocation of the API call is to cause the first dependency type of an edge of the software graph to be updated to the second dependency type.

12. The computer-implemented method of claim 8, wherein the dependency type information includes a dependency which is one or more of a full execution dependency, a launch order dependency, or an anti-deadlock dependency.

13. The computer-implemented method of claim 8, wherein the one or more graph nodes are to be performed by one or more graphics processing units (GPUs).

14. The computer-implemented method of claim 8, wherein the API call is to receive a set of parameters comprising an identifier of the one or more graph nodes.

15. A computer system comprising:

one or more processors and memory storing executable instructions that, if performed by the one or more processors, are to, in response to an application programming interface (API) call, cause dependency type information of one or more graph nodes of a software graph to be modified, wherein modifying the dependency type information comprises altering the dependency type information from a first dependency type to a second dependency type of a plurality of dependency types, the second dependency type indicated by one or more input parameters of the API call.

16. The computer system of claim 15, wherein the one or more processors are to cause the dependency type information of the one or more graph nodes of the software graph to be modified based, at least in part, identifying one or more edges to the software graph, the one or more edges dependent on or dependent from the one or more graph nodes.

17. The computer system of claim 15, wherein the API call is to receive a set of parameters comprising a dependency type to be used to modify the dependency type information of the one or more graph nodes.

18. The computer system of claim 15, wherein the one or more processors, in response to the API call, are to cause the first dependency type of an edge of the software graph to be updated to the second dependency type.

19. The computer system of claim 15, wherein the dependency type information includes a dependency which is one or more of a full execution dependency, a launch order dependency, or an anti-deadlock dependency.

20. The computer system of claim 15, wherein the API call is to receive a set of parameters comprising an identifier of the one or more graph nodes.

* * * * *